(12) United States Patent
Seefeldt et al.

(10) Patent No.: US 12,170,875 B2
(45) Date of Patent: Dec. 17, 2024

(54) MANAGING PLAYBACK OF MULTIPLE STREAMS OF AUDIO OVER MULTIPLE SPEAKERS

(71) Applicants: Dolby Laboratories Licensing Corporation, San Francisco, CA (US); Dolby International AB, Amsterdam (NL)

(72) Inventors: Alan J. Seefeldt, Alameda, CA (US); Joshua B. Lando, Mill Valley, CA (US); Daniel Arteaga, Barcelona (ES); Mark R. P Thomas, Walnut Creek, CA (US); Glenn N. Dickins, Como (AU)

(73) Assignees: Dolby Laboratories Licensing Corporation, San Francisco, CA (US); Dolby International AB, Amsterdam (NL)

( * ) Notice: Subject to any disclaimer, the term of this patent is extended or adjusted under 35 U.S.C. 154(b) by 284 days.

(21) Appl. No.: 17/630,917

(22) PCT Filed: Jul. 27, 2020

(86) PCT No.: PCT/US2020/043696
§ 371 (c)(1),
(2) Date: Jan. 28, 2022

(87) PCT Pub. No.: WO2021/021707
PCT Pub. Date: Feb. 4, 2021

(65) Prior Publication Data
US 2022/0272454 A1   Aug. 25, 2022

Related U.S. Application Data

(60) Provisional application No. 62/705,896, filed on Jul. 21, 2020, provisional application No. 62/705,410, (Continued)

(30) Foreign Application Priority Data

Jul. 30, 2019  (ES) .................................. P201930702
Dec. 18, 2019  (EP) .................................... 19217580

(51) Int. Cl.
*H04R 3/12* (2006.01)
*G10L 15/08* (2006.01)
(Continued)

(52) U.S. Cl.
CPC ................ *H04R 3/12* (2013.01); *G10L 15/08* (2013.01); *G10L 15/22* (2013.01); *G10L 25/78* (2013.01);
(Continued)

(58) Field of Classification Search
CPC ... H04R 3/12; H04R 5/02; H04R 5/04; H04R 2430/01; H04R 2227/005; H04R 3/14;
(Continued)

(56) References Cited

U.S. PATENT DOCUMENTS 5,450,494 A  *  9/1995  Okubo ...................... H04S 1/00
                                                         348/E5.122
7,555,354 B2     6/2009  Walsh
(Continued)

FOREIGN PATENT DOCUMENTS

CN    104054126 A    1/2013
CN    106658342 A    7/2013
(Continued)

OTHER PUBLICATIONS

Lee, C.H. "Location-Aware Speakers for the Virtual Reality Environments" Feb. 2017, IEEE Access, vol. 5, pp. 2636-2640, 2017.
(Continued)

*Primary Examiner* — Xu Mei

(57) ABSTRACT

A multi-stream rendering system and method may render and play simultaneously a plurality of audio program
(Continued)

streams over a plurality of arbitrarily placed loudspeakers. At least one of the program streams may be a spatial mix. The rendering of said spatial mix may be dynamically modified as a function of the simultaneous rendering of one or more additional program streams. The rendering of one or more additional program streams may be dynamically modified as a function of the simultaneous rendering of the spatial mix.

29 Claims, 71 Drawing Sheets

Related U.S. Application Data filed on Jun. 25, 2020, provisional application No. 62/705,351, filed on Jun. 23, 2020, provisional application No. 62/705,143, filed on Jun. 12, 2020, provisional application No. 62/704,754, filed on May 27, 2020, provisional application No. 62/992,068, filed on Mar. 19, 2020, provisional application No. 62/971,421, filed on Feb. 7, 2020, provisional application No. 62/949,998, filed on Dec. 18, 2019, provisional application No. 62/880,111, filed on Jul. 30, 2019, provisional application No. 62/880,114, filed on Jul. 30, 2019, provisional application No. 62/880,115, filed on Jul. 30, 2019.

(51) Int. Cl.
G10L 15/22 (2006.01)
G10L 25/78 (2013.01)
H04R 5/02 (2006.01)
H04R 5/04 (2006.01)
H04S 7/00 (2006.01)

(52) U.S. Cl.
CPC ............. *H04R 5/02* (2013.01); *H04R 5/04* (2013.01); *H04S 7/30* (2013.01); *G10L 2015/088* (2013.01); *G10L 2015/223* (2013.01); *H04R 2430/01* (2013.01); *H04S 2400/11* (2013.01); *H04S 2400/13* (2013.01); *H04S 2400/15* (2013.01)

(58) Field of Classification Search
CPC .... H04S 7/30; H04S 2400/11; H04S 2400/13; H04S 2400/15; H04S 2420/01; H04S 7/303; H04S 3/00; G10L 15/08; G10L 15/22; G10L 25/78; G10L 2015/088; G10L 2015/223
USPC .................................. 381/303, 309, 310, 86
See application file for complete search history.

(56) References Cited

U.S. PATENT DOCUMENTS

| | | | |
|---|---|---|---|
| 8,103,008 B2* | 1/2012 | Johnston | H03G 9/025 381/102 |
| 8,170,221 B2* | 5/2012 | Christoph | H03G 3/3089 381/103 |
| 8,208,663 B2 | 6/2012 | Jeong | |
| 8,509,454 B2 | 8/2013 | Kirkeby | |
| 8,879,742 B2 | 11/2014 | Disch | |
| 9,031,268 B2 | 5/2015 | Fejzo | |
| 9,086,475 B2 | 7/2015 | Kleijn | |
| 9,215,545 B2 | 12/2015 | Dublin | |
| 9,264,806 B2 | 2/2016 | Hyun | |
| 9,316,717 B2 | 4/2016 | Gicklhorn | |
| 9,332,370 B2 | 5/2016 | Zajac | |
| 9,396,731 B2 | 7/2016 | Herre | |
| 9,412,385 B2 | 8/2016 | Sen | |
| 9,549,253 B2 | 1/2017 | Alexandridis | |
| 9,646,620 B1 | 5/2017 | Oh | |
| 9,723,425 B2 | 8/2017 | Fischer | |
| 9,813,804 B2 | 11/2017 | Franck | |
| 9,900,694 B1 | 2/2018 | List | |
| 9,933,989 B2 | 4/2018 | Tsingos | |
| 9,942,686 B1 | 4/2018 | Family | |
| 9,955,253 B1 | 4/2018 | Chavez | |
| 10,074,373 B2 | 9/2018 | Atti | |
| 10,075,791 B2 | 9/2018 | Milne | |
| 10,096,325 B2 | 10/2018 | Terentiv | |
| 10,097,944 B2 | 10/2018 | Christoph | |
| 10,142,758 B2 | 11/2018 | Sikora | |
| 10,334,384 B2 | 6/2019 | Sun | |
| 10,506,361 B1 | 12/2019 | Pallamsetty | |
| 2011/0109798 A1 | 5/2011 | Mcreynolds | |
| 2011/0316996 A1 | 12/2011 | Abe | |
| 2012/0020480 A1* | 1/2012 | Visser | H04R 3/12 381/17 |
| 2012/0230497 A1 | 9/2012 | Dressler | |
| 2013/0013096 A1 | 1/2013 | Seefeldt | |
| 2014/0096219 A1* | 4/2014 | Lang | H04R 27/00 726/9 |
| 2014/0172435 A1 | 6/2014 | Thiergart | |
| 2015/0016642 A1 | 1/2015 | Walsh | |
| 2015/0128194 A1 | 5/2015 | Kuang | |
| 2015/0131966 A1 | 5/2015 | Zurek | |
| 2015/0256933 A1* | 9/2015 | Vautin | B60R 11/0217 381/86 |
| 2016/0088388 A1* | 3/2016 | Franck | H04R 5/02 381/305 |
| 2016/0104491 A1 | 4/2016 | Taegyu | |
| 2016/0134988 A1 | 5/2016 | Gorzel | |
| 2016/0142763 A1 | 5/2016 | Kim | |
| 2016/0212559 A1 | 7/2016 | Mateos Sole | |
| 2016/0322062 A1 | 11/2016 | Li | |
| 2016/0337755 A1 | 11/2016 | Bagby | |
| 2017/0012591 A1 | 1/2017 | Rider | |
| 2017/0032793 A1 | 2/2017 | Baumgarte | |
| 2017/0125023 A1 | 5/2017 | Oh | |
| 2017/0280264 A1 | 9/2017 | Wang | |
| 2017/0374465 A1 | 12/2017 | Family | |
| 2018/0060025 A1 | 3/2018 | Hill | |
| 2018/0108351 A1 | 4/2018 | Beckhardt | |
| 2018/0124543 A1* | 5/2018 | Leppänen | H04S 7/303 |
| 2018/0152803 A1 | 5/2018 | Seefeldt | |
| 2018/0165054 A1 | 6/2018 | Kang | |
| 2018/0184199 A1 | 6/2018 | Fontana | |
| 2018/0192223 A1 | 7/2018 | Satheesh | |
| 2018/0249267 A1 | 8/2018 | Klingler | |
| 2018/0288556 A1 | 10/2018 | Kyung | |
| 2018/0332420 A1 | 11/2018 | Salume | |
| 2018/0352329 A1 | 12/2018 | Klingler | |
| 2018/0357038 A1 | 12/2018 | Olivieri | |
| 2019/0016644 A1 | 1/2019 | Liang | |
| 2019/0104366 A1 | 4/2019 | Johnson | |
| 2019/0124458 A1 | 4/2019 | Sheen | |
| 2019/0158974 A1 | 5/2019 | Tsingos | |
| 2019/0239013 A1 | 8/2019 | Audfray | |
| 2020/0351606 A1 | 11/2020 | Seefeldt | |

FOREIGN PATENT DOCUMENTS

| | | |
|---|---|---|
| CN | 105191354 A | 5/2014 |
| EP | 1206161 A1 | 5/2002 |
| EP | 2030660 A1 | 3/2009 |
| EP | 2568702 B1 | 5/2014 |
| EP | 3148224 A2 | 3/2017 |
| EP | 3209034 A1 | 8/2017 |
| EP | 2901717 B2 | 12/2019 |
| EP | 3032847 B1 | 1/2020 |
| EP | 3223542 B1 | 4/2021 |
| GB | 2561844 A | 10/2018 |
| JP | H06310962 A | 11/1994 |
| JP | 2006115364 A | 4/2006 |
| JP | 2016005207 A | 1/2016 |
| WO | 2014007724 W | 1/2014 |
| WO | 2016048381 W | 3/2016 |

(56) References Cited

FOREIGN PATENT DOCUMENTS

| WO | 2017039632 A1 | 3/2017 |
| --- | --- | --- |
| WO | 2018064410 W | 4/2018 |
| WO | 2018202324 W | 11/2018 |
| WO | 19012131 W | 1/2019 |
| WO | 2019004524 W | 1/2019 |
| WO | 2019067445 A1 | 4/2019 |
| WO | 2019067620 A1 | 4/2019 |
| WO | 2019089322 W | 5/2019 |
| WO | 2019246457 W | 12/2019 |

OTHER PUBLICATIONS

Nielsen, Jesper Kjoer "Loudspeaker and Listening Position Estimation Using Smart Speakers" IEEE International Conference on Acoustics, Speech and Signal Processing (ICASSP), Calgary, AB, 2018, pp. 81-85.

Plinge, A. et al "Passive Online Geometry Calibration of Acoustic Sensor Networks," IEEE Signal Processing Letters, vol. 24, No. 3, pp. 324-328, Mar. 2017.

Plinge, A. et al "Acoustic microphone geometry calibration: An overview and experimental evaluation of state-of-the-art algorithms" IEEE Signal Processing Society, Jul. 2016.

Plinge, A. et al "Geometry Calibration of Distributed Microphone Arrays Exploiting Audio-Visual Correspondences" IEEE Conference Location: Lisbon, Portugal, Sep. 2014.

\* cited by examiner

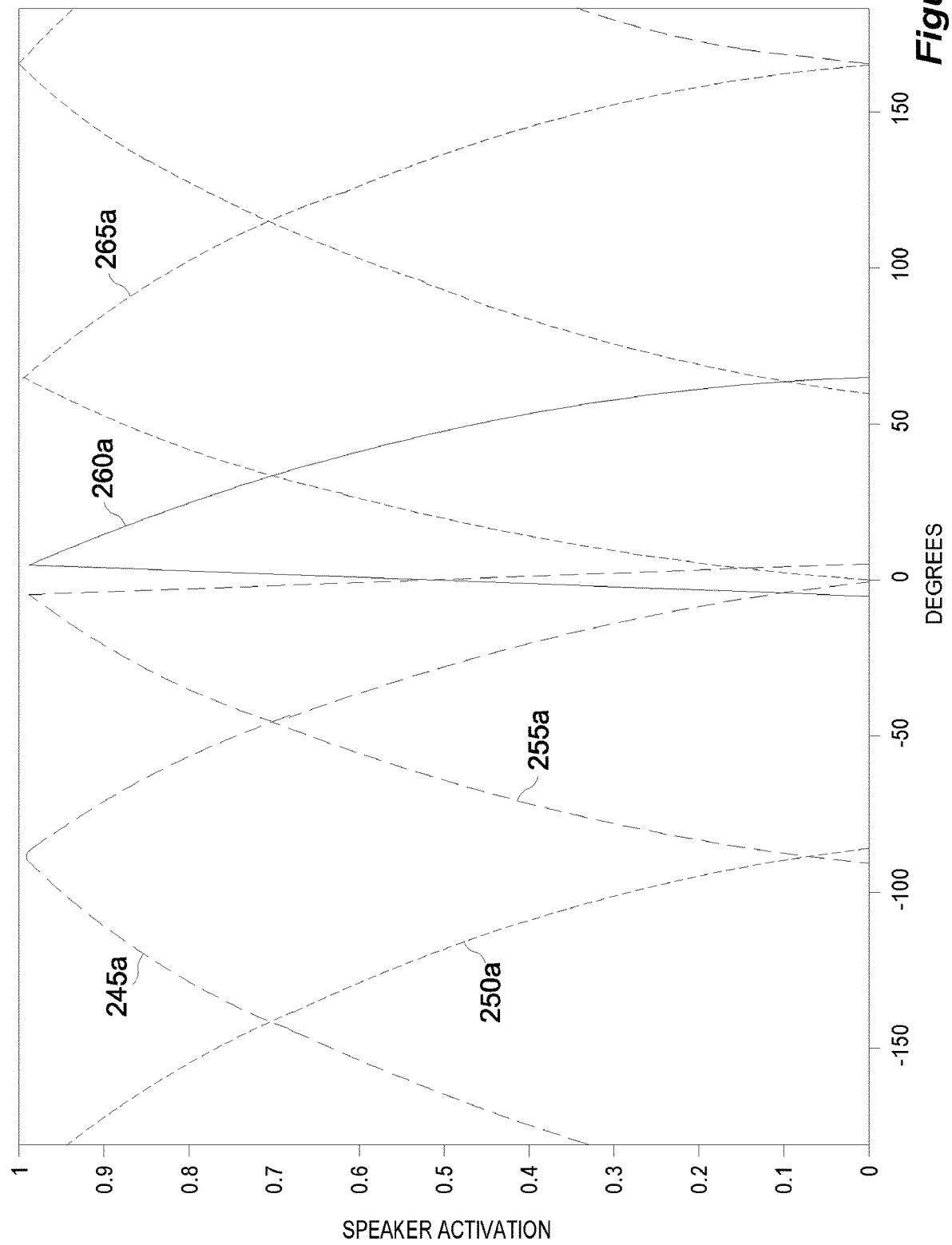

Receiving, by a control system and via an interface system, audio data, the audio data including one or more audio signals and associated spatial data, the spatial data indicating an intended perceived spatial position corresponding to an audio signal ⎯ 285

Rendering, by the control system, the audio data for reproduction via a set of loudspeakers of an environment, to produce rendered audio signals, wherein rendering each of the one or more audio signals included in the audio data comprises determining relative activation of a set of loudspeakers in an environment by optimizing a cost that is a function of: a model of perceived spatial position of the audio signal played when played back over the set of loudspeakers in the environment; a measure of proximity of the intended perceived spatial position of the audio signal to a position of each loudspeaker of the set of loudspeakers; and one or more additional dynamically configurable functions, wherein the one or more additional dynamically configurable functions are based on one or more of: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance ⎯ 290

Providing, via the interface system, the rendered audio signals to at least some loudspeakers of the set of loudspeakers of the environment ⎯ 295

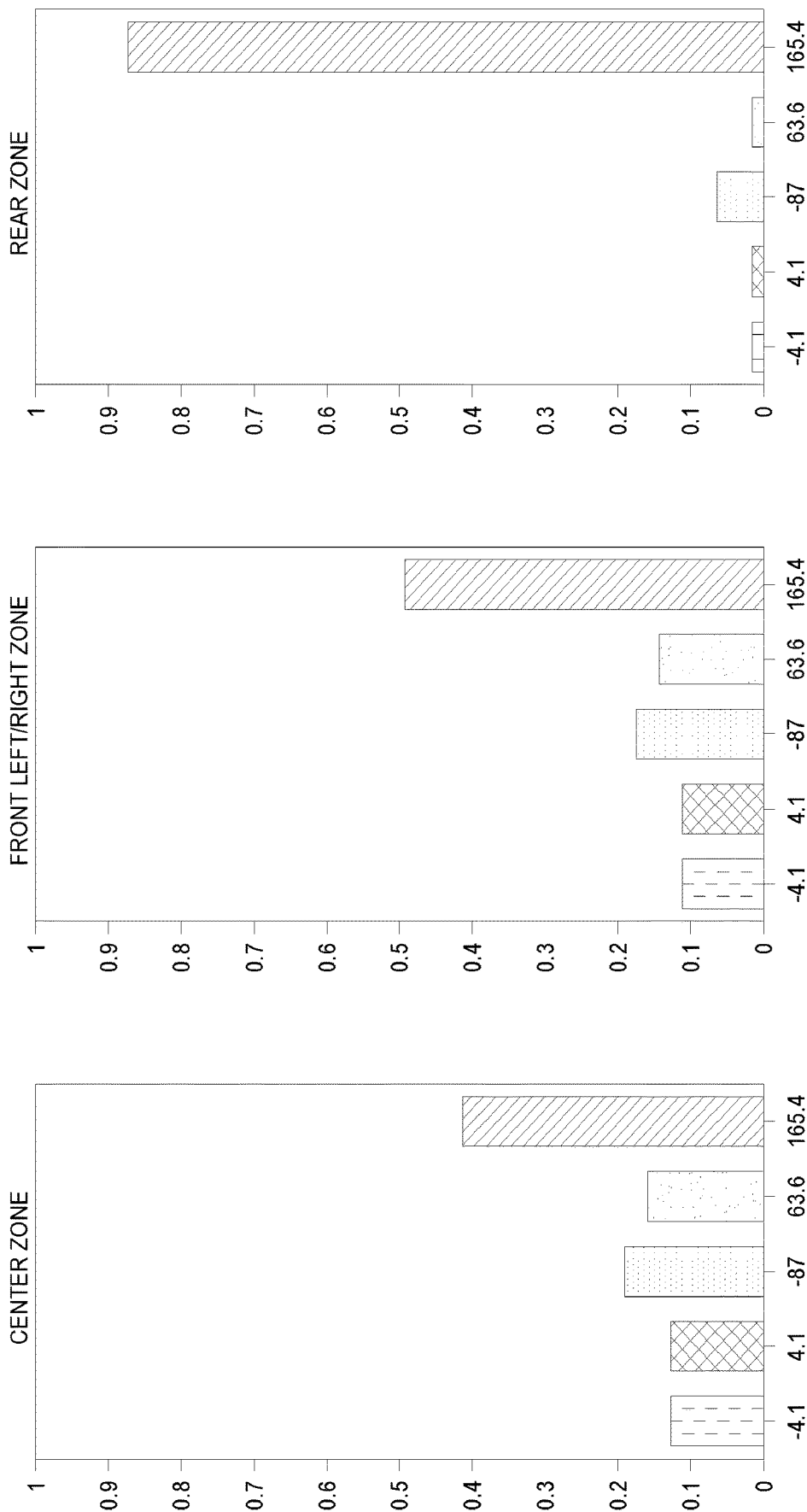

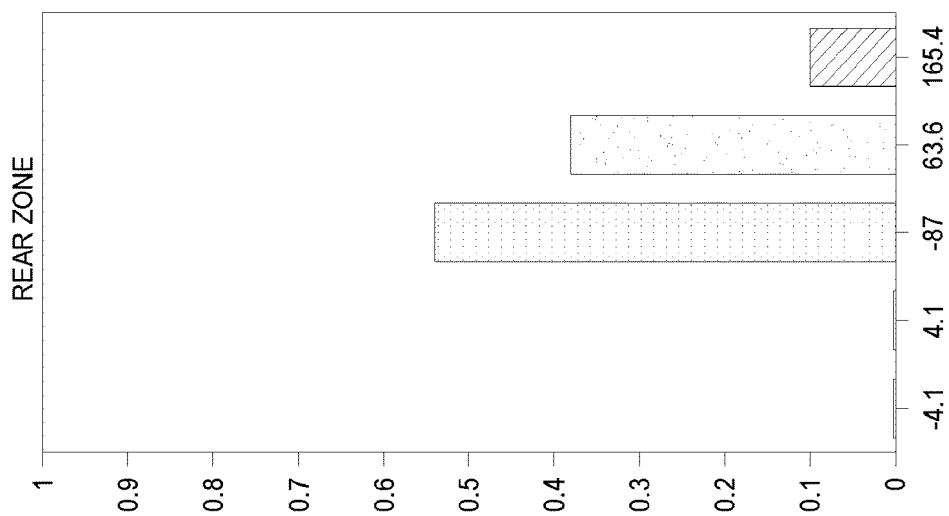
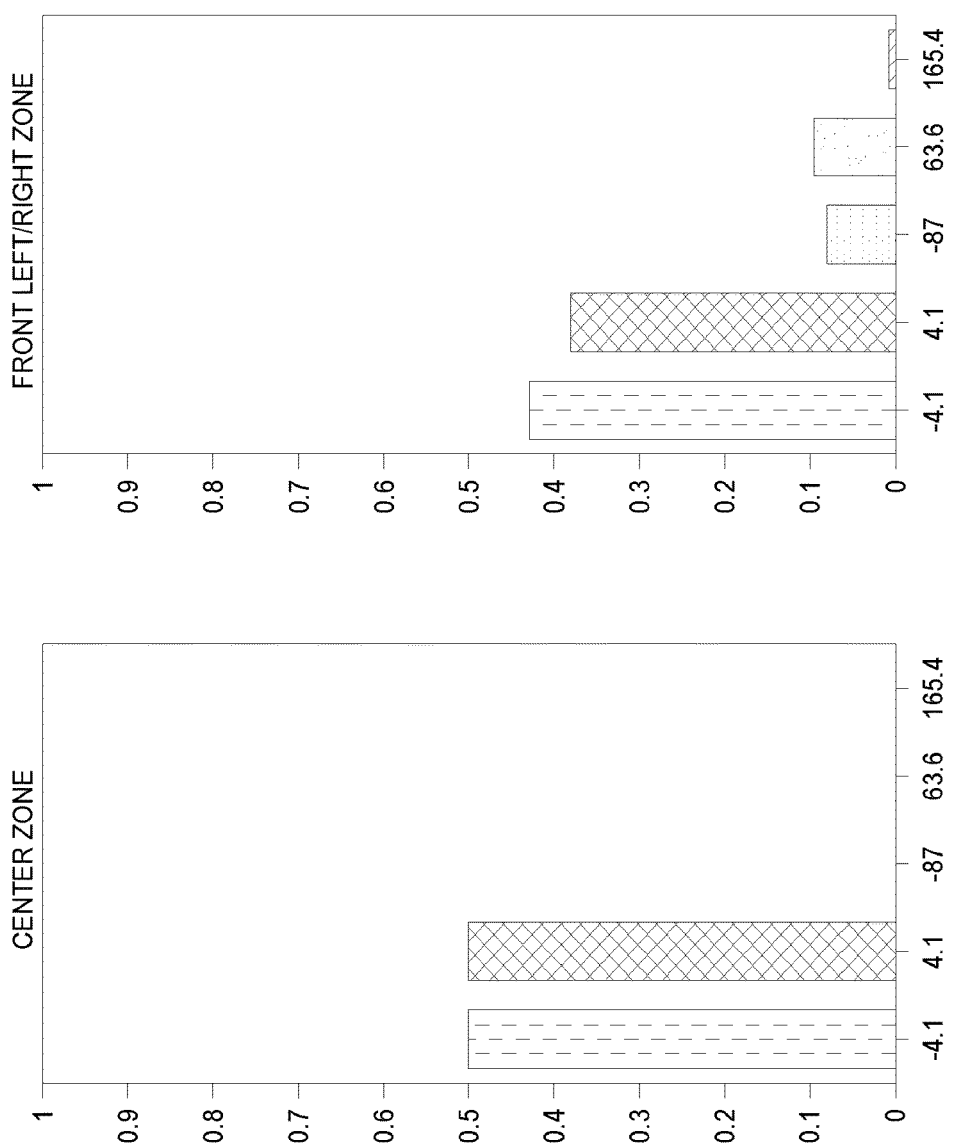
FIG. 41A
FIG. 41B
FIG. 41C

MANAGING PLAYBACK OF MULTIPLE STREAMS OF AUDIO OVER MULTIPLE SPEAKERS

CROSS-REFERENCE TO RELATED APPLICATIONS

The present application is the U.S. national stage of International Patent Application No. PCT/US20/043696 filed on Jul. 27, 2020 which in turn claims priority to U.S. Provisional Patent Application No. 62/705,896 filed on Jul. 21, 2020, U.S. Provisional Patent Application No. 62/705,410 filed on Jun. 25, 2020, U.S. Provisional Patent Application No. 62/705,351 filed on Jun. 23, 2020, U.S. Provisional Patent Application No. 62/705,143 filed on Jun. 12, 2020, U.S. Provisional Patent Application No. 62/704,754 filed on May 27, 2020, U.S. Provisional Patent Application No. 62/992,068 filed on Mar. 19, 2020, U.S. Provisional Patent Application No. 62/971,421 filed on Feb. 7, 2020, U.S. Provisional Patent Application No. 62/949,998 filed on Dec. 18, 2019, U.S. Provisional Patent Application No. 62/880,111 filed on Jul. 30, 2019, U.S. Provisional Patent Application No. 62/880,114 filed on Jul. 30, 2019, U.S. Provisional Patent Application No. 62/880,115 filed on Jul. 30, 2019, Spanish Application No. P201930702 filed Jul. 30, 2019 and EP application Ser. No. 19217580.0 filed Dec. 18, 2019. The Examiner is requested to acknowledge this status in the next official action.

TECHNICAL FIELD

This disclosure pertains to systems and methods for playback, and rendering for playback, of audio by some or all speakers (for example, each activated speaker) of a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV) or a mobile phone) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

Some embodiments involve methods for managing playback of multiple streams of audio by at least one (e.g., all or some) of the smart audio devices of a set of smart audio devices, and/or by at least one (e.g., all or some) of the speakers of another set of speakers.

A class of embodiments involves methods for managing playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices.

Orchestrating smart audio devices (e.g., in the home to handle a variety of simultaneous use cases) may involve the simultaneous playback of one or more audio program streams over an interconnected set of speakers. For example, a user might be listening to a cinematic Atmos soundtrack (or other object-based audio program) over a set of speakers (e.g., included in or controlled by a set of smart audio devices), and then the user may utter a command (e.g., a wakeword followed by a command) to an associated smart audio device (e.g., a smart assistant). In this case, the audio playback by the system may by modified (in accordance with some embodiments) to warp the spatial presentation of the program (e.g., an Atmos mix) away from the location of the talker (the talking user) and to direct playback of a smart audio device's (e.g., voice assistant's) corresponding response to speakers close to the talker. This may provide important benefits in comparison to merely reducing volume of playback of the audio program content in response to detection of the command (or a corresponding wakeword). Similarly, a user might want to use the speakers to obtain cooking tips in the kitchen while the same program (e.g., Atmos soundtrack) is playing in an adjacent open living space. In this case, in accordance with some embodiments, playback of the program (e.g., the Atmos soundtrack) can be warped away from the kitchen and the cooking tips can be played out of speakers near or in the kitchen. Additionally the cooking tips playing in the kitchen can be dynamically adjusted (in accordance with some embodiments) to be heard by a person in the kitchen above any of the program (e.g., Atmos soundtrack) that might be bleeding in from the living space.

Some embodiments are multi-stream rendering systems configured to implement the example use cases set forth above as well as numerous others which are contemplated. In a class of embodiments, an audio rendering system may be configured to render a plurality of audio program streams for simultaneous playback (and/or play the streams simultaneously) over a plurality of arbitrarily placed loudspeakers, wherein at least one of said program streams is a spatial mix and the rendering (or rendering and playback) of said spatial mix is dynamically modified in response to (or in connection with) the simultaneous playback (or rendering and playback) of one or more additional program streams.

Aspects of some implementations include a system configured (e.g., programmed) to perform any embodiment of the disclosed method or steps thereof, and a tangible, non-transitory, computer readable medium which implements non-transitory storage of data (for example, a disc or other tangible storage medium) which stores code for performing (e.g., code executable to perform) any embodiment of the disclosed methods or steps thereof. For example, some embodiments can be or include a programmable general purpose processor, digital signal processor, or microprocessor, programmed with software or firmware and/or otherwise configured to perform any of a variety of operations on data, including an embodiment of the disclosed methods or steps thereof. Such a general purpose processor may be or include a computer system including an input device, a memory, and a processing subsystem that is programmed (and/or otherwise configured) to perform an embodiment of the disclosed methods (or steps thereof) in response to data asserted thereto.

At least some aspects of the present disclosure may be implemented via apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system includes, or implements, at least 2 rendering modules. According to some examples, the control system may include, or may implement, N rendering modules, where N is an integer greater than 2.

In some examples, a first rendering module is configured for receiving, via the interface system, a first audio program stream. In some instances, the first audio program stream includes first audio signals that are scheduled to be reproduced by at least some speakers of an environment. In some examples, the first audio program stream includes first spatial data, which includes channel data and/or spatial metadata. According to some examples, the first rendering module is configured for rendering the first audio signals for reproduction via the speakers of the environment, to produce first rendered audio signals.

In some implementations, a second rendering module is configured for receiving, via the interface system, a second audio program stream. In some instances, the second audio program stream includes second audio signals that are scheduled to be reproduced by at least some speakers of the environment. In some examples, the second audio program stream includes second spatial data, which includes channel data and/or spatial metadata. According to some examples, the second rendering module is configured for rendering the second audio signals for reproduction via the speakers of the environment, to produce second rendered audio signals.

According to some examples, the first rendering module is configured for modifying a rendering process for the first audio signals based at least in part on at least one of the second audio signals, the second rendered audio signals or characteristics thereof, to produce modified first rendered audio signals. In some implementations, the second rendering module is further configured for modifying a rendering process for the second audio signals based at least in part on at least one of the first audio signals, the first rendered audio signals or characteristics thereof, to produce modified second rendered audio signals.

In some implementations, the audio processing system includes a mixing module configured for mixing the modified first rendered audio signals and the modified second rendered audio signals to produce mixed audio signals. In some examples, the control system is further configured for providing the mixed audio signals to at least some speakers of the environment.

According to some examples, the audio processing system may include one or more additional rendering modules. In some instances, each of the one or more additional rendering modules may be configured for receiving, via the interface system, an additional audio program stream. The additional audio program stream may include additional audio signals that are scheduled to be reproduced by at least one speaker of the environment. In some instances, each of the one or more additional rendering modules may be configured for rendering the additional audio signals for reproduction via at least one speaker of the environment, to produce additional rendered audio signals. In some instances, each of the one or more additional rendering modules may be configured for modifying a rendering process for the additional audio signals based at least in part on at least one of the first audio signals, the first rendered audio signals, the second audio signals, the second rendered audio signals or characteristics thereof, to produce modified additional rendered audio signals. In some such examples, the mixing module may be further configured for mixing the modified additional rendered audio signals with at least the modified first rendered audio signals and the modified second rendered audio signals, to produce the mixed audio signals.

In some implementations, modifying the rendering process for the first audio signals may involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

According to some examples, modifying the rendering process for the second audio signals may involve warping the rendering of second audio signals away from a rendering location of the first rendered audio signals. Alternatively, or additionally, modifying the rendering process for the second audio signals may involve modifying the loudness of one or more of the second rendered audio signals in response to a loudness of one or more of the first audio signals or the first rendered audio signals. According to some implementations, modifying the rendering process for the first audio signals and/or the second audio signals may involve performing spectral modification, audibility-based modification and/or dynamic range modification.

In some examples, the audio processing system may include a microphone system that includes one or more microphones. In some such examples, the first rendering module may be configured for modifying a rendering process for the first audio signals based at least in part on first microphone signals from the microphone system. In some such examples, the second rendering module may be configured for modifying a rendering process for the second audio signals based at least in part on the first microphone signals.

According to some examples, the control system may be further configured for estimating a first sound source position based on the first microphone signals and for modifying the rendering process for at least one of the first audio signals or the second audio signals based at least in part on the first sound source position. In some examples, the control system may be further configured for determining whether the first microphone signals correspond to environmental noise and for modifying the rendering process for at least one of the first audio signals or the second audio signals based at least in part on whether the first microphone signals correspond to environmental noise.

In some examples, the control system may be configured for determining whether the first microphone signals correspond to a human voice and for modifying the rendering process for at least one of the first audio signals or the second audio signals based at least in part on whether the first microphone signals correspond to a human voice. According to some such examples, modifying the rendering process for the first audio signals may involve reducing the loudness of the first rendered audio signals reproduced by speakers near the first sound source position, as compared to the loudness of the first rendered audio signals reproduced by speakers farther from the first sound source position.

According to some examples, the control system may be configured for determining that the first microphone signals correspond to a wakeword, for determining a reply to the wakeword and for controlling at least one speaker near the first sound source location to reproduce the reply. In some examples, the control system may be configured for determining that the first microphone signals correspond to a command, for determining a reply to the command, for controlling at least one speaker near the first sound source location to reproduce the reply and for executing the command According to some examples, the control system may be further configured for reverting to an unmodified rendering process for the first audio signals after controlling at least one speaker near the first sound source location to reproduce the reply.

In some implementations, the control system may be configured for deriving a loudness estimate for the reproduced first audio program stream and/or the reproduced second audio program stream based at least in part on the first microphone signals. According to some examples, the control system may be further configured for modifying the rendering process for at least one of the first audio signals or the second audio signals based at least in part on the loudness estimate. In some instances, the loudness estimate may be a perceived loudness estimate. According to some such examples, modifying the rendering process may involve altering at least one of the first audio signals or the second audio signals in order to preserve the perceived loudness of the first audio signals and/or the second audio signals in the presence of an interfering signal.

In some examples, the control system may be configured for determining that the first microphone signals correspond to a human voice and reproducing the first microphone signals in one or more speakers near a location of the environment that is different from the first sound source position. According to some such examples, the control system may be further configured for determining whether the first microphone signals correspond to a child's cry. In some such examples, the location of the environment may correspond to an estimated location of a caregiver.

According to some examples, the control system may be configured for deriving a loudness estimate for the reproduced first audio program stream and/or the reproduced second audio program stream. In some such examples, the control system may be further configured for modifying the rendering process for the first audio signals and/or the second audio signals based at least in part on the loudness estimate. According to some examples, the loudness estimate may be a perceived loudness estimate. Modifying the rendering process may involve altering at least one of the first audio signals or the second audio signals in order to preserve its perceived loudness in the presence of an interfering signal.

In some implementations, rendering the first audio signals and/or rendering the second audio signals may involve flexible rendering to arbitrarily located speakers. In some such examples, the flexible rendering may involve Center of Mass Amplitude Panning or Flexible Virtualization.

At least some aspects of the present disclosure may be implemented via one or more audio processing methods. In some instances, the method(s) may be implemented, at least in part, by a control system such as those disclosed herein. Some such methods involve receiving, by a first rendering module, a first audio program stream, the first audio program stream including first audio signals that are scheduled to be reproduced by at least some speakers of an environment. In some examples, the first audio program stream includes first spatial data, including channel data and/or spatial metadata. Some such methods involve rendering, by the first rendering module, the first audio signals for reproduction via the speakers of the environment, to produce first rendered audio signals.

Some such methods involve receiving, by a second rendering module, a second audio program stream. In some examples, the second audio program stream includes second audio signals that are scheduled to be reproduced by at least one speaker of the environment. Some such methods involve rendering, by the second rendering module, the second audio signals for reproduction via at least one speaker of the environment, to produce second rendered audio signals.

Some such methods involve modifying, by the first rendering module, a rendering process for the first audio signals based at least in part on at least one of the second audio signals, the second rendered audio signals or characteristics thereof, to produce modified first rendered audio signals. Some such methods involve modifying, by the second rendering module, a rendering process for the second audio signals based at least in part on at least one of the first audio signals, the first rendered audio signals or characteristics thereof, to produce modified second rendered audio signals. Some such methods involve mixing the modified first rendered audio signals and the modified second rendered audio signals to produce mixed audio signals and providing the mixed audio signals to at least some speakers of the environment.

According to some examples, modifying the rendering process for the first audio signals may involve warping the rendering of first audio signals away from a rendering location of the second rendered audio signals and/or modifying the loudness of one or more of the first rendered audio signals in response to a loudness of one or more of the second audio signals or the second rendered audio signals.

In some examples, modifying the rendering process for the second audio signals may involve warping the rendering of second audio signals away from a rendering location of the first rendered audio signals and/or modifying the loudness of one or more of the second rendered audio signals in response to a loudness of one or more of the first audio signals or the first rendered audio signals.

According to some examples, modifying the rendering process for the first audio signals may involve performing spectral modification, audibility-based modification and/or dynamic range modification.

Some methods may involve modifying, by the first rendering module, a rendering process for the first audio signals based at least in part on first microphone signals from a microphone system. Some methods may involve modifying, by the second rendering module, a rendering process for the second audio signals based at least in part on the first microphone signals.

Some methods may involve estimating a first sound source position based on the first microphone signals and modifying the rendering process for at least one of the first audio signals or the second audio signals based at least in part on the first sound source position.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves receiving, by a first rendering module, a first audio program stream, the first audio program stream including first audio signals that are scheduled to be reproduced by at least some speakers of an environment. In some examples, the first audio program stream includes first spatial data, including channel data and/or spatial metadata. Some such methods involve rendering, by the first rendering module, the first audio signals for reproduction via the speakers of the environment, to produce first rendered audio signals.

Some such methods involve receiving, by a second rendering module, a second audio program stream. In some examples, the second audio program stream includes second audio signals that are scheduled to be reproduced by at least one speaker of the environment. Some such methods involve rendering, by the second rendering module, the second audio signals for reproduction via at least one speaker of the environment, to produce second rendered audio signals.

Some such methods involve modifying, by the first rendering module, a rendering process for the first audio signals based at least in part on at least one of the second audio signals, the second rendered audio signals or characteristics thereof, to produce modified first rendered audio signals. Some such methods involve modifying, by the second rendering module, a rendering process for the second audio signals based at least in part on at least one of the first audio signals, the first rendered audio signals or characteristics thereof, to produce modified second rendered audio signals. Some such methods involve mixing the modified first rendered audio signals and the modified second rendered audio signals to produce mixed audio signals and providing the mixed audio signals to at least some speakers of the environment.

According to some examples, modifying the rendering process for the first audio signals may involve warping the rendering of first audio signals away from a rendering location of the second rendered audio signals and/or modifying the loudness of one or more of the first rendered audio signals in response to a loudness of one or more of the second audio signals or the second rendered audio signals.

In some examples, modifying the rendering process for the second audio signals may involve warping the rendering of second audio signals away from a rendering location of the first rendered audio signals and/or modifying the loudness of one or more of the second rendered audio signals in response to a loudness of one or more of the first audio signals or the first rendered audio signals.

According to some examples, modifying the rendering process for the first audio signals may involve performing spectral modification, audibility-based modification and/or dynamic range modification.

Some methods may involve modifying, by the first rendering module, a rendering process for the first audio signals based at least in part on first microphone signals from a microphone system. Some methods may involve modifying, by the second rendering module, a rendering process for the second audio signals based at least in part on the first microphone signals.

Some methods may involve estimating a first sound source position based on the first microphone signals and modifying the rendering process for at least one of the first audio signals or the second audio signals based at least in part on the first sound source position.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2C and 2D are diagrams which illustrate an example set of speaker activations and object rendering positions.

FIG. 2E is a flow diagram that outlines one example of a method that may be performed by an apparatus or system such as that shown in FIG. 1A.

FIGS. 39A, 39B and 39C show examples of loudspeaker participation values corresponding to the examples of FIGS. 2F and 2G.

FIGS. 41A, 41B and 41C show examples of loudspeaker participation values corresponding to the examples of FIGS. 2J and 2K.

Like reference numbers and designations in the various drawings indicate like elements.

DETAILED DESCRIPTION OF EMBODIMENTS

Figure 1A:
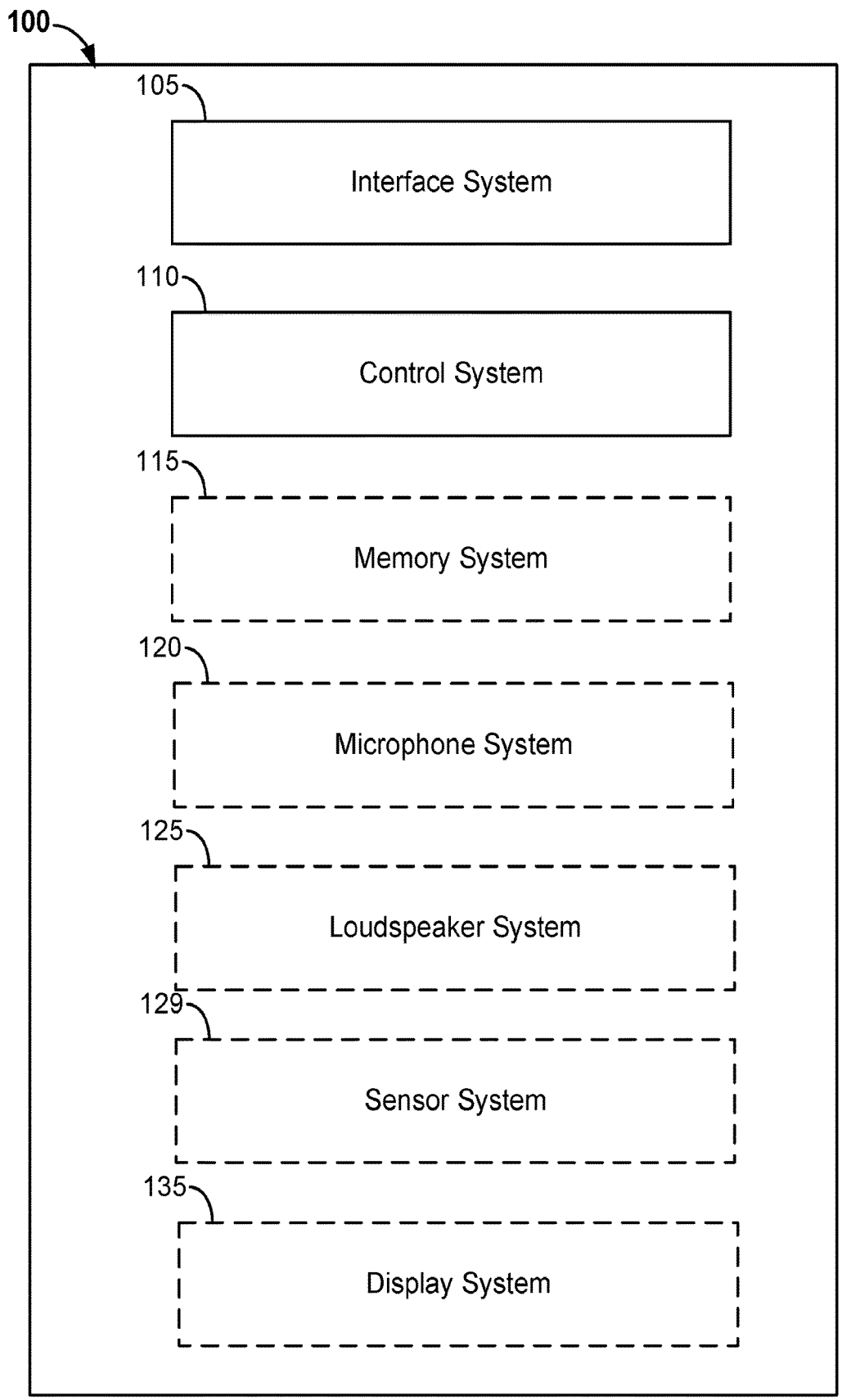
FIG. 1A is a block diagram that shows examples of components of an apparatus capable of implementing various aspects of this disclosure.

Flexible rendering is a technique for rendering spatial audio over an arbitrary number of arbitrarily placed speakers. With the widespread deployment of smart audio devices (e.g., smart speakers) in the home, there is need for realizing flexible rendering technology which allows consumers to perform flexible rendering of audio, and playback of the so-rendered audio, using smart audio devices.

Several technologies have been developed to implement flexible rendering, including: Center of Mass Amplitude Panning (CMAP), and Flexible Virtualization (FV). Both of these technologies cast the rendering problem as one of cost function minimization, where the cost function consists of two terms: a first term that models the desired spatial impression that the renderer is trying to achieve, and a second term that assigns a cost to activating speakers. To date this second term has focused on creating a sparse solution where only speakers in close proximity to the desired spatial position of the audio being rendered are activated.

Some embodiments of the present disclosure are methods for managing playback of multiple streams of audio by at least one (e.g., all or some) of the smart audio devices of a set of smart audio devices (or by at least one (e.g., all or some) of the speakers another set of speakers).

A class of embodiments involves methods for managing playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices.

Orchestrating smart audio devices (e.g., in the home to handle a variety of simultaneous use cases) may involve the simultaneous playback of one or more audio program streams over an interconnected set of speakers. For example, a user might be listening to a cinematic Atmos soundtrack (or other object-based audio program) over the set of speakers, but then the user may utter a command to an associated smart assistant (or other smart audio device). In this case, the audio playback by the system may by modified (in accordance with some embodiments) to warp the spatial presentation of the Atmos mix away from the location of the talker (the talking user) and away from the nearest smart audio device, while simultaneously warping the playback of the smart audio device's (voice assistant's) corresponding response towards the location of the talker. This may provide important benefits in comparison to merely reducing volume of playback of the audio program content in response to detection of the command (or a corresponding wakeword). Similarly, a user might want to use the speakers to get cooking tips in the kitchen while the same Atmos sound track is playing in an adjacent open living space. In this case, in accordance with some examples, the Atmos soundtrack can be warped away from the kitchen and/or the loudness of one or more rendered signals of the Atmos soundtrack can be modified in response to the loudness of one or more rendered signals of the cooking tips sound track. Additionally, in some implementations the cooking tips playing in the kitchen can be dynamically adjusted to be heard by a person in the kitchen above any of the Atmos sound track that might be bleeding in from the living space.

Some embodiments involve multi-stream rendering systems configured to implement the example use cases set forth above as well as numerous others being contemplated. In a class of embodiments, an audio rendering system may be configured to play simultaneously a plurality of audio program streams over a plurality of arbitrarily placed loudspeakers, wherein at least one of said program streams is a spatial mix and the rendering of said spatial mix is dynamically modified in response to (or in connection with) the simultaneous playback of one or more additional program streams.

In some embodiments, a multi-stream renderer may be configured for implementing the scenario laid out above as well as numerous other cases where the simultaneous playback of multiple audio program streams must be managed. Some implementations of the multi-stream rendering system may be configured to perform the following operations:

Simultaneously rendering and playing back a plurality of audio programs streams over a plurality of arbitrarily placed loudspeakers, wherein at least one of said program streams is a spatial mix.
  The term program stream refers to a collection of one or more audio signals that are meant to be heard together as a whole. Examples include a selection of music, a movie soundtrack, a pod-cast, a live voice call, a synthesized voice response from a smart assistant, etc.
  A spatial mix is a program stream that is intended to deliver different signals at the left and right ears of the listener (more than mono). Examples of audio formats for a spatial mix include stereo, 5.1 and 7.1 surround sound, object audio formats such as Dolby Atmos, and Ambisonics.
  Rendering a program stream refers to the process of actively distributing the associated one or more audio signals across the plurality of loudspeakers to achieve a particular perceptual impression.
Dynamically modifying the rendering of the at least one spatial mix as a function of the rendering of one or more of the additional program streams. Examples of such modifications to the rendering of the spatial mix include, but are not limited to Modifying the relative activation of the plurality of loudspeakers as a function of the relative activation of loudspeakers associated with the rendering of at least one of the one or more additional program streams.
  Warping the intended spatial balance of the spatial mix as a function of the spatial properties of the rendering of at least one of the one or more additional program streams.
  Modifying the loudness or audibility of the spatial mix as a function of the loudness or audibility of at least one of the one or more additional program streams.

FIG. 1A is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server. In some implementations the apparatus 100 may be configured to implement what may be referred to herein as an "audio session manager."

In this example, the apparatus 100 includes an interface system 105 and a control system 110. The interface system 105 may, in some implementations, be configured for communication with one or more devices that are executing, or configured for executing, software applications. Such software applications may sometimes be referred to herein as "applications" or simply "apps." The interface system 105 may, in some implementations, be configured for exchanging control information and associated data pertaining to the applications. The interface system 105 may, in some implementations, be configured for communication with one or more other devices of an audio environment. The audio environment may, in some examples, be a home audio environment. The interface system 105 may, in some implementations, be configured for exchanging control information and associated data with audio devices of the audio environment. The control information and associated data may, in some examples, pertain to one or more applications with which the apparatus 100 is configured for communication.

The interface system 105 may, in some implementations, be configured for receiving audio program streams. The audio program streams may include audio signals that are scheduled to be reproduced by at least some speakers of the environment. The audio program streams may include spatial data, such as channel data and/or spatial metadata. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1A. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. According to some examples, the control system 110 may be configured for implementing methods of managing playback of multiple streams of audio over multiple speakers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1A and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1A.

In some examples, the apparatus 100 may include the optional microphone system 120 shown in FIG. 1A. The optional microphone system 120 may include one or more microphones. In some implementations, one or more of the microphones may be part of, or associated with, another device, such as a speaker of the speaker system, a smart audio device, etc. In some examples, the apparatus 100 may not include a microphone system 120. However, in some such implementations the apparatus 100 may nonetheless be configured to receive microphone data for one or more microphones in an audio environment via the interface system 110.

According to some implementations, the apparatus 100 may include the optional loudspeaker system 125 shown in FIG. 1A. The optional loudspeaker system 125 may include one or more loudspeakers, which also may be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed loudspeaker layout, such as Dolby 5.1, Dolby 5.1.2, Dolby 7.1, Dolby 7.1.4, Dolby 9.1, Hamasaki 22.2, etc. In some such examples, at least some loudspeakers of the optional speaker system 125 may be placed in locations that are convenient to the space (e.g., in locations where there is space to accommodate the loudspeakers), but not in any standard prescribed loudspeaker layout. In some examples, the apparatus 100 may not include a loudspeaker system 125.

In some implementations, the apparatus 100 may include the optional sensor system 129 shown in FIG. 1A. The optional sensor system 129 may include one or more cameras, touch sensors, gesture sensors, motion detectors, etc. According to some implementations, the optional sensor system 129 may include one or more cameras. In some implementations, the cameras may be free-standing cameras. In some examples, one or more cameras of the optional sensor system 129 may reside in a smart audio device, which may be a single purpose audio device or a virtual assistant. In some such examples, one or more cameras of the optional sensor system 129 may reside in a TV, a mobile phone or a smart speaker. In some examples, the apparatus 100 may not include a sensor system 129. However, in some such implementations the apparatus 100 may nonetheless be configured to receive sensor data for one or more sensors in an audio environment via the interface system 110.

In some implementations, the apparatus 100 may include the optional display system 135 shown in FIG. 1A. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 129 may include a touch sensor system and/or a gesture sensor system proximate one or more displays of the display system 135. According to some such implementations, the control system 110 may be configured for controlling the display system 135 to present one or more graphical user interfaces (GUIs).

According to some such examples the apparatus 100 may be, or may include, a smart audio device. In some such implementations the apparatus 100 may be, or may include, a wakeword detector. For example, the apparatus 100 may be, or may include, a virtual assistant.

Figure 1B:
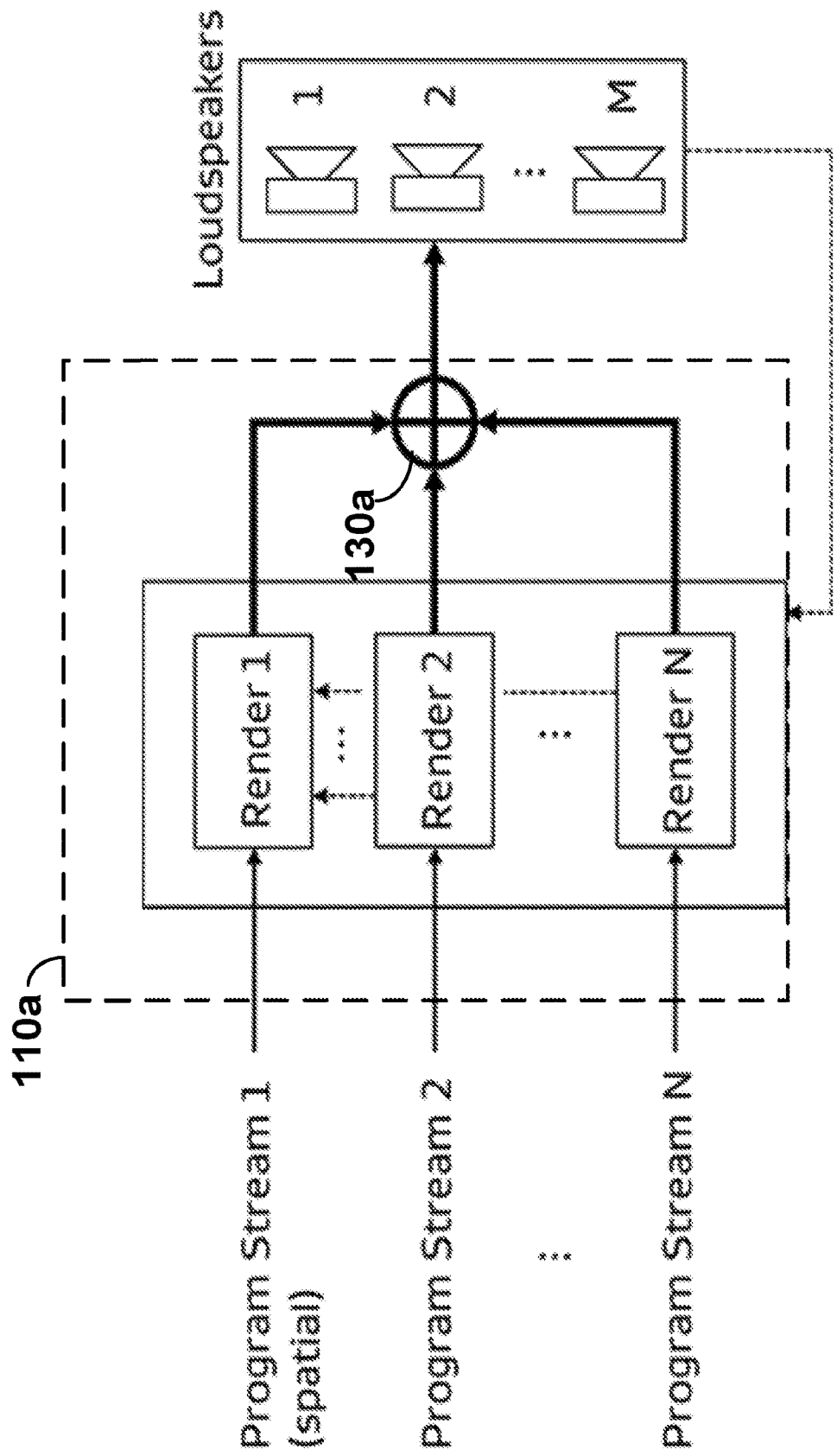
FIG. 1B is a block diagram of a minimal version of an embodiment.

FIG. 1B is a block diagram of a minimal version of an embodiment. Depicted are N program streams (N≥2), with the first explicitly labeled as being spatial, whose corresponding collection of audio signals feed through corresponding renderers that are each individually configured for playback of its corresponding program stream over a common set of M arbitrarily spaced loudspeakers (M≥2). The renderers also may be referred to herein as "rendering modules." The rendering modules and the mixer 130a may be implemented via software, hardware, firmware or some combination thereof. In this example, the rendering modules and the mixer 130a are implemented via control system 110a, which is an instance of the control system 110 that is described above with reference to FIG. 1A. Each of the N renderers output a set of M loudspeaker feeds which are summed across all N renderers for simultaneous playback over the M loudspeakers. According to this implementation, information about the layout of the M loudspeakers within the listening environment is provided to all the renderers, indicated by the dashed line feeding back from the loudspeaker block, so that the renderers may be properly configured for playback over the speakers. This layout information may or may not be sent from one or more of the speakers themselves, depending on the particular implementation. According to some examples, layout information may be provided by one or more smart speakers configured for determining the relative positions of each of the M loudspeakers in the listening environment. Some such autolocation methods may be based on direction of arrival (DOA) methods or time of arrival (TOA) methods. In other examples, this layout information may be determined by another device and/or input by a user. In some examples, loudspeaker specification information about the capabilities of at least some of the M loudspeakers within the listening environment may be provided to all the renderers. Such loudspeaker specification information may include impedance, frequency response, sensitivity, power rating, number and location of individual drivers, etc. According to this example, information from the rendering of one or more of the additional program streams is fed into the renderer of the primary spatial stream such that said rendering may be dynamically modified as a function of said information. This information is represented by the dashed lines passing from render blocks 2 through N back up to render block 1.

Figure 2A:
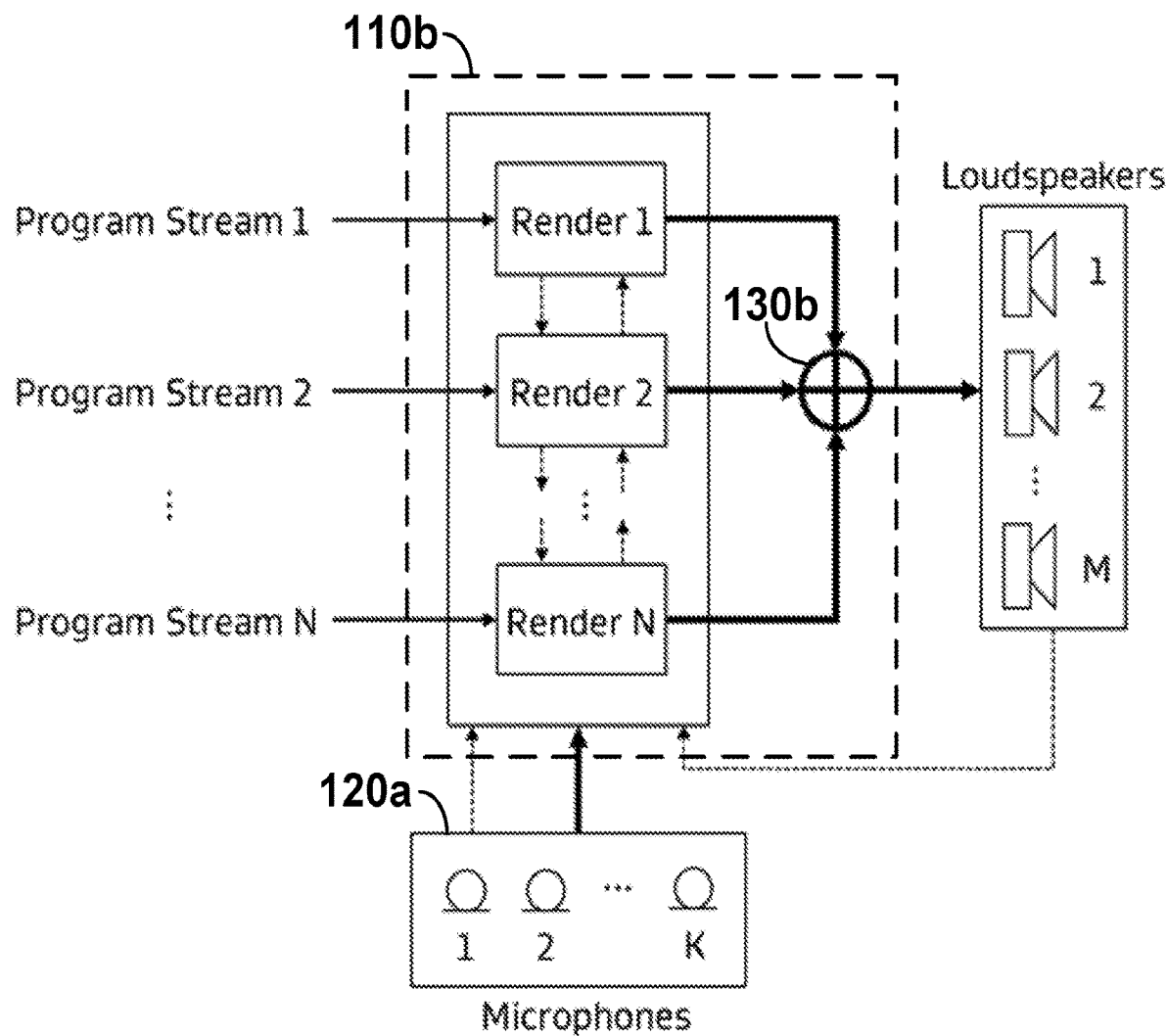
FIG. 2A depicts another (more capable) embodiment with additional features.

FIG. 2A depicts another (more capable) embodiment with additional features. In this example, the rendering modules and the mixer 130b are implemented via control system 110b, which is an instance of the control system 110 that is described above with reference to FIG. 1A. In this version, dashed lines travelling up and down between all N renderers represent the idea that any one of the N renderers may contribute to the dynamic modification of any of the remaining N−1 renderers. In other words, the rendering of any one of the N program streams may be dynamically modified as a function of a combination of one or more renderings of any of the remaining N−1 program streams. Additionally, any one or more of the program streams may be a spatial mix, and the rendering of any program stream, regardless of whether it is spatial or not, may be dynamically modified as a function of any of the other program streams. Loudspeaker layout information may be provided to the N renderers, e.g. as noted above. In some examples, loudspeaker specification information may be provided to the N renderers. In some implementations, a microphone system 120a may include a set of K microphones, (K≥1), within the listening environment. In some examples, the microphone(s) may be attached to, or associated with, the one or more of the loudspeakers. These microphones may feed both their captured audio signals, represented by the solid line, and additional configuration information (their location, for example), represented by the dashed line, back into the set of N renderers. Any of the N renderers may then be dynamically modified as a function of this additional microphone input. Various examples are provided herein.

Examples of information derived from the microphone inputs and subsequently used to dynamically modify any of the N renderers include but are not limited to:

Detection of the utterance of a particular word or phrase by a user of the system.

An estimate of the location of one or more users of the system.

An estimate of the loudness of any of combination of the N programs streams at a particular location in the listening space.

An estimate of the loudness of other environmental sounds, such as background noise, in the listening environment.

Figure 2B:
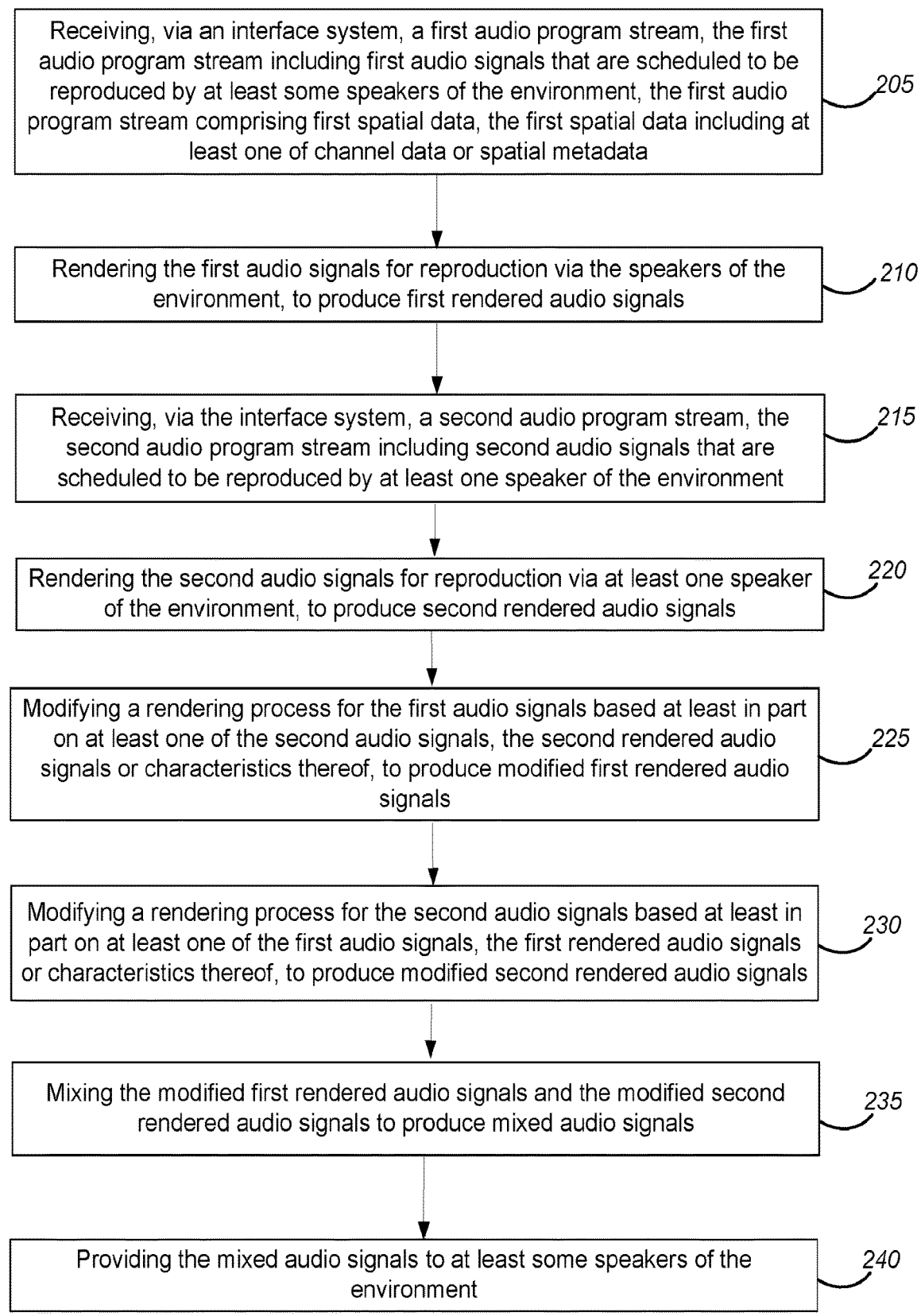
FIG. 2B is a flow diagram that outlines one example of a method that may be performed by an apparatus or system such as those shown in FIG. 1A, FIG. 1B or FIG. 2A.

FIG. 2B is a flow diagram that outlines one example of a method that may be performed by an apparatus or system such as those shown in FIG. 1A, FIG. 1B or FIG. 2A. The blocks of method 200, like other methods described herein, are not necessarily performed in the order indicated. Moreover, such methods may include more or fewer blocks than shown and/or described. The blocks of method 200 may be performed by one or more devices, which may be (or may include) a control system such as the control system 110, the control system 110a or the control system 110b that are shown in FIGS. 1A, 1B and 2A, and described above, or one of the other disclosed control system examples.

In this implementation, block 205 involves receiving, via an interface system, a first audio program stream. In this example, the first audio program stream includes first audio signals that are scheduled to be reproduced by at least some speakers of the environment. Here, the first audio program stream includes first spatial data. According to this example, the first spatial data includes channel data and/or spatial metadata. In some examples, block 205 involves a first rendering module of a control system receiving, via an interface system, the first audio program stream.

According to this example, block 210 involves rendering the first audio signals for reproduction via the speakers of the environment, to produce first rendered audio signals. Some examples of the method 200 involve receiving loudspeaker layout information, e.g., as noted above. Some examples of the method 200 involve receiving loudspeaker specification information, e.g., as noted above. In some examples, the first rendering module may produce the first rendered audio signals based, at least in part, on the loudspeaker layout information and/or the loudspeaker specification information.

In this example, block 215 involves receiving, via the interface system, a second audio program stream. In this implementation, the second audio program stream includes second audio signals that are scheduled to be reproduced by at least some speakers of the environment. According to this example, the second audio program stream includes second spatial data. The second spatial data includes channel data and/or spatial metadata. In some examples, block 215 involves a second rendering module of a control system receiving, via the interface system, the second audio program stream.

According to this implementation, block 220 involves rendering the second audio signals for reproduction via the speakers of the environment, to produce second rendered audio signals. In some examples, the second rendering module may produce the second rendered audio signals based, at least in part, on received loudspeaker layout information and/or received loudspeaker specification information.

In some instances, some or all speakers of the environment may be arbitrarily located. For example, at least some speakers of the environment may be placed in locations that do not correspond to any standard prescribed speaker layout, such as Dolby 5.1, Dolby 7.1, Hamasaki 22.2, etc. In some such examples, at least some speakers of the environment may be placed in locations that are convenient with respect to the furniture, walls, etc., of the environment (e.g., in locations where there is space to accommodate the speakers), but not in any standard prescribed speaker layout.

Accordingly, some implementations block 210 or block 220 may involve flexible rendering to arbitrarily located speakers. Some such implementations may involve Center of Mass Amplitude Panning (CMAP), Flexible Virtualization (FV) or a combination of both. From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g) = C_{spatial}(g, \vec{o}, \{\vec{s}_i\}) C_{proximity}(g, \vec{o}, \{\vec{s}_i\}) \tag{1}$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt} = \min_g C(g, \vec{o}, \{\vec{s}_i\}) \tag{2a}$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt} = \frac{g_{opt}}{\|g_{opt}\|} \tag{2b}$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \tag{3}$$

Equation 3 is then manipulated into a spatial cost representing the squared error between the desired audio position and that produced by the activated loudspeakers:

$$C_{spatial}(g, \vec{o}, \{\vec{s}_i\}) = \|(\sum_{i=1}^{M} g_i) \vec{o} - \sum_{i=1}^{M} g_i \vec{s}_i\|^2 = \|\sum_{i=1}^{M} g_i(\vec{o} - \vec{s}_i)\|^2 \tag{4}$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b = HRTF\{\vec{o}\} \tag{5}$$

At the same time, the 2×1 binaural response e produced at the listener's ears by the loudspeakers is modelled as a 2×M acoustic transmission matrix H multiplied with the M×1 vector g of complex speaker activation values:

$$e = Hg \tag{6}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g, \vec{o}, \{\vec{s}_i\}) = (b - Hg)^*(b - Hg) \tag{7}$$

Conveniently, the spatial term of the cost function for CMAP and FV defined in Equations 4 and 7 can both be rearranged into a matrix quadratic as a function of speaker activations g:

$$C_{spatial}(g, \vec{o}, \{\vec{s}_i\}) = g^* A g + B g + C \tag{8}$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g, \vec{o}, \{\vec{s}_i\}) = g^* D g \tag{9a}$$

where D is a diagonal matrix of distance penalties between the desired audio position and each speaker:

$$D = \begin{bmatrix} d_1 & \cdots & 0 \\ \vdots & \ddots & \vdots \\ 0 & \cdots & d_M \end{bmatrix}, \tag{9b}$$

$$d_i = \text{distance}(\vec{o}, \vec{s}_i)$$

The distance penalty function can take on many forms, but the following is a useful parameterization $$\text{distance}(\vec{o}, \vec{s}_i) = \alpha d_0^2 \left( \frac{\|\vec{o} - \vec{s}_i\|}{d_0} \right)^\beta \quad (9c)$$

where $\|\vec{o} - \vec{s}_i\|$ is the Euclidean distance between the desired audio position and speaker position and $\alpha$ and $\beta$ are tunable parameters. The parameter $\alpha$ indicates the global strength of the penalty; $d_0$ corresponds to the spatial extent of the distance penalty (loudspeakers at a distance around $d_0$ or further away will be penalized), and $\beta$ accounts for the abruptness of the onset of the penalty at distance $d_0$.

Combining the two terms of the cost function defined in Equations 8 and 9a yields the overall cost function $$C(g) = g^*Ag + Bg + C + g^*Dg = g^*(A+D)g + Bg + C \quad (10)$$

Setting the derivative of this cost function with respect to g equal to zero and solving for g yields the optimal speaker activation solution:

$$g_{opt} = \frac{1}{2}(A+D)^{-1}B \quad (11)$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Figure 2D:
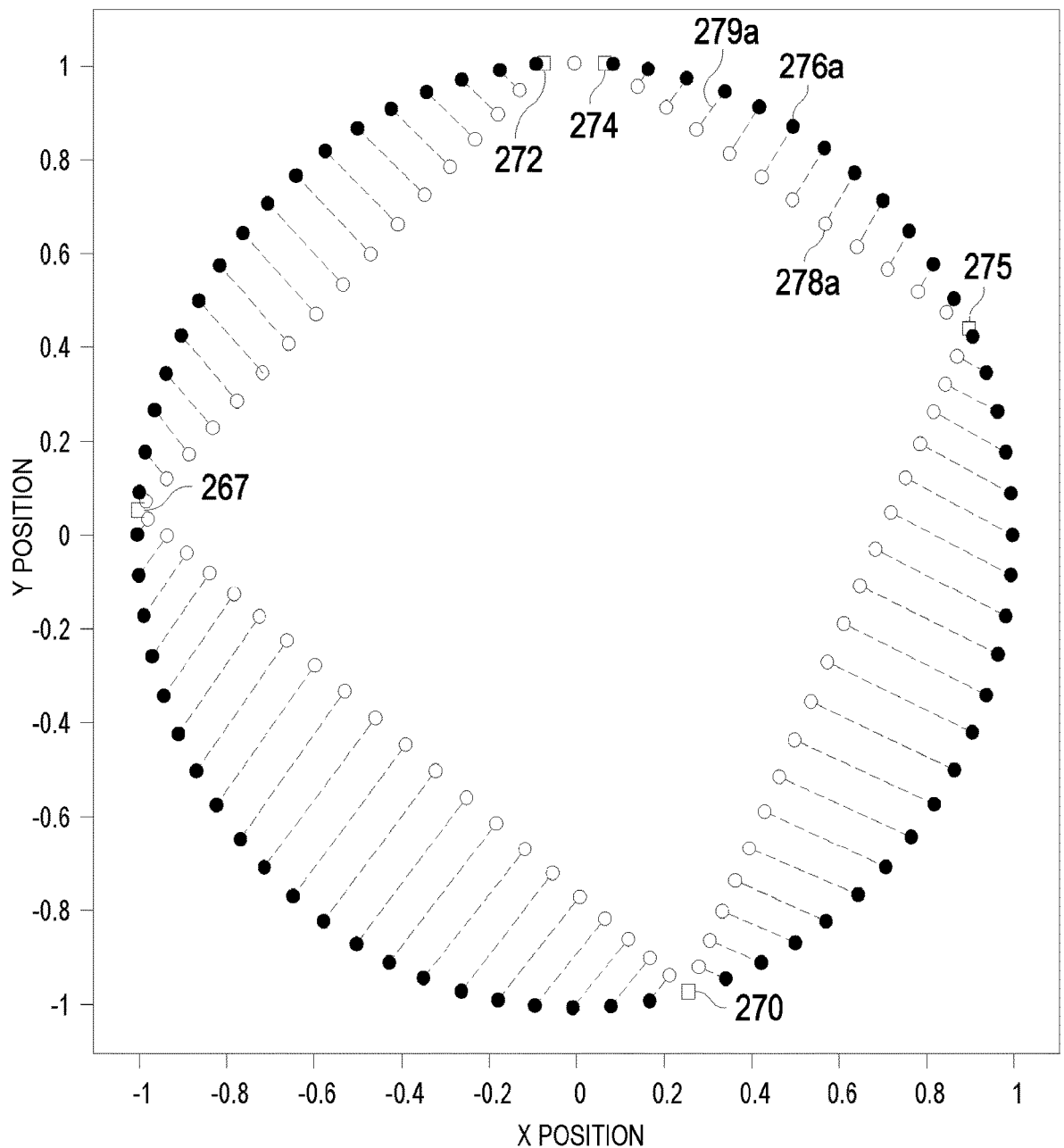

FIGS. 2C and 2D are diagrams which illustrate an example set of speaker activations and object rendering positions. In these examples, the speaker activations and object rendering positions correspond to speaker positions of 4, 64, 165, −87, and −4 degrees. FIG. 2C shows the speaker activations 245a, 250a, 255a, 260a and 265a, which comprise the optimal solution to Equation 11 for these particular speaker positions. FIG. 2D plots the individual speaker positions as squares 267, 270, 272, 274 and 275, which correspond to speaker activations 245a, 250a, 255a, 260a and 265a, respectively. FIG. 2D also shows ideal object positions (in other words, positions at which audio objects are to be rendered) for a multitude of possible object angles as dots 276a and the corresponding actual rendering positions for those objects as dots 278a, connected to the ideal object positions by dotted lines 279a.

A class of embodiments involves methods for rendering audio for playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering (in accordance with an embodiment) of audio for playback by all or some (i.e., by speaker(s) of all or some) of the smart audio devices. Many interactions with the system are contemplated which require dynamic modifications to the rendering. Such modifications may be, but are not necessarily, focused on spatial fidelity.

Some embodiments are methods for rendering of audio for playback by at least one (e.g., all or some) of the smart audio devices of a set of smart audio devices (or for playback by at least one (e.g., all or some) of the speakers of another set of speakers). The rendering may include minimization of a cost function, where the cost function includes at least one dynamic speaker activation term. Examples of such a dynamic speaker activation term include (but are not limited to):

Proximity of speakers to one or more listeners;
Proximity of speakers to an attracting or repelling force;
Audibility of the speakers with respect to some location (e.g., listener position, or baby room);
Capability of the speakers (e.g., frequency response and distortion);
Synchronization of the speakers with respect to other speakers;
Wakeword performance; and
Echo canceller performance The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some embodiments implement rendering for playback by speaker(s) of a plurality of smart audio devices that are coordinated (orchestrated). Other embodiments implement rendering for playback by speaker(s) of another set of speakers.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g) = C_{spatial}(g, \vec{o}, \{\vec{s}_i\}) + C_{proximity}(g, \vec{o}, \{\vec{s}_i\}) + \Sigma_j C_j(g, \{\{\hat{o}\}, \{\hat{s}_i\}, \{\hat{e}\}\}_j) \quad (12)$$

In Equation 12, the terms $C_j(g, \{\{\hat{o}\}, \{\hat{s}_i\}, \{\hat{e}\}\}_j)$ represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_j(g, \{\{\hat{o}\}, \{\hat{s}_i\}, \{\hat{e}\}\}_j)$ returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$ contains at a minimum only one element from any of $\{\hat{o}\}$, $\{\hat{s}_i\}$, or $\{\hat{e}\}$.

Examples of $\{\hat{o}\}$ include but are not limited to:
Desired perceived spatial position of the audio signal;
Level (possible time-varying) of the audio signal; and/or
Spectrum (possibly time-varying) of the audio signal.
Examples of $\{\hat{s}_i\}$ include but are not limited to:
Locations of the loudspeakers in the listening space;
Frequency response of the loudspeakers;
Playback level limits of the loudspeakers;
Parameters of dynamics processing algorithms within the speakers, such as limiter gains;
A measurement or estimate of acoustic transmission from each speaker to the others;

A measure of echo canceller performance on the speakers; and/or

Relative synchronization of the speakers with respect to each other.

Examples of $\{\hat{e}\}$ include but are not limited to:

Locations of one or more listeners or talkers in the playback space;

A measurement or estimate of acoustic transmission from each loudspeaker to the listening location;

A measurement or estimate of the acoustic transmission from a talker to the set of loudspeakers;

Location of some other landmark in the playback space; and/or

A measurement or estimate of acoustic transmission from each speaker to some other landmark in the playback space;

With the new cost function defined in Equation 12, an optimal set of activations may be found through minimization with respect to g and possible post-normalization as previously specified in Equations 2a and 2b.

FIG. 2E is a flow diagram that outlines one example of a method that may be performed by an apparatus or system such as that shown in FIG. 1A. The blocks of method 280, like other methods described herein, are not necessarily performed in the order indicated. Moreover, such methods may include more or fewer blocks than shown and/or described. The blocks of method 280 may be performed by one or more devices, which may be (or may include) a control system such as the control system 110 shown in FIG. 1A.

In this implementation, block 285 involves receiving, by a control system and via an interface system, audio data. In this example, the audio data includes one or more audio signals and associated spatial data. According to this implementation, the spatial data indicates an intended perceived spatial position corresponding to an audio signal. In some instances, the intended perceived spatial position may be explicit, e.g., as indicated by positional metadata such as Dolby Atmos positional metadata. In other instances, the intended perceived spatial position may be implicit, e.g., the intended perceived spatial position may be an assumed location associated with a channel according to Dolby 5.1, Dolby 7.1, or another channel-based audio format. In some examples, block 285 involves a rendering module of a control system receiving, via an interface system, the audio data.

According to this example, block 290 involves rendering, by the control system, the audio data for reproduction via a set of loudspeakers of an environment, to produce rendered audio signals. In this example, rendering each of the one or more audio signals included in the audio data involves determining relative activation of a set of loudspeakers in an environment by optimizing a cost function. According to this example, the cost is a function of a model of perceived spatial position of the audio signal when played back over the set of loudspeakers in the environment. In this example, the cost is also a function of a measure of proximity of the intended perceived spatial position of the audio signal to a position of each loudspeaker of the set of loudspeakers. In this implementation, the cost is also a function of one or more additional dynamically configurable functions. In this example, the dynamically configurable functions are based on one or more of the following: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance.

In this example, block 295 involves providing, via the interface system, the rendered audio signals to at least some loudspeakers of the set of loudspeakers of the environment.

According to some examples, the model of perceived spatial position may produce a binaural response corresponding to an audio object position at the left and right ears of a listener. Alternatively, or additionally, the model of perceived spatial position may place the perceived spatial position of an audio signal playing from a set of loudspeakers at a center of mass of the set of loudspeakers' positions weighted by the loudspeaker's associated activating gains.

In some examples, the one or more additional dynamically configurable functions may be based, at least in part, on a level of the one or more audio signals. In some instances, the one or more additional dynamically configurable functions may be based, at least in part, on a spectrum of the one or more audio signals.

Some examples of the method 280 involve receiving loudspeaker layout information. In some examples, the one or more additional dynamically configurable functions may be based, at least in part, on a location of each of the loudspeakers in the environment.

Some examples of the method 280 involve receiving loudspeaker specification information. In some examples, the one or more additional dynamically configurable functions may be based, at least in part, on the capabilities of each loudspeaker, which may include one or more of frequency response, playback level limits or parameters of one or more loudspeaker dynamics processing algorithms.

According to some examples, the one or more additional dynamically configurable functions may be based, at least in part, on a measurement or estimate of acoustic transmission from each loudspeaker to the other loudspeakers. Alternatively, or additionally, the one or more additional dynamically configurable functions may be based, at least in part, on a listener or speaker location of one or more people in the environment. Alternatively, or additionally, the one or more additional dynamically configurable functions may be based, at least in part, on a measurement or estimate of acoustic transmission from each loudspeaker to the listener or speaker location. An estimate of acoustic transmission may, for example be based at least in part on walls, furniture or other objects that may reside between each loudspeaker and the listener or speaker location.

Alternatively, or additionally, the one or more additional dynamically configurable functions may be based, at least in part, on an object location of one or more non-loudspeaker objects or landmarks in the environment. In some such implementations, the one or more additional dynamically configurable functions may be based, at least in part, on a measurement or estimate of acoustic transmission from each loudspeaker to the object location or landmark location.

Numerous new and useful behaviors may be achieved by employing one or more appropriately defined additional cost terms to implement flexible rendering. All example behaviors listed below are cast in terms of penalizing certain loudspeakers under certain conditions deemed undesirable. The end result is that these loudspeakers are activated less in the spatial rendering of the set of audio signals. In many of these cases, one might contemplate simply turning down the undesirable loudspeakers independently of any modification to the spatial rendering, but such a strategy may significantly degrade the overall balance of the audio content. Certain components of the mix may become completely inaudible, for example. With the disclosed embodiments, on the other hand, integration of these penalizations into the core optimization of the rendering allows the rendering to adapt and perform the best possible spatial rendering with the remaining less-penalized speakers. This is a much more elegant, adaptable, and effective solution.

Example use cases include, but are not limited to:

Providing a more balanced spatial presentation around the listening area
- It has been found that spatial audio is best presented across loudspeakers that are roughly the same distance from the intended listening area. A cost may be constructed such that loudspeakers that are significantly closer or further away than the mean distance of loudspeakers to the listening area are penalized, thus reducing their activation;

Moving audio away from or towards a listener or talker
- If a user of the system is attempting to speak to a smart voice assistant of or associated with the system, it may be beneficial to create a cost which penalizes loudspeakers closer to the talker. This way, these loudspeakers are activated less, allowing their associated microphones to better hear the talker;
- To provide a more intimate experience for a single listener that minimizes playback levels for others in the listening space, speakers far from the listener's location may be penalized heavily so that only speakers closest to the listener are activated most significantly;

Moving audio away from or towards a landmark, zone or area
- Certain locations in the vicinity of the listening space may be considered sensitive, such as a baby's room, a baby's bed, an office, a reading area, a study area, etc. In such a case, a cost may be constructed the penalizes the use of speakers close to this location, zone or area;
- Alternatively, for the same case above (or similar cases), the system of speakers may have generated measurements of acoustic transmission from each speaker into the baby's room, particularly if one of the speakers (with an attached or associated microphone) resides within the baby's room itself. In this case, rather than using physical proximity of the speakers to the baby's room, a cost may be constructed that penalizes the use of speakers whose measured acoustic transmission into the room is high; and/or Optimal use of the speakers' capabilities
- The capabilities of different loudspeakers can vary significantly. For example, one popular smart speaker contains only a single 1.6" full range driver with limited low frequency capability. On the other hand, another smart speaker contains a much more capable 3" woofer. These capabilities are generally reflected in the frequency response of a speaker, and as such, the set of responses associated with the speakers may be utilized in a cost term. At a particular frequency, speakers that are less capable relative to the others, as measured by their frequency response, are penalized and therefore activated to a lesser degree. In some implementations, such frequency response values may be stored with a smart loudspeaker and then reported to the computational unit responsible for optimizing the flexible rendering;
- Many speakers contain more than one driver, each responsible for playing a different frequency range. For example, one popular smart speaker is a two-way design containing a woofer for lower frequencies and a tweeter for higher frequencies. Typically, such a speaker contains a crossover circuit to divide the full-range playback audio signal into the appropriate frequency ranges and send to the respective drivers. Alternatively, such a speaker may provide the flexible renderer playback access to each individual driver as well as information about the capabilities of each individual driver, such as frequency response. By applying a cost term such as that described just above, in some examples the flexible renderer may automatically build a crossover between the two drivers based on their relative capabilities at different frequencies;
- The above-described example uses of frequency response focus on the inherent capabilities of the speakers but may not accurately reflect the capability of the speakers as placed in the listening environment. In certain cases, the frequencies responses of the speakers as measured in the intended listening position may be available through some calibration procedure. Such measurements may be used instead of precomputed responses to better optimize use of the speakers. For example, a certain speaker may be inherently very capable at a particular frequency, but because of its placement (behind a wall or a piece of furniture for example) might produce a very limited response at the intended listening position. A measurement that captures this response and is fed into an appropriate cost term can prevent significant activation of such a speaker;
- Frequency response is only one aspect of a loudspeaker's playback capabilities. Many smaller loudspeakers start to distort and then hit their excursion limit as playback level increases, particularly for lower frequencies. To reduce such distortion many loudspeakers implement dynamics processing which constrains the playback level below some limit thresholds that may be variable across frequency. In cases where a speaker is near or at these thresholds, while others participating in flexible rendering are not, it makes sense to reduce signal level in the limiting speaker and divert this energy to other less taxed speakers. Such behavior can be automatically achieved in accordance with some embodiments by properly configuring an associated cost term. Such a cost term may involve one or more of the following:
  - Monitoring a global playback volume in relation to the limit thresholds of the loudspeakers. For example, a loudspeaker for which the volume level is closer to its limit threshold may be penalized more;
  - Monitoring dynamic signals levels, possibly varying across frequency, in relationship to loudspeaker limit thresholds, also possibly varying across frequency. For example, a loudspeaker for which the monitored signal level is closer to its limit thresholds may be penalized more;
  - Monitoring parameters of the loudspeakers' dynamics processing directly, such as limiting gains. In some such examples, a loudspeaker for which the parameters indicate more limiting may be penalized more; and/or Monitoring the actual instantaneous voltage, current, and power being delivered by an amplifier to a loudspeaker to determine if the loudspeaker is operating in a linear range. For example, a loudspeaker which is operating less linearly may be penalized more;

Smart speakers with integrated microphones and an interactive voice assistant typically employ some type of echo cancellation to reduce the level of audio signal playing out of the speaker as picked up by the recording microphone. The greater this reduction, the better chance the speaker has of hearing and understanding a talker in the space. If the residual of the echo canceller is consistently high, this may be an indication that the speaker is being driven into a non-linear region where prediction of the echo path becomes challenging. In such a case it may make sense to divert signal energy away from the speaker, and as such, a cost term taking into account echo canceller performance may be beneficial. Such a cost term may assign a high cost to a speaker for which its associated echo canceller is performing poorly;

In order to achieve predictable imaging when rendering spatial audio over multiple loudspeakers, it is generally required that playback over the set of loudspeakers be reasonably synchronized across time. For wired loudspeakers this is a given, but with a multitude of wireless loudspeakers synchronization may be challenging and the end-result variable. In such a case it may be possible for each loudspeaker to report its relative degree of synchronization with a target, and this degree may then feed into a synchronization cost term. In some such examples, loudspeakers with a lower degree of synchronization may be penalized more and therefore excluded from rendering. Additionally, tight synchronization may not be required for certain types of audio signals, for example components of the audio mix intended to be diffuse or non-directional. In some implementations, components may be tagged as such with metadata and a synchronization cost term may be modified such that the penalization is reduced.

We next describe examples of embodiments.

Similar to the proximity cost defined in Equations 9a and 9b, it is also convenient to express each of the new cost function terms $C_j(g, \{\{\hat{o}\}, \{\hat{s}_i\}, \{\hat{e}\}\}_j)$ as a weighted sum of the absolute values squared of speaker activations:

$$C_j(g,\{\{\hat{o}\},\{\hat{s}_i\},\{\hat{e}\}\}_j)=g^*W_j(\{\{\hat{o}\},\{\hat{s}_i\},\{\hat{e}\}\}_j)g, \qquad (13a)$$

where $W_j$ is a diagonal matrix of weights $w_{ij}=w_{ij}(\{\{\hat{o}\}, \{\hat{s}_i\}, \{\hat{e}\}\}_j)$ describing the cost associated with activating speaker i for the term j:

$$W_j = \begin{bmatrix} w_{1j} & \cdots & 0 \\ \vdots & \ddots & \vdots \\ 0 & \cdots & w_{Mj} \end{bmatrix} \qquad (13b)$$

Combining Equations 13a and b with the matrix quadratic version of the CMAP and FV cost functions given in Equation 10 yields a potentially beneficial implementation of the general expanded cost function (of some embodiments) given in Equation 12:

$$C(g)=g^*Ag+Bg+C+g^*Dg+\Sigma_j g^*W_j g=g^*(A+D+\Sigma_j W_j)g+Bg+C \qquad (14)$$

With this definition of the new cost function terms, the overall cost function remains a matrix quadratic, and the optimal set of activations $g_{opt}$ can be found through differentiation of Equation 14 to yield $$g_{opt} = \frac{1}{2}\left(A + D + \sum_j W_j\right)^{-1} B \qquad (15)$$

It is useful to consider each one of the weight terms $w_{ij}$ as functions of a given continuous penalty value $p_{ij}=p_{ij}(\{\{\hat{o}\}, \{\hat{s}_i\}, \{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \qquad (16)$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \qquad (17)$$

where $\alpha_j$, $\beta_j$, $\tau_j$ are tunable parameters which respectively indicate the global strength of the penalty, the abruptness of the onset of the penalty and the extent of the penalty. C are should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \to w_{ij}' = w_{ij} - \min_i(w_{ij}) \qquad (18)$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight with $w_{ij}$ takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \|\vec{l}_j - \vec{s}_i\|, \text{ and} \quad (19a)$$

$$\tau_j = \max_i \|\vec{l}_j - \vec{s}_i\| \quad (19b)$$

To illustrate the use case of "pulling" audio towards a listener or talker, we specifically set $\alpha_j=20$, $\beta_j=3$, and $\vec{l}_j$ to a vector corresponding to a listener/talker position of 180 degrees. These values of $\alpha_j$, $\beta_j$, and $\vec{l}_j$; are merely examples. In other implementations, $\alpha_j$ may be in the range of 1 to 100 and $\beta_j$ may be in the range of 1 to 25.

Figure 2F:
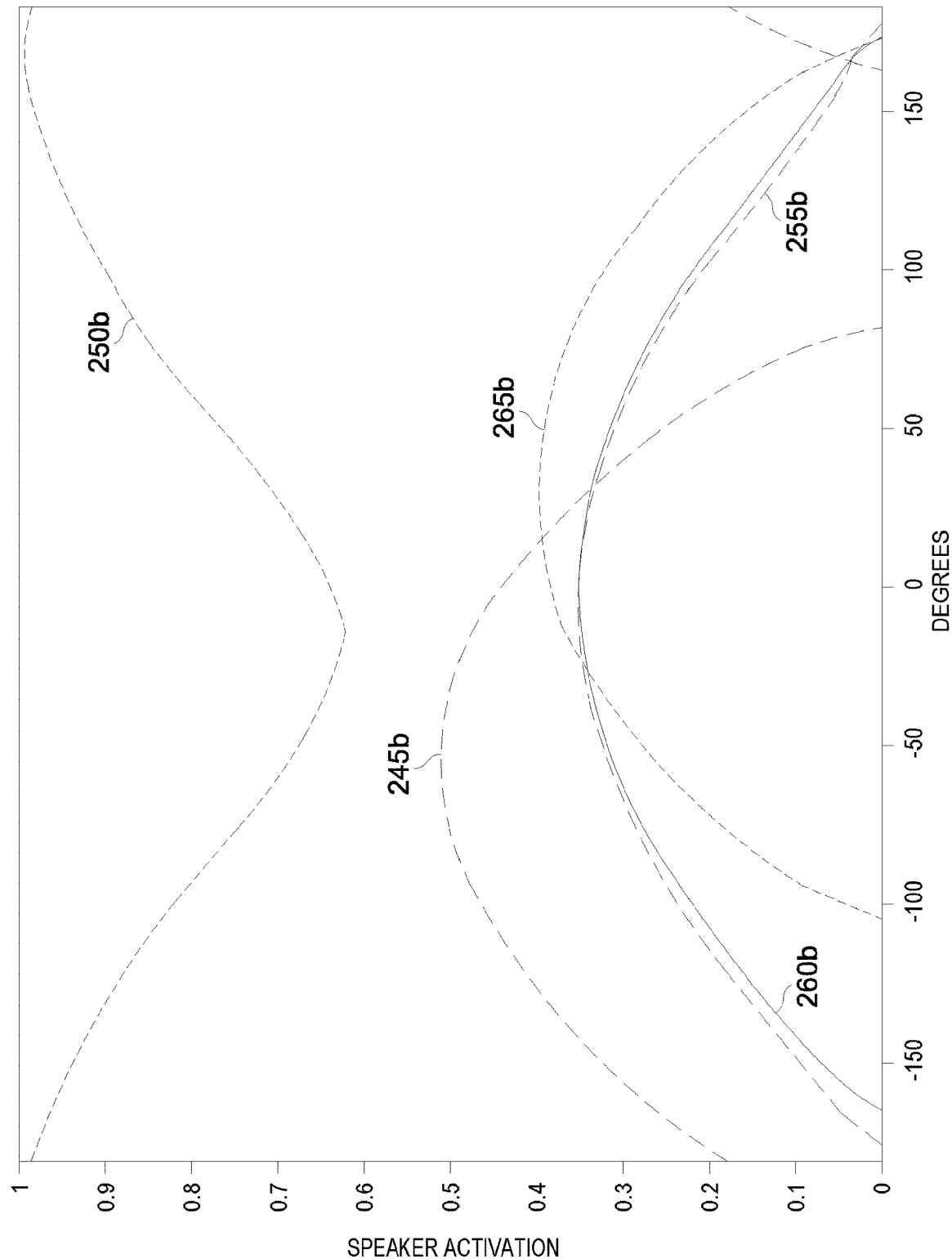
FIG. 2F is a graph of speaker activations in an example embodiment.
Figure 2G:
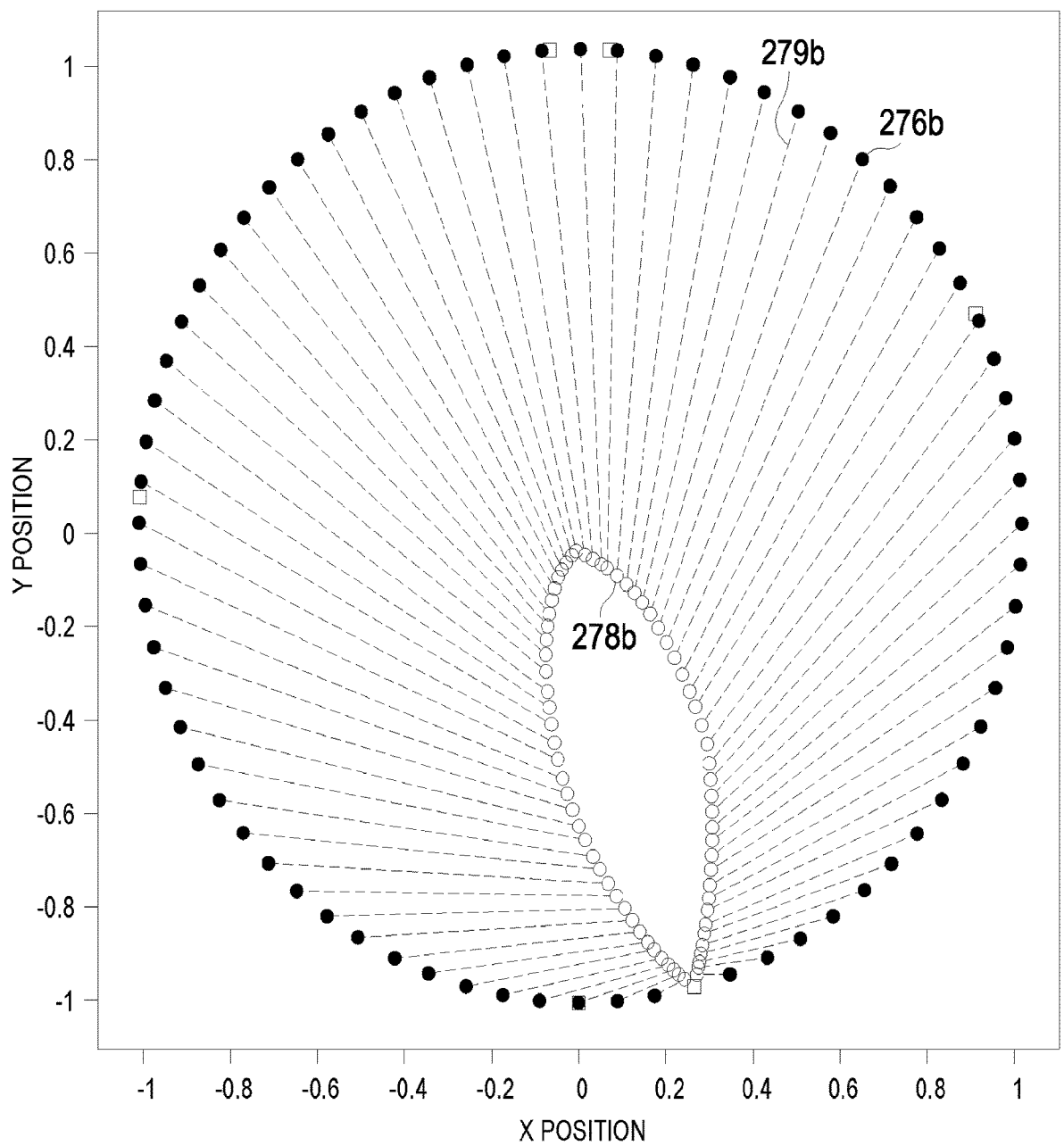
FIG. 2G is a graph of object rendering positions in an example embodiment.

FIG. 2F is a graph of speaker activations in an example embodiment. In this example, FIG. 2F shows the speaker activations 245b, 250b, 255b, 260b and 265b, which comprise the optimal solution to the cost function for the same speaker positions from FIGS. 1 and 2 with the addition of the attracting force represented by $w_{ij}$. FIG. 2G is a graph of object rendering positions in an example embodiment. In this example, FIG. 2G shows the corresponding ideal object positions 276b for a multitude of possible object angles and the corresponding actual rendering positions 278b for those objects, connected to the ideal object positions 276b by dotted lines 279b. The skewed orientation of the actual rendering positions 278b towards the fixed position $\vec{l}_j$ illustrates the impact of the attractor weightings on the optimal solution to the cost function.

In the second and third examples, a "repelling force" is used to "push" audio away from a position, which may be a listener position, a talker position or another position, such as a landmark position, a furniture position, etc. In some examples, a repelling force may be used to push audio away from an area or zone of a listening environment, such as an office area, a reading area, a bed or bedroom area (e.g., a baby's bed or bedroom), etc. According to some such examples, a particular position may be used as representative of a zone or area. For example, a position that represents a baby's bed may be an estimated position of the baby's head, an estimated sound source location corresponding to the baby, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equation 19:

$$p_{ij} = \max_i \|\vec{l}_j - \vec{s}_i\|, \text{ and} \quad (19c)$$

$$\tau_j = \max_i \|\vec{l}_j - \vec{s}_i\| \quad (19d)$$

Figure 2H:
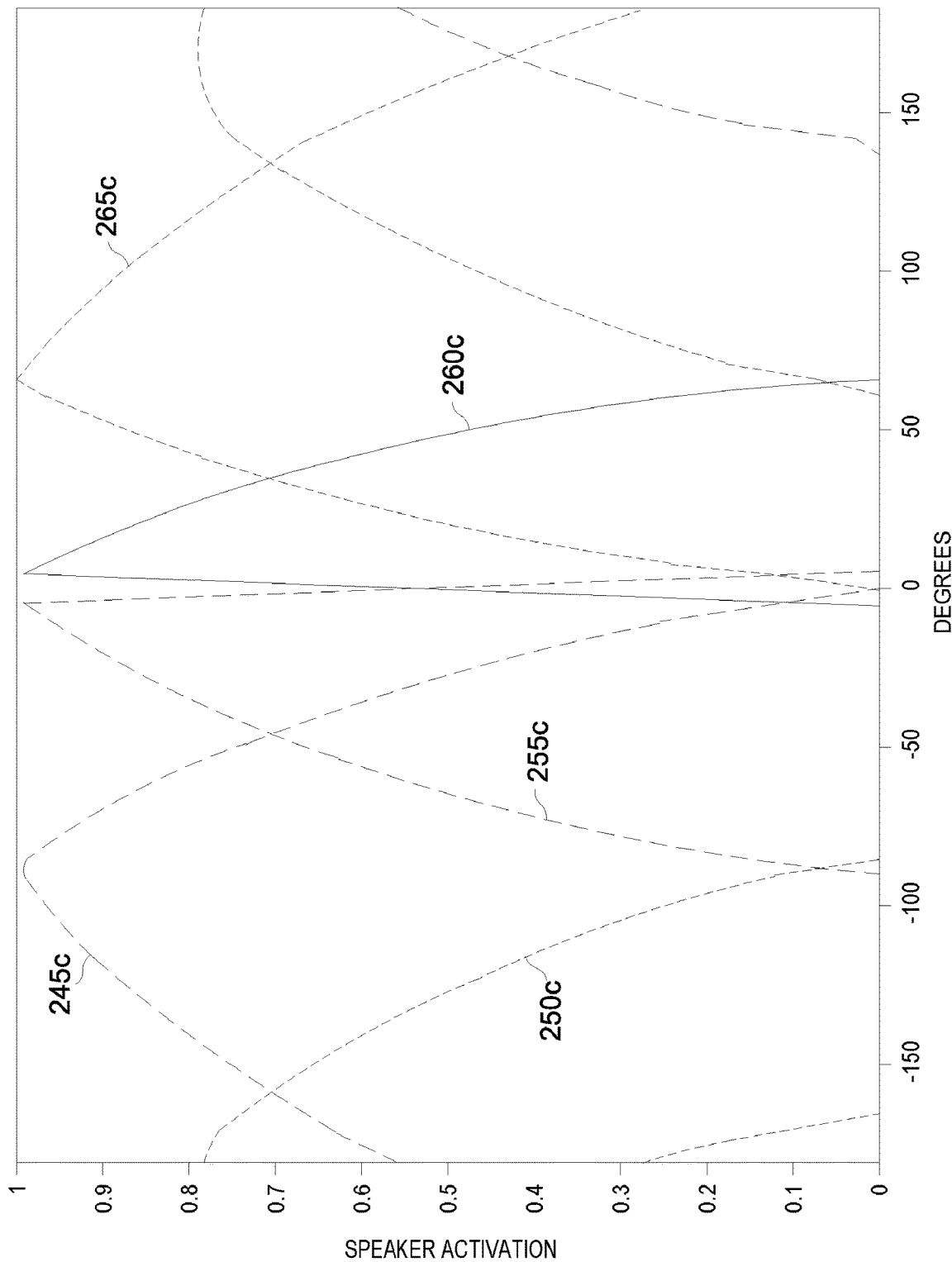
FIG. 2H is a graph of speaker activations in an example embodiment.
Figure 2I:
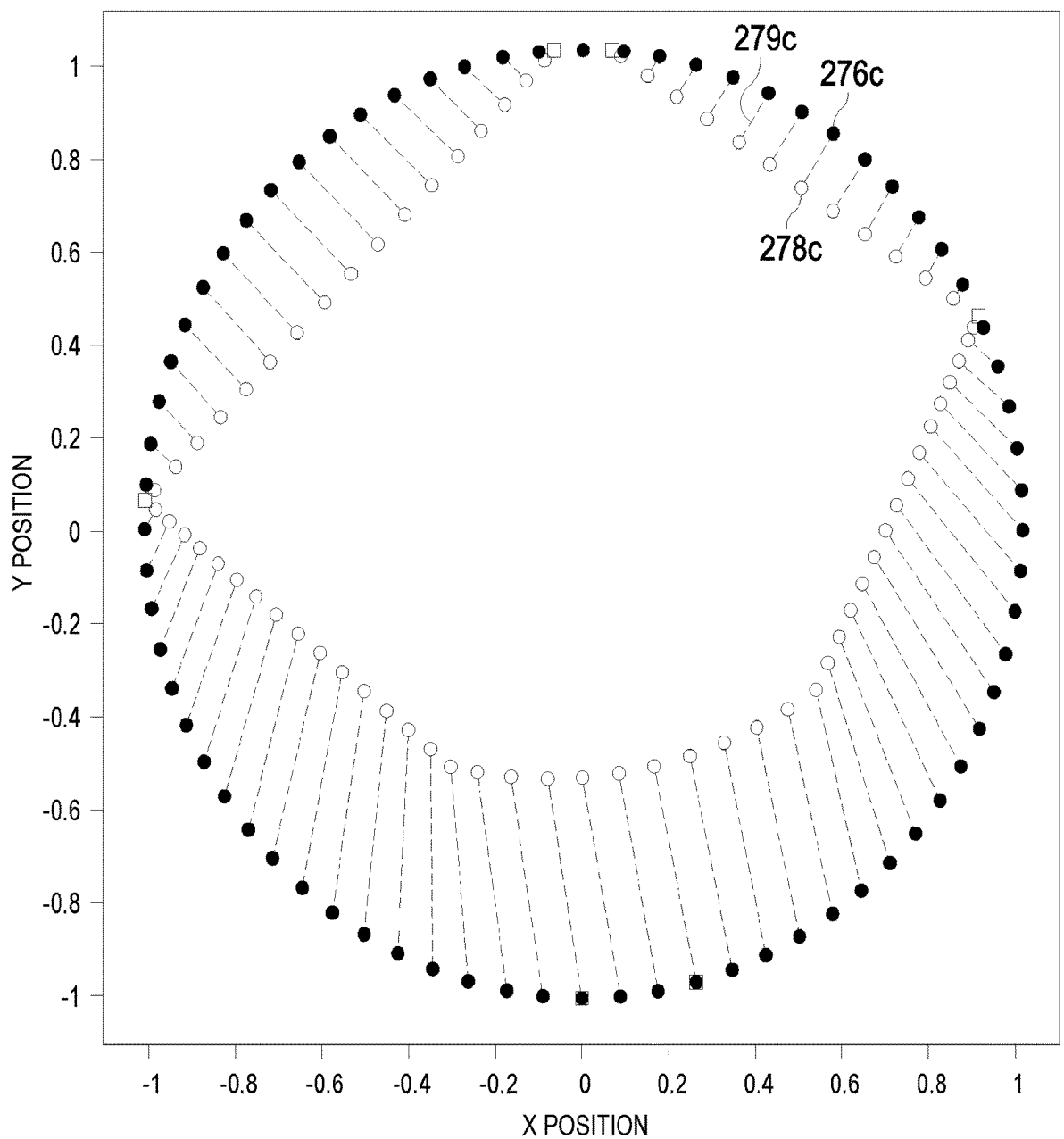
FIG. 2I is a graph of object rendering positions in an example embodiment.

To illustrate the use case of pushing audio away from a listener or talker, we specifically set $\alpha_j=5$, $\beta_j=2$, and $\vec{l}_j$ to a vector corresponding to a listener/talker position of 180 degrees. These values of $\alpha_j$, $\beta_j$, and $\vec{l}_j$ are merely examples. As noted above, in some examples $\alpha_j$ may be in the range of 1 to 100 and $\beta_j$ may be in the range of 1 to 25. FIG. 2H is a graph of speaker activations in an example embodiment. According to this example, FIG. 2H shows the speaker activations 245c, 250c, 255c, 260c and 265c, which comprise the optimal solution to the cost function for the same speaker positions as previous figures, with the addition of the repelling force represented by $w_{ij}$. FIG. 2I is a graph of object rendering positions in an example embodiment. In this example, FIG. 2I shows the ideal object positions 276c for a multitude of possible object angles and the corresponding actual rendering positions 278c for those objects, connected to the ideal object positions 276c by dotted lines 279c. The skewed orientation of the actual rendering positions 278c away from the fixed position $\vec{l}_j$ illustrates the impact of the repeller weightings on the optimal solution to the cost function.

Figure 2J:
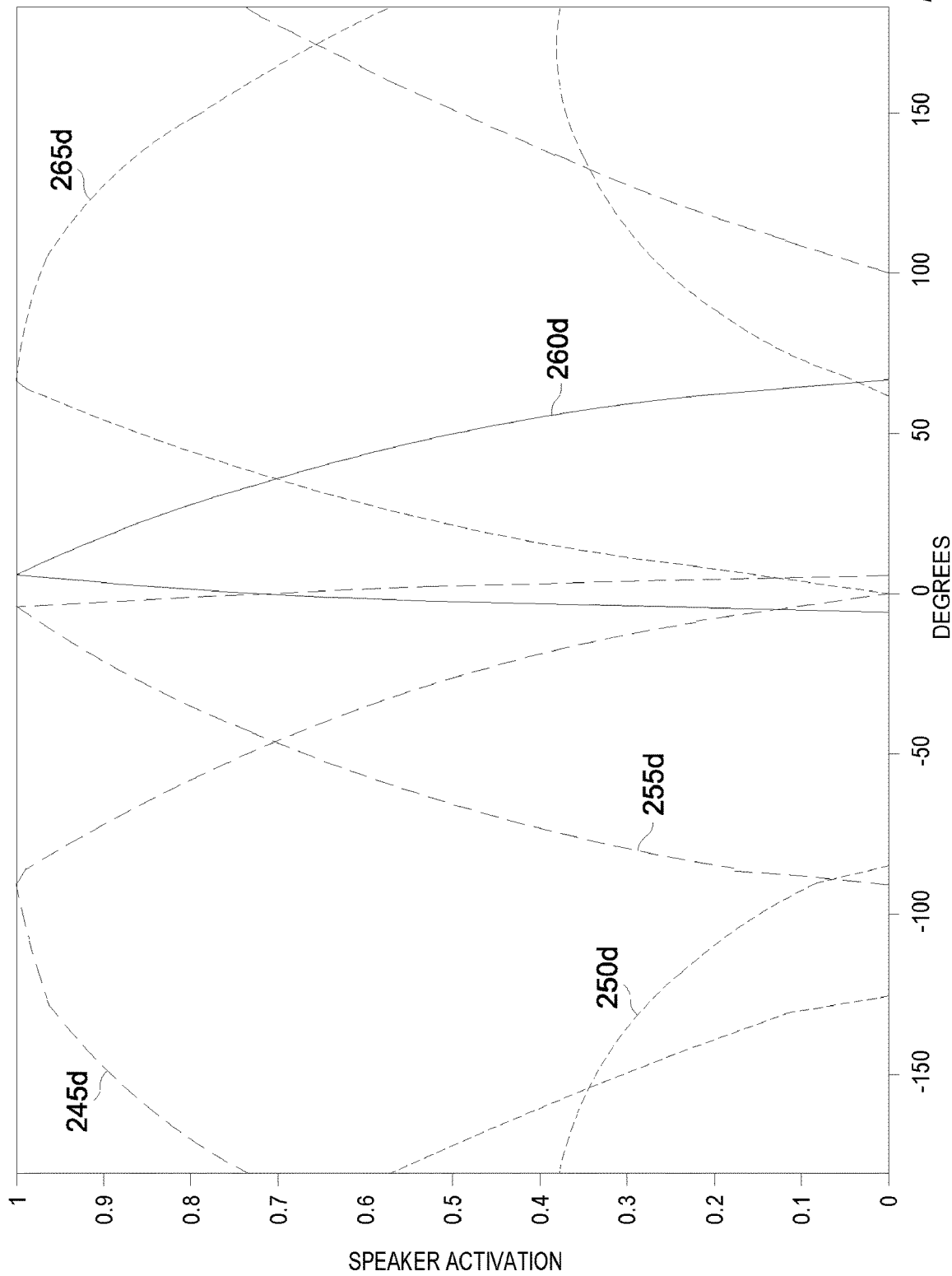
FIG. 2J is a graph of speaker activations in an example embodiment.
Figure 2K:
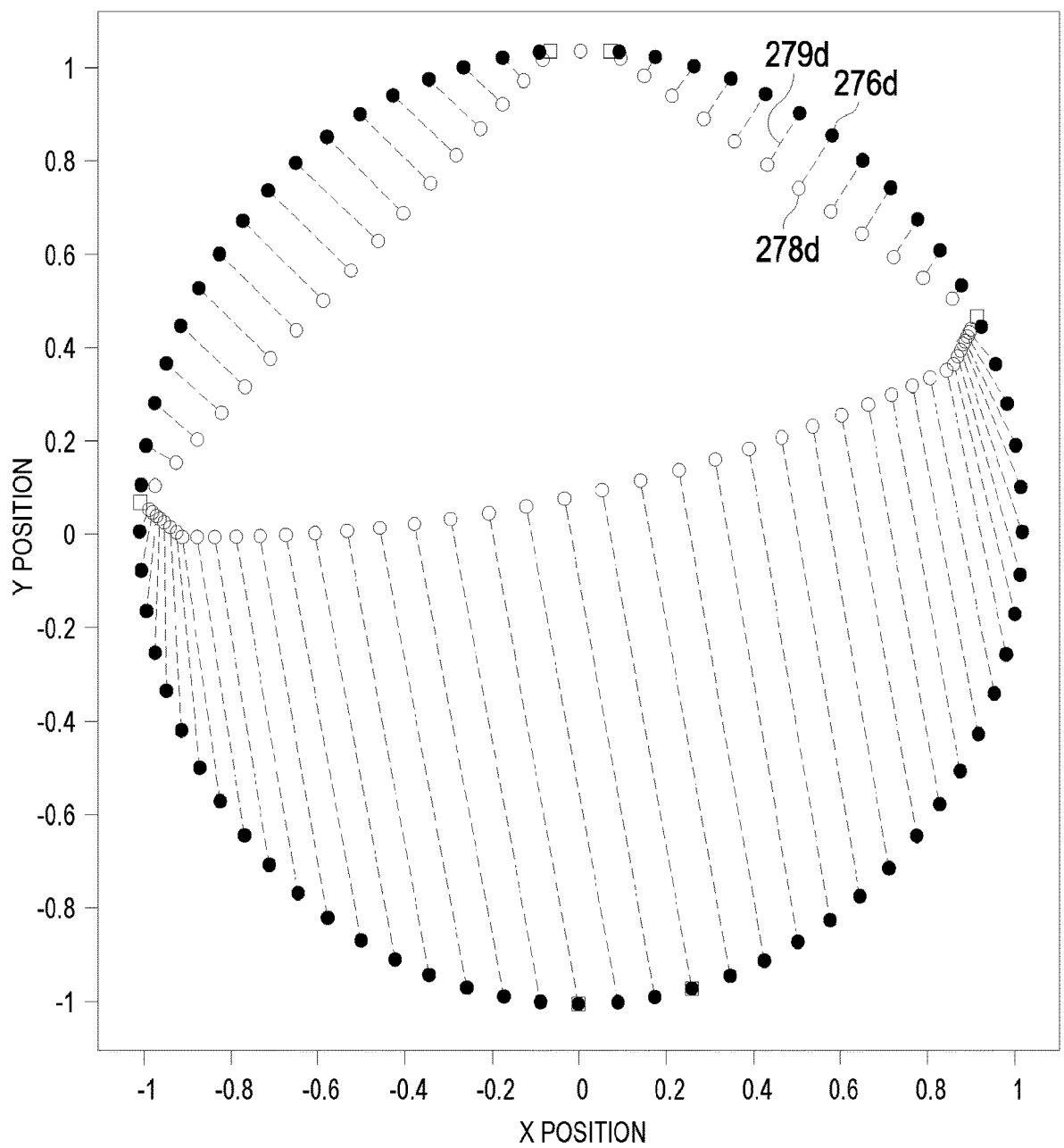
FIG. 2K is a graph of object rendering positions in an example embodiment.

The third example use case is "pushing" audio away from a landmark which is acoustically sensitive, such as a door to a sleeping baby's room. Similarly to the last example, we set $\vec{l}_j$ to a vector corresponding to a door position of 180 degrees (bottom, center of the plot). To achieve a stronger repelling force and skew the soundfield entirely into the front part of the primary listening space, we set $\alpha_j=20$, $\beta_j=5$. FIG. 2J is a graph of speaker activations in an example embodiment. Again, in this example FIG. 2J shows the speaker activations 245d, 250d, 255d, 260d and 265d, which comprise the optimal solution to the same set of speaker positions with the addition of the stronger repelling force. FIG. 2K is a graph of object rendering positions in an example embodiment. And again, in this example FIG. 2K shows the ideal object positions 276d for a multitude of possible object angles and the corresponding actual rendering positions 278d for those objects, connected to the ideal object positions 276d by dotted lines 279d. The skewed orientation of the actual rendering positions 278d illustrates the impact of the stronger repeller weightings on the optimal solution to the cost function.

Returning now to FIG. 2B, in this example block 225 involves modifying a rendering process for the first audio signals based at least in part on at least one of the second audio signals, the second rendered audio signals or characteristics thereof, to produce modified first rendered audio signals. Various examples of modifying a rendering process are disclosed herein. "Characteristics" of a rendered signal may, for example, include estimated or measured loudness or audibility at an intended listening position, either in silence or in the presence of one or more additional rendered signals. Other examples of characteristics include parameters associated with the rendering of said signals such as the intended spatial positions of the constituent signals of the associated program stream, the location of loudspeakers over which the signals are rendered, the relative activation of loudspeakers as a function of intended spatial position of the constituent signals, and any other parameters or state associated with the rendering algorithm utilized to generate said rendered signals. In some examples, block 225 may be performed by the first rendering module.

According to this example, block 230 involves modifying a rendering process for the second audio signals based at least in part on at least one of the first audio signals, the first rendered audio signals or characteristics thereof, to produce modified second rendered audio signals. In some examples, block 230 may be performed by the second rendering module.

In some implementations, modifying the rendering process for the first audio signals may involve warping the rendering of first audio signals away from a rendering location of the second rendered audio signals and/or modifying the loudness of one or more of the first rendered audio signals in response to a loudness of one or more of the second audio signals or the second rendered audio signals. Alternatively, or additionally, modifying the rendering process for the second audio signals may involve warping the rendering of second audio signals away from a rendering location of the first rendered audio signals and/or modifying the loudness of one or more of the second rendered audio signals in response to a loudness of one or more of the first audio signals or the first rendered audio signals. Some examples are provided below with reference to FIG. 3 et seq.

However, other types of rendering process modifications are within the scope of the present disclosure. For example, in some instances modifying the rendering process for the first audio signals or the second audio signals may involve performing spectral modification, audibility-based modification or dynamic range modification. These modifications may or may not be related to a loudness-based rendering modification, depending on the particular example. For example, in the aforementioned case of a primary spatial stream being rendered in an open plan living area and a secondary stream comprised of cooking tips being rendered in an adjacent kitchen, it may be desirable to ensure the cooking tips remain audible in the kitchen. This can be accomplished by estimating what the loudness would be for the rendered cooking tips stream in the kitchen without the interfering first signal, then estimating the loudness in the presence of the first signal in the kitchen, and finally dynamically modifying the loudness and dynamic range of both streams across a plurality of frequencies, to ensure audibility of the second signal, in the kitchen.

In the example shown in FIG. 2B, block 235 involves mixing at least the modified first rendered audio signals and the modified second rendered audio signals to produce mixed audio signals. Block 235 may, for example, be performed by the mixer 130b shown in FIG. 2A.

According to this example, block 240 involves providing the mixed audio signals to at least some speakers of the environment. Some examples of the method 200 involve playback of the mixed audio signals by the speakers.

As shown in FIG. 2B, some implementations may provide more than 2 rendering modules. Some such implementations may provide N rendering modules, where N is an integer greater than 2. Accordingly, some such implementations may include one or more additional rendering modules. In some such examples, each of the one or more additional rendering modules may be configured for receiving, via the interface system, an additional audio program stream. The additional audio program stream may include additional audio signals that are scheduled to be reproduced by at least one speaker of the environment. Some such implementations may involve rendering the additional audio signals for reproduction via at least one speaker of the environment, to produce additional rendered audio signals and modifying a rendering process for the additional audio signals based at least in part on at least one of the first audio signals, the first rendered audio signals, the second audio signals, the second rendered audio signals or characteristics thereof, to produce modified additional rendered audio signals. According to some such examples, the mixing module may be configured for mixing the modified additional rendered audio signals with at least the modified first rendered audio signals and the modified second rendered audio signals, to produce the mixed audio signals.

As described above with reference to FIGS. 1A and 2A, some implementations may include a microphone system that includes one or more microphones in a listening environment. In some such examples, the first rendering module may be configured for modifying a rendering process for the first audio signals based, at least in part, on first microphone signals from the microphone system. The "first microphone signals" may be received from a single microphone or from 2 or more microphones, depending on the particular implementation. In some such implementations, the second rendering module may be configured for modifying a rendering process for the second audio signals based, at least in part, on the first microphone signals.

As noted above with reference to FIG. 2A, in some instances the locations of one or more microphones may be known and may be provided to the control system. According to some such implementations, the control system may be configured for estimating a first sound source position based on the first microphone signals and modifying the rendering process for at least one of the first audio signals or the second audio signals based at least in part on the first sound source position. The first sound source position may, for example, be estimated according to a triangulation process, based on DOA data from each of three or more microphones, or groups of microphones, having known locations. Alternatively, or additionally, the first sound source position may be estimated according to the amplitude of a received signal from two or more microphones. The microphone that produces the highest-amplitude signal may be assumed to be the nearest to the first sound source position. In some such examples, the first sound source position may be set to the location of the nearest microphone. In some such examples, the first sound source position may be associated with the position of a zone, where a zone is selected by processing signals from two or more microphones through a pre-trained classifier, such as a Gaussian mixer model.

In some such implementations, the control system may be configured for determining whether the first microphone signals correspond to environmental noise. Some such implementations may involve modifying the rendering process for at least one of the first audio signals or the second audio signals based, at least in part, on whether the first microphone signals correspond to environmental noise. For example, if the control system determines that the first microphone signals correspond to environmental noise, modifying the rendering process for the first audio signals or the second audio signals may involve increasing the level of the rendered audio signals so that the perceived loudness of the signals in the presence of the noise at an intended listening position is substantially equal to the perceived loudness of the signals in the absence of the noise.

In some examples, the control system may be configured for determining whether the first microphone signals correspond to a human voice. Some such implementations may involve modifying the rendering process for at least one of the first audio signals or the second audio signals based, at least in part, on whether the first microphone signals correspond to a human voice. For example, if the control system determines that the first microphone signals correspond to a human voice, such as a wakeword, modifying the rendering process for the first audio signals or the second audio signals may involve decreasing the loudness of the rendered audio signals reproduced by speakers near the first sound source position, as compared to the loudness of the rendered audio signals reproduced by speakers farther from the first sound source position. Modifying the rendering process for the first audio signals or the seconds audio signals may alternatively or in addition involve modifying the rendering process to warp the intended positions of the associated program stream's constituent signals away from the first sound source position and/or to penalize the use of speakers near the first sound source position in comparison to speakers farther from the first sound source position.

In some implementations, if the control system determines that the first microphone signals correspond to a human voice, the control system may be configured for reproducing the first microphone signals in one or more speakers near a location of the environment that is different from the first sound source position. In some such examples, the control system may be configured for determining whether the first microphone signals correspond to a child's cry. According to some such implementations, the control system may be configured for reproducing the first microphone signals in one or more speakers near a location of the environment that corresponds to an estimated location of a caregiver, such as a parent, a relative, a guardian, a child care service provider, a teacher, a nurse, etc. In some examples, the process of estimating the caregiver's estimated location may be triggered by a voice command, such as "<wakeword>, don't wake the baby". The control system would be able to estimate the location of the speaker (caregiver) according to the location of the nearest smart audio device that is implementing a virtual assistant, by triangulation based on DOA information provided by three or more local microphones, etc. According to some implementations, the control system would have a priori knowledge of the baby room location (and/or listening devices therein) would then be able to perform the appropriate processing.

According to some such examples, the control system may be configured for determining whether the first microphone signals correspond to a command. If the control system determines that the first microphone signals correspond to a command, in some instances the control system may be configured for determining a reply to the command and controlling at least one speaker near the first sound source location to reproduce the reply. In some such examples, the control system may be configured for reverting to an unmodified rendering process for the first audio signals or the second audio signals after controlling at least one speaker near the first sound source location to reproduce the reply.

In some implementations, the control system may be configured for executing the command. For example, the control system may be, or may include, a virtual assistant that is configured to control an audio device, a television, a home appliance, etc., according to the command.

With this definition of the minimal and more capable multi-stream rendering systems shown in FIGS. 1A, 1B and 2A, dynamic management of the simultaneous playback of multiple program streams may be achieved for numerous useful scenarios. Several examples will now be described with reference to FIGS. 3A and 3B.

Figure 3A:
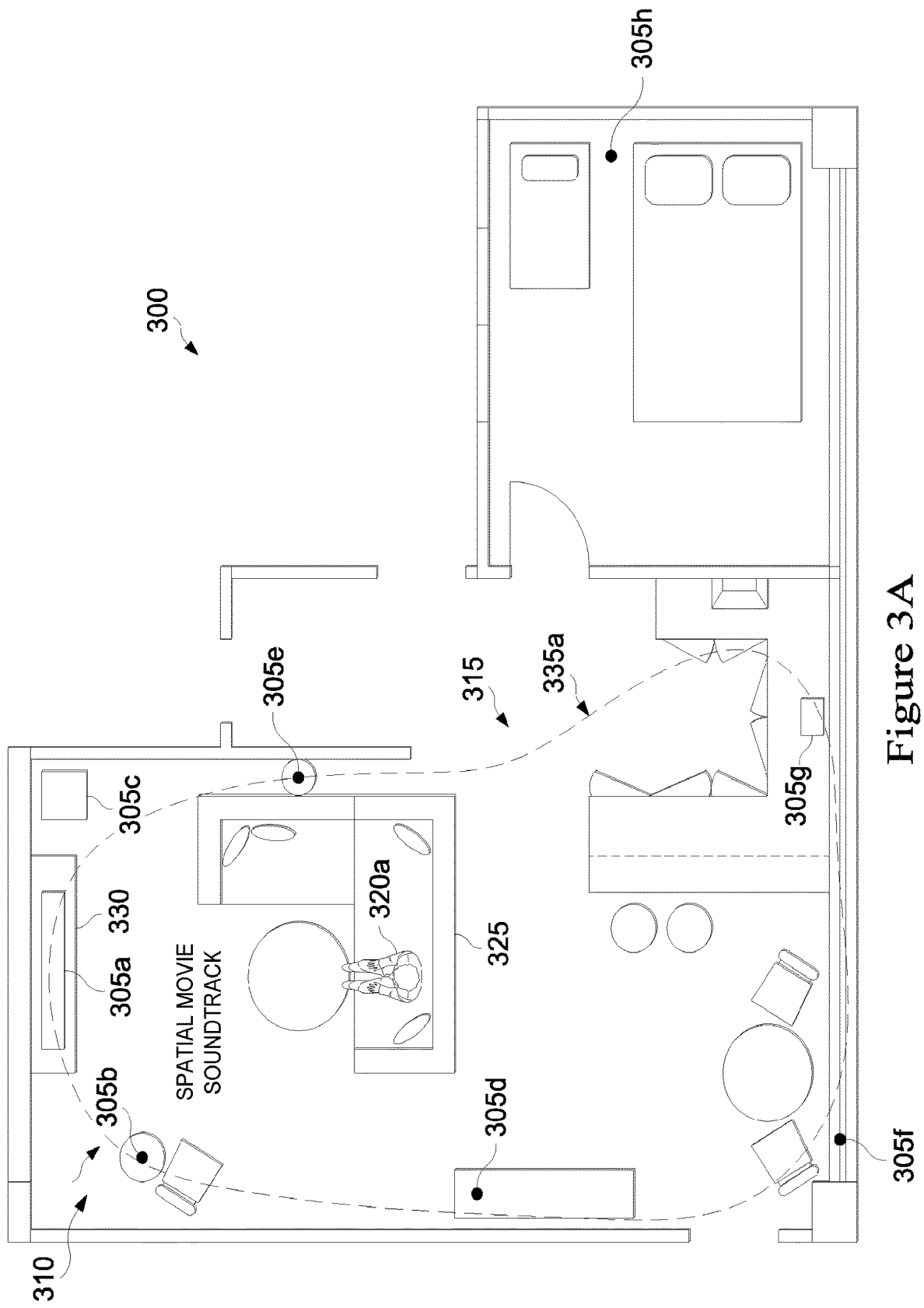
FIGS. 3A and 3B show an example of a floor plan of a connected living space.
Figure 3B:
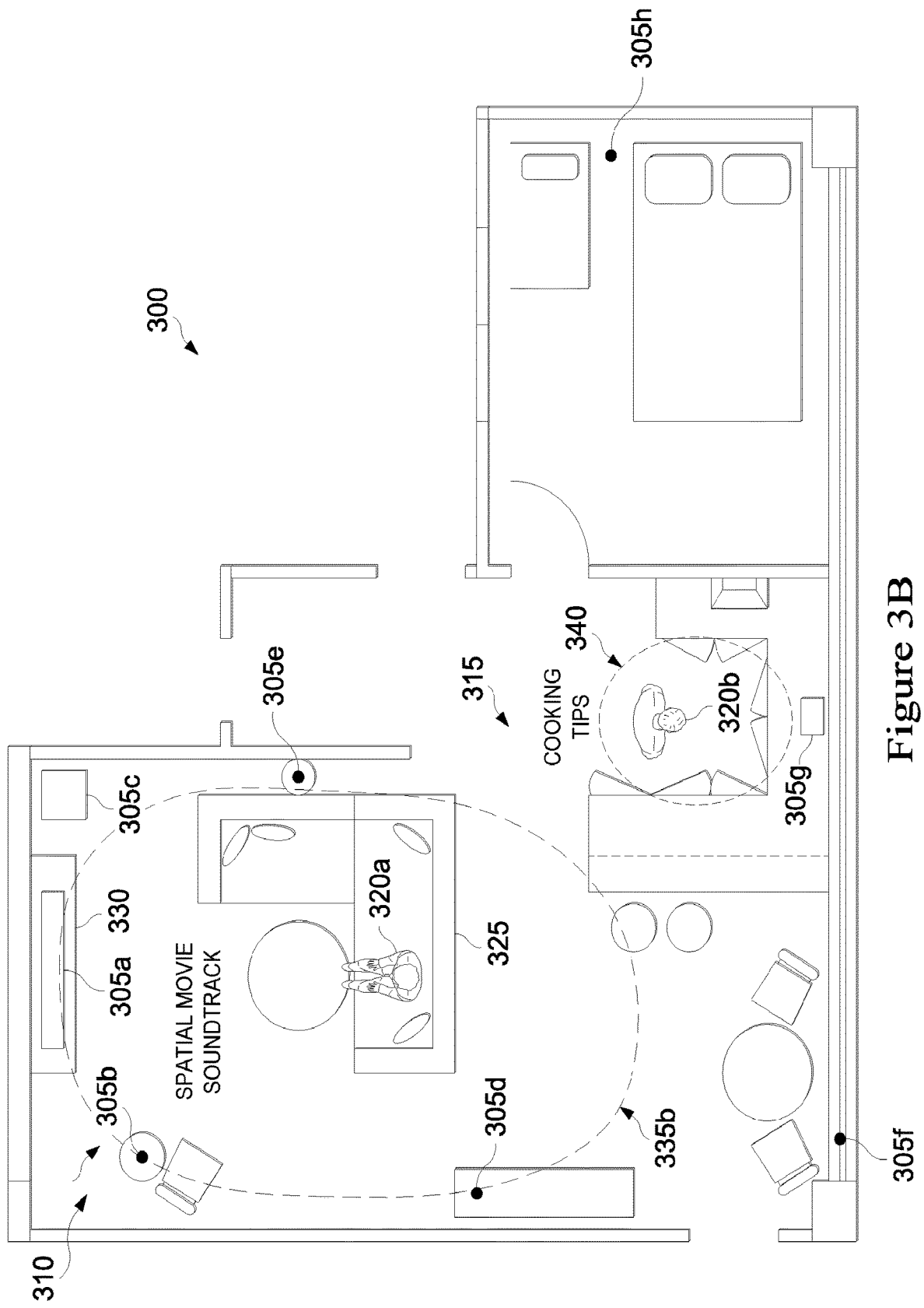

We first examine the previously-discussed example involving the simultaneous playback of a spatial movie sound track in a living room and cooking tips in a connected kitchen. The spatial movie sound track is an example of the "first audio program stream" referenced above and the cooking tips audio is an example of the "second audio program stream" referenced above. FIGS. 3A and 3B show an example of a floor plan of a connected living space. In this example, the living space 300 includes a living room at the upper left, a kitchen at the lower center, and a bedroom at the lower right. Boxes and circles 305a-305h distributed across the living space represent a set of 8 loudspeakers placed in locations convenient to the space, but not adhering to any standard prescribed layout (arbitrarily placed). In FIG. 3A, only the spatial movie soundtrack is being played back, and all the loudspeakers in the living room 310 and kitchen 315 are utilized to create an optimized spatial reproduction around the listener 320a seated on the couch 325 facing the television 330, given the loudspeaker capabilities and layout. This optimal reproduction of the movie soundtrack is represented visually by the cloud 335a lying within the bounds of the active loudspeakers.

In FIG. 3B, cooking tips are simultaneously rendered and played back over a single loudspeaker 305g in the kitchen 315 for a second listener 320b. The reproduction of this second program stream is represented visually by the cloud 340 emanating from the loudspeaker 305g. If these cooking tips were simultaneously played back without modification to the rendering of the movie soundtrack as depicted in FIG. 3A, then audio from the movie soundtrack emanating from speakers in or near the kitchen 315 would interfere with the second listener's ability to understand the cooking tips. Instead, in this example, rendering of the spatial movie soundtrack is dynamically modified as a function of the rendering of the cooking tips. Specifically, the rendering of the movie sound track is shifted away from speakers near the rendering location of the cooking tips (the kitchen 315), with this shift represented visually by the smaller cloud 335b in FIG. 3B that is pushed away from speakers near the kitchen. If playback of the cooking tips stops while the movie soundtrack is still playing, then in some implementations the rendering of the movie soundtrack may dynamically shift back to its original optimal configuration seen in FIG. 3A. Such a dynamic shift in the rendering of the spatial movie soundtrack may be achieved through numerous disclosed methods.

Many spatial audio mixes include a plurality of constituent audio signals designed to be played back at a particular location in the listening space. For example, Dolby 5.1 and 7.1 surround sound mixes consist of 6 and 8 signals, respectively, meant to be played back on speakers in prescribed canonical locations around the listener. Object-based audio formats, e.g., Dolby Atmos, consist of constituent audio signals with associated metadata describing the possibly time-varying 3D position in the listening space where the audio is meant to be rendered. With the assumption that the renderer of the spatial movie soundtrack is capable of rendering an individual audio signal at any location with respect to the arbitrary set of loudspeakers, the dynamic shift to the rendering depicted in FIGS. 3A and 3B may be achieved by warping the intended positions of the audio signals within the spatial mix. For example, the 2D or 3D coordinates associated with the audio signals may be pushed away from the location of the speaker in the kitchen or alternatively pulled toward the upper left corner of the living room. The result of such warping is that speakers near the kitchen are used less since the warped positions of the spatial mix's audio signals are now more distant from this location. While this method does achieve the goal of making the second audio stream more intelligible to the second listener, it does so at the expense of significantly altering the intended spatial balance of the movie soundtrack for the first listener.

A second method for achieving the dynamic shift to the spatial rendering may be realized by using a flexible rendering system. In some such implementations, the flexible rendering system may be CMAP, FV or a hybrid of both, as described above. Some such flexible rendering systems attempt to reproduce a spatial mix with all its constituent signals perceived as coming from their intended locations. While doing so for each signal of the mix, in some examples, preference is given to the activation of loudspeakers in close proximity to the desired position of that signal. In some implementations, additional terms may be dynamically added to the optimization of the rendering, which penalize the use of certain loudspeakers based on other criteria. For the example at hand, what may be referred to as a "repelling force" may be dynamically placed at the location of the kitchen to highly penalize the use of loudspeakers near this location and effectively push the rendering of the spatial movie soundtrack away. As used herein, the term "repelling force" may refer to a factor that corresponds with relatively lower speaker activation in a particular location or area of a listening environment. In other words, the phrase "repelling force" may refer to a factor that favors the activation of speakers that are relatively farther from a particular position or area that corresponds with the "repelling force." However, according to some such implementations the renderer may still attempt to reproduce the intended spatial balance of the mix with the remaining, less penalized speakers. As such, this technique may be considered a superior method for achieving the dynamic shift of the rendering in comparison to that of simply warping the intended positions of the mix's constituent signals.

The described scenario of shifting the rendering of the spatial movie soundtrack away from the cooking tips in the kitchen may be achieved with the minimal version of the multi-stream renderer depicted in FIG. 1B. However, improvements to the scenario may be realized by employing the more capable system depicted in FIG. 2A. While shifting the rendering of the spatial movie soundtrack does improve the intelligibility of the cooking tips in the kitchen, the movie soundtrack may still be noticeably audible in the kitchen. Depending on the instantaneous conditions of both streams, the cooking tips might be masked by the movie soundtrack; for example, a loud moment in the movie soundtrack masking a soft moment in the cooking tips. To deal with this issue, a dynamic modification to the rendering of the cooking tips as a function of the rendering of the spatial movie soundtrack may be added. For example, a method for dynamically altering an audio signal across frequency and time in order to preserve its perceived loudness in the presence of an interfering signal may be performed. In this scenario, an estimate of the perceived loudness of the shifted movie soundtrack at the kitchen location may be generated and fed into such a process as the interfering signal. The time and frequency varying levels of the cooking tips may then be dynamically modified to maintain its perceived loudness above this interference, thereby better maintaining intelligibility for the second listener. The required estimate of the loudness of the movie soundtrack in the kitchen may be generated from the speaker feeds of the soundtrack's rendering, signals from microphones in or near the kitchen, or a combination thereof. This process of maintaining the perceived loudness of the cooking tips will in general boost the level of the cooking tips, and it is possible that the overall loudness may become objectionably high in some cases. To combat this issue, yet another rendering modification may be employed. The interfering spatial movie soundtrack may be dynamically turned down as a function of the loudness-modified cooking tips in the kitchen becoming too loud. Lastly, it is possible that some external noise source might simultaneously interfere with the audibility of both program streams; a blender may be used in the kitchen during cooking, for example. An estimate of the loudness of this environmental noise source in both the living room and kitchen may be generated from microphones connected to the rendering system. This estimate may, for example, be added to the estimate of the loudness of the soundtrack in the kitchen to affect the loudness modifications of the cooking tips. At the same time, the rendering of the soundtrack in the living room may be additionally modified as a function of the environmental noise estimate to maintain the perceived loudness of the soundtrack in the living room in the presence of this environmental noise, thereby better maintaining audibility for the listener in the living room.

Figure 4A:
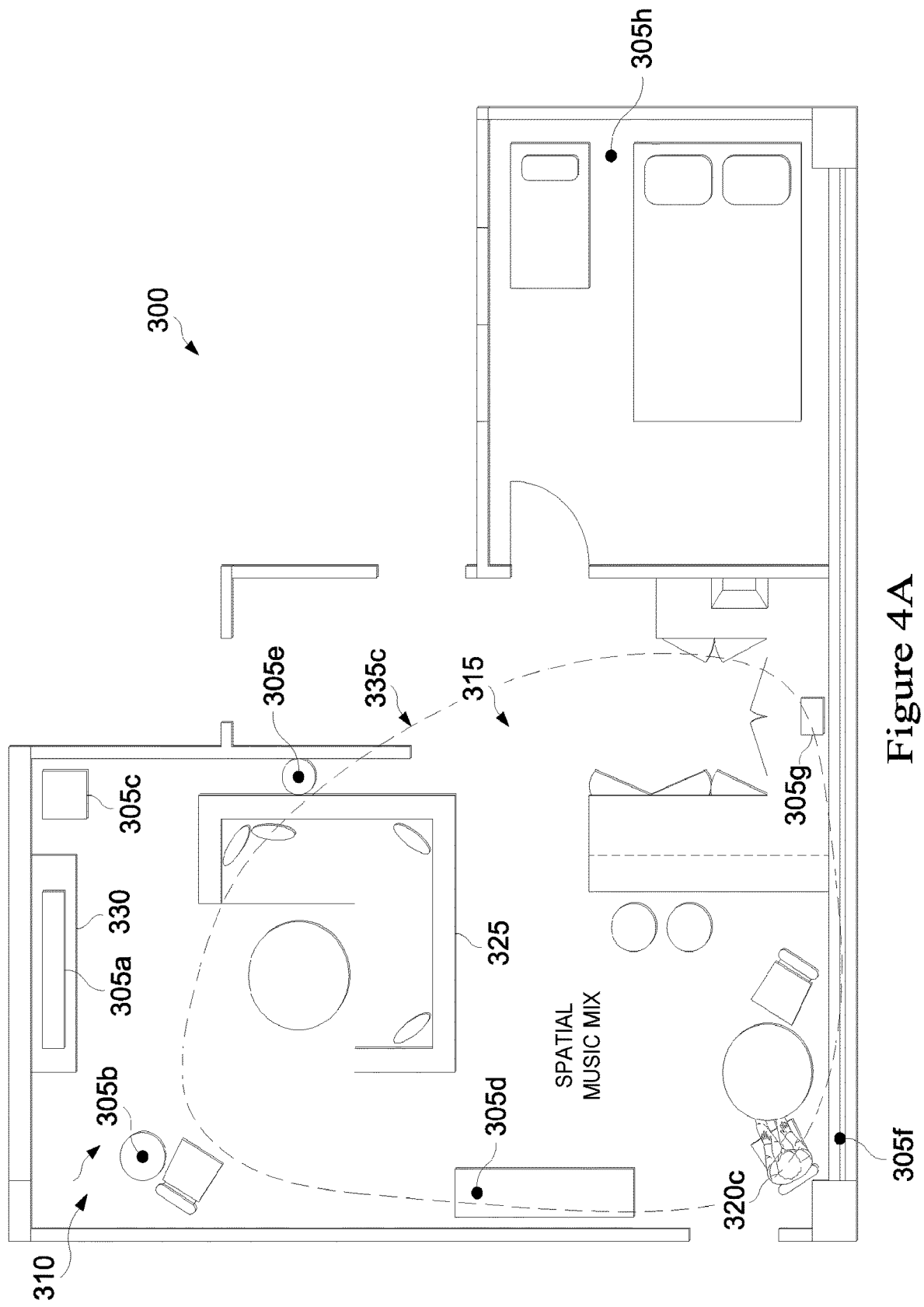
FIGS. 4A and 4B show an example of a multi-stream renderer providing simultaneous playback of a spatial music mix and a voice assistant response.
Figure 4B:
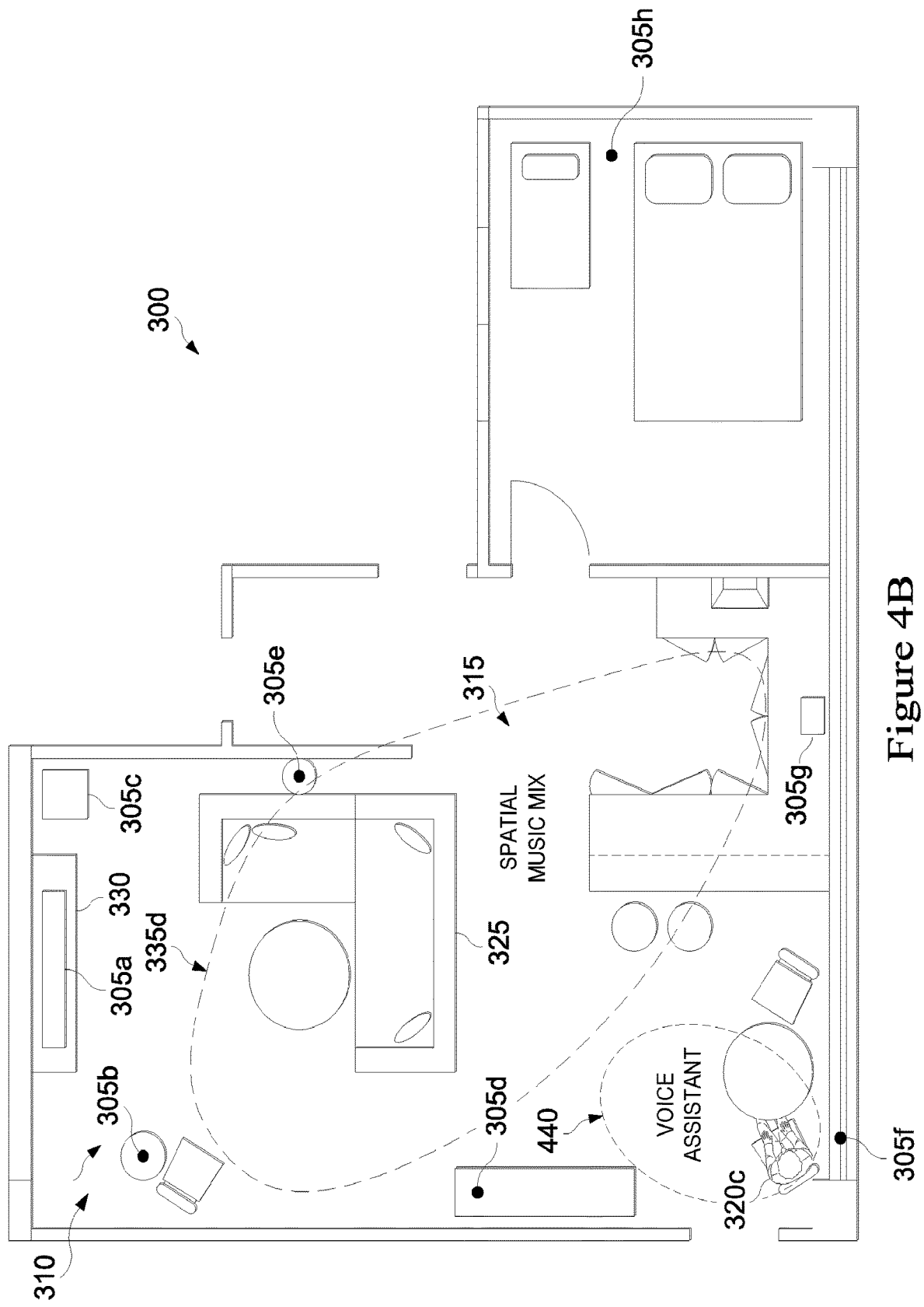

As can be seen, this example use case of the disclosed multi-stream renderer employs numerous, interconnected modifications to the two program streams in order to optimize their simultaneous playback. In summary, these modifications to the streams can be listed as:

Spatial movie soundtrack
    Spatial rendering shifted away from the kitchen as a function of the cooking tips being rendered in the kitchen
    Dynamic reduction in loudness as a function of the loudness of the cooking tips rendered in the kitchen
    Dynamic boost in loudness as a function of an estimate of the loudness in the living room of the interfering blender noise from the kitchen Cooking tips
    Dynamic boost in loudness as a function of a combined estimate of the loudness of both the movie soundtrack and blender noise in the kitchen A second example use case of the disclosed multi-stream renderer involves the simultaneous playback of a spatial program stream, such as music, with the response of a smart voice assistant to some inquiry by the user. With existing smart speakers, where playback has generally been constrained to monophonic or stereo playback over a single device, an interaction with the voice assistant typically consists of the following stages:

1) Music playing
2) User utters the voice assistant wakeword
3) Smart speaker recognizes the wakeword and turns down (ducks) the music by a significant amount
4) User utters a command to the smart assistant (i.e. "Play the next song")
5) Smart speaker recognizes the command, affirms this by playing some voice response (i.e. "Ok, playing next song") through the speaker mixed over the top of the ducked music, and then executes the command
6) Smart speaker turns the music back up to the original volume FIGS. 4A and 4B show an example of a multi-stream renderer providing simultaneous playback of a spatial music mix and a voice assistant response. When playing spatial audio over a multitude of orchestrated smart speakers, some embodiments provide an improvement to the above chain of events. Specifically, the spatial mix may be shifted away from one or more of the speakers selected as appropriate for relaying the response from the voice assistant. Creating this space for the voice assistant response means that the spatial mix may be turned down less, or perhaps not at all, in comparison to the existing state of affairs listed above. FIGS. 4A and 4B depict this scenario. In this example, the modified chain of events may transpire as:

1) A spatial music program stream is playing over a multitude of orchestrated smart speakers for a user cloud 335c in FIG. 4A).
2) User 320c utters the voice assistant wakeword.

3) One or more smart speakers (e.g., the speaker 305d and/or the speaker 305f) recognizes the wakeword and determines the location of the user 320c, or which speaker(s) the user 320c is closest to, using the associated recordings from microphones associated with the one or more smart speaker(s).
4) The rendering of the spatial music mix is shifted away from the location determined in the previous step in anticipation of a voice assistant response program stream being rendered near that location (cloud 335d in FIG. 4B).
5) User utters a command to the smart assistant (e.g., to a smart speaker running smart assistant/virtual assistant software).
6) Smart speakers recognize the command, synthesize a corresponding response program stream, and render the response near the location of the user (cloud 440 in FIG. 4B).
7) Rendering of the spatial music program stream shifts back to its original state when the voice assistant response is complete (cloud 335c in FIG. 4A).

In addition to optimizing the simultaneous playback of the spatial music mix and voice assistant response, the shifting of the spatial music mix may also improve the ability of the set of speakers to understand the listener in step 5. This is because music has been shifted out of the speakers near the listener, thereby improving the voice to other ratio of the associated microphones.

Similar to what was described for the previous scenario with the spatial movie mix and cooking tips, the current scenario may be further optimized beyond what is afforded by shifting the rendering of the spatial mix as a function of the voice assistant response. On its own, shifting the spatial mix may not be enough to make the voice assistant response completely intelligible to the user. A simple solution is to also turn the spatial mix down by a fixed amount, though less than is required with the current state of affairs. Alternatively, the loudness of the voice assistant response program stream may be dynamically boosted as a function of the loudness of the spatial music mix program stream in order to maintain the audibility of the response. As an extension, the loudness of the spatial music mix may also be dynamically cut if this boosting process on the response stream grows too large.

Figure 5A:
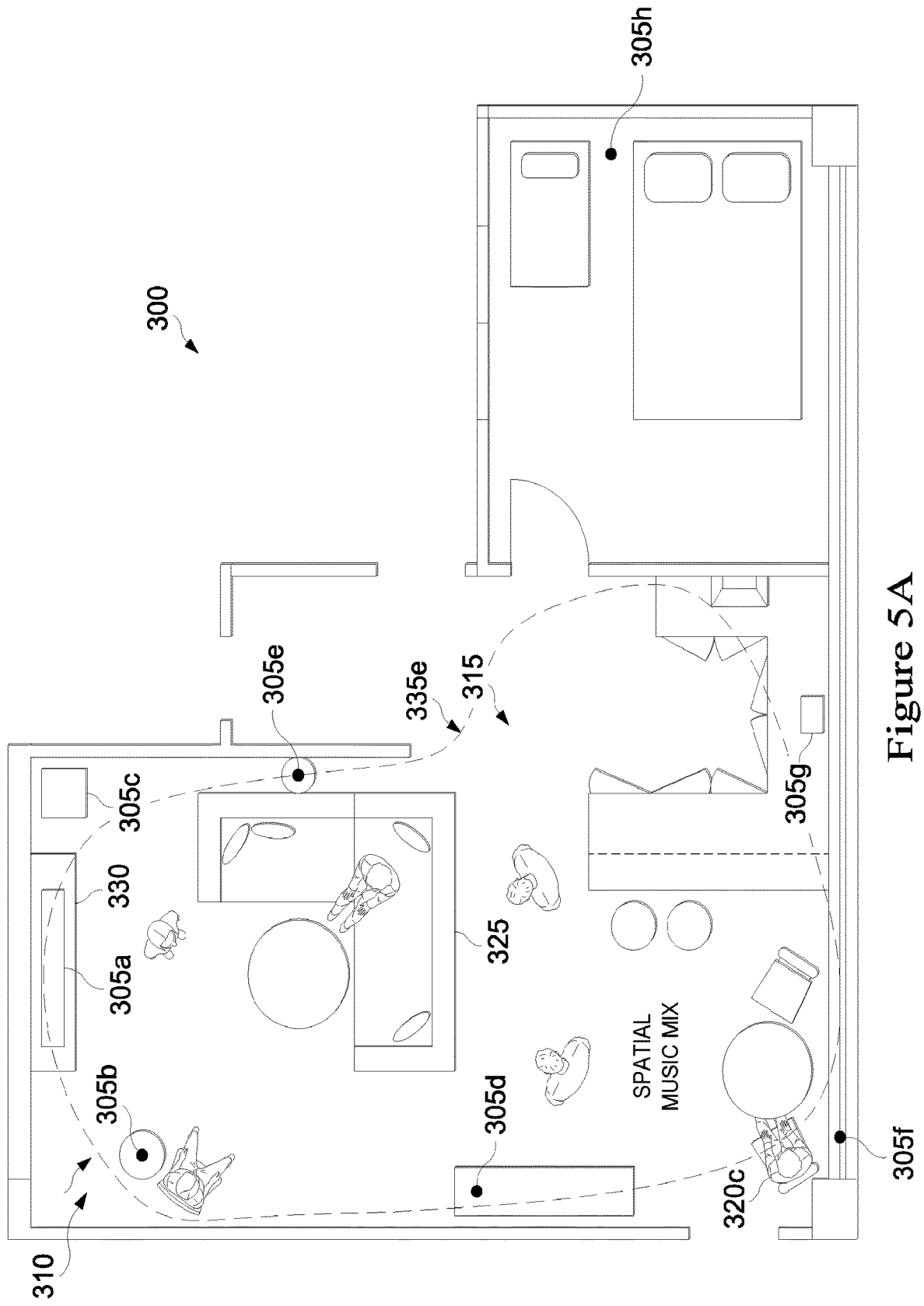
FIGS. 5A, 5B and 5C illustrate a third example use case for a disclosed multi-stream renderer.
Figure 5B:
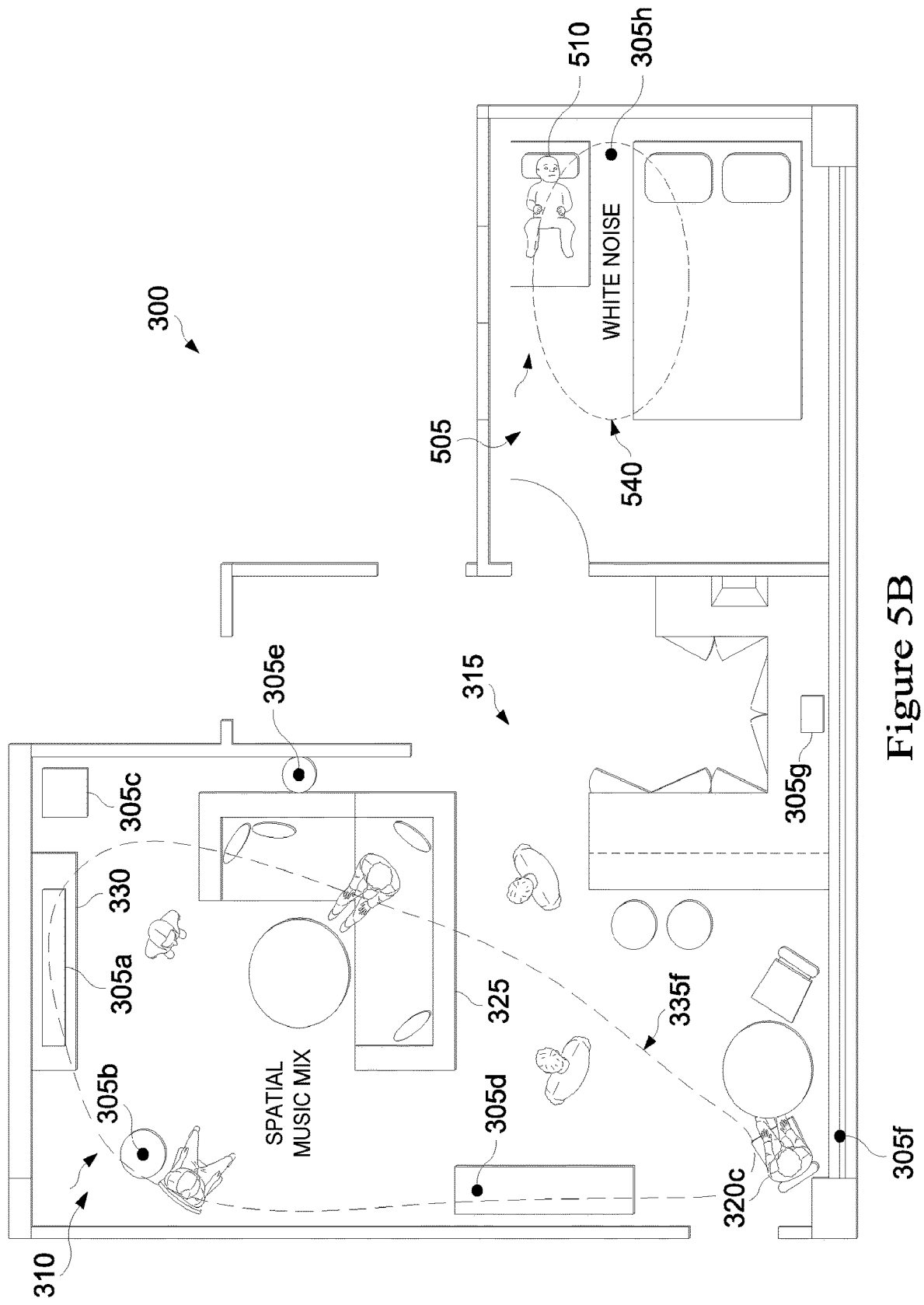
Figure 5C:
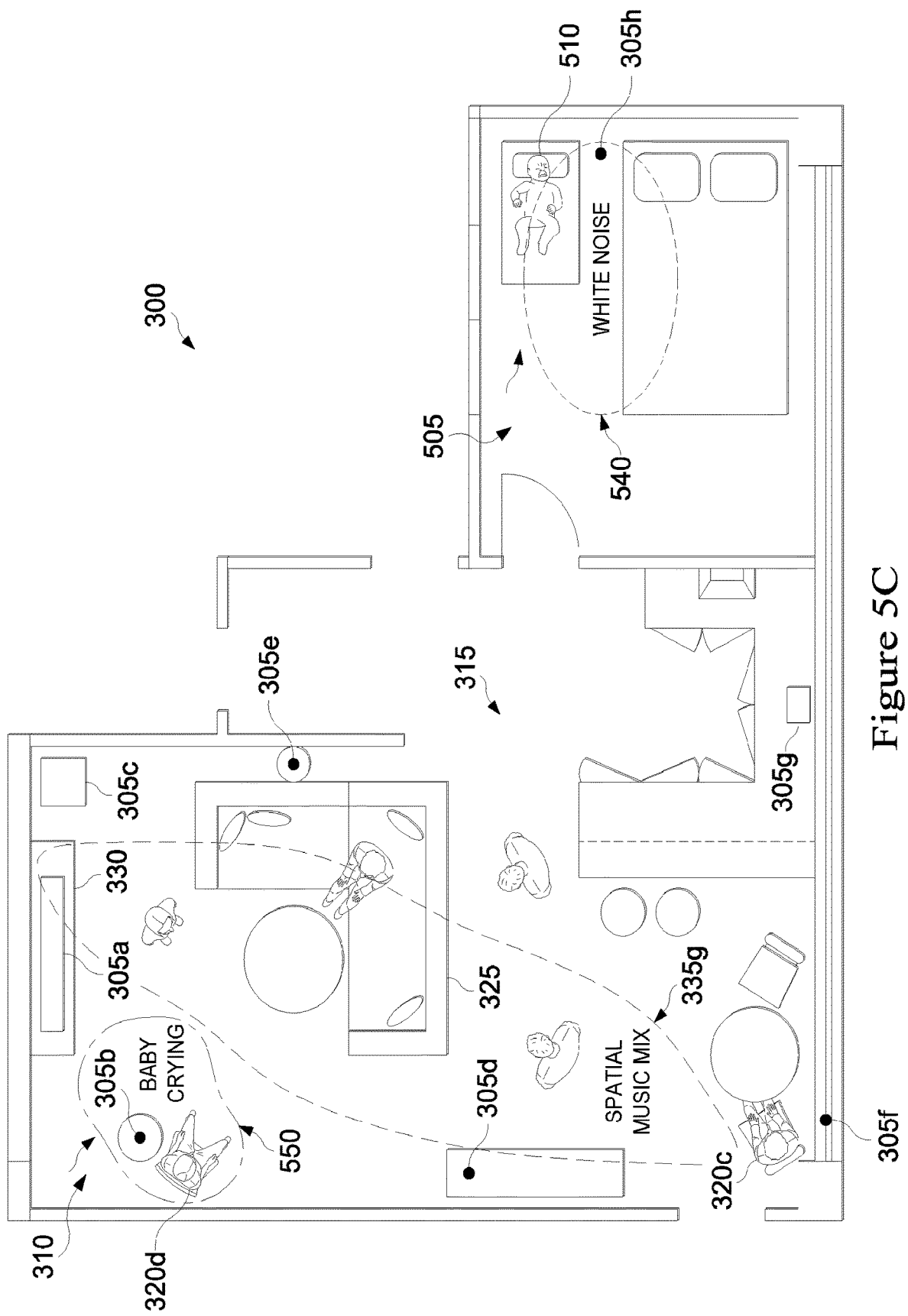

FIGS. 5A, 5B and 5C illustrate a third example use case for a disclosed multi-stream renderer. This example involves managing the simultaneous playback of a spatial music mix program stream and a comfort-noise program stream while at the same time attempting to make sure that a baby stays asleep in an adjacent room but being able to hear if the baby cries. FIG. 5A depicts a starting point wherein the spatial music mix (represented by the cloud 335e) is playing optimally across all the speakers in the living room 310 and kitchen 315 for numerous people at a party. In FIG. 5B a baby 510 is now trying to sleep in the adjacent bedroom 505 pictured at the lower right. To help ensure this, the spatial music mix is dynamically shifted away from the bedroom to minimize leakage therein, as depicted by the cloud 335f, while still maintaining a reasonable experience for people at the party. At the same time, a second program stream containing soothing white noise (represented by the cloud 540) plays out of the speaker 305h in the baby's room to mask any remaining leakage from the music in the adjacent room. To ensure complete masking, the loudness of this white noise stream may, in some examples, be dynamically modified as a function of an estimate of the loudness of the spatial music leaking into the baby's room. This estimate may be generated from the speaker feeds of the spatial music's rendering, signals from microphones in the baby's room, or a combination thereof. Also, the loudness of the spatial music mix may be dynamically attenuated as a function of the loudness-modified noise if it becomes too loud. This is analogous to the loudness processing between the spatial movie mix and cooking tips of the first scenario. Lastly, microphones in the baby's room (e.g., microphones associated with the speaker 305h, which may be a smart speaker in some implementations) may be configured to record audio from the baby (cancelling out sound that might be picked up from the spatial music and white noise), and a combination of these processed microphone signals may then serve as a third program stream which may be simultaneously played back near the listener 320d, who may be a parent or other caregiver, in the living room 310 if crying is detected (through machine learning, via a pattern matching algorithm, etc.). FIG. 5C depicts the reproduction of this additional stream with the cloud 550. In this case, the spatial music mix may be additionally shifted away from the speaker near the parent playing the baby's cry, as shown by the modified shape of the cloud 335g relative to the shape of the cloud 335f of FIG. 5B, and the program stream of the baby's cry may be loudness modified as a function of the spatial music stream so that the baby's cry remains audible to the listener 320d. The interconnected modifications optimizing the simultaneous playback of the three program streams considered within this example may be summarized as follows:

Spatial music mix in living room
    Spatial rendering shifted away from the baby's room to reduce transmission into the room
    Dynamic reduction in loudness as a function of the loudness of the white noise rendered in the baby's room
    Spatial rendering shifted away from parent as a function of the baby's cry being rendered on a speaker near the parent
White noise
    Dynamic boost in loudness as a function of an estimate of the loudness of the music stream bleeding into the baby's room
Recording of baby's cry
    Dynamic boost in loudness as a function of an estimate of the loudness of the music mix at the position of the parent or other caregiver.

We next describe examples of how some of the noted embodiments may be implemented.

In FIG. 1B, each of the Render blocks 1 . . . N may be implemented as identical instances of any single-stream renderer, such as the CMAP, FV or hybrid renderers previously mentioned. Structuring the multi-stream renderer this way has some convenient and useful properties.

First, if the rendering is done in this hierarchical arrangement and each of the single-stream renderer instances is configured to operate in the frequency/transform domain (e.g. QMF), then the mixing of the streams can also happen in the frequency/transform domain and the inverse transform only needs to be run once, for M channels. This is a significant efficiency improvement over running N×M inverse transforms and mixing in the time domain.

Figure 6:
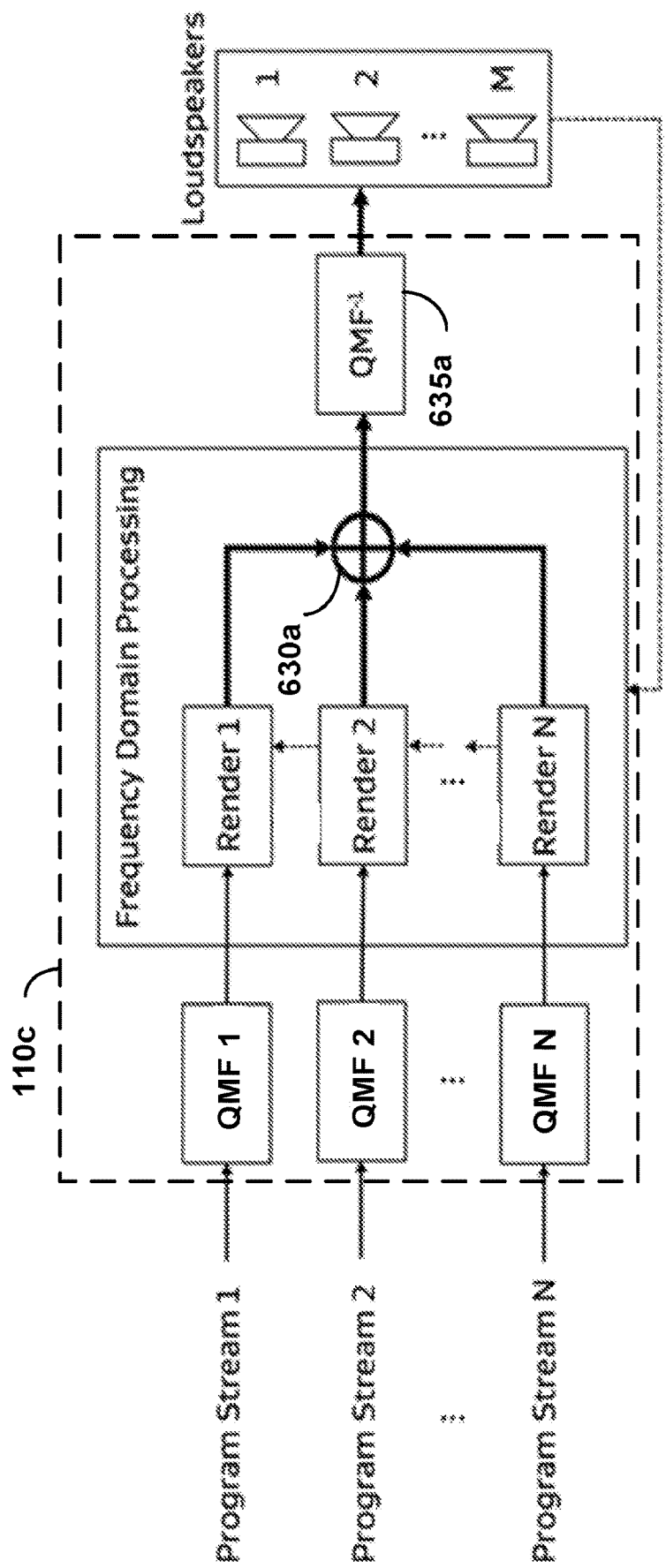
FIG. 6 shows a frequency/transform domain example of the multi-stream renderer shown in FIG. 1B.

FIG. 6 shows a frequency/transform domain example of a multi-stream renderer shown in FIG. 1B. In this example, a quadrature mirror analysis filterbank (QMF) is applied to each of program streams 1 through N before each program stream is received by a corresponding one of the rendering modules 1 through N. According to this example, the rendering modules 1 through N operate in the frequency domain. After the mixer 630*a* mixes the outputs of the rendering modules 1 through N, an inverse synthesis filterbank 635*a* converts the mix to the time domain and provides mixed speaker feed signals in the time domain to the loudspeakers 1 through M. In this example, the quadrature mirror filterbanks, the rendering modules 1 through N, the mixer 630*a* and the inverse filterbank 635*a* are components of the control system 110*c*.

Figure 7:
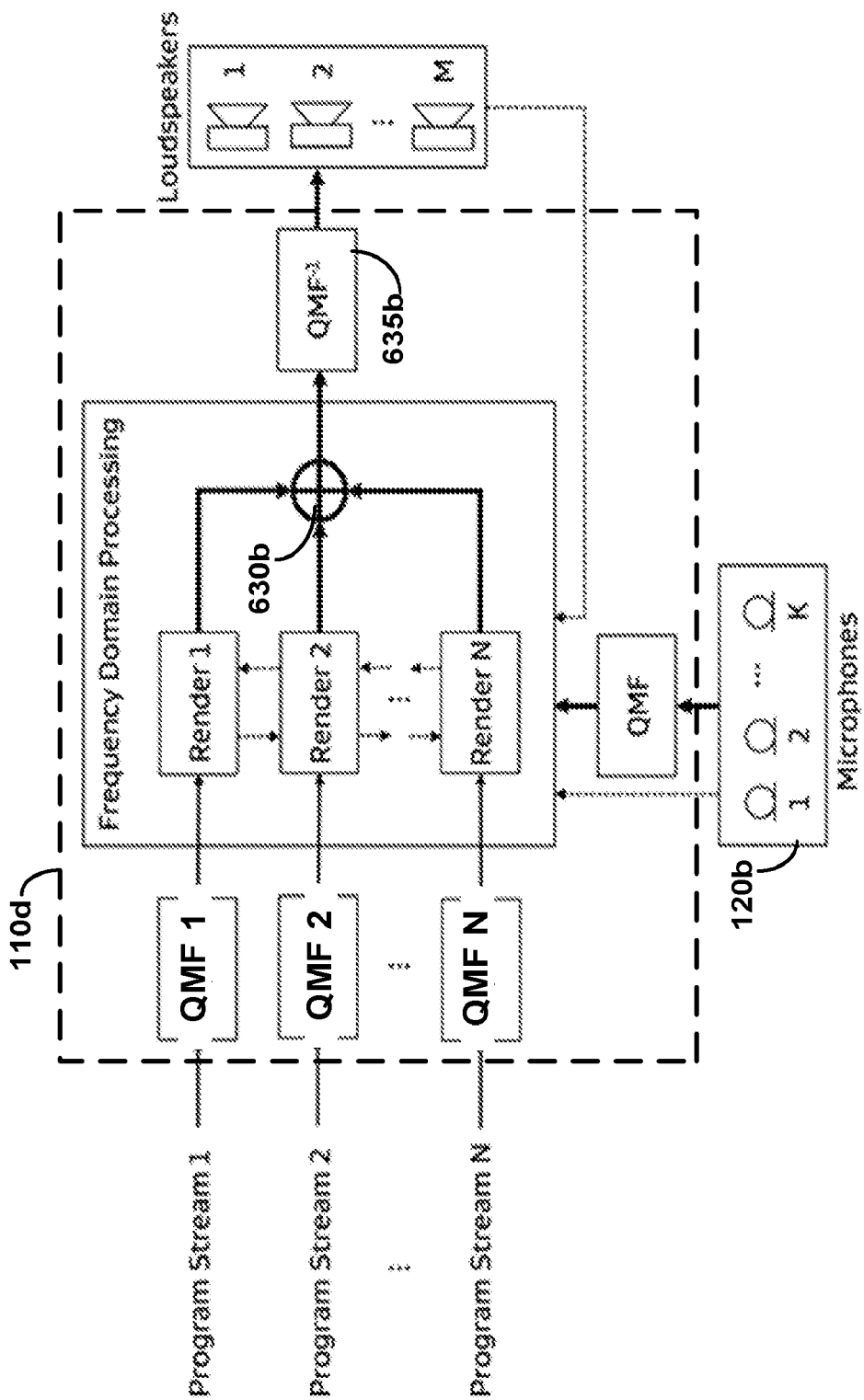
FIG. 7 shows a frequency/transform domain example of the multi-stream renderer shown in FIG. 2A.

FIG. 7 shows a frequency/transform domain example of the multi-stream renderer shown in FIG. 2A. As in FIG. 6, a quadrature mirror filterbank (QMF) is applied to each of program streams 1 through N before each program stream is received by a corresponding one of the rendering modules 1 through N. According to this example, the rendering modules 1 through N operate in the frequency domain. In this implementation, time-domain microphone signals from the microphone system 120*b* are also provided to a quadrature mirror filterbank, so that the rendering modules 1 through N receive microphone signals in the frequency domain. After the mixer 630*b* mixes the outputs of the rendering modules 1 through N, an inverse filterbank 635*b* converts the mix to the time domain and provides mixed speaker feed signals in the time domain to the loudspeakers 1 through M. In this example, the quadrature mirror filterbanks, the rendering modules 1 through N, the mixer 630*b* and the inverse filterbank 635*b* are components of the control system 110*d*.

Another benefit of the hierarchical approach in the frequency domain is in the calculation of the perceived loudness of each audio stream and the use of this information in dynamically modifying one or more of the other audio streams. To illustrate this embodiment, we consider the previously mentioned example that is described above with reference to FIGS. 3A and 3B. In this case we have two audio streams (N=2), a spatial movie soundtrack and cooking tips. We also may have environmental noise produced a blender in the kitchen, picked up by one or more of the K microphones.

After each audio stream s has been individually rendered and each microphone i captured and transformed to the frequency domain, a source excitation signal $E_s$ or $E_i$ can be calculated, which serves as a time-varying estimate of the perceived loudness of each audio stream s or microphone signal i. In this example, these source excitation signals are computed from the rendered streams or captured microphones via transform coefficients $X_s$ for audio steams or $X_i$ for microphone signals, for b frequency bands across time t for c loudspeakers and smoothed with frequency-dependent time constants $\lambda_b$:

$$E_s(b,t,c)=\lambda_b E_s(b,t-1,c)+(1-\lambda_b)|X_s(b,t,c)|^2 \quad (20a)$$

$$E_i(b,t,c)=\lambda_b(b)E_i(b,t-1,c)+(1-\lambda_b)|X_i(b,t,c)|^2 \quad (20b)$$

The raw source excitations are an estimate of the perceived loudness of each stream at a specific position. For the spatial stream, that position is in the middle of the cloud 335*b* in FIG. 3B, whereas for the cooking tips stream, it is in the middle of the cloud 340. The position for the blender noise picked up by the microphones may, for example, be based on the specific location(s) of the microphone(s) closest to the source of the blender noise.

The raw source excitations must be translated to the listening position of the audio stream(s) that will be modified by them, to estimate how perceptible they will be as noise at the listening position of each target audio stream. For example, if audio stream 1 is the movie soundtrack and audio stream 2 is the cooking tips, $\hat{E}_{12}$ would be the translated (noise) excitation. That translation is calculated by applying an audibility scale factor $A_{xs}$ from a source audio stream s to a target audio stream x or $A_{xi}$ from microphone i to a target audio stream x, as a function of each loudspeaker c for each frequency band b. Values for $A_{xs}$ and $A_{xi}$ may be determined by using distance ratios or estimates of actual audibility, which may vary over time.

$$\hat{E}_{xs}(b,t,c)=A_{xs}(b,t,c)E_s(b,t,c) \quad (21a)$$

$$\hat{E}_{xi}(b,t,c)=A_{xi}(b,t,c)E_i(b,t,c) \quad (21b)$$

In equation 13a, $\hat{E}_{xs}$ represents raw noise excitations computed for source audio streams, without reference to microphone input. In equation 13b, $\hat{E}_{xi}$ represents raw noise excitations computed with reference to microphone input. According to this example, the raw noise excitations $\hat{E}_{xs}$ or $\hat{E}_{xi}$ are then summed across streams 1 to N, microphones 1 to K, and output channels 1 to M to get a total noise estimate $\hat{E}_x$ for a target stream x:

$$\hat{E}_x(b,t)=\Sigma_{c=1}^M(\Sigma_{s=1}^N \hat{E}_{xs}(b,t,x)+\Sigma_{i=1}^K \hat{E}_{xi}(b,t,c)) \quad (22)$$

According to some alternative implementations, a total noise estimate may be obtained without reference to microphone input by omitting the term $\Sigma_{i=1}^K \hat{E}_{xi}(b,t,c)$ in Equation 14.

In this example, the total raw noise estimate is smoothed to avoid perceptible artifacts that could be caused by modifying the target streams too rapidly. According to this implementation, the smoothing is based on the concept of using a fast attack and a slow release, similar to an audio compressor. The smoothed noise estimate $\overline{E}_x$ for a target stream x is calculated in this example as:

$$\overline{E}_x(b,t) = \lambda(b,t)\hat{E}_x(b,t) + (1-\lambda(b,t))\overline{E}_x(b,t-1) \quad (23)$$

$$\lambda(b,t) = \begin{cases} \lambda_{fast}, & \hat{E}_x(b,t) > \overline{E}_x(b,t) \\ \lambda_{slow}, & \hat{E}_x(b,t) \le \overline{E}_x(b,t) \end{cases} \quad (24)$$

Once we have a complete noise estimate $\overline{E}_x(b,t)$ for stream x, we can reuse the previously calculated source excitation signal $\overline{E}_x(b,t,c)$ to determine a set of time-varying gains $G_x(b,t,c)$ to apply to the target audio stream x to ensure that it remains audible over the noise. These gains can be calculated using any of a variety of techniques.

In one embodiment, a loudness function $L\{\cdot,\cdot\}$ can be applied to the excitations to model various non-linearities in a human's perception of loudness and to calculate specific loudness signals which describe the time-varying distribution of the perceived loudness across frequency. Applying $L\{\cdot,\cdot\}$ to the excitations for the noise estimate and rendered audio stream x gives an estimate for the specific loudness of each signal:

$$L_{xn}(b,t)=L\{\overline{E}_x(b,t)\} \quad (25a)$$

$$L_x(b,t,c)=L\{E_x(b,t,c)\} \quad (25b)$$

In Equation 17a, $L_{xn}$ represents an estimate for the specific loudness of the noise and in Equation 17b, $L_x$ represents an estimate for the specific loudness of the rendered audio stream x. These specific loudness signals represent the perceived loudness when the signals are heard in isolation. However, if the two signals are mixed, masking may occur. For example, if the noise signal is much louder than the stream x signal, it will mask the stream x signal thereby decreasing the perceived loudness of that signal relative to the perceived loudness of that signal heard in isolation. This phenomenon may be modeled with a partial loudness function PL{•,•} which takes two inputs. The first input is the excitation of the signal of interest, and the second input is the excitation of the competing (noise) signal. The function returns a partial specific loudness signal PL representing the perceived loudness of the signal of interest in the presence of the competing signal. The partial specific loudness of the stream x signal in the presence of the noise signal may then be computed directly from the excitation signals, across frequency bands b, time t, and loudspeaker c:

$$PL_x(b,t,c) = PL\{E_x(b,t,c), \bar{E}_x(b,t)\} \qquad (26)$$

To maintain audibility of the audio stream x signal in the presence of the noise, we can calculate gains $G_x(b,t,c)$ to apply to audio stream x to boost the loudness until it is audible above the noise as shown in Equations 8a and 8b. Alternatively, if the noise is from another audio stream s, we can calculate two sets of gains. In one such example, the first, $G_x(b,t,c)$, is to be applied to audio stream x to boost its loudness and the second, $G_s(b,t)$, is to be applied to competing audio stream s to reduce its loudness such that the combination of the gains ensures audibility of audio stream x, as shown in Equations 9a and 9b. In both sets of equations $\overline{PL}_x(b,t,c)$ represents the partial specific loudness of the source signal in the presence of noise after application of the compensating gains.

$$\overline{PL}_x(b,t,c) = PL\{G_x(b,t,c)^2 E_x(b,t,c), \bar{E}_x(b,t)\} \qquad (27a)$$

such that $$L_x(b,t,c) - \overline{PL}_x(b,t,c) < L_x(b,t,c) - PL_x(b,t,c) \qquad (27b)$$

$$\overline{PL}_x(b,t,c) = PL\{G_x(b,t,c)^2 E_x(b,t,c), G_s(b,t)^2 \bar{E}_x(b,t)\} \qquad (28a)$$

again, such that $$L_x(b,t,c) - \overline{PL}_x(b,t,c) < L_x(b,t,c) - PL_x(b,t,c) \qquad (28b)$$

In practice, the raw gains are further smoothed across frequency using a smoothing function S{•} before being applied to an audio stream, again to avoid audible artifacts. $\bar{G}_x(b,t,c)$ and $\bar{G}_s(b,t)$ represent the final compensation gains for a target audio stream x and a competing audio stream s:

$$\bar{G}_x(b,t,c) = S\{G_x(b,t,c)\} \qquad (29a)$$

$$\bar{G}_s(b,t) = S\{G_s(b,t)\} \qquad (29b)$$

In one embodiment these gains may be applied directly to all rendered output channels of an audio stream. In another embodiment they may instead be applied to an audio stream's objects before they are rendered, e.g., using the methods described in US Patent Application Publication No. 2019/0037333A1, which is hereby incorporated by reference. These methods involve calculating, based on spatial metadata of the audio object, a panning coefficient for each of the audio objects in relation to each of a plurality of predefined channel coverage zones. The audio signal may be converted into submixes in relation to the predefined channel coverage zones based on the calculated panning coefficients and the audio objects. Each of the submixes may indicate a sum of components of the plurality of audio objects in relation to one of the predefined channel coverage zones. A submix gain may be generated by applying an audio processing to each of the submix and may control an object gain applied to each of the audio objects. The object gain may be a function of the panning coefficients for each of the audio objects and the submix gains in relation to each of the predefined channel coverage zones. Applying the gains to the objects has some advantages, especially when combined with other processing of the streams.

Figure 8:
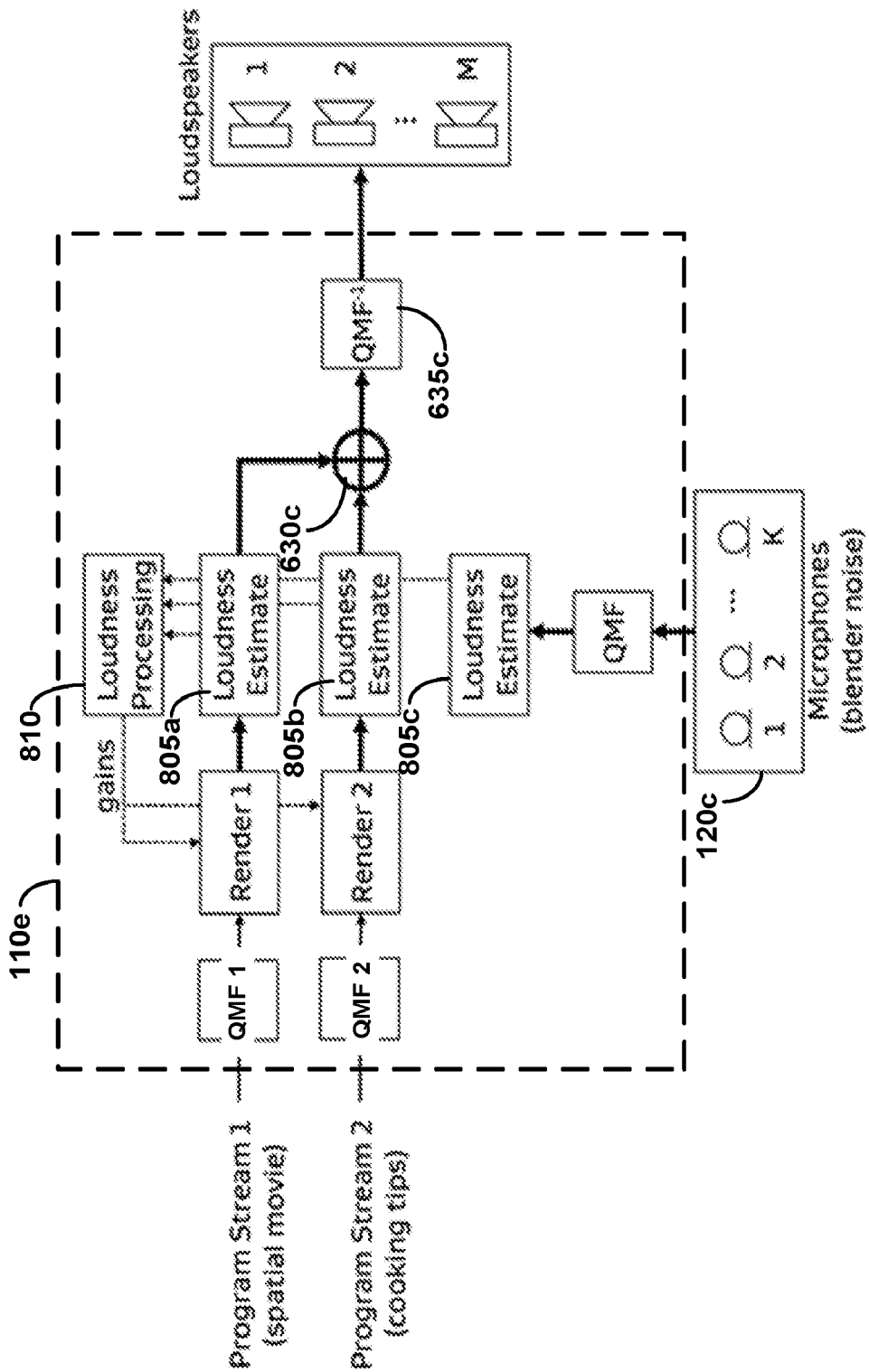
FIG. 8 shows an implementation of a multi-stream rendering system having audio stream loudness estimators.

FIG. 8 shows an implementation of a multi-stream rendering system having audio stream loudness estimators. According to this example, the multi-stream rendering system of FIG. 8 is also configured for implementing loudness processing, e.g., as described in Equations 12a-21b, and compensation gain application within each single-stream renderer. In this example, a quadrature mirror filterbank (QMF) is applied to each of program streams 1 and 2 before each program stream is received by a corresponding one of the rendering modules 1 and 2. In alternative examples, a quadrature mirror filterbank (QMF) may be applied to each of program streams 1 through N before each program stream is received by a corresponding one of the rendering modules 1 through N. According to this example, the rendering modules 1 and 2 operate in the frequency domain. In this implementation, loudness estimation module 805a calculates a loudness estimate for program stream 1, e.g., as described above with reference to Equations 12a-17b. Similarly, in this example the loudness estimation module 805b calculates a loudness estimate for program stream 2.

In this implementation, time-domain microphone signals from the microphone system 120c are also provided to a quadrature mirror filterbank, so that the loudness estimation module 805c receives microphone signals in the frequency domain. In this implementation, loudness estimation module 805c calculates a loudness estimate for the microphone signals, e.g., as described above with reference to Equations 12b-17a. In this example, the loudness processing module 810 is configured for implementing loudness processing, e.g., as described in Equations 18-21b, and compensation gain application for each single-stream rendering module. In this implementation, the loudness processing module 810 is configured for altering audio signals of program stream 1 and audio signals of program stream 2 in order to preserve their perceived loudness in the presence of one or more interfering signals. In some instances, the control system may determine that the microphone signals correspond to environmental noise above which a program stream should be raised. However, in some examples the control system may determine that the microphone signals correspond to a wakeword, a command, a child's cry, or other such audio that may need to be heard by a smart audio device and/or one or more listeners. In some such implementations, the loudness processing module 810 may be configured for altering the microphone signals in order to preserve their perceived loudness in the presence of interfering audio signals of program stream 1 and/or audio signals of program stream 2. Here, the loudness processing module 810 is configured to provide appropriate gains to the rendering modules 1 and 2.

After the mixer 630c mixes the outputs of the rendering modules 1 through N, an inverse filterbank 635c converts the mix to the time domain and provides mixed speaker feed signals in the time domain to the loudspeakers 1 through M. In this example, the quadrature mirror filterbanks, the rendering modules 1 through N, the mixer 630c and the inverse filterbank 635c are components of the control system 110e.

Figure 9A:
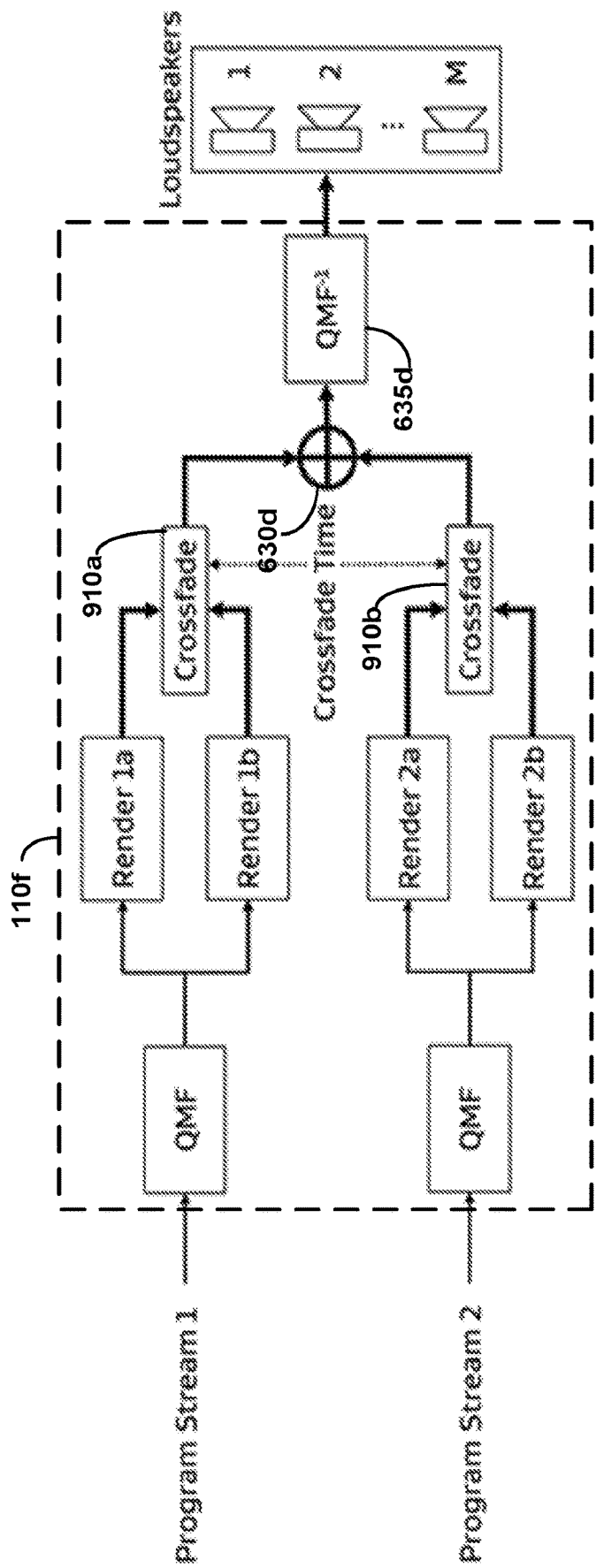
FIG. 9A shows an example of a multi-stream rendering system configured for crossfading of multiple rendered streams.

FIG. 9A shows an example of a multi-stream rendering system configured for crossfading of multiple rendered streams. In some such embodiments, crossfading of multiple rendered streams is used to provide a smooth experience when the rendering configurations are changed dynamically. One example is the aforementioned use case of simultaneous playback of a spatial program stream, such as music, with the response of a smart voice assistant to some inquiry by the listener, as described above with reference to FIGS. 4A and 4B. In this case, it is useful to instantiate extra single-stream renderers with the alternate spatial rendering configurations and simultaneously crossfade between them, as shown in FIG. 9A.

In this example, a QMF is applied to program stream 1 before the program stream is received by rendering modules 1a and 1b. Similarly, a QMF is applied to program stream 2 before the program stream is received by rendering modules 2a and 2b. In some instances, the output of rendering module 1a may correspond with a desired reproduction of the program stream 1 prior to the detection of a wakeword, whereas the output of rendering module 1b may correspond with a desired reproduction of the program stream 1 after the detection of the wakeword. Similarly, the output of rendering module 2a may correspond with a desired reproduction of the program stream 2 prior to the detection of a wakeword, whereas the output of rendering module 2b may correspond with a desired reproduction of the program stream 2 after the detection of the wakeword. In this implementation, the output of rendering modules 1a and 1b is provided to crossfade module 910a and the output of rendering modules 2a and 2b is provided to crossfade module 910b. The crossfade time may, for example, be in the range of hundreds of milliseconds to several seconds.

After the mixer 630d mixes the outputs of the crossfade modules 910a and 910b, an inverse filterbank 635d converts the mix to the time domain and provides mixed speaker feed signals in the time domain to the loudspeakers 1 through M. In this example, the quadrature mirror filterbanks, the rendering modules, the crossfade modules, the mixer 630d and the inverse filterbank 635d are components of the control system 110f.

In some embodiments it may be possible to precompute the rendering configurations used in each of the single stream renderers 1a, 1b, 2a, and 2b. This is especially convenient and efficient for use cases like the smart voice assistant, as the spatial configurations are often known a priori and have no dependency on other dynamic aspects of the system. In other embodiments it may not be possible or desirable to precompute the rendering configurations, in which case the complete configurations for each single-stream renderer must be calculated dynamically while the system is running.

Aspects of some embodiments include the following:

1. An audio rendering system which plays simultaneously a plurality of audio program streams over a plurality of arbitrarily placed loudspeakers, wherein at least one of said program streams is a spatial mix and the rendering of said spatial mix is dynamically modified in response to the simultaneous playback of one or more additional program streams.

2. The system of claim 1 wherein the rendering of any of the plurality of audio program streams may be dynamically modified as a function of a combination of any one or more of the remaining plurality of audio program streams.

3. The system of claim 1 or 2 wherein said modifications include one or more of Modifying the relative activation of the plurality of loudspeakers as a function of the relative activation of loudspeakers associated with the rendering of at least one of the one or more additional program streams;

Warping the intended spatial balance of the spatial mix as a function of the spatial properties of the rendering of at least one of the one or more additional program streams; or Modifying the loudness or audibility of the spatial mix as a function of the loudness or audibility of at least one of the one or more additional program streams.

4. The system of claim 1 or 2 which further involves dynamically modifying the rendering of as a function of one or more microphone inputs.

5. The system of claim 4 wherein information derived from the microphone inputs used to modify the rendering includes one or more of Detection of the utterance of a particular phrase by a user of the system;

An estimate of the location of one or more users of the system;

An estimate of the loudness of any of combination of the N programs streams at a particular location in the listening space; or An estimate of the loudness of other environmental sounds, e.g., background noise, in the listening environment.

Other examples of embodiments of the inventive system and method for managing playback of multiple streams of audio over multiple speakers (e.g., speakers of a set of orchestrated smart audio devices) include the following:

1. An audio system (e.g., an audio rendering system) which plays simultaneously a plurality of audio program streams over a plurality of arbitrarily placed loudspeakers (e.g., speakers of a set of orchestrated smart audio devices), wherein at least one of said program streams is a spatial mix and the rendering of said spatial mix is dynamically modified in response to (or in connection with) the simultaneous playback of one or more additional program streams.

2. The system of claim 1, wherein said modifications to the spatial mix include one or more of:

Warping the rendering of the spatial mix away from the rendering location of the one or more additional streams, or Modifying the loudness of the spatial mix in response to the loudness of the one or more additional streams.

3. The system of claim 1, which further involves dynamically modifying the rendering of said spatial mix as a function of one or more microphone inputs (i.e., signals captured by one or more microphones of one or more smart audio devices, e.g., of a set of orchestrated smart audio devices).

4. The system of claim 3, where at least one of the one or more microphone inputs contains (is indicative of) human voice. Optionally, the rendering is dynamically modified in response to a determined position of the source (a human being) of the voice.

5. The system of claim 3, where at least one of the one or more microphone inputs contains environmental noise.

6. The system of claim 3, wherein an estimate of the loudness of the spatial stream or the one or more additional streams is derived from at least one of the one or more microphone inputs.

Figure 9B:
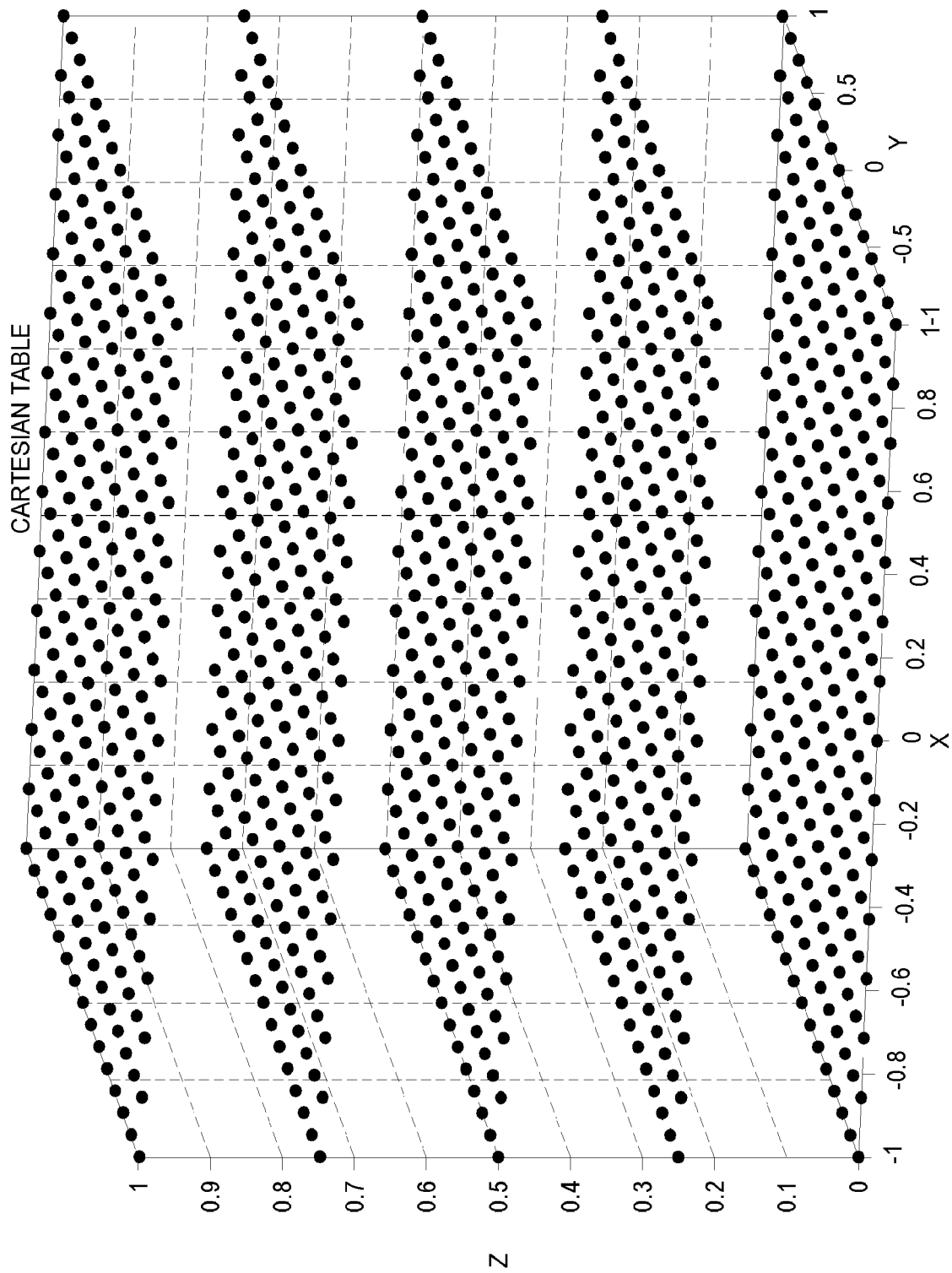
FIG. 9B is a graph of points indicative of speaker activations, in an example embodiment.

One of the practical considerations in implementing dynamic cost flexible rendering (in accordance with some embodiments) is complexity. In some cases it may not be feasible to solve the unique cost functions for each frequency band for each audio object in real-time, given that object positions (the positions, which may be indicated by metadata, of each audio object to be rendered) may change many times per second. An alternative approach to reduce complexity at the expense of memory is to use a look-up table that samples the three dimensional space of all possible object positions. The sampling need not be the same in all dimensions. FIG. 9B is a graph of points indicative of speaker activations, in an example embodiment. In this example, the x and y dimensions are sampled with 15 points and the z dimension is sampled with 5 points. Other implementations may include more samples or fewer samples. According to this example, each point represents the M speaker activations for the CMAP or FV solution.

Figure 10:
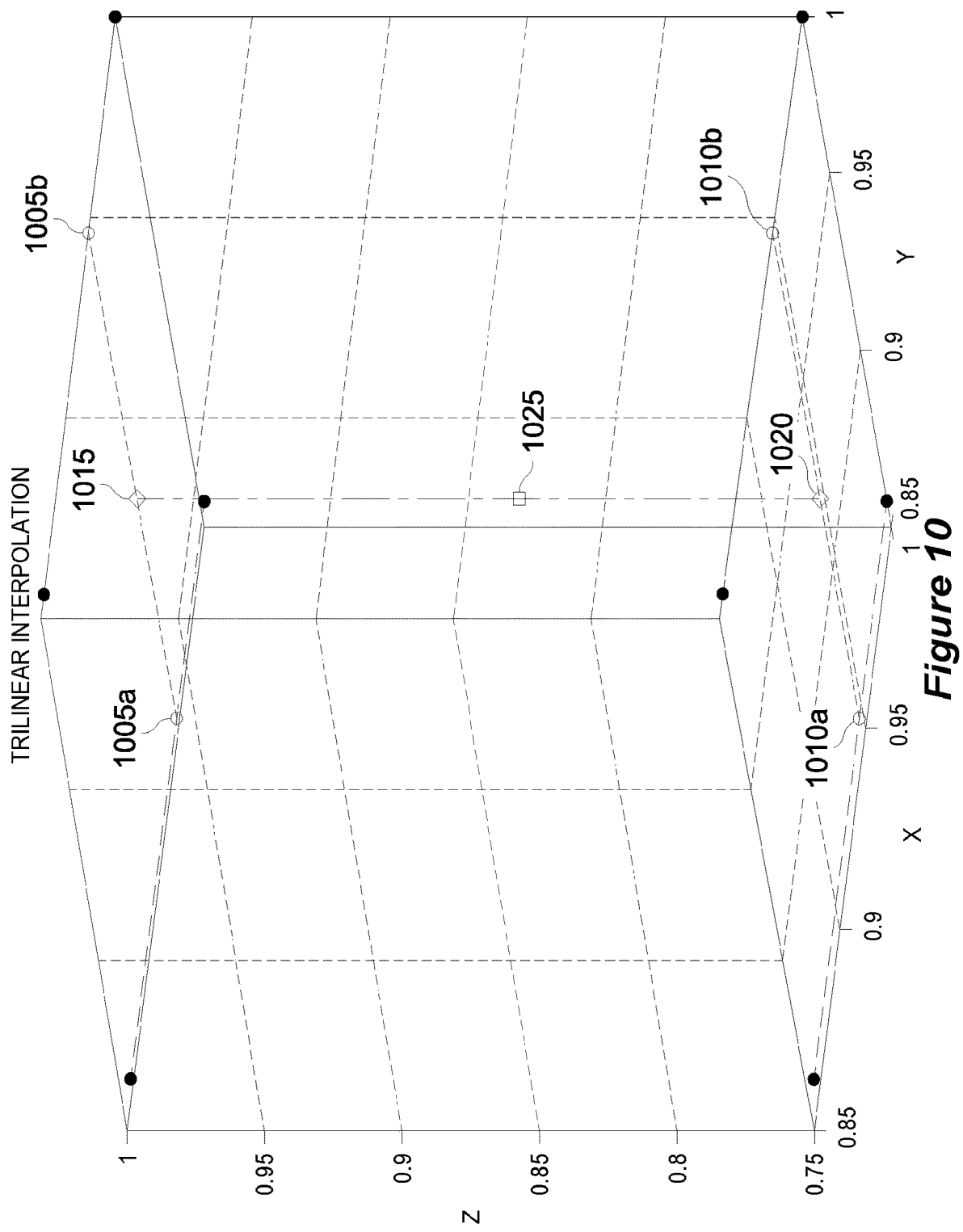
FIG. 10 is a graph of tri-linear interpolation between points indicative of speaker activations according to one example.

At runtime, to determine the actual activations for each speaker, tri-linear interpolation between the speaker activations of the nearest 8 points may be used in some examples. FIG. 10 is a graph of tri-linear interpolation between points indicative of speaker activations according to one example. In this example, the process of successive linear interpolation includes interpolation of each pair of points in the top plane to determine first and second interpolated points 1005a and 1005b, interpolation of each pair of points in the bottom plane to determine third and fourth interpolated points 1010a and 1010b, interpolation of the first and second interpolated points 1005a and 1005b to determine a fifth interpolated point 1015 in the top plane, interpolation of the third and fourth interpolated points 1010a and 1010b to determine a sixth interpolated point 1020 in the bottom plane, and interpolation of the fifth and sixth interpolated points 1015 and 1020 to determine a seventh interpolated point 1025 between the top and bottom planes. Although tri-linear interpolation is an effective interpolation method, one of skill in the art will appreciate that tri-linear interpolation is just one possible interpolation method that may be used in implementing aspects of the present disclosure, and that other examples may include other interpolation methods.

In the first example above, where a repelling force is being used to create acoustic space for a voice assistant for example, another important concept is the transition from the rendering scene without the repelling force to the scene with the repelling force. To create a smooth transition and give the impression of the soundfield being dynamically warped, both the previous set of speaker activations without the repelling force and a new set of speaker activations with the repelling force are calculated and interpolated between over a period of time.

An example of audio rendering implemented in accordance with an embodiment is: An audio rendering method, comprising:
  rendering a set of one or more audio signals, each with an associated desired perceived spatial position, over a set of two or more loudspeakers, where relative activation of the set of loudspeakers is a function of a model of perceived spatial position of said audio signals played back over the loudspeakers, proximity of the desired perceived spatial position of the audio objects to the positions of the loudspeakers, and one or more additional dynamically configurable functions dependent on at least one or more properties of the set of audio signals, one or more properties of the set of loudspeakers, or one or more external inputs.

Figure 11:
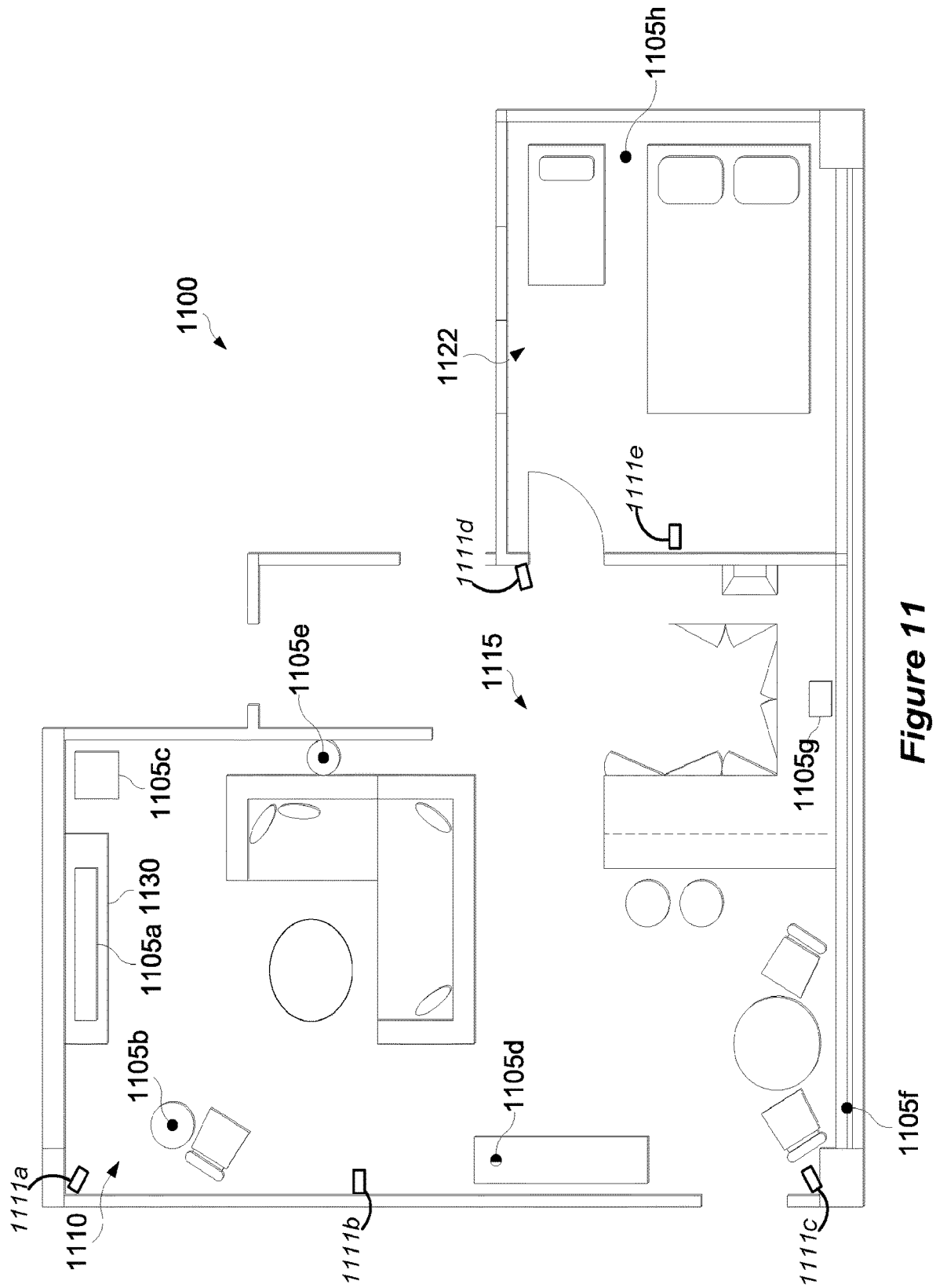
FIG. 11 depicts a floor plan of a listening environment, which is a living space in this example.

With reference to FIG. 11, we describe an example embodiment. As with other figures provided herein, the types and numbers of elements shown in FIG. 11 are merely provided by way of example. Other implementations may include more, fewer and/or different types and numbers of elements. FIG. 11 depicts a floor plan of a listening environment, which is a living space in this example. According to this example, the environment 1100 includes a living room 1110 at the upper left, a kitchen 1115 at the lower center, and a bedroom 1122 at the lower right. Boxes and circles distributed across the living space represent a set of loudspeakers 1105a-1105h, at least some of which may be smart speakers in some implementations, placed in locations convenient to the space, but not adhering to any standard prescribed layout (arbitrarily placed). In some examples, the loudspeakers 1105a-1105h may be coordinated to implement one or more disclosed embodiments. In this example, the environment 1100 includes cameras 1111a-1111e, which are distributed throughout the environment. In some implementations, one or more smart audio devices in the environment 1100 also may include one or more cameras. The one or more smart audio devices may be single purpose audio devices or virtual assistants. In some such examples, one or more cameras of the optional sensor system 130 may reside in or on the television 1130, in a mobile phone or in a smart speaker, such as one or more of the loudspeakers 1105b, 1105d, 1105e or 1105h. Although cameras 1111a-1111e are not shown in every depiction of the environment 1100 presented in this disclosure, each of the environments 1100 may nonetheless include one or more cameras in some implementations.

FIGS. 12A, 12B, 12C and 12D show examples of flexibly rendering spatial audio in a reference spatial mode for a plurality of different listening positions and orientations in the living space shown in FIG. 11. FIGS. 12A-12D depict this capability at four example listening positions. In each example, the arrow 1205 that is pointing towards the person 1220a represents the location of the front sound stage (where the person 1220a is facing). In each example, the arrow 1210a represents the left surround field and the arrow 1210b represents the right surround field.

Figure 12A:
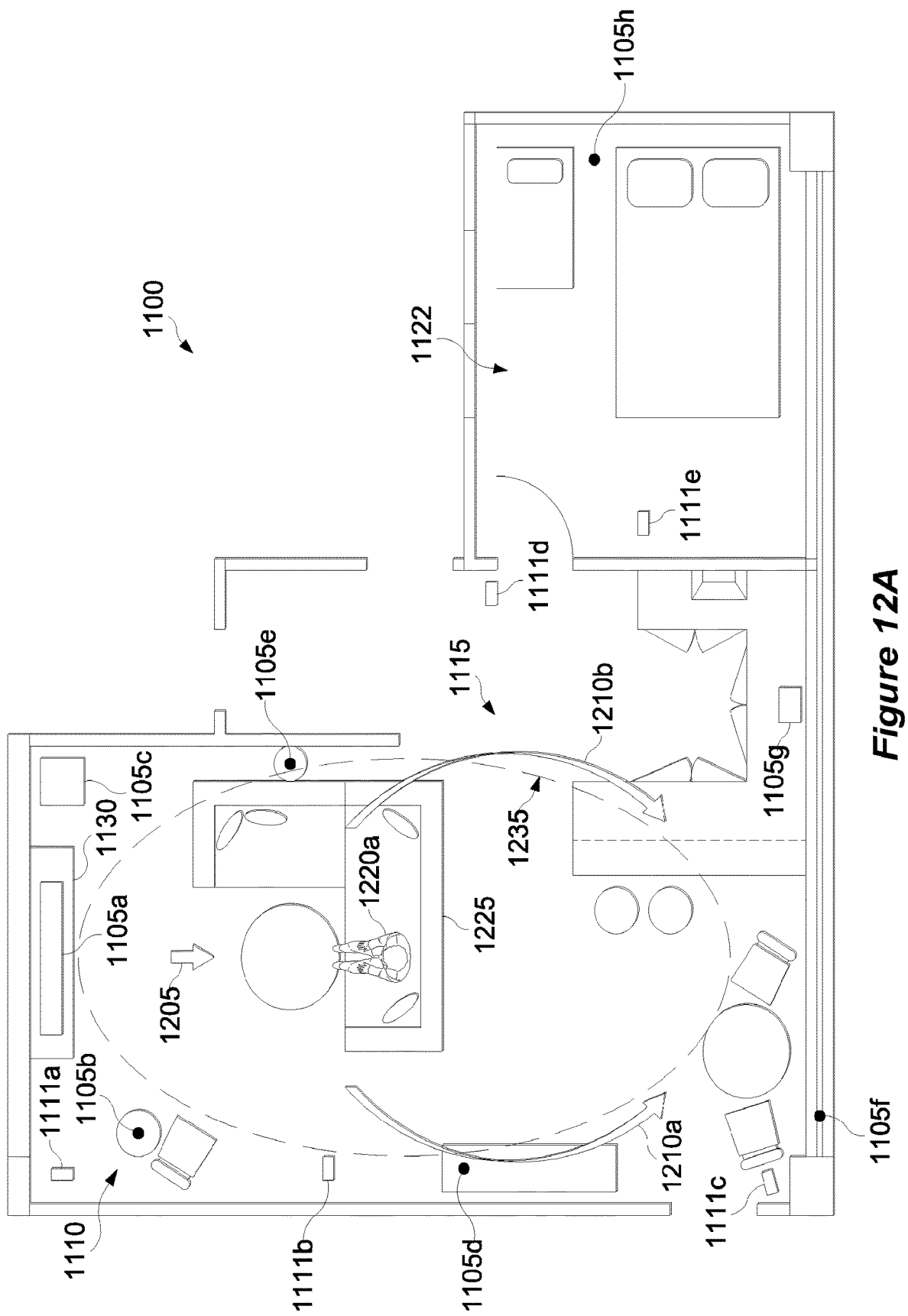
FIGS. 12A, 12B, 12C and 12D show examples of flexibly rendering spatial audio in a reference spatial mode for a plurality of different listening positions and orientations in the living space shown in FIG. 11.

In FIG. 12A, a reference spatial mode has been determined, and spatial audio has been flexibly rendered, for a person 1220a sitting on the living room couch 1225. According to some implementations, a control system (such as the control system 110 of FIG. 1A may be configured to determine the assumed listening position and/or the assumed orientation of the reference spatial mode according to reference spatial mode data received via an interface system, such as the interface system 105 of FIG. 1A. Some examples are described below. In some such examples, the reference spatial mode data may include microphone data from a microphone system (such as the microphone system 120 of FIG. 1A).

In some such examples, the reference spatial mode data may include microphone data corresponding to a wakeword and a voice command, such as "[wakeword], make the television the front sound stage." Alternatively, or additionally, microphone data may be used to triangulate a user's position according to the sound of the user's voice, e.g., via direction of arrival (DOA) data. For example, three or more of loudspeakers 1105a-1105e may use microphone data to triangulate the position of the person 1220a, who is sitting on the living room couch 1225, according to the sound of the person 1220a's voice, via DOA data. The person 1220a's orientation may be assumed according to the person 1220a's position: if the person 1220a is at the position shown in FIG. 12A, the person 1220a may be assumed to be facing the television 1130.

Alternatively, or additionally, the person 1220a's position and orientation may be determined according to image data from a camera system (such as the sensor system 130 of FIG. 1A).

In some examples, the person 1220a's position and orientation may be determined according to user input obtained via a graphical user interface (GUI). According to some such examples, a control system may be configured for controlling a display device (e.g., a display device of a cellular telephone) to present a GUI that allows the person 1220*a* to input the person 1220*a*'s position and orientation.

Figure 13A:
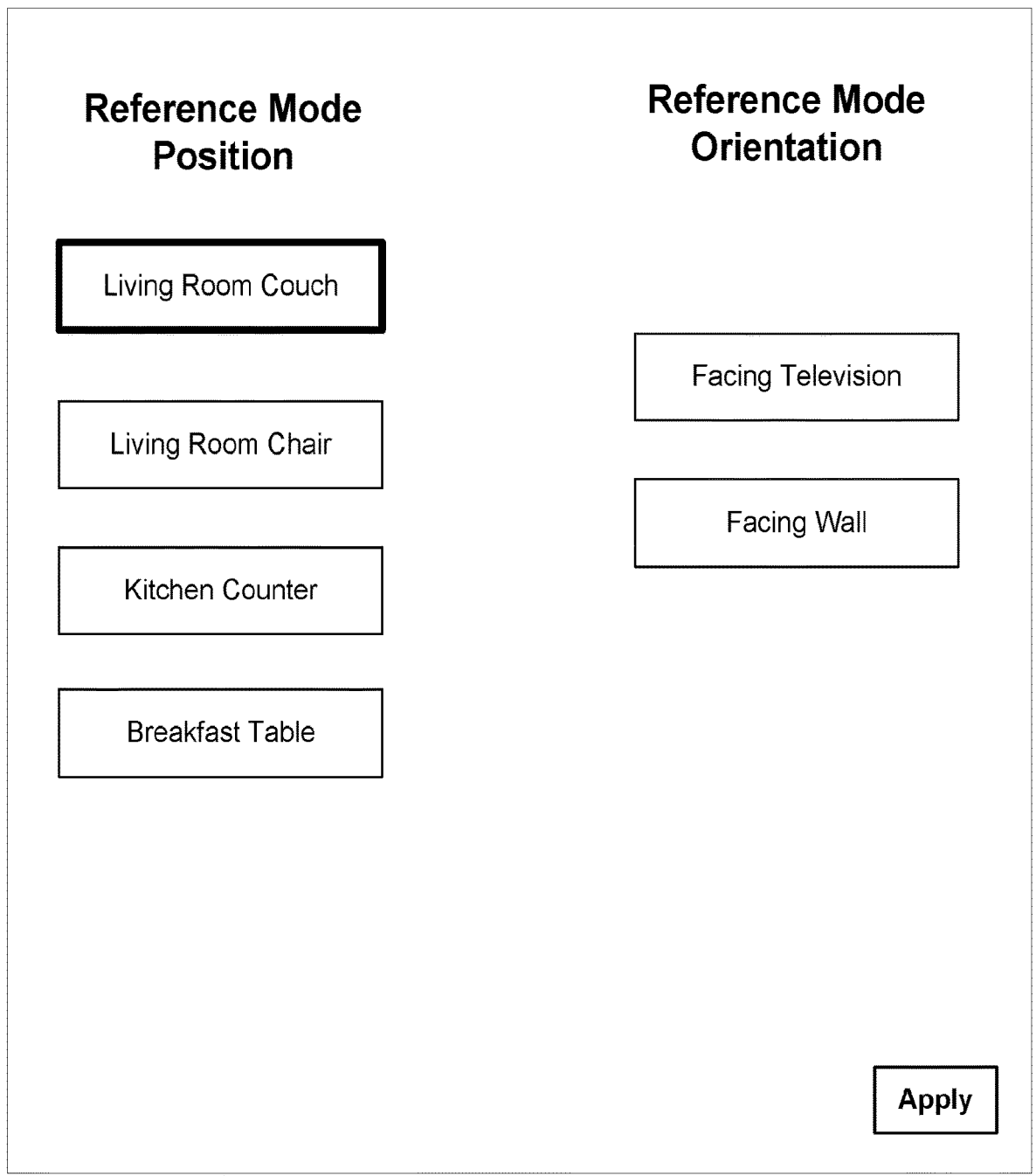
FIG. 13A shows an example of a graphical user interface (GUI) for receiving user input regarding a listener's position and orientation.

FIG. 13A shows an example of a GUI for receiving user input regarding a listener's position and orientation. According to this example, the user has previously identified several possible listening positions and corresponding orientations. Loudspeaker locations corresponding to each position and corresponding orientation have already been input and stored during a set-up process. Some examples are described below. For example, a listening environment layout GUI may have been provided and the user may have been prompted to touch locations corresponding to possible listening positions and speaker positions, and to name the possible listening positions. In this example, at the time depicted in FIG. 13A, the user has already provided user input to the GUI 1300 regarding the user's position by touching the virtual button "living room couch." Because there are two possible front-facing positions, given the L-shaped couch 1225, the user is being prompted to indicate which direction the user is facing.

Figure 12B:
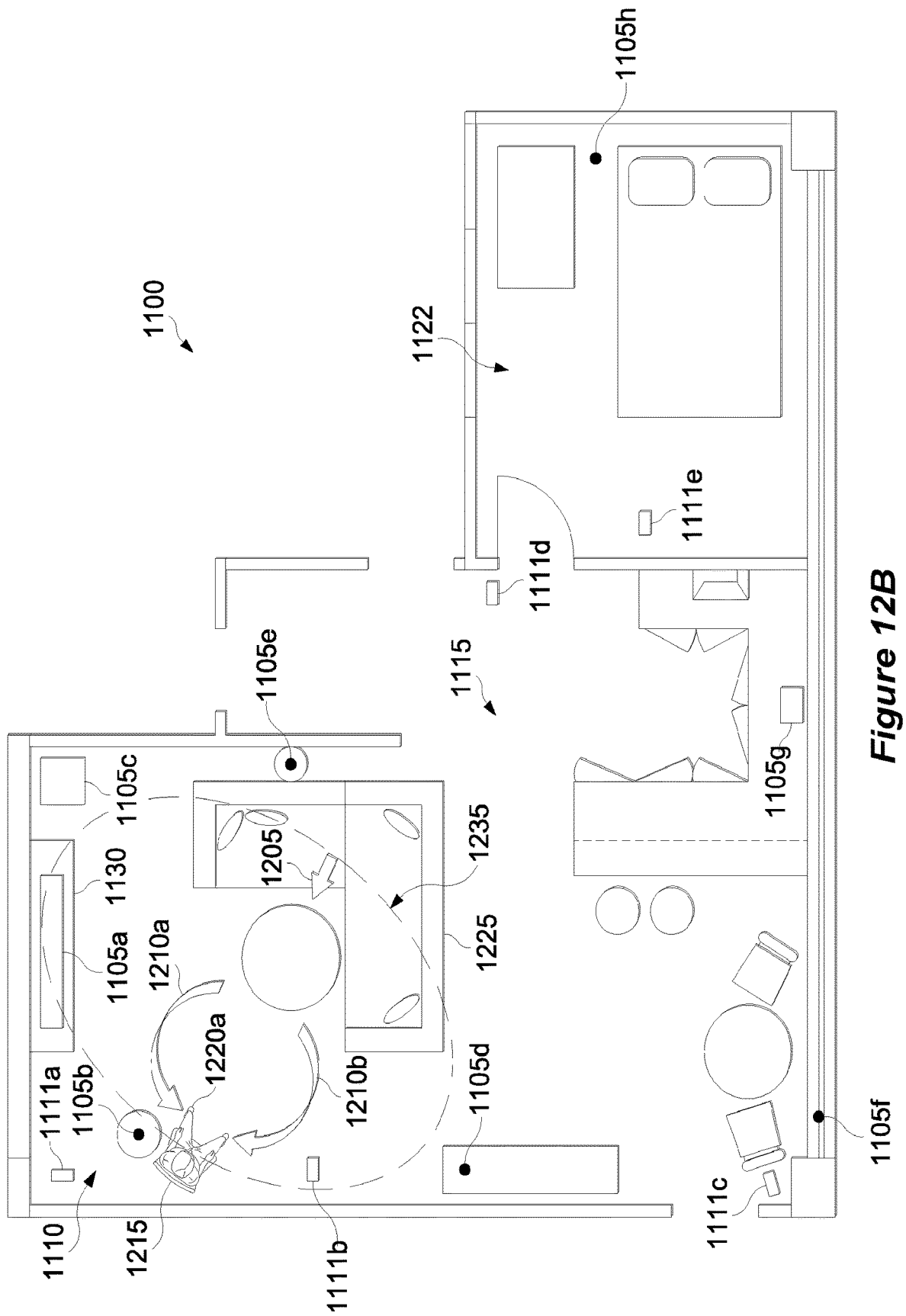
Figure 12C:
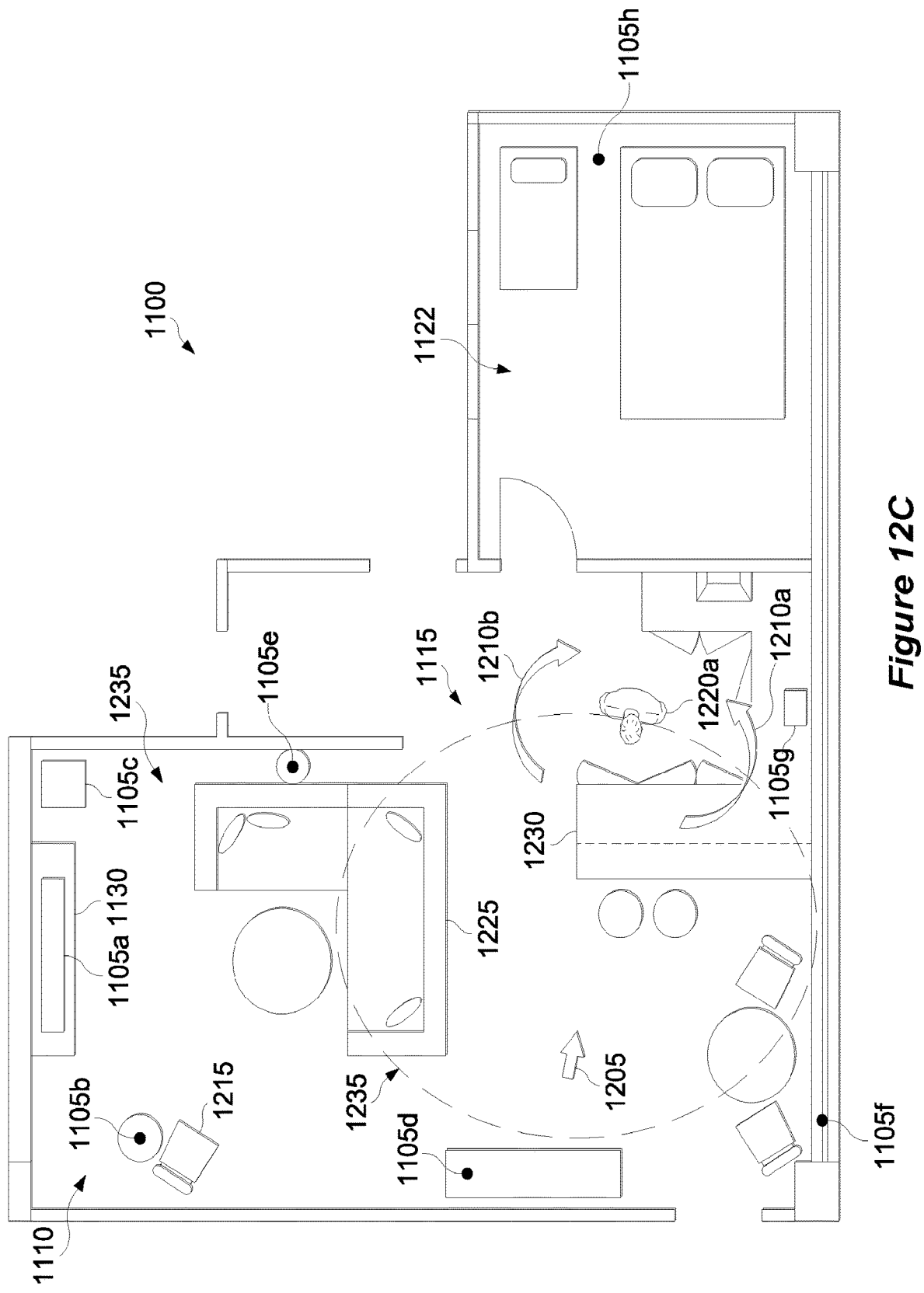
Figure 12D:
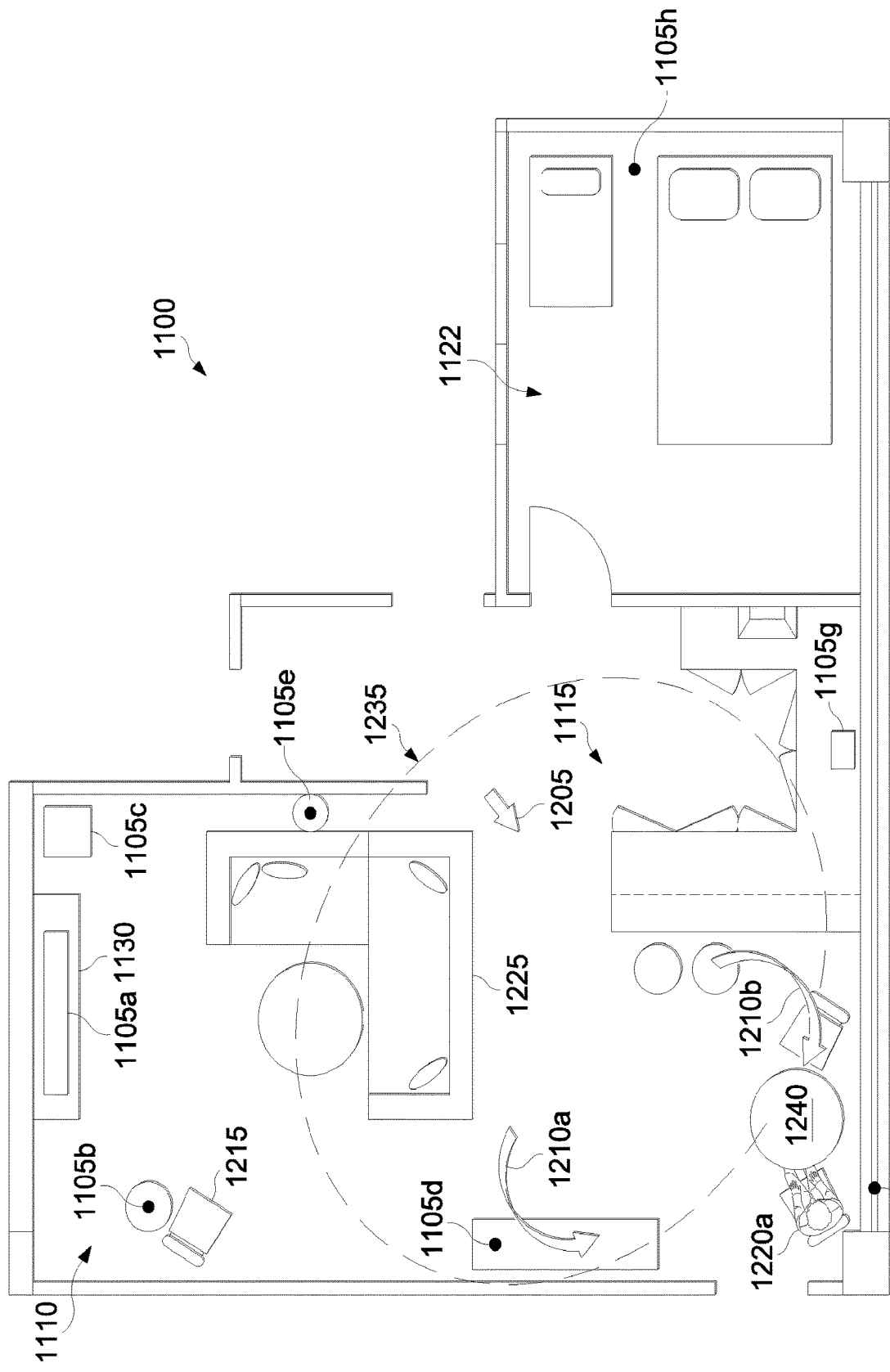

In FIG. 12B, a reference spatial mode has been determined, and spatial audio has been flexibly rendered, for the person 1220*a* sitting on the living room reading chair 1215. In FIG. 12C, a reference spatial mode has been determined, and spatial audio has been flexibly rendered, for the person 1220*a* standing next to the kitchen counter 1230. In FIG. 12D, a reference spatial mode has been determined, and spatial audio has been flexibly rendered, for the person 1220*a* sitting at the breakfast table 1240. One may observe that the front sound stage orientation, as indicated by the arrow 1205, does not necessarily correspond with any particular loudspeaker within the environment 1100. As the listener's location and orientation vary, so do the speakers' responsibilities for rendering the various components of the spatial mix.

Figure 12E:
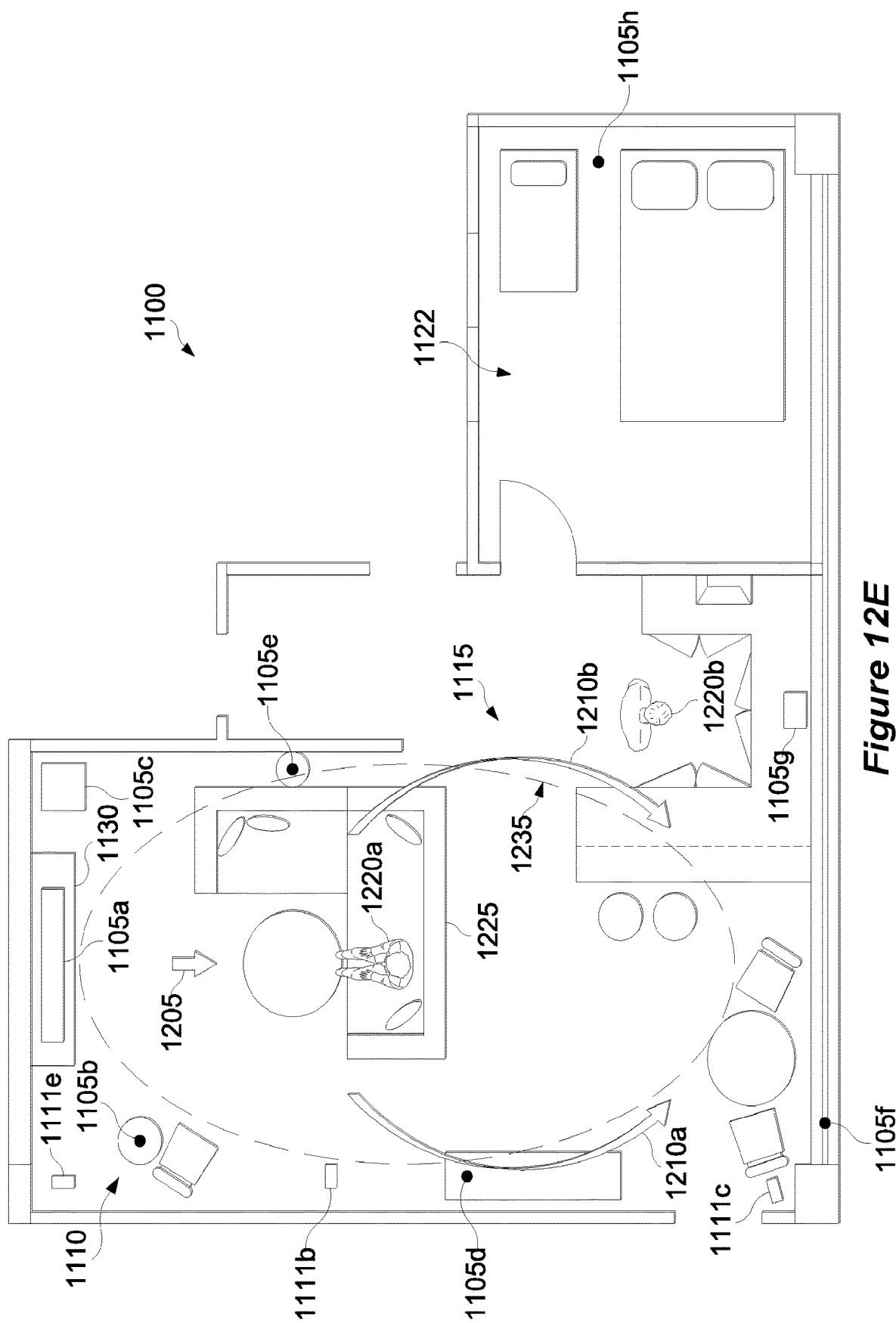
FIG. 12E shows an example of reference spatial mode rendering when two listeners are in different locations of a listening environment.

For the person 1220*a* in any of FIGS. 12A-12D, he or she hears the spatial mix as intended for each of the positions and orientations shown. However, the experience may be suboptimal for additional listeners in the space. FIG. 12E shows an example of reference spatial mode rendering when two listeners are in different locations of a listening environment. FIG. 12E depicts the reference spatial mode rendering for a person 1220*a* on the couch and a person 1220*b* standing in the kitchen. In this example, rendering may be optimal for the person 1220*a*, but the person 1220*b* will hear mostly signals from the surround field and little of the front sound stage given his/her location.

Figure 13B:
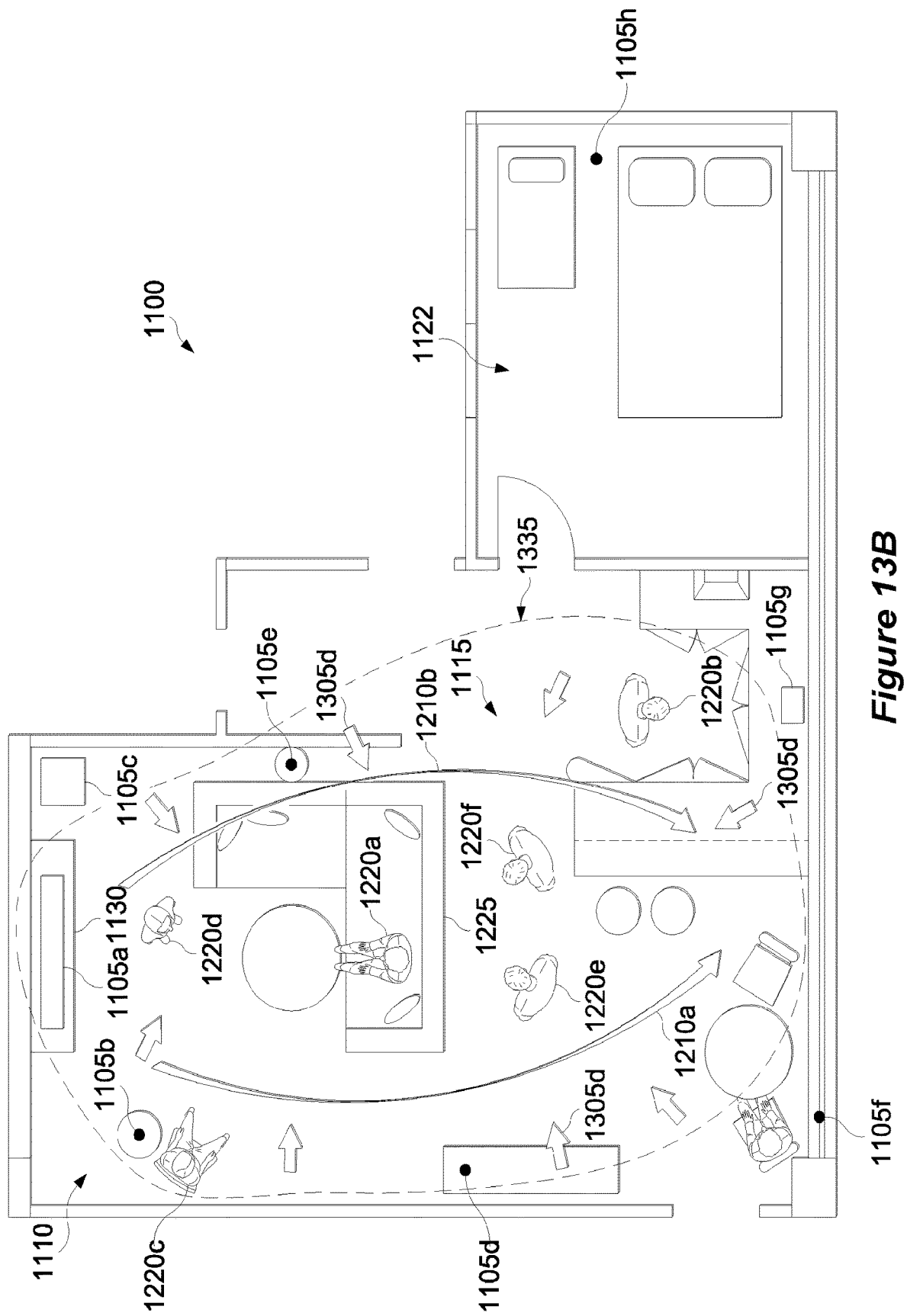
FIG. 13B depicts a distributed spatial rendering mode according to one example embodiment.

In this case and others where multiple people may be in the space moving around in an unpredictable manner (a party, for example) there exists a need for a rendering mode that is more appropriate for such a distributed audience. FIG. 13B depicts a distributed spatial rendering mode according to one example embodiment. In this example of a distributed spatial mode, the front sound stage is now rendered uniformly across the entire listening space instead of only from the location forward of the listener on the couch. This distribution of the front sound stage is represented by the multiple arrows 1305*d* circling the cloud 1335, all of the arrows 1305*d* having the same length, or approximately the same length. The intended meaning of the arrows 1305*d* is that the plurality of listeners depicted (persons 1220*a*-1220*l*) are all able to hear this part of the mix equally well, regardless of their location. However, if this uniform distribution were applied to all components of the mix then all spatial aspects of the mix would be lost; persons 1220*a*-1220*f* would essentially hear monophonic audio. In order to maintain some spaciousness, the left and right surround components of the mix, represented by the arrows 1210*a* and 1210*b*, respectively, are still rendered in a spatial manner (In many instances there may be left and right side surrounds, left and right back surrounds, overheads, and dynamic audio objects with spatial positions within this space. The arrows 1210*a* and 1210*b* are meant to represent the left and right portions of all of these possibilities.) And in order to maximize the perceived spaciousness, the area over which these components are spatialized is expanded to cover the entire listening space more completely, including the space formerly occupied by the front sound stage alone. This expanded area over which the surround components are rendered may be appreciated by comparing the relatively elongated arrows 1210*a* and 1210*b* shown in FIG. 13B with the relatively shorter arrows 1210*a* and 1210*b* shown in FIG. 12A. Moreover, the arrows 1210*a* and 1210*b* shown in FIG. 12A, which represent the surround components in the reference spatial mode, extend approximately from the sides of the person 1220*a* to the back sides of the listening environment and do not extend into the front stage area of the listening environment.

In this example, care is taken in implementing the uniform distribution of the front sound stage and expanded spatialization of the surround components such that the perceived loudness of these components is largely maintained in comparison to the rendering for the reference spatial mode. The goal is to shift the spatial impression of these components to optimize for multiple people while still maintaining the relative level of each component in the mix. It would be undesirable, for example, if the front sound stage became twice as loud with respect to the surround components as a result of its uniform distribution.

To switch between the various reference rendering modes and the distributed rendering mode of the example embodiment, in some examples a user may interact with a voice assistant associated with the system of orchestrated speakers. For example, to play audio in the reference spatial mode, a user may utter the wake-word for the voice assistant (e.g. "Listen Dolby") followed by the command, "Play [insert name of content] for me.", or "Play [insert name of content] in personal mode." Then, based on recordings from the various microphones associated with the system, the system may automatically determine the location and orientation of the user, or the closest of one of several pre-determined zones to the user, and start playing audio in the reference mode corresponding to this determined location. To play audio in a distributed spatial mode, a user may utter a different command, for example, "Play [insert name of content] in distributed mode."

Alternatively, or in addition, the system may be configured to automatically switch between the reference mode and distributed mode based on other inputs. For example, the system may have the means to automatically determine how many listeners are in the space and their locations. This may be achieved, for example, by monitoring voice activity in the space from associated microphones and/or through the use of other associated sensors, such as one or more cameras. In this case, the system may also be configured with a mechanism to vary the rendering continuously between the reference spatial mode, such as depicted in FIG. 12E, and a fully distributed spatial mode, such as depicted in FIG. 13B. The point at which the rendering is set on this continuum may be computed as a function, for example, of the number of people reported in the space.

Figure 14A:
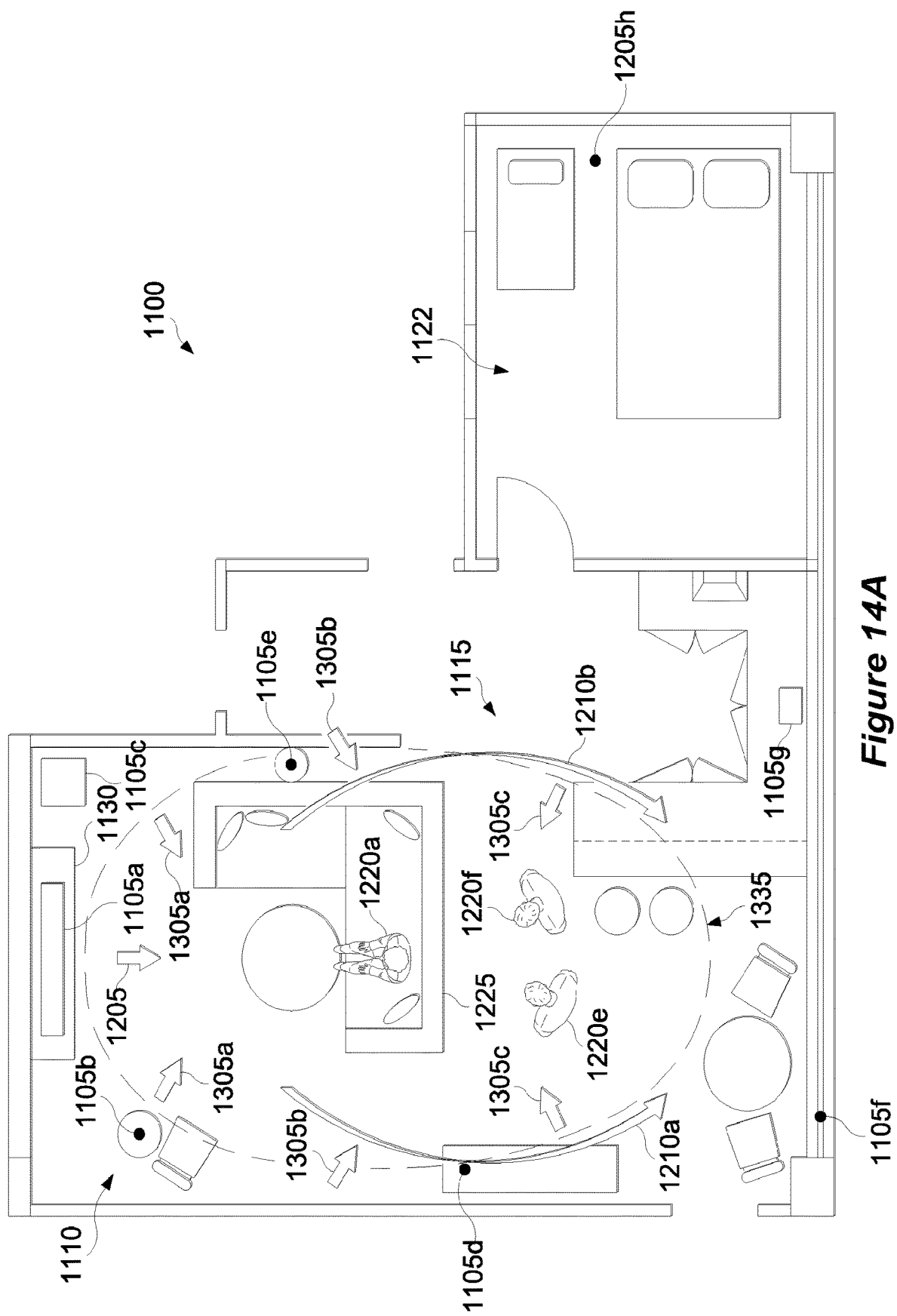
FIG. 14A depicts a partially distributed spatial rendering mode according to one example.
Figure 14B:
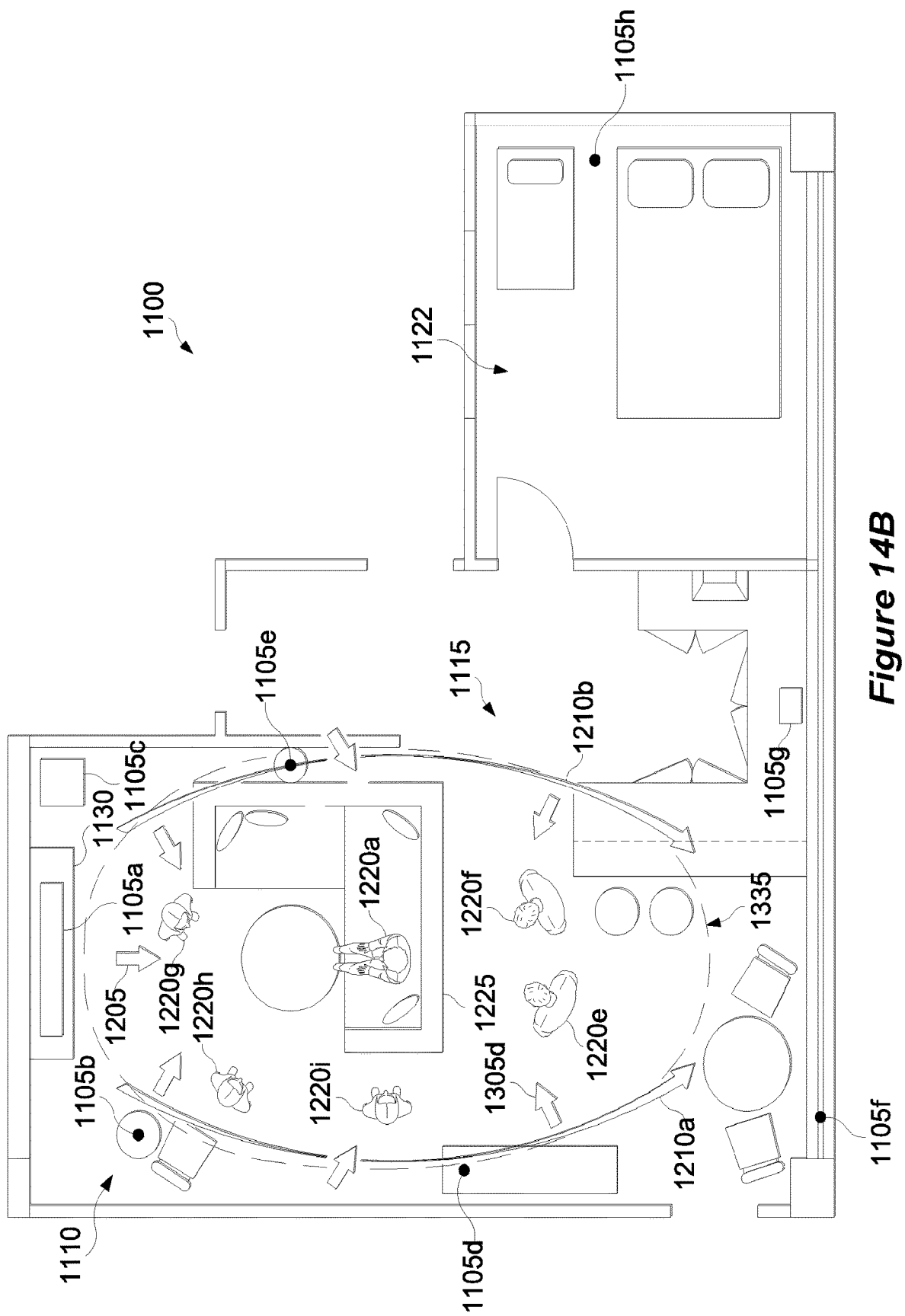
FIG. 14B depicts a fully distributed spatial rendering mode according to one example.

FIGS. 12A, 14A and 14B illustrate this behavior. In FIG. 12A, the system detects only a single listener on the couch (the person 1220*a*), facing the television, and so the rendering mode is set to the reference spatial mode for this listener location and orientation. FIG. 14A depicts a partially distributed spatial rendering mode according to one example. In FIG. 14A, two additional people (persons 1220*e* and 1220*f*) are detected behind the person 1220*a*, and the rendering mode is set at a point between the reference spatial mode and a fully distributed spatial mode. This is depicted with some of the front sound stage (the arrows 1305*a*, 1305*b* and 1305*c*) being pulled back toward the additional listeners (persons 1220*e* and 1220*f*), but still with more of an emphasis towards the location of the front sound stage of the reference spatial mode. This emphasis is indicated in FIG. 14A by the arrow 1205 and the relatively greater length of the arrows 1305*a*, as comparted to the lengths of the arrows 1305*b* and 1305*c*. Also, the surround field is only partially expanded towards the location of the front sound stage of the reference spatial mode, as indicated by the lengths and positions of the arrows 1210*a* and 1210*b*.

FIG. 14B depicts a fully distributed spatial rendering mode according to one example. In some examples, the system may have detected numerous listeners (persons 1220*a*, 1220*e*, 1220*f*, 1220*g*, 1220*h* and 1220*i*) spanning the entire space, and the system may have automatically set the rendering mode to a fully distributed spatial mode. In other examples, the rendering mode may have been set according to user input. The fully distributed spatial mode is indicated in FIG. 14B by the uniform, or substantially uniform, lengths of the arrows 1305*d*, as well as the lengths and positions of the arrows 1210*a* and 1210*b*.

In the preceding examples, the part of the spatial mix rendered with more uniform distribution in the distributed rendering mode is specified as the front sound stage. In the context of many spatial mixes, this makes sense since traditional mixing practices typically place the most important parts of the mix, such as dialog for movies and lead vocals, drums, and bass for music, in the front sound stage. This is true for most 5.1 and 7.1 surround sound mixes as well as stereo content up-mixed to 5.1 or 7.1 using algorithms such as Dolby Pro-Logic or Dolby Surround, where the front sound stage is given by the left, right and center channels. This is also true for many object-based audio mixes, such as Dolby Atmos, wherein audio data may be specified as front sound stage according to spatial metadata indicating an (x,y) spatial position of y<0.5. However, with object-based audio, mixing engineers have the freedom to place audio anywhere in 3D space. With object-based music, in particular, mixing engineers are beginning to break from traditional mixing norms and place what would be considered important parts of the mix, such as lead vocals, in non-traditional locations, such as overhead. In such cases it becomes difficult to construct a simple rule for determining which components of the mix are appropriate for rendering in a more distributed spatial manner for the distributed rendering mode. Object-based audio already contains metadata associated with each of its constituent audio signals describing where in 3D space the signal should be rendered. To deal with the described problem, in some implementations additional metadata may be added allowing the content creator to flag particular signals as being appropriate for more distributed spatial rendering in the distributed rendering mode. During rendering, the system may use this metadata to select the components of the mix to which the more distributed rendering is applied. This gives the content creator control over the way that the distributed rendering mode sounds for a particular piece of content.

In some alternative implementations, a control system may be configured for implementing a content type classifier to identify one or more elements of the audio data to be rendered in a more spatially distributed manner. In some examples, the content type classifier may refer to content type metadata, (e.g., metadata that indicates that the audio data is dialogue, vocals, percussion, bass, etc.) in order to determine whether the audio data should be rendered in a more spatially distributed manner According to some such implementations, the content type metadata to be rendered in a more spatially distributed manner may be selectable by a user, e.g., according to user input via a GUI displayed on a display device.

The exact mechanism used to render the one or more elements of the spatial audio mix in a more spatially distributed manner than in the reference spatial mode may vary between different embodiments, and the present disclosure is meant to cover all such mechanisms. One example mechanism involves creating multiple copies of each such element with multiple associated rendering locations distributed more uniformly across the listening space. In some implementations, the rendering locations and/or the number of rendering locations for a distributed spatial mode may be user-selectable, whereas in other implementations the rendering locations and/or the number of rendering locations for a distributed spatial mode may be pre-set. In some such implementations, a user may select a number of rendering locations for a distributed spatial mode and the rendering locations may be pre-set, e.g., evenly spaced throughout a listening environment. The system then renders all of these copies at their set of distributed positions as opposed to the original single element at its original intended position. According to some implementations, the copies may be modified in level so that the perceived level associated with the combined rendering of all the copies is the same as, or substantially the same as (e.g., within a threshold number of decibels, such as 2 dB, 3 dB, 4 dB, 5 dB, 6 dB, etc.) the level of the original single element in the reference rendering mode.

A more elegant mechanism may be implemented in the context of either the CMAP or FV flexible rendering systems, or with a hybrid of both systems. In these systems, each element of a spatial mix is rendered at a particular position in space; associated with each element may be an assumed fixed location, for example the canonical location of a channel in a 5.1 or 7.1 surround sound mix, or a time-varying position as is the case with object-based audio such as Dolby Atmos.

Figure 15:
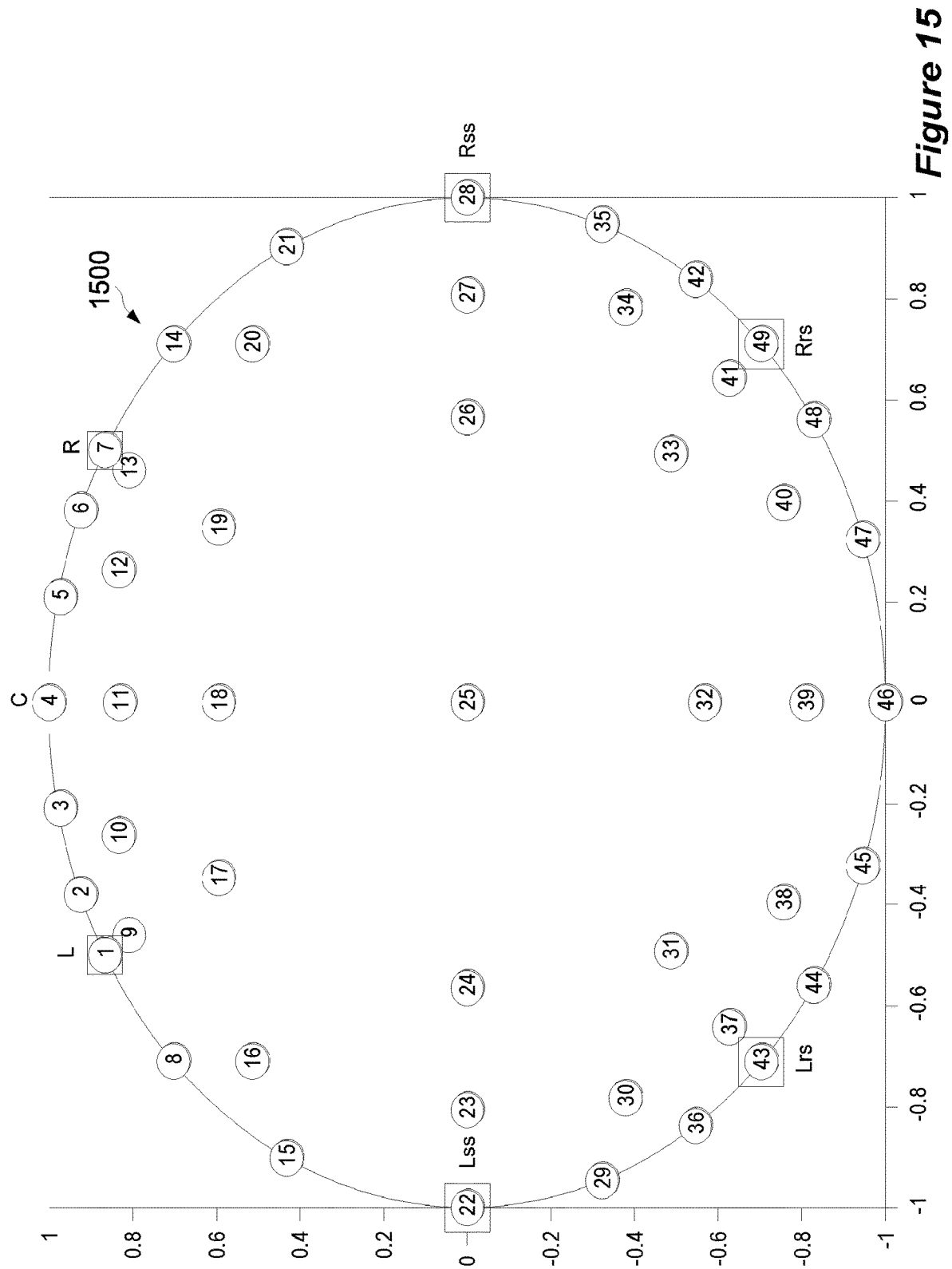
FIG. 15 depicts example rendering locations for Center of Mass Amplitude Panning (CMAP) and Flexible Virtualization (FV) rendering systems on a 2D plane.

FIG. 15 depicts example rendering locations for CMAP and FV rendering systems on a 2D plane. Each small numbered circle represents an example rendering location, and the rendering systems are capable of rendering an element of the spatial mix anywhere on or within the circle 1500. The positions on the circle 1500 labelled L, R, C, Lss, Rss, Lrs, and Rrs represent the fixed canonical rendering locations of the 7 full-range channels of a 7.1 surround mix in this example: Left (L), Right (R), Center (C), Left side surround (Lss), Right side surround (Rss), Left rear surround (Lrs), and Right rear surround (Rrs). In this context, rendering locations near L, R, and C are considered the front sound stage. For the reference rendering mode (also referred to herein as the "reference spatial mode"), the listener is assumed to be located at the center of the large circle facing towards the C rendering position. For any of FIGS. 12A-12D depicting reference rendering for various listening positions and orientations, one may conceptualize the superposition of the center of FIG. 15 on top of the listener, with FIG. 15 additionally rotated and scaled so that the C position aligns with the position of the front sound stage (the arrow 1205) and the circle 1500 of FIG. 15 encircles the cloud 1235. The resulting alignment then describes the relative proximity of any of the speakers from FIGS. 12A-12D to any of the rendering locations in FIG. 15. In some implementations it is this proximity that governs, to a large extent, the relative activation of speakers when rendering an element of the spatial mix at a particular location for both the CMAP and FV rendering systems.

When spatial audio is mixed in a studio, speakers are generally placed around the listening position at a uniform distance. In most instances, no speakers lie within the bounds of the resulting circle or hemisphere. When audio is placed "in the room" (for example, at the center of FIG. 15), rendering tends towards the firing of all speakers on the perimeter to achieve a "sound of nowhere." In the CMAP and FV rendering systems, a similar effect may be achieved by altering the proximity penalty term of the cost function governing speaker activation. In particular, for a rendering position on the perimeter of the circle 1500 of FIG. 15, the proximity penalty term fully penalizes the use of speakers distant from the desired rendering position. As such, only speakers near the intended rendering location are activated in a substantial manner. As the desired rendering position moves towards the center of the circle (radius zero), the proximity penalty term reduces to zero so that at the center, no preference is given to any speaker. The corresponding result for a rendering position at radius zero is completely uniform perceived distribution of audio across the listening space, which is also precisely the desired outcome for certain elements of the mix in the most distributed spatial rendering mode.

Given this behavior of the CMAP and FV systems at radius zero, a more spatially distributed rendering of any element of the spatial mix may be achieved by warping its intended spatial position towards the zero-radius point. This warping may be made continuous between the original intended position and zero-radius, thereby providing a natural continuous control between a reference spatial mode and various distributed spatial modes. FIGS. 16A, 16B, 16C and 16D show examples of a warping applied to all of the rendering points in FIG. 15 to achieve various distributed spatial rendering modes. FIG. 16D depicts an example of such a warping applied to all of the rendering points in FIG. 15 to achieve a fully distributed rendering mode. One can see that the L, R, and C points (the front sound stage) have been collapsed to zero-radius, thereby ensuring their rendering in a completely uniform manner. In addition, the Lss and Rss rendering points have been pulled along the perimeter of the circle towards the original front sound stage so that the spatialized surround field (Lss, Rss, Lbs, and Rbs) encircles the entire listening area. This warping is applied to the entire rendering space, and one sees that all of the rendering points from FIG. 15 have been warped to new locations in FIG. 16D commensurate with warping of the 7.1 canonical locations. The spatial mode referenced in FIG. 16D is one example of what may be referred to herein as a "most distributed spatial mode" or a "fully distributed spatial mode."

Figure 16A:
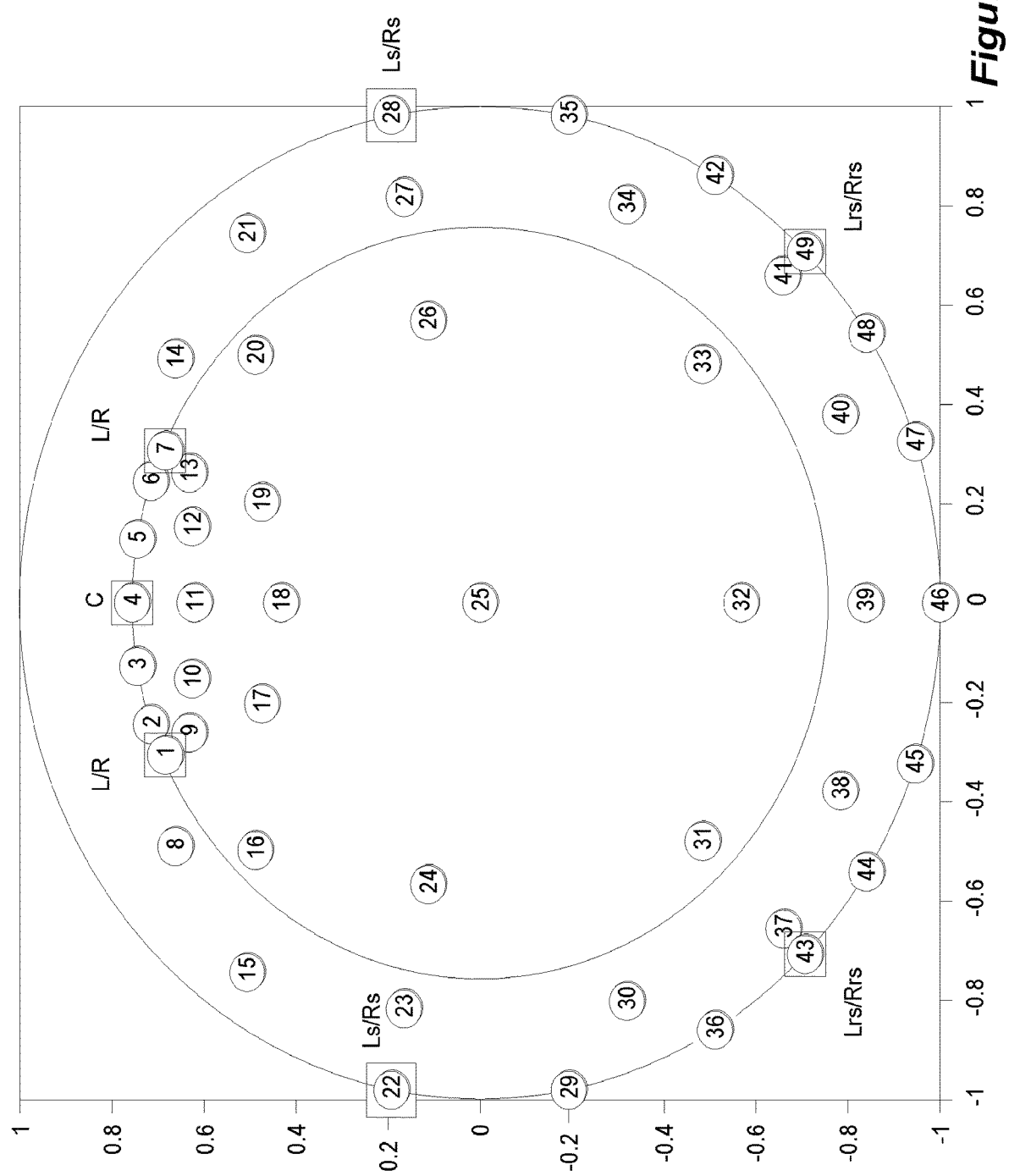
FIGS. 16A, 16B and 16C show various examples of intermediate distributed spatial modes between the distributed spatial mode represented in FIG. 15 and the distributed spatial mode represented in FIG. 16D.
Figure 16B:
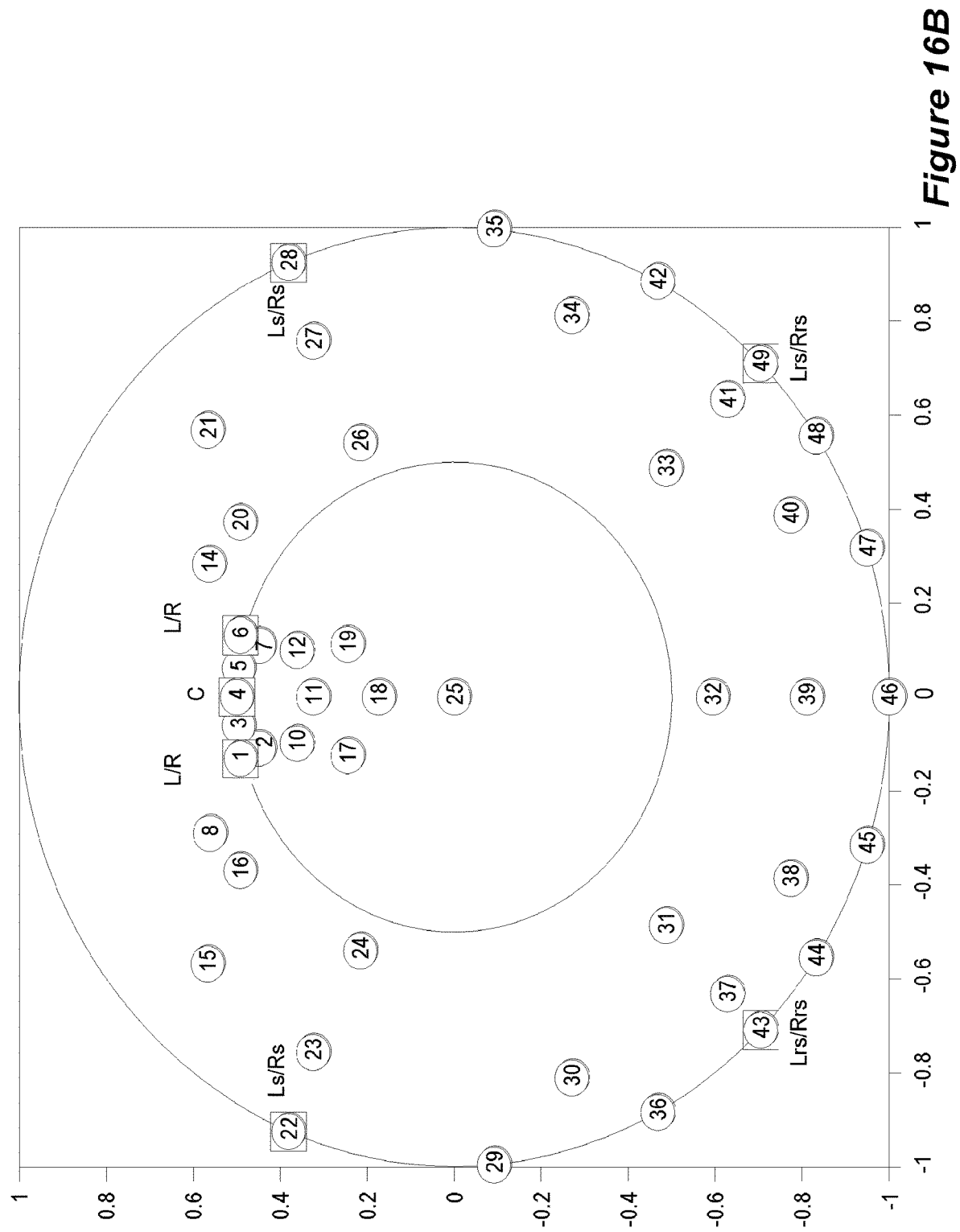
Figure 16C:
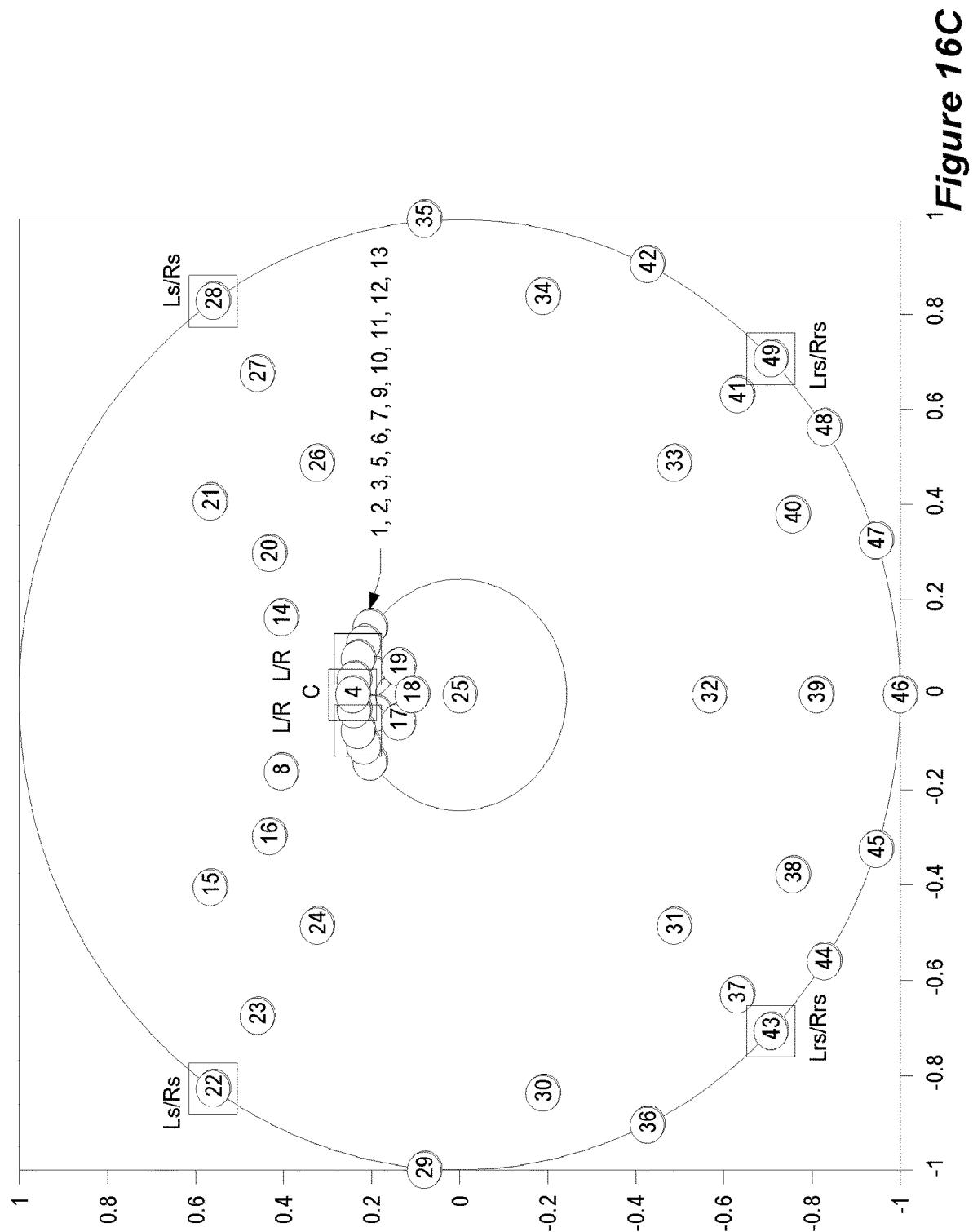
Figure 16D:
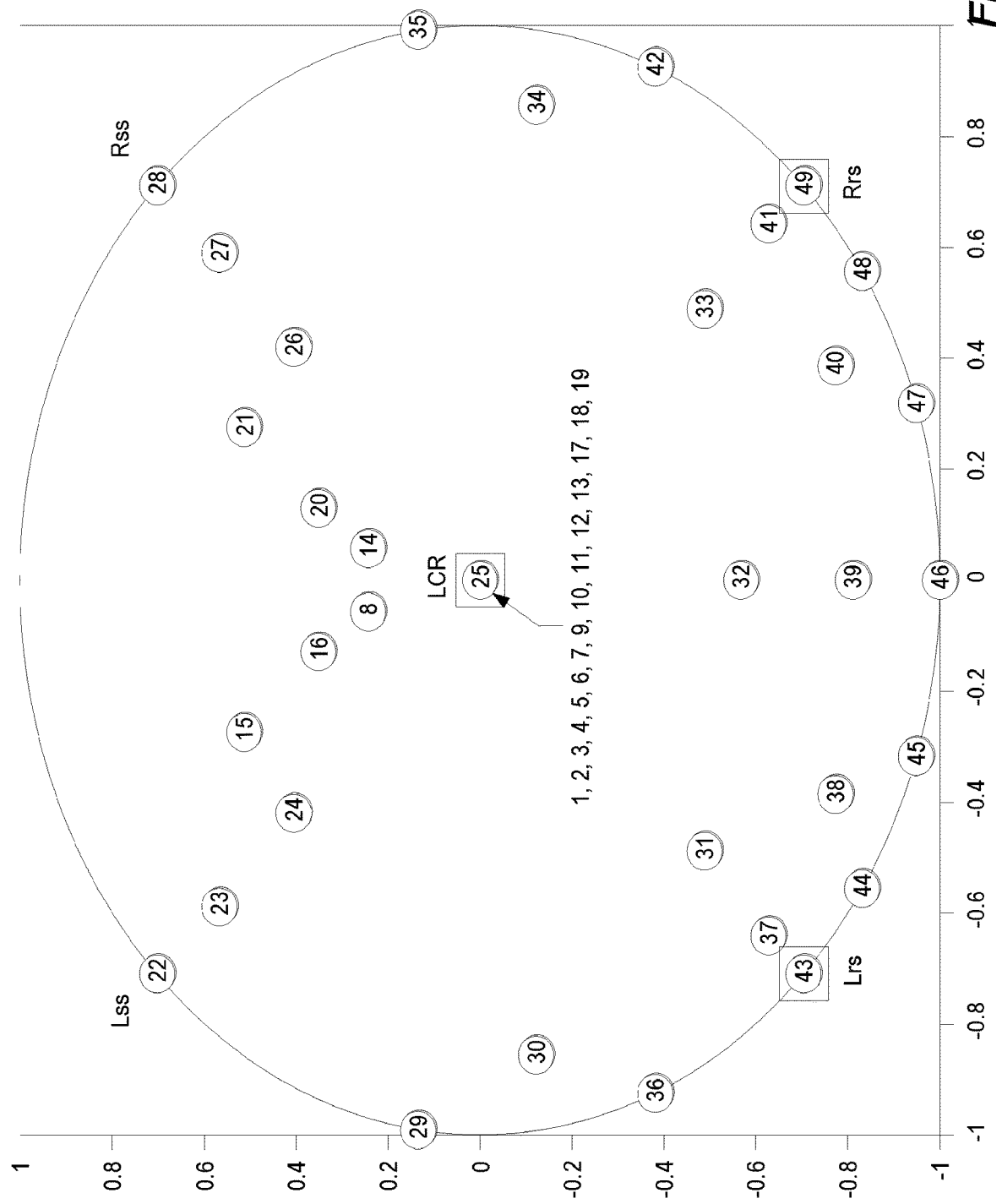
FIG. 16D depicts an example of a warping applied to all of the rendering points in FIG. 15 to achieve a fully distributed rendering mode.

FIGS. 16A, 16B and 16C show various examples of intermediate distributed spatial modes between the distributed spatial mode represented in FIG. 15 and the distributed spatial mode represented in FIG. 16D. FIG. 16B represents a midpoint between the distributed spatial mode represented in FIG. 15 and the distributed spatial mode represented in FIG. 16D. FIG. 16A represents a midpoint between the distributed spatial mode represented in FIG. 15 and the distributed spatial mode represented in FIG. 16B. FIG. 16C represents a midpoint between the distributed spatial mode represented in FIG. 16B and the distributed spatial mode represented in FIG. 16D.

Figure 17:
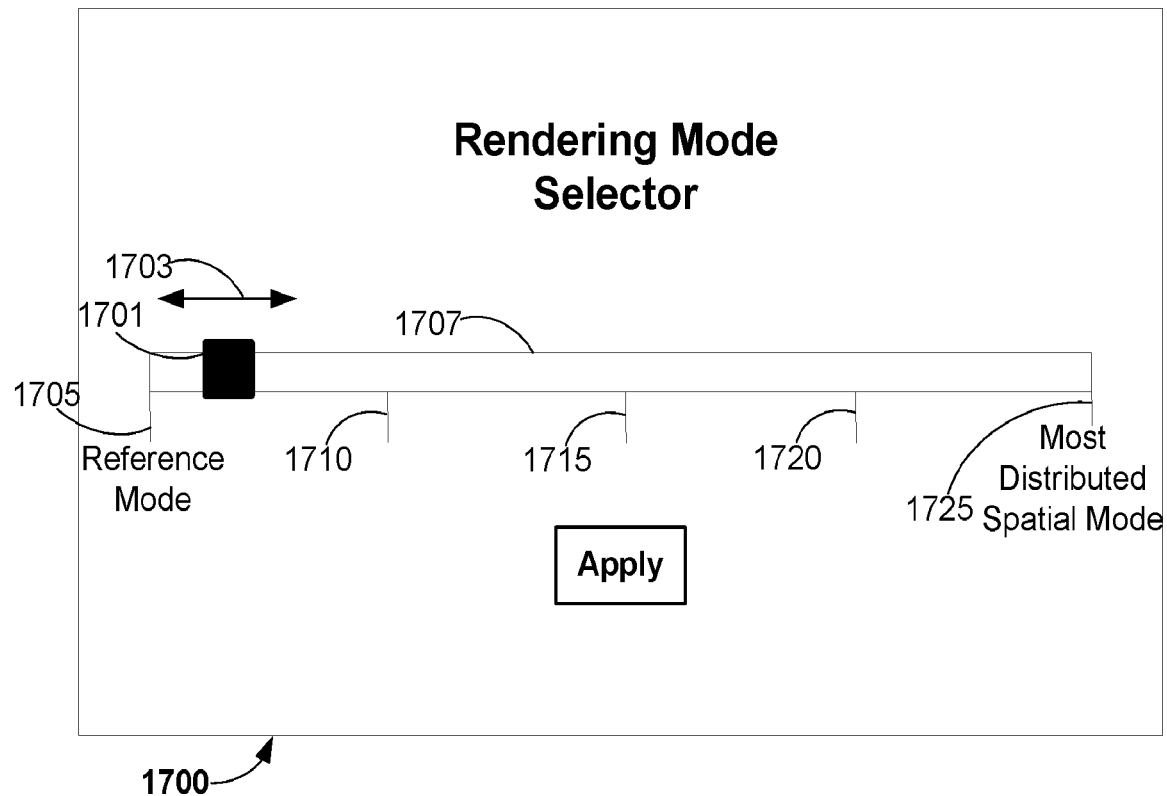
FIG. 17 shows an example of a GUI with which a user may select a rendering mode.

FIG. 17 shows an example of a GUI with which a user may select a rendering mode. According to some implementations, a control system may control a display device (e.g., a cellular telephone) to display the GUI 1700, or a similar GUI, on a display. The display device may include a sensor system (such as a touch sensor system or a gesture sensor system proximate the display (e.g., overlying the display or under the display). The control system may be configured to receive user input via the GUI 1700 in the form of sensor signals from the sensor system. The sensor signals may correspond with user touches or gestures corresponding with elements of the GUI 1700.

According to this example, the GUI includes a virtual slider 1701, with which a user may interact in order to select a rendering mode. As indicated by the arrows 1703, a user may cause the slider to move in either direction along the track 1707. In this example, the line 1705 indicates a position of the virtual slider 1701 that corresponds with a reference spatial mode, such as one of the reference spatial modes disclosed herein. Other implementations may provide other features on a GUI with which a user may interact, such as a virtual knob or dial. According to some implementations, after selecting a reference spatial mode, the control system may present a GUI such as that shown in FIG. 13A or another such GUI that allows the user to select a listener position and orientation for the reference spatial mode.

In this example, the line 1725 indicates a position of the virtual slider 1701 that corresponds with a most distributed spatial mode, such as the distributed spatial mode shown in FIG. 13B. According to this implementation, the lines 1710, 1715 and 1720 indicate positions of the virtual slider 1701 that correspond with intermediate spatial modes. In this example, the position of the line 1710 corresponds with an intermediate spatial mode such as that of FIG. 16A. Here, the position of the line 1715 corresponds with an intermediate spatial mode such as that of FIG. 16B. In this implementation, the position of the line 1720 corresponds with an intermediate spatial mode such as that of FIG. 16C. According to this example, a user may interact with (e.g., touch) the "Apply" button in order to instruct the control system to implement a selected rendering mode.

However, other implementations may provide other ways for a user to select one of the foregoing distributed spatial modes. According to some examples, a user may utter a voice command, for example, "Play [insert name of content] in a half distributed mode." The "half distributed mode" may correspond with a distributed mode indicated by the position of the line 1715 in the GUI 1700 of FIG. 17. According to some such examples, a user may utter a voice command, for example, "Play [insert name of content] in a one-quarter distributed mode." The "one-quarter distributed mode" may correspond with a distributed mode indicated by the position of the line 1710.

Figure 18:
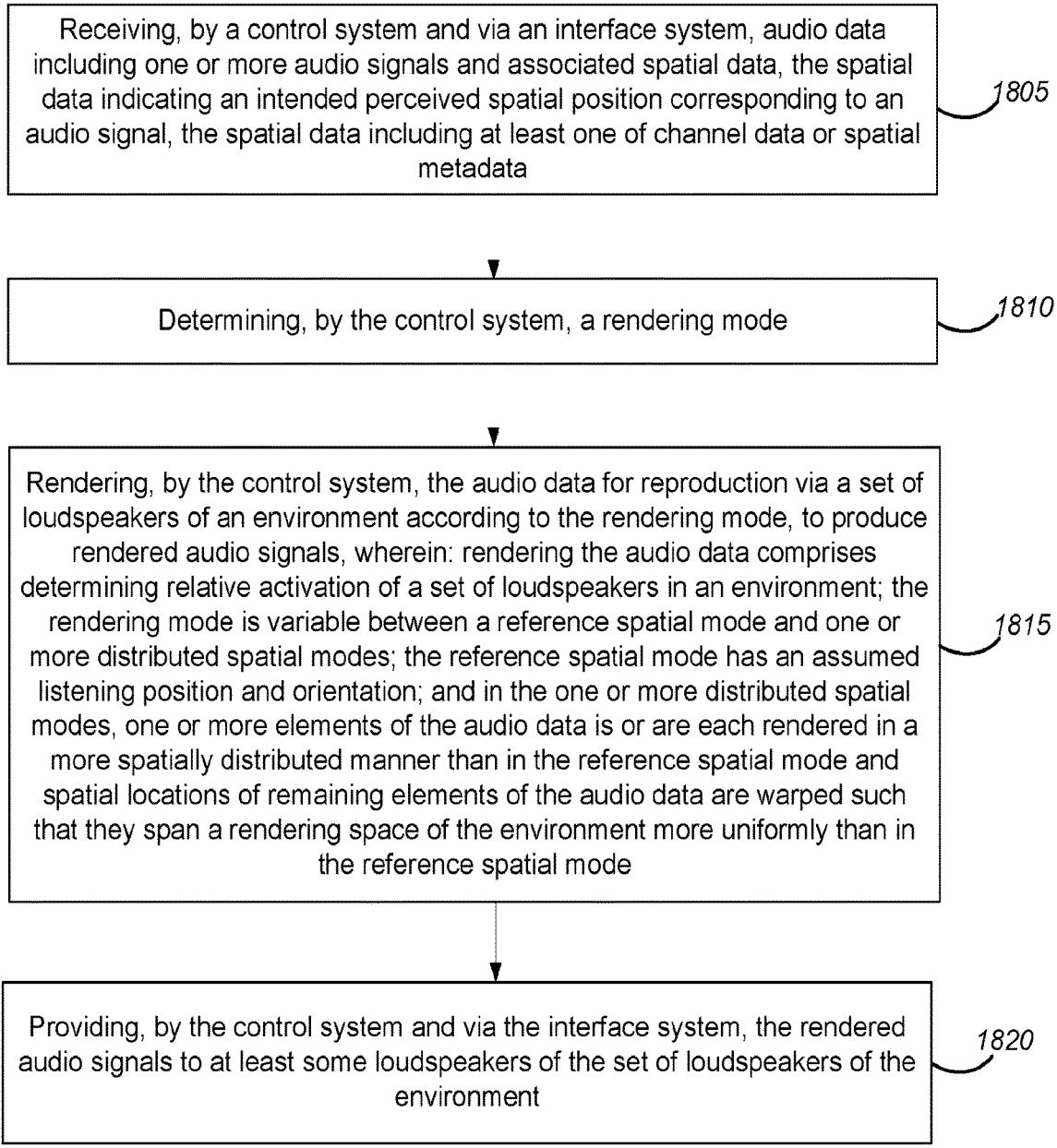
FIG. 18 is a flow diagram that outlines one example of a method that may be performed by an apparatus or system such as those disclosed herein.

FIG. 18 is a flow diagram that outlines one example of a method that may be performed by an apparatus or system such as those disclosed herein. The blocks of method 1800, like other methods described herein, are not necessarily performed in the order indicated. In some implementations, one or more of the blocks of method 1800 may be performed concurrently. Moreover, some implementations of method 1800 may include more or fewer blocks than shown and/or described. The blocks of method 1800 may be performed by one or more devices, which may be (or may include) a control system such as the control system 110 that is shown in FIG. 1A and described above, or one of the other disclosed control system examples.

In this implementation, block 1805 involves receiving, by a control system and via an interface system, audio data including one or more audio signals and associated spatial data. In this example, the spatial data indicates an intended perceived spatial position corresponding to an audio signal. Here, the spatial data includes channel data and/or spatial metadata.

In this example, block 1810 involves determining, by the control system, a rendering mode. Determining the rendering mode may, in some instances, involve receiving a rendering mode indication via the interface system. Receiving the rendering mode indication may, for example, involve receiving microphone signals corresponding to a voice command. In some examples, receiving the rendering mode indication may involve receiving sensor signals corresponding to user input via a graphical user interface. The sensor signals may, for example, be touch sensor signals and/or gesture sensor signals.

In some implementations, receiving the rendering mode indication may involve receiving an indication of a number of people in a listening area. According to some such examples, the control system may be configured for determining the rendering mode based, at least in part, on the number of people in the listening area. In some such examples, the indication of the number of people in the listening area may be based on microphone data from a microphone system and/or image data from a camera system.

According to the example shown in FIG. 18, block 1815 involves rendering, by the control system, the audio data for reproduction via a set of loudspeakers of an environment according to the rendering mode determined in block 1810, to produce rendered audio signals. In this example, rendering the audio data involves determining relative activation of a set of loudspeakers in an environment. Here, the rendering mode is variable between a reference spatial mode and one or more distributed spatial modes. In this implementation, the reference spatial mode has an assumed listening position and orientation. According to this example, in the one or more distributed spatial modes, one or more elements of the audio data is or are each rendered in a more spatially distributed manner than in the reference spatial mode. In this example, in the one or more distributed spatial modes, spatial locations of remaining elements of the audio data are warped such that they span a rendering space of the environment more completely than in the reference spatial mode.

In some implementations, rendering the one or more elements of the audio data in a more spatially distributed manner than in the reference spatial mode may involve creating copies of the one or more elements. Some such implementations may involve rendering all of the copies simultaneously at a distributed set of positions across the environment.

According to some implementations, the rendering may be based on CMAP, FV or a combination thereof. Rendering the one or more elements of the audio data in a more spatially distributed manner than in the reference spatial mode may involve warping a rendering position of each of the one or more elements towards a zero radius.

In this example, block 1820 involves providing, by the control system and via the interface system, the rendered audio signals to at least some loudspeakers of the set of loudspeakers of the environment.

According to some implementations, the rendering mode may be selectable from a continuum of rendering modes ranging from the reference spatial mode to a most distributed spatial mode. In some such implementations, the control system may be further configured to determine the assumed listening position and/or orientation of the reference spatial mode according to reference spatial mode data received via the interface system. According to some such implementations, the reference spatial mode data may include microphone data from a microphone system and/or image data from a camera system. In some such examples, the reference spatial mode data may include microphone data corresponding to a voice command. Alternatively, or additionally, the reference spatial mode data may include microphone data corresponding to a location of one or more utterances of a person in the listening environment. In some such examples, the reference spatial mode data may include image data indicating the location and/or orientation of a person in the listening environment.

However, in some instances the apparatus or system may include a display device and a sensor system proximate the display device. The control system may be configured for controlling the display device to present a graphical user interface. Receiving reference spatial mode data may involve receiving sensor signals corresponding to user input via the graphical user interface.

According to some implementations, the one or more elements of the audio data each rendered in a more spatially distributed manner may correspond to front sound stage data, music vocals, dialogue, bass, percussion, and/or other solo or lead instruments. In some instances, the front sound stage data may include the left, right or center signals of audio data received in, or upmixed to, a Dolby 5.1, Dolby 7.1 or Dolby 9.1 format. In some examples, the front sound stage data may include audio data received in Dolby Atmos format and having spatial metadata indicating an (x,y) spatial position wherein y<0.5

In some instances, the audio data may include spatial distribution metadata indicating which elements of the audio data are to be rendered in a more spatially distributed manner. In some such examples, the control system may be configured for identifying the one or more elements of the audio data to be rendered in a more spatially distributed manner according to the spatial distribution metadata.

Alternatively, or additionally, the control system may be configured for implementing a content type classifier to identify the one or more elements of the audio data to be rendered in a more spatially distributed manner. In some examples, the content type classifier may refer to content type metadata, (e.g., metadata that indicates that the audio data is dialogue, vocals, percussion, bass, etc.) in order to determine whether the audio data should be rendered in a more spatially distributed manner According to some such implementations, the content type metadata to be rendered in a more spatially distributed manner may be selectable by a user, e.g., according to user input via a GUI displayed on a display device.

Alternatively, or additionally, the content type classifier may operate directly on the audio signals in combination with the rendering system. For example, classifiers may be implemented using neural networks trained on a variety of content types to analyze the audio signals and determine if they belong to any content type (vocals, lead guitar, drums, etc.) that may be deemed appropriate for rendering in a more spatially distributed manner. Such classification may be performed in a continuous and dynamic manner, and the resulting classification results may also adjust the set of signals being rendered in a more spatially distributed manner in a continuous and dynamic manner. Some such implementations may involve the use of technology such as neural networks to implement such a dynamic classification system according to methods that are known in the art.

In some examples, at least one of the one or more distributed spatial modes may involve applying a time-varying modification to the spatial location of at least one element. According to some such examples, the time-varying modification may be a periodic modification. For example, the periodic modification may involve revolving one or more rendering locations around a periphery of the listening environment. According to some such implementations, the periodic modification may involve a tempo of music being reproduced in the environment, a beat of music being reproduced in the environment, or one or more other features of audio data being reproduced in the environment. For example, some such periodic modifications may involve alternating between two, three, four or more rendering locations. The alternations may correspond to a beat of music being reproduced in the environment. In some implementations, the periodic modification may be selectable according to user input, e.g., according to one or more voice commands, according to user input received via a GUI, etc.

Figure 19:
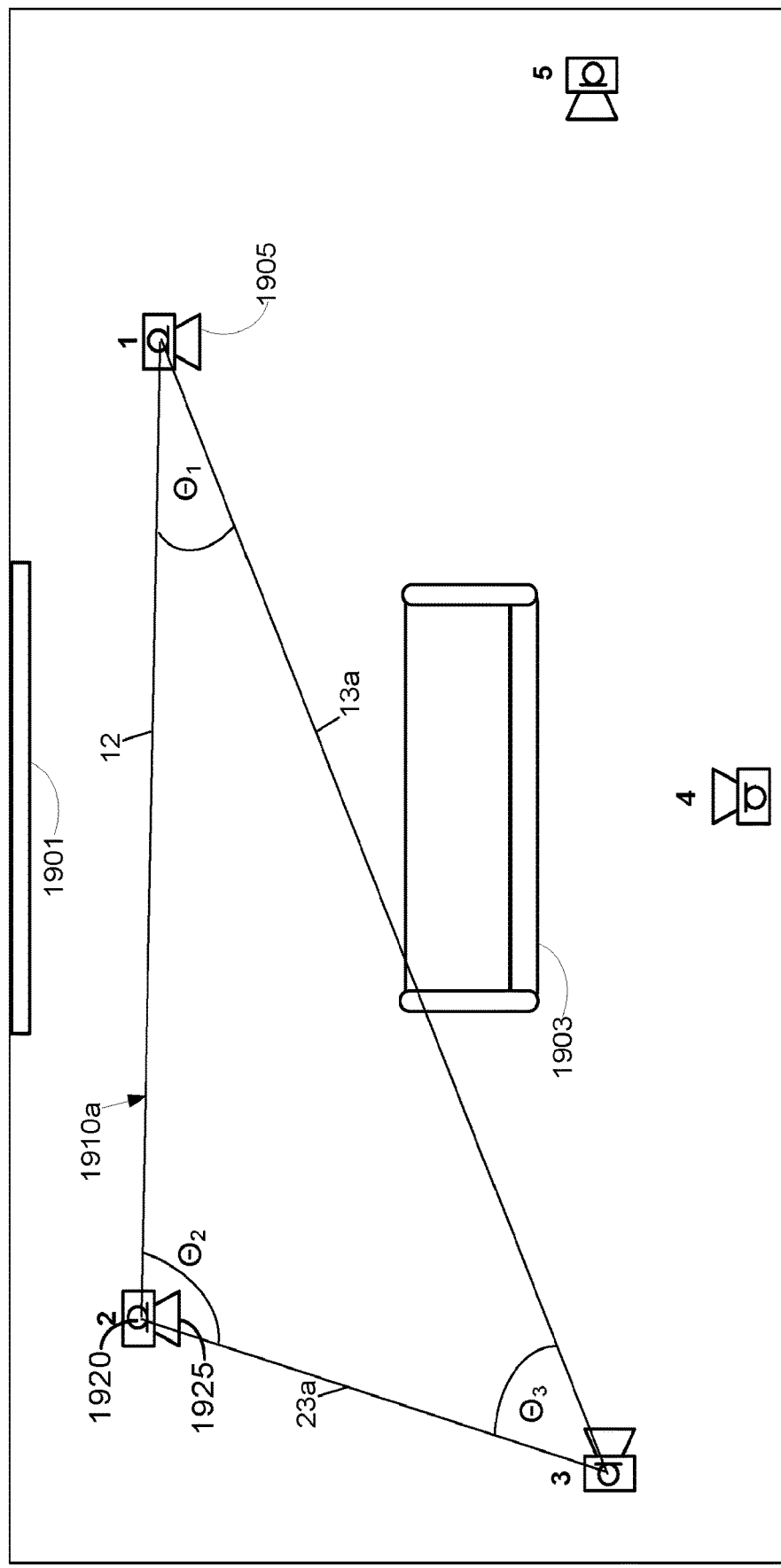
FIG. 19 shows an example of geometric relationships between three audio devices in an environment.

FIG. 19 shows an example of geometric relationships between three audio devices in an environment. In this example, the environment 1900 is a room that includes a television 1901, a sofa 1903 and five audio devices 1905. According to this example, the audio devices 1905 are in locations 1 through 5 of the environment 1900. In this implementation, each of the audio devices 1905 includes a microphone system 1920 having at least three microphones and a speaker system 1925 that includes at least one speaker. In some implementations, each microphone system 1920 includes an array of microphones. According to some implementations, each of the audio devices 1905 may include an antenna system that includes at least three antennas.

As with other examples disclosed herein, the type, number and arrangement of elements shown in FIG. 19 are merely made by way of example. Other implementations may have different types, numbers and arrangements of elements, e.g., more or fewer audio devices 1905, audio devices 1905 in different locations, etc.

In this example, the triangle 1910a has its vertices at locations 1, 2 and 3. Here, the triangle 1910a has sides 12, 23a and 13a. According to this example, the angle between sides 12 and 23 is $\theta_2$, the angle between sides 12 and 13a is $\theta_1$ and the angle between sides 23a and 13a is $\theta_3$. These angles may be determined according to DOA data, as described in more detail below.

In some implementations, only the relative lengths of triangle sides may be determined. In alternative implementations, the actual lengths of triangle sides may be estimated. According to some such implementations, the actual length of a triangle side may be estimated according to TOA data, e.g., according to the time of arrival of sound produced by an audio device located at one triangle vertex and detected by an audio device located at another triangle vertex. Alternatively, or additionally, the length of a triangle side may be estimated according to electromagnetic waves produced by an audio device located at one triangle vertex and detected by an audio device located at another triangle vertex. For example, the length of a triangle side may be estimated according to the signal strength of electromagnetic waves produced by an audio device located at one triangle vertex and detected by an audio device located at another triangle vertex. In some implementations, the length of a triangle side may be estimated according to a detected phase shift of electromagnetic waves.

Figure 20:
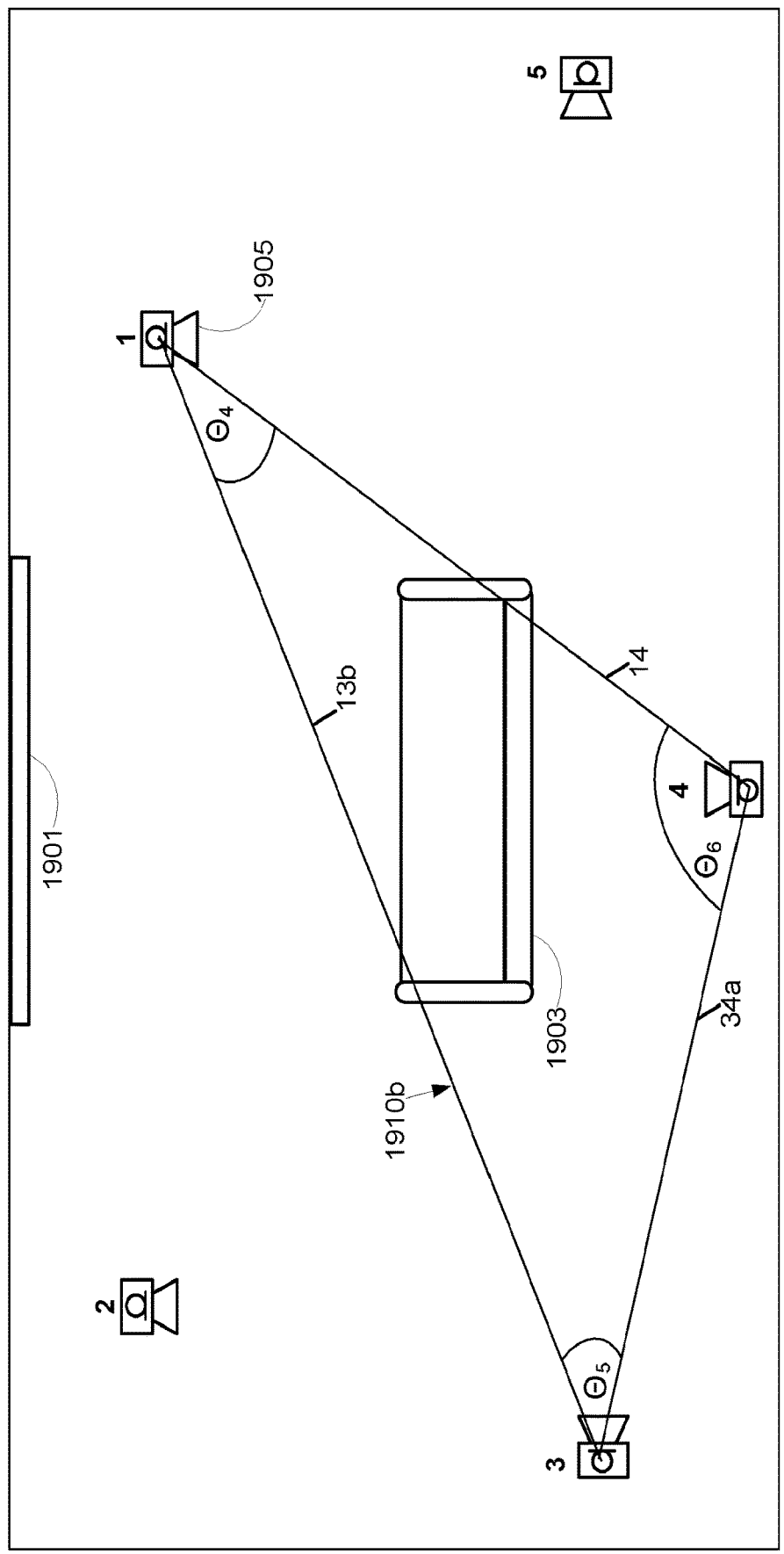
FIG. 20 shows another example of geometric relationships between three audio devices in the environment shown in FIG. 19.

FIG. 20 shows another example of geometric relationships between three audio devices in the environment shown in FIG. 19. In this example, the triangle 1910b has its vertices at locations 1, 3 and 4. Here, the triangle 1910b has sides 13b, 14 and 34a. According to this example, the angle between sides 13b and 14 is $\theta_4$, the angle between sides 13b and 34a is $\theta_5$ and the angle between sides 34a and 14 is $\theta_6$.

By comparing FIGS. 11 and 12, one may observe that the length of side 13a of triangle 1910a should equal the length of side 13b of triangle 1910b. In some implementations, the side lengths of one triangle (e.g., triangle 1910a) may be assumed to be correct, and the length of a side shared by an adjacent triangle will be constrained to this length.

Figure 21A:
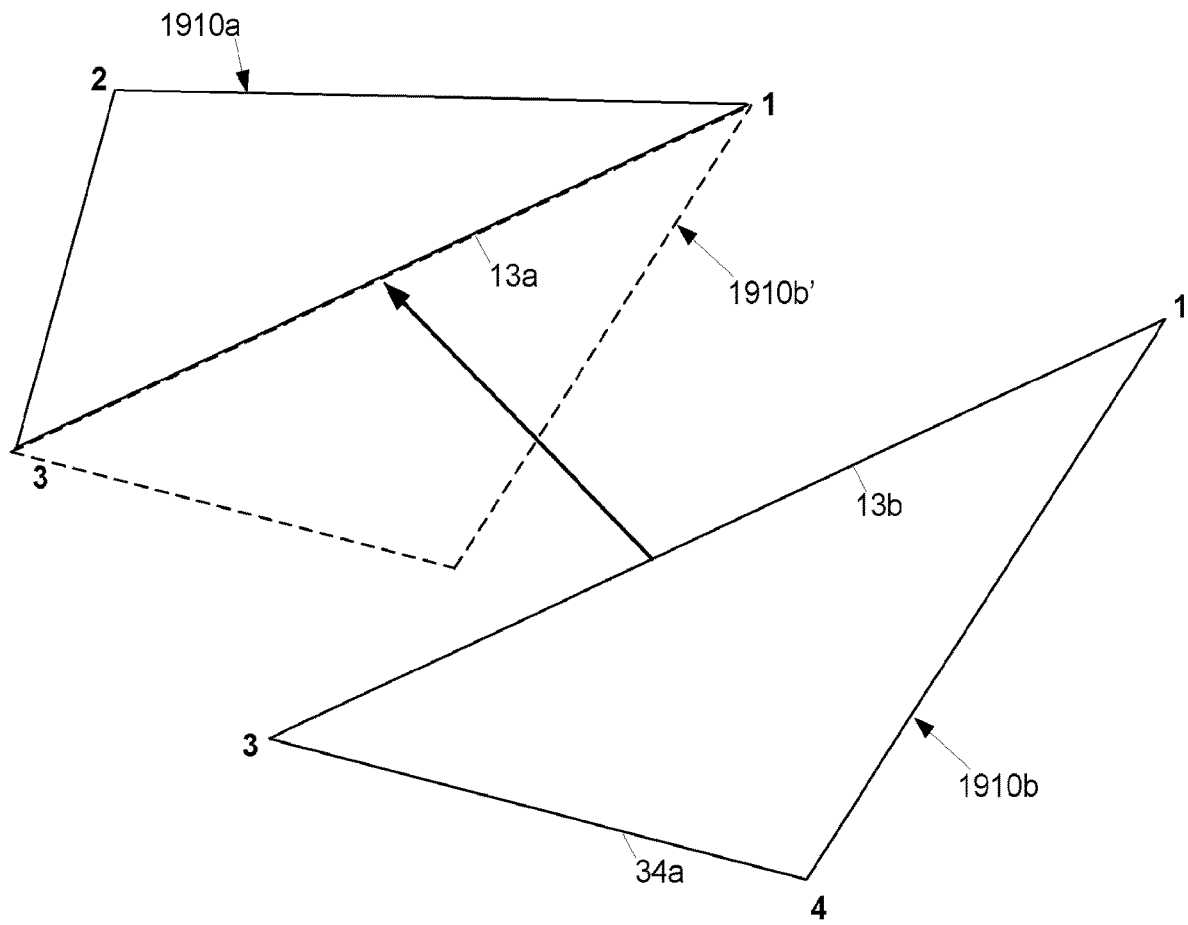
FIG. 21A shows both of the triangles depicted in FIGS. 19 and 20, without the corresponding audio devices and the other features of the environment.

FIG. 21A shows both of the triangles depicted in FIGS. 19 and 20, without the corresponding audio devices and the other features of the environment. FIG. 21A shows estimates of the side lengths and angular orientations of triangles 1910a and 1910b. In the example shown in FIG. 21A, the length of side 13b of triangle 1910b is constrained to be the same length as side 13a of triangle 1910a. The lengths of the other sides of triangle 1910b are scaled in proportion to the resulting change in the length of side 13b. The resulting triangle 1910b' is shown in FIG. 21A, adjacent to the triangle 1910a.

According to some implementations, the side lengths of other triangles adjacent to triangle 1910a and 1910b may be all determined in a similar fashion, until all of the audio device locations in the environment 1900 have been determined.

Some examples of audio device location may proceed as follows. Each audio device may report the DOA of every other audio device in an environment (e.g., a room) based on sounds produced by every other audio device in the environment. The Cartesian coordinates of the ith audio device may be expressed as $x_i=[x_i, y_i]^T$, where the superscript T indicates a vector transpose. Given M audio devices in the environment, $i=\{1 \ldots M\}$.

Figure 21B:
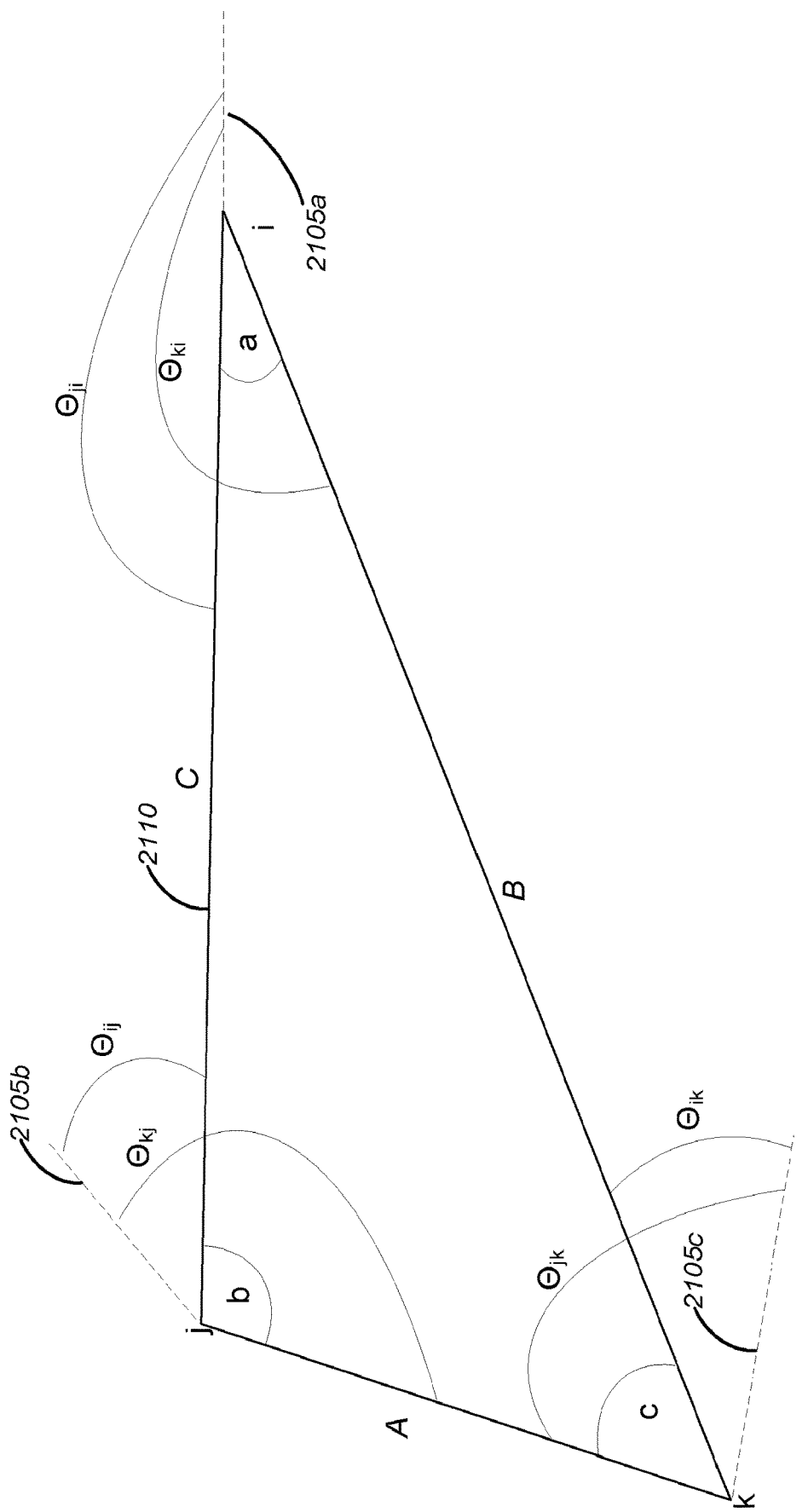
FIG. 21B shows an example of estimating the interior angles of a triangle formed by three audio devices.

FIG. 21B shows an example of estimating the interior angles of a triangle formed by three audio devices. In this example, the audio devices are i, j and k. The DOA of a sound source emanating from device j as observed from device i may be expressed as $\theta_{ji}$. The DOA of a sound source emanating from device k as observed from device i may be expressed as $\theta_{ki}$. In the example shown in FIG. 21B, $\theta_{ji}$ and $\theta_{ki}$ are measured from axis 2105a, the orientation of which is arbitrary and which may, for example, correspond to the orientation of audio device i. Interior angle a of triangle 2110 may be expressed as $a=\theta_{ki}-\theta_{ji}$. One may observe that the calculation of interior angle a does not depend on the orientation of the axis 2105a.

In the example shown in FIG. 21B, $\theta_{ij}$ and $\theta_{kj}$ are measured from axis 2105b, the orientation of which is arbitrary and which may correspond to the orientation of audio device j. Interior angle b of triangle 2110 may be expressed as $b=\theta_{ij}-\theta_{kj}$. Similarly, $\theta_{jk}$ and $\theta_{ik}$ are measured from axis 2105c in this example. Interior angle c of triangle 2110 may be expressed as $c=\theta_{jk}-\theta_{ik}$.

In the presence of measurement error, $a+b+c \neq 180°$. Robustness can be improved by predicting each angle from the other two angles and averaging, e.g., as follows:

$$\tilde{a}=0.5(a+\text{sgn}(a)(180-|b+c|)).$$

In some implementations, the edge lengths (A, B, C) may be calculated (up to a scaling error) by applying the sine rule. In some examples, one edge length may be assigned an arbitrary value, such as 1. For example, by making A=1 and placing vertex $\hat{x}_a=[0,0]^T$ at the origin, the locations of the remaining two vertices may be calculated as follows:

$$\hat{x}_b=[A\cos a, -A\sin a]^T = \hat{x}_c[B,0]^T$$

However, an arbitrary rotation may be acceptable.

According to some implementations, the process of triangle parameterization may be repeated for all possible subsets of three audio devices in the environment, enumerated in superset $\zeta$ of size $$N = \binom{M}{3}.$$

In some examples, $T_l$ may represent the lth triangle. Depending on the implementation, triangles may not be enumerated in any particular order. The triangles may overlap and may not align perfectly, due to possible errors in the DOA and/or side length estimates.

Figure 22:
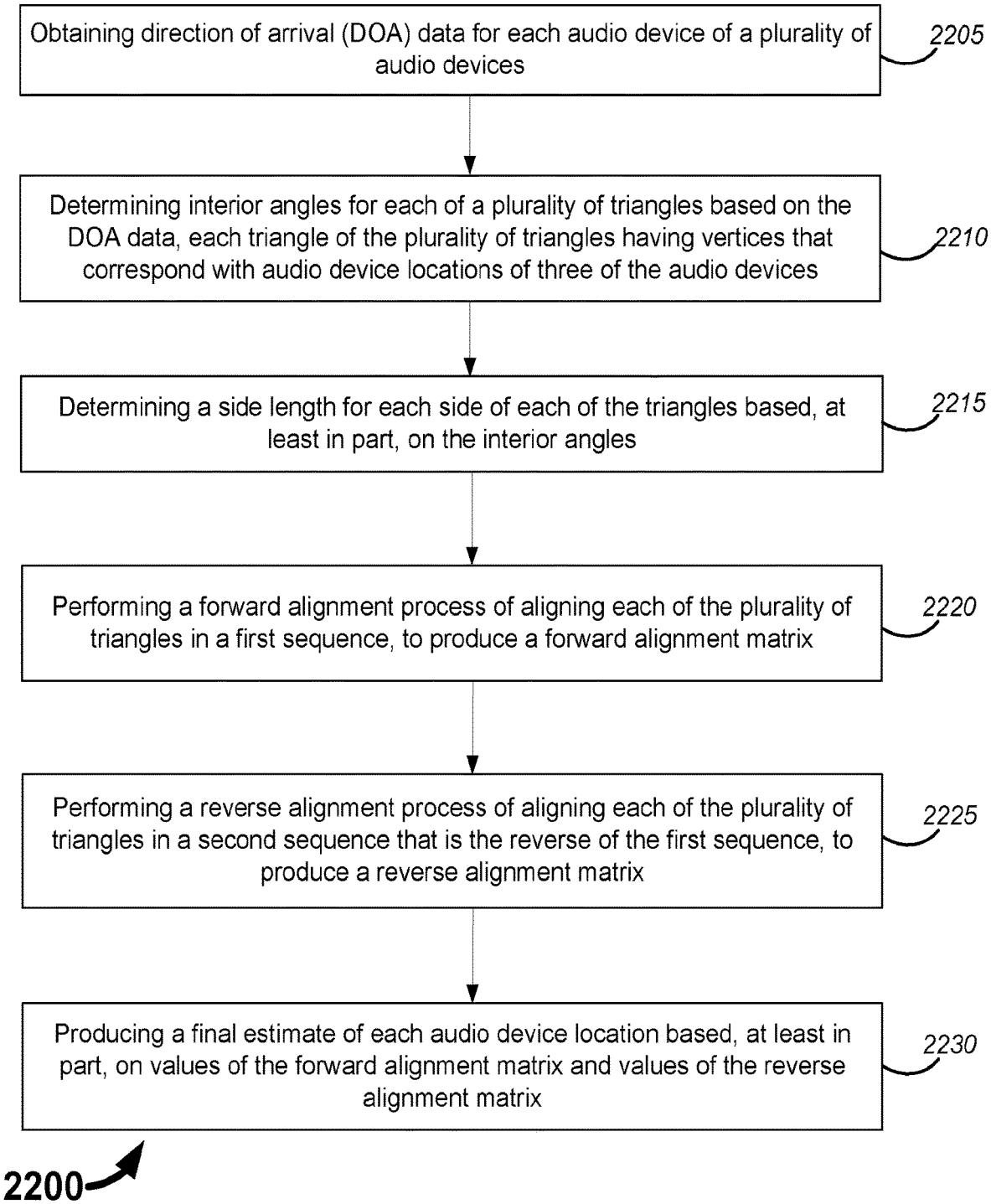
FIG. 22 is a flow diagram that outlines one example of a method that may be performed by an apparatus such as that shown in FIG. 1A.

FIG. 22 is a flow diagram that outlines one example of a method that may be performed by an apparatus such as that shown in FIG. 1A. The blocks of method 2200, like other methods described herein, are not necessarily performed in the order indicated. Moreover, such methods may include more or fewer blocks than shown and/or described. In this implementation, method 2200 involves estimating a speaker's location in an environment. The blocks of method 2200 may be performed by one or more devices, which may be (or may include) the apparatus 100 shown in FIG. 1A.

In this example, block 2205 involves obtaining direction of arrival (DOA) data for each audio device of a plurality of audio devices. In some examples, the plurality of audio devices may include all of the audio devices in an environment, such as all of the audio devices 1905 shown in FIG. 19.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to this example, block 2210 involves determining interior angles for each of a plurality of triangles based on the DOA data. In this example, each triangle of the plurality of triangles has vertices that correspond with audio device locations of three of the audio devices. Some such examples are described above.

Figure 23:
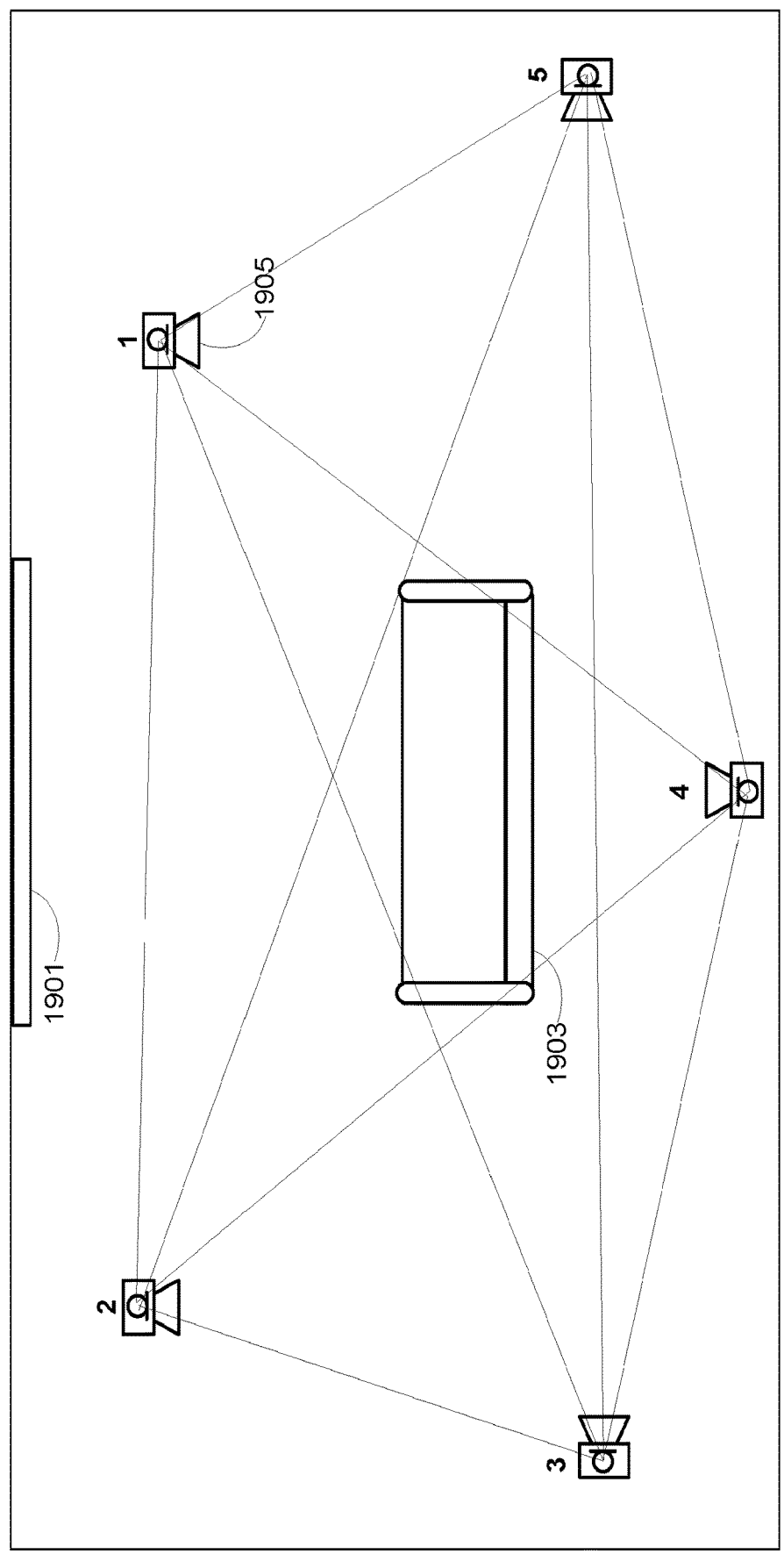
FIG. 23 shows an example in which each audio device in an environment is a vertex of multiple triangles.

FIG. 23 shows an example in which each audio device in an environment is a vertex of multiple triangles. The sides of each triangle correspond with distances between two of the audio devices 1905.

In this implementation, block 2215 involves determining a side length for each side of each of the triangles. (A side of a triangle may also be referred to herein as an "edge.") According to this example, the side lengths are based, at least in part, on the interior angles. In some instances, the side lengths may be calculated by determining a first length of a first side of a triangle and determining lengths of a second side and a third side of the triangle based on the interior angles of the triangle. Some such examples are described above.

According to some such implementations, determining the first length may involve setting the first length to a predetermined value. However, determining the first length may, in some examples, be based on time-of-arrival data and/or received signal strength data. The time-of-arrival data and/or received signal strength data may, in some implementations, correspond to sound waves from a first audio device in an environment that are detected by a second audio device in the environment. Alternatively, or additionally, the time-of-arrival data and/or received signal strength data may correspond to electromagnetic waves (e.g., radio waves, infrared waves, etc.) from a first audio device in an environment that are detected by a second audio device in the environment.

According to this example, block 2220 involves performing a forward alignment process of aligning each of the plurality of triangles in a first sequence. According to this example, the forward alignment process produces a forward alignment matrix.

According to some such examples, triangles are expected to align in such a way that an edge $(x_i, x_j)$ is equal to a neighboring edge, e.g., as shown in FIG. 21A and described above. Let $\varepsilon$ be the set of all edges of size $$P = \binom{M}{2}.$$

In some such implementations, block 2220 may involve traversing through $\varepsilon$ and aligning the common edges of triangles in forward order by forcing an edge to coincide with that of a previously aligned edge.

Figure 24:
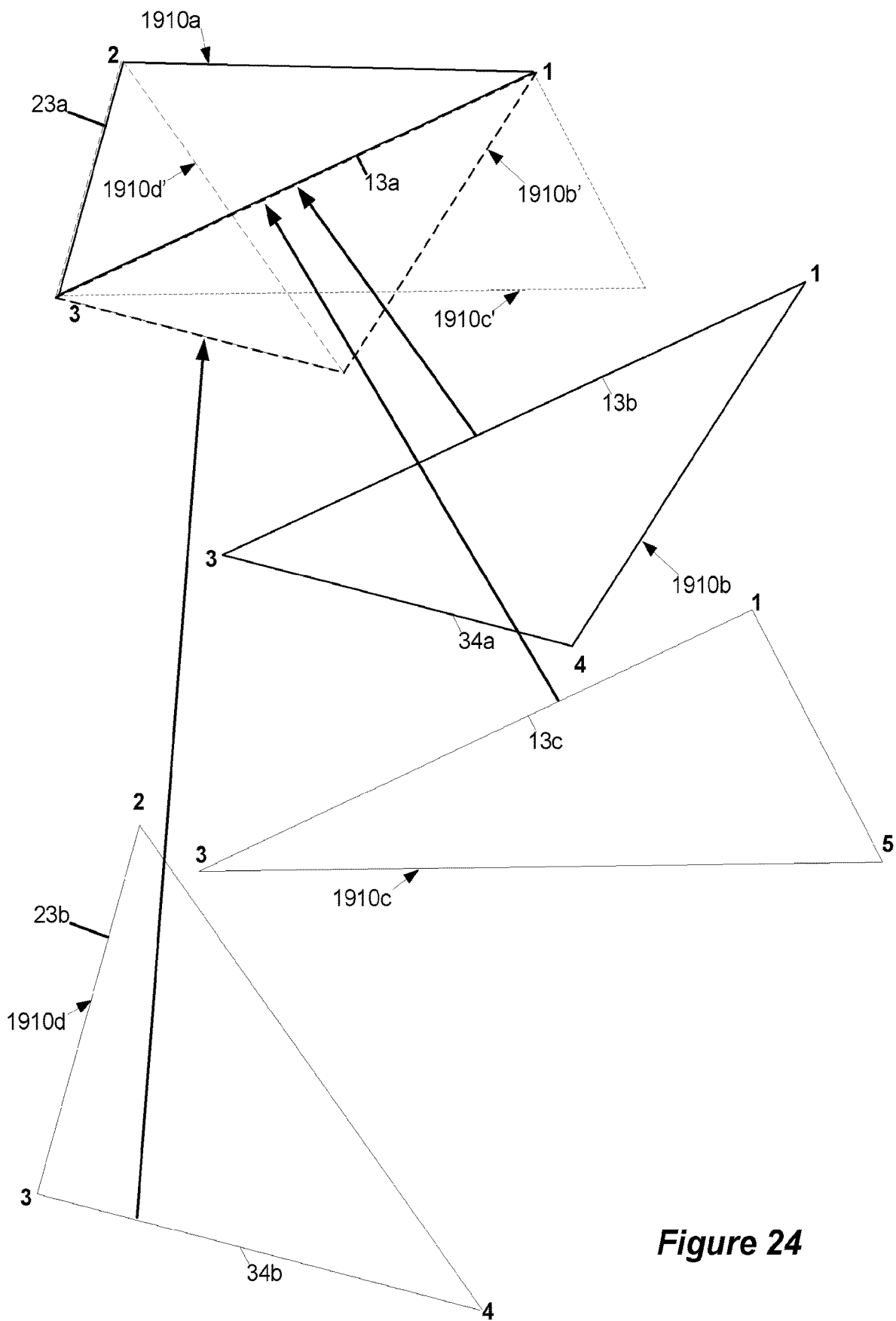
FIG. 24 provides an example of part of a forward alignment process.

FIG. 24 provides an example of part of a forward alignment process. The numbers 1 through 5 that are shown in bold in FIG. 24 correspond with the audio device locations shown in FIGS. 1, 2 and 5. The sequence of the forward alignment process that is shown in FIG. 24 and described herein is merely an example.

In this example, as in FIG. 21A, the length of side 13*b* of triangle 1910*b* is forced to coincide with the length of side 13*a* of triangle 1910*a*. The resulting triangle 1910*b*' is shown in FIG. 24, with the same interior angles maintained. According to this example, the length of side 13*c* of triangle 1910*c* is also forced to coincide with the length of side 13*a* of triangle 1910*a*. The resulting triangle 1910*c*' is shown in FIG. 24, with the same interior angles maintained.

Next, in this example, the length of side 34*b* of triangle 1910*d* is forced to coincide with the length of side 34*a* of triangle 1910*b*'. Moreover, in this example, the length of side 23*b* of triangle 1910*d* is forced to coincide with the length of side 23*a* of triangle 1910*a*. The resulting triangle 1910*d'* is shown in FIG. 24, with the same interior angles maintained. According to some such examples, the remaining triangles shown in FIG. 5 may be processed in the same manner as triangles 1910*b*, 1910*c* and 1910*d*.

The results of the forward alignment process may be stored in a data structure. According to some such examples, the results of the forward alignment process may be stored in a forward alignment matrix. For example, the results of the forward alignment process may be stored in matrix $\vec{X} \in \mathbb{R}^{3N \times 2}$, where N indicates the total number of triangles.

When the DOA data and/or the initial side length determinations contain errors, multiple estimates of audio device location will occur. The errors will generally increase during the forward alignment process.

Figure 25:
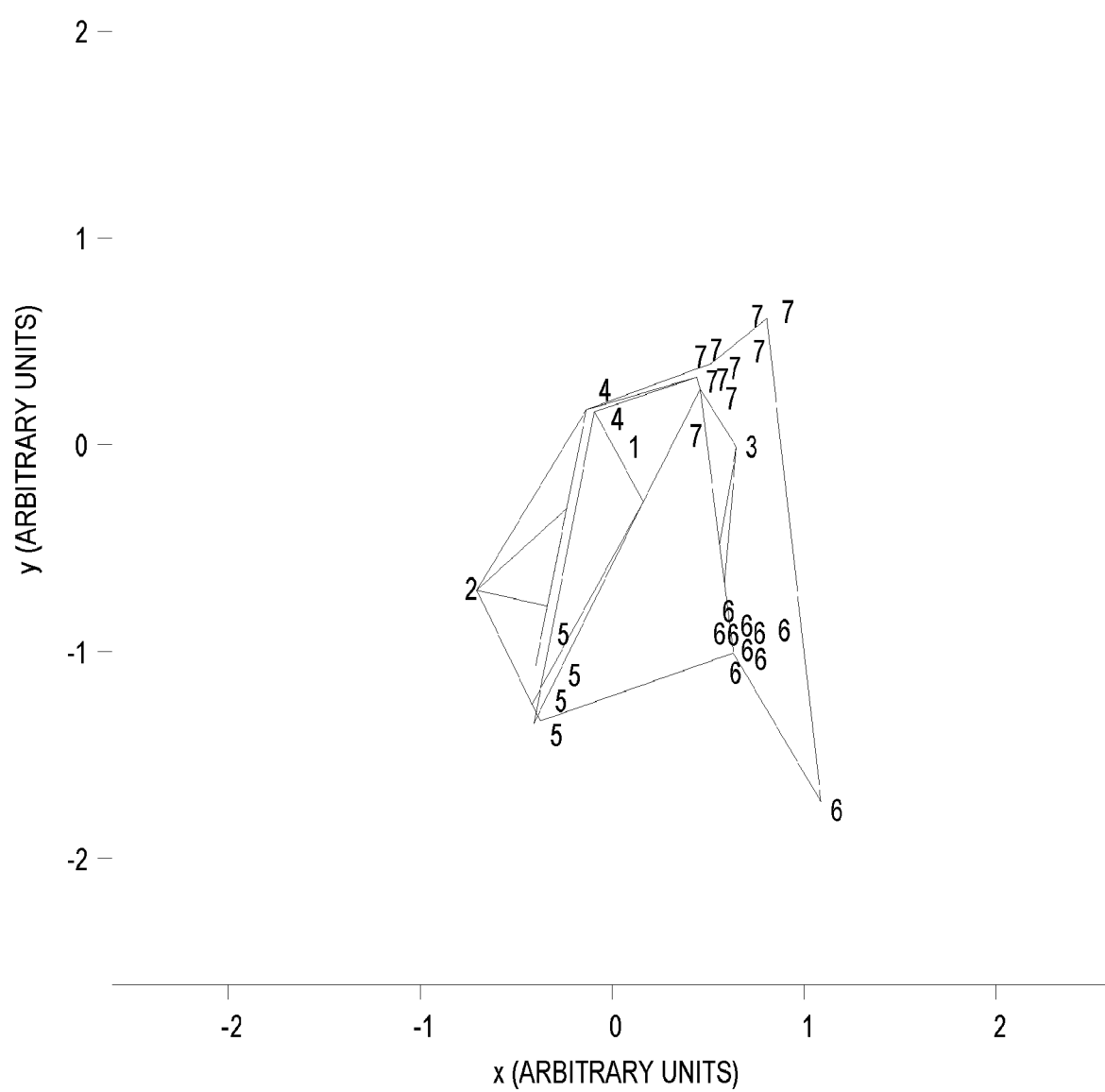
FIG. 25 shows an example of multiple estimates of audio device location that have occurred during a forward alignment process.

FIG. 25 shows an example of multiple estimates of audio device location that have occurred during a forward alignment process. In this example, the forward alignment process is based on triangles having seven audio device locations as their vertices. Here, the triangles do not align perfectly due to additive errors in the DOA estimates. The locations of the numbers 1 through 7 that are shown in FIG. 25 correspond to the estimated audio device locations produced by the forward alignment process. In this example, the audio device location estimates labelled "1" coincide but the audio device locations estimates for audio devices 6 and 7 show larger differences, as indicted by the relatively larger areas over which the numbers 6 and 7 are located.

Returning to FIG. 22, in this example block 2225 involves a reverse alignment process of aligning each of the plurality of triangles in a second sequence that is the reverse of the first sequence. According to some implementations, the reverse alignment process may involve traversing through ε as before, but in reverse order. In alternative examples, the reverse alignment process may not be precisely the reverse of the sequence of operations of the forward alignment process. According to this example, the reverse alignment process produces a reverse alignment matrix, which may be represented herein as $\bar{x} \in \mathbb{R}^{3N \times 2}$.

Figure 26:
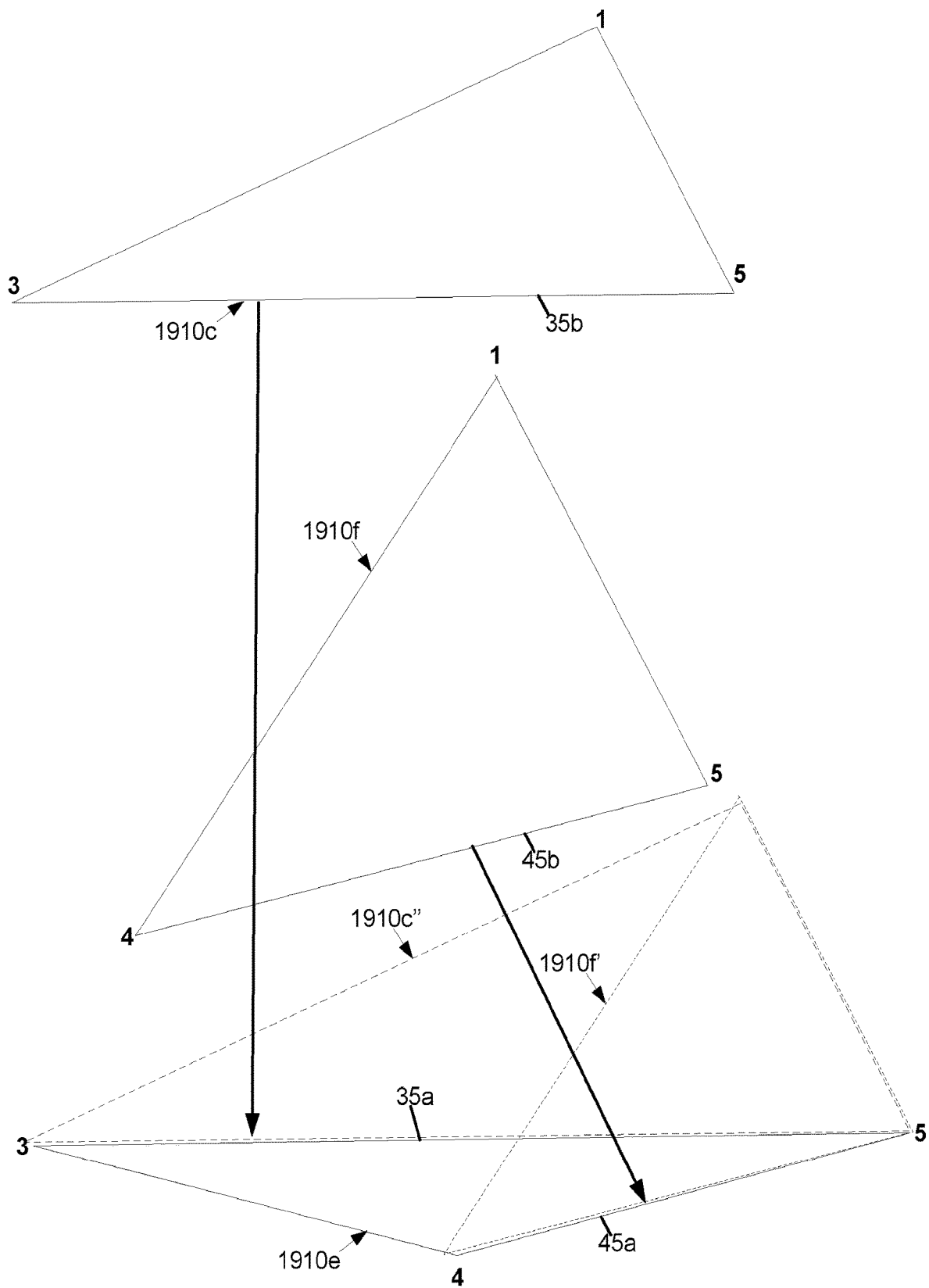
FIG. 26 provides an example of part of a reverse alignment process.

FIG. 26 provides an example of part of a reverse alignment process. The numbers 1 through 5 that are shown in bold in FIG. 26 correspond with the audio device locations shown in FIGS. 19, 21 and 23. The sequence of the reverse alignment process that is shown in FIG. 26 and described herein is merely an example.

In the example shown in FIG. 26, triangle 1910*e* is based on audio device locations 3, 4 and 5. In this implementation, the side lengths (or "edges") of triangle 1910*e* are assumed to be correct, and the side lengths of adjacent triangles are forced to coincide with them. According to this example, the length of side 45*b* of triangle 1910*f* is forced to coincide with the length of side 45*a* of triangle 1910*e*. The resulting triangle 1910*f'*, with interior angles remaining the same, is shown in FIG. 26. In this example, the length of side 35*b* of triangle 1910*c* is forced to coincide with the length of side 35*a* of triangle 1910*e*. The resulting triangle 1910*c"*, with interior angles remaining the same, is shown in FIG. 26. According to some such examples, the remaining triangles shown in FIG. 23 may be processed in the same manner as triangles 1910*c* and 1910*f*, until the reverse alignment process has included all remaining triangles.

Figure 27:
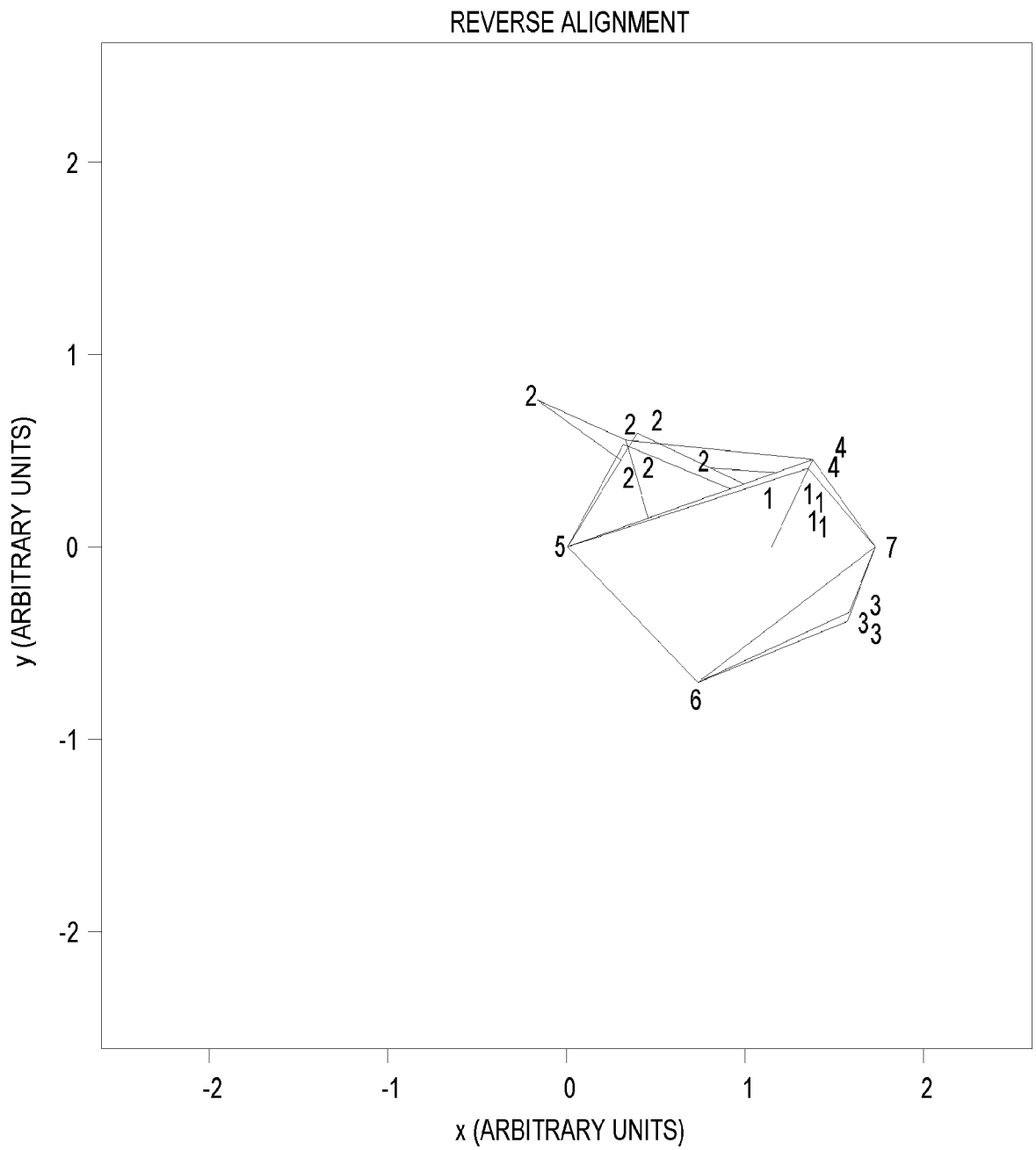
FIG. 27 shows an example of multiple estimates of audio device location that have occurred during a reverse alignment process.

FIG. 27 shows an example of multiple estimates of audio device location that have occurred during a reverse alignment process. In this example, the reverse alignment process is based on triangles having the same seven audio device locations as their vertices that are described above with reference to FIG. 25. The locations of the numbers 1 through 7 that are shown in FIG. 27 correspond to the estimated audio device locations produced by the reverse alignment process. Here again, the triangles do not align perfectly due to additive errors in the DOA estimates. In this example, the audio device location estimates labelled 6 and 7 coincide, but the audio device location estimates for audio devices 1 and 2 show larger differences.

Returning to FIG. 22, block 2230 involves producing a final estimate of each audio device location based, at least in part, on values of the forward alignment matrix and values of the reverse alignment matrix. In some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix.

For example, translation and scaling are fixed by moving the centroids to the origin and forcing unit Frobenius norm, e.g., $\vec{x} = \vec{X}/\|\vec{X}\|_2^F$ and $\bar{x} = \bar{x}/\|\bar{x}\|_2^F$.

According to some such examples, producing the final estimate of each audio device location also may involve producing a rotation matrix based on the translated and scaled forward alignment matrix and the translated and scaled reverse alignment matrix. The rotation matrix may include a plurality of estimated audio device locations for each audio device. An optimal rotation between forward and reverse alignments is can be found, for example, by singular value decomposition. In some such examples, involve producing the rotation matrix may involve performing a singular value decomposition on the translated and scaled forward alignment matrix and the translated and scaled reverse alignment matrix, e.g., as follows:

$$U\Sigma V = \vec{x}^T \bar{x}$$

In the foregoing equation, U represents the left-singular vector and V represents the right-singular vector of matrix $\vec{x}^T \bar{x}$ respectively. $\Sigma$ represents a matrix of singular values. The foregoing equation yields a rotation matrix $R=VU^T$. The matrix product $VU^T$ yields a rotation matrix such that $R\bar{x}$ is optimally rotated to align with $\vec{X}$.

According to some examples, after determining the rotation matrix $R=VU^T$ alignments may be averaged, e.g., as follows:

$$\vec{\tilde{X}} = 0.5(\vec{X} + R\bar{X}).$$

In some implementations, producing the final estimate of each audio device location also may involve averaging the estimated audio device locations for each audio device to produce the final estimate of each audio device location. Various disclosed implementations have proven to be robust, even when the DOA data and/or other calculations include significant errors. For example, $\vec{\tilde{X}}$ contains $$\frac{(N-1)(N-2)}{2}$$

estimates of the same node due to overlapping vertices from multiple triangles. Averaging across common nodes yields a final estimate $\hat{X} \in \mathbb{R}^{M \times 3}$.

Figure 28:
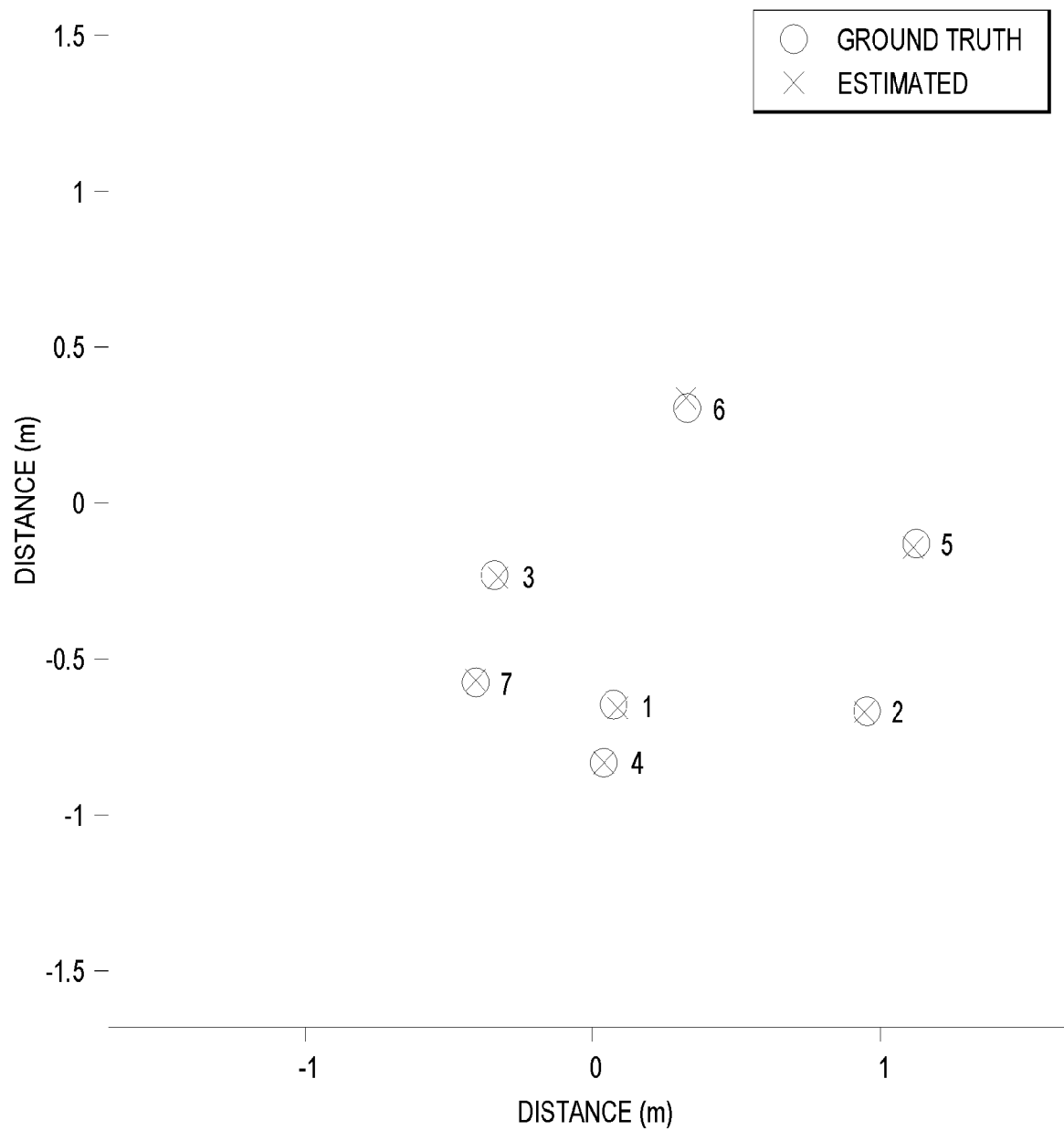
FIG. 28 shows a comparison of estimated and actual audio device locations.

FIG. 28 shows a comparison of estimated and actual audio device locations. In the example shown in FIG. 28, the audio device locations correspond to those that were estimated during the forward and reverse alignment processes that are described above with reference to FIGS. 17 and 19. In these examples, the errors in the DOA estimations had a standard deviation of 15 degrees. Nonetheless, the final estimates of each audio device location (each of which is represented by an "x" in FIG. 28) correspond well with the actual audio device locations (each of which is represented by a circle in FIG. 28).

Much of the foregoing discussion involves audio device auto-location. The following discussion expands upon some methods of determining listener location and listener angular orientation that are described briefly above. In the foregoing description, the term "rotation" is used in essentially the same way as the term "orientation" is used in the following description. For example, the above-referenced "rotation" may refer to a global rotation of the final speaker geometry, not the rotation of the individual triangles during the process that is described above with reference to FIG. 14 et seq. This global rotation or orientation may be resolved with reference to a listener angular orientation, e.g., by the direction in which the listener is looking, by the direction in which the listener's nose is pointing, etc. Various satisfactory methods for estimating listener location are described below.

However, estimating the listener angular orientation can be challenging. Some relevant methods are described in detail below.

Determining listener location and listener angular orientation can enable some desirable features, such as orienting located audio devices relative to the listener. Knowing the listener position and angular orientation allows a determination of, e.g., which speakers within an environment would be in the front, which are in the back, which are near the center (if any), etc., relative to the listener.

After making a correlation between audio device locations and a listener's location and orientation, some implementations may involve providing the audio device location data, the audio device angular orientation data, the listener location data and the listener angular orientation data to an audio rendering system. Alternatively, or additionally, some implementations may involve an audio data rendering process that is based, at least in part, on the audio device location data, the audio device angular orientation data, the listener location data and the listener angular orientation data.

Figure 29:
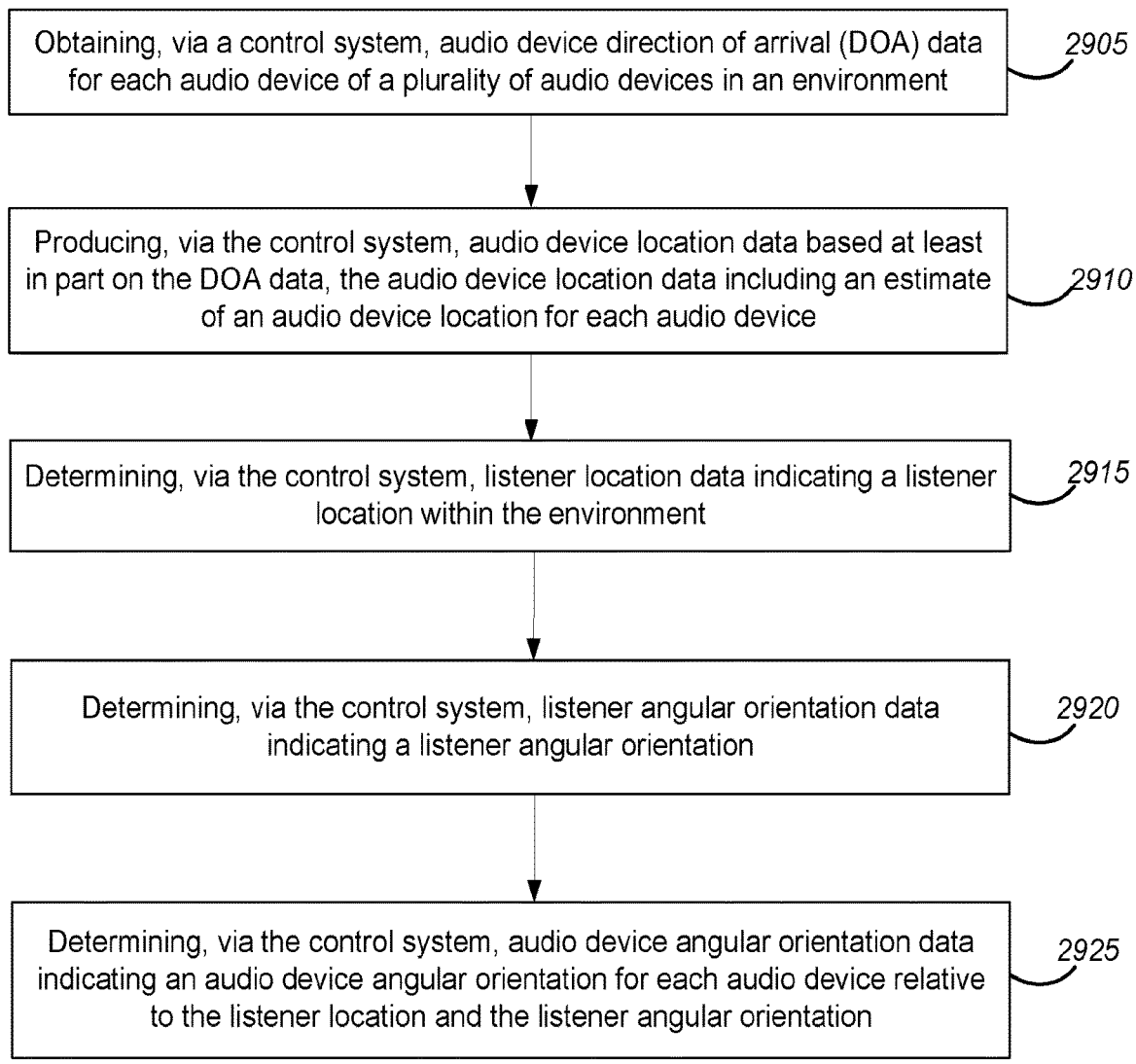
FIG. 29 is a flow diagram that outlines one example of a method that may be performed by an apparatus such as that shown in FIG. 1A.

FIG. 29 is a flow diagram that outlines one example of a method that may be performed by an apparatus such as that shown in FIG. 1A. The blocks of method 2900, like other methods described herein, are not necessarily performed in the order indicated. Moreover, such methods may include more or fewer blocks than shown and/or described. In this example, the blocks of method 2900 are performed by a control system, which may be (or may include) the control system 110 shown in FIG. 1A. As noted above, in some implementations the control system 110 may reside in a single device, whereas in other implementations the control system 110 may reside in two or more devices.

In this example, block 2905 involves obtaining direction of arrival (DOA) data for each audio device of a plurality of audio devices in an environment. In some examples, the plurality of audio devices may include all of the audio devices in an environment, such as all of the audio devices 1905 shown in FIG. 27.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. In some examples, the DOA data may be obtained by controlling each loudspeaker of a plurality of loudspeakers in the environment to reproduce a test signal. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to the example shown in FIG. 29, block 2910 involves producing, via the control system, audio device location data based at least in part on the DOA data. In this example, the audio device location data includes an estimate of an audio device location for each audio device referenced in block 2905.

The audio device location data may, for example, be (or include) coordinates of a coordinate system, such as a Cartesian, spherical or cylindrical coordinate system. The coordinate system may be referred to herein as an audio device coordinate system. In some such examples, the audio device coordinate system may be oriented with reference to one of the audio devices in the environment. In other examples, the audio device coordinate system may be oriented with reference to an axis defined by a line between two of the audio devices in the environment. However, in other examples the audio device coordinate system may be oriented with reference to another part of the environment, such as a television, a wall of a room, etc.

In some examples, block 2910 may involve the processes described above with reference to FIG. 22. According to some such examples, block 2910 may involve determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix. However, in some implementations of method

2900 block 2910 may involve applying methods other than those described above with reference to FIG. 22.

In this example, block 2915 involves determining, via the control system, listener location data indicating a listener location within the environment. The listener location data may, for example, be with reference to the audio device coordinate system. However, in other examples the coordinate system may be oriented with reference to the listener or to a part of the environment, such as a television, a wall of a room, etc.

In some examples, block 2915 may involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, block 2915 may involve a triangulation process. For example, block 2915 may involve triangulating the user's voice by finding the point of intersection between DOA vectors passing through the audio devices, e.g., as described below with reference to FIG. 30A. According to some implementations, block 2915 (or another operation of the method 2900) may involve co-locating the origins of the audio device coordinate system and the listener coordinate system, which is after the listener location is determined. Co-locating the origins of the audio device coordinate system and the listener coordinate system may involve transforming the audio device locations from the audio device coordinate system to the listener coordinate system.

According to this implementation, block 2920 involves determining, via the control system, listener angular orientation data indicating a listener angular orientation. The listener angular orientation data may, for example, be made with reference to a coordinate system that is used to represent the listener location data, such as the audio device coordinate system. In some such examples, the listener angular orientation data may be made with reference to an origin and/or an axis of the audio device coordinate system.

However, in some implementations the listener angular orientation data may be made with reference to an axis defined by the listener location and another point in the environment, such as a television, an audio device, a wall, etc. In some such implementations, the listener location may be used to define the origin of a listener coordinate system. The listener angular orientation data may, in some such examples, be made with reference to an axis of the listener coordinate system.

Various methods for performing block 2920 are disclosed herein. According to some examples, the listener angular orientation may correspond to a listener viewing direction. In some such examples the listener viewing direction may be inferred with reference to the listener location data, e.g., by assuming that the listener is viewing a particular object, such as a television. In some such implementations, the listener viewing direction may be determined according to the listener location and a television location. Alternatively, or additionally, the listener viewing direction may be determined according to the listener location and a television soundbar location.

However, in some examples the listener viewing direction may be determined according to listener input. According to some such examples, the listener input may include inertial sensor data received from a device held by the listener. The listener may use the device to point at location in the environment, e.g., a location corresponding with a direction in which the listener is facing. For example, the listener may use the device to point to a sounding loudspeaker (a loudspeaker that is reproducing a sound). Accordingly, in such examples the inertial sensor data may include inertial sensor data corresponding to the sounding loudspeaker.

In some such instances, the listener input may include an indication of an audio device selected by the listener. The indication of the audio device may, in some examples, include inertial sensor data corresponding to the selected audio device.

However, in other examples the indication of the audio device may be made according to one or more utterances of the listener (e.g., "the television is in front of me now." "speaker 2 is in front of me now," etc.). Other examples of determining listener angular orientation data according to one or more utterances of the listener are described below.

According to the example shown in FIG. 29, block 2925 involves determining, via the control system, audio device angular orientation data indicating an audio device angular orientation for each audio device relative to the listener location and the listener angular orientation. According to some such examples, block 2925 may involve a rotation of audio device coordinates around a point defined by the listener location. In some implementations, block 2925 may involve a transformation of the audio device location data from an audio device coordinate system to a listener coordinate system. Some examples are described below.

Figure 30A:
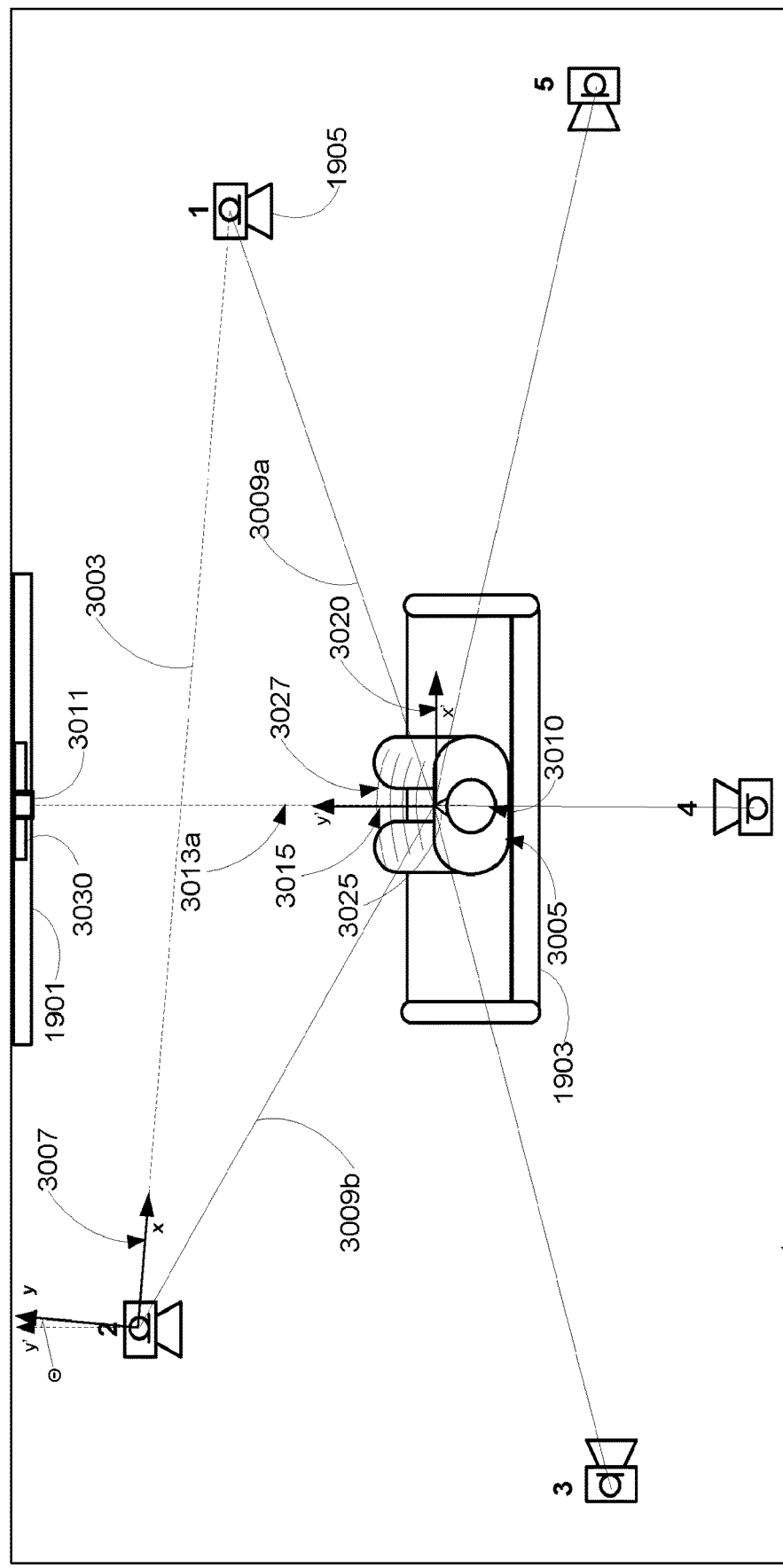
FIG. 30A shows examples of some blocks of FIG. 29.

FIG. 30A shows examples of some blocks of FIG. 29. According to some such examples, the audio device location data includes an estimate of an audio device location for each of audio devices 1-5, with reference to the audio device coordinate system 3007. In this implementation, the audio device coordinate system 3007 is a Cartesian coordinate system having the location of the microphone of audio device 2 as its origin. Here, the x axis of the audio device coordinate system 3007 corresponds with a line 3003 between the location of the microphone of audio device 2 and the location of the microphone of audio device 1.

In this example, this example, the listener location is determined by prompting the listener 3005 who is shown seated on the couch 1903 (e.g., via an audio prompt from one or more loudspeakers in the environment 3000a) to make one or more utterances 3027 and estimating the listener location according to time-of-arrival (TOA) data. The TOA data corresponds to microphone data obtained by a plurality of microphones in the environment. In this example, the microphone data corresponds with detections of the one or more utterances 3027 by the microphones of at least some (e.g., 3, 4 or all 5) of the audio devices 1-5.

Alternatively, or additionally, the listener location according to DOA data provided by the microphones of at least some (e.g., 2, 3, 4 or all 5) of the audio devices 1-5. According to some such examples, the listener location may be determined according to the intersection of lines 3009a, 3009b, etc., corresponding to the DOA data.

According to this example, the listener location corresponds with the origin of the listener coordinate system 3020. In this example, the listener angular orientation data is indicated by the y' axis of the listener coordinate system 3020, which corresponds with a line 3013a between the listener's head 3010 (and/or the listener's nose 3025) and the sound bar 3030 of the television 101. In the example shown in FIG. 30A, the line 3013a is parallel to the y' axis. Therefore, the angle Θ represents the angle between the y axis and the y' axis. In this example, block 2925 of FIG. 29 may involve a rotation by the angle Θ of audio device coordinates around the origin of the listener coordinate system 3020. Accordingly, although the origin of the audio device coordinate system 3007 is shown to correspond with audio device 2 in FIG. 30A, some implementations involve co-locating the origin of the audio device coordinate system 3007 with the origin of the listener coordinate system 3020 prior to the rotation by the angle Θ of audio device coordinates around the origin of the listener coordinate system 3020. This co-location may be performed by a coordinate transformation from the audio device coordinate system 3007 to the listener coordinate system 3020.

The location of the sound bar 3030 and/or the television 1901 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 3030 and/or the television 1901 may be determined by prompting the user to walk up to the TV and locating the user's speech by DOA and/or TOA data, which may correspond detections of the sound by the microphones of at least some (e.g., 3, 4 or all 5) of the audio devices 1-5. Such methods may involve triangulation. Such examples may be beneficial in situations wherein the sound bar 3030 and/or the television 1901 has no associated microphone.

In some other examples wherein the sound bar 3030 and/or the television 1901 does have an associated microphone, the location of the sound bar 3030 and/or the television 1901 may be determined according to TOA or DOA methods, such as the DOA methods disclosed herein. According to some such methods, the microphone may be co-located with the sound bar 3030.

According to some implementations, the sound bar 3030 and/or the television 1901 may have an associated camera 3011. A control system may be configured to capture an image of the listener's head 3010 (and/or the listener's nose 3025). In some such examples, the control system may be configured to determine a line 3013a between the listener's head 3010 (and/or the listener's nose 3025) and the camera 3011. The listener angular orientation data may correspond with the line 3013a. Alternatively, or additionally, the control system may be configured to determine an angle Θ between the line 3013a and the y axis of the audio device coordinate system.

Figure 30B:
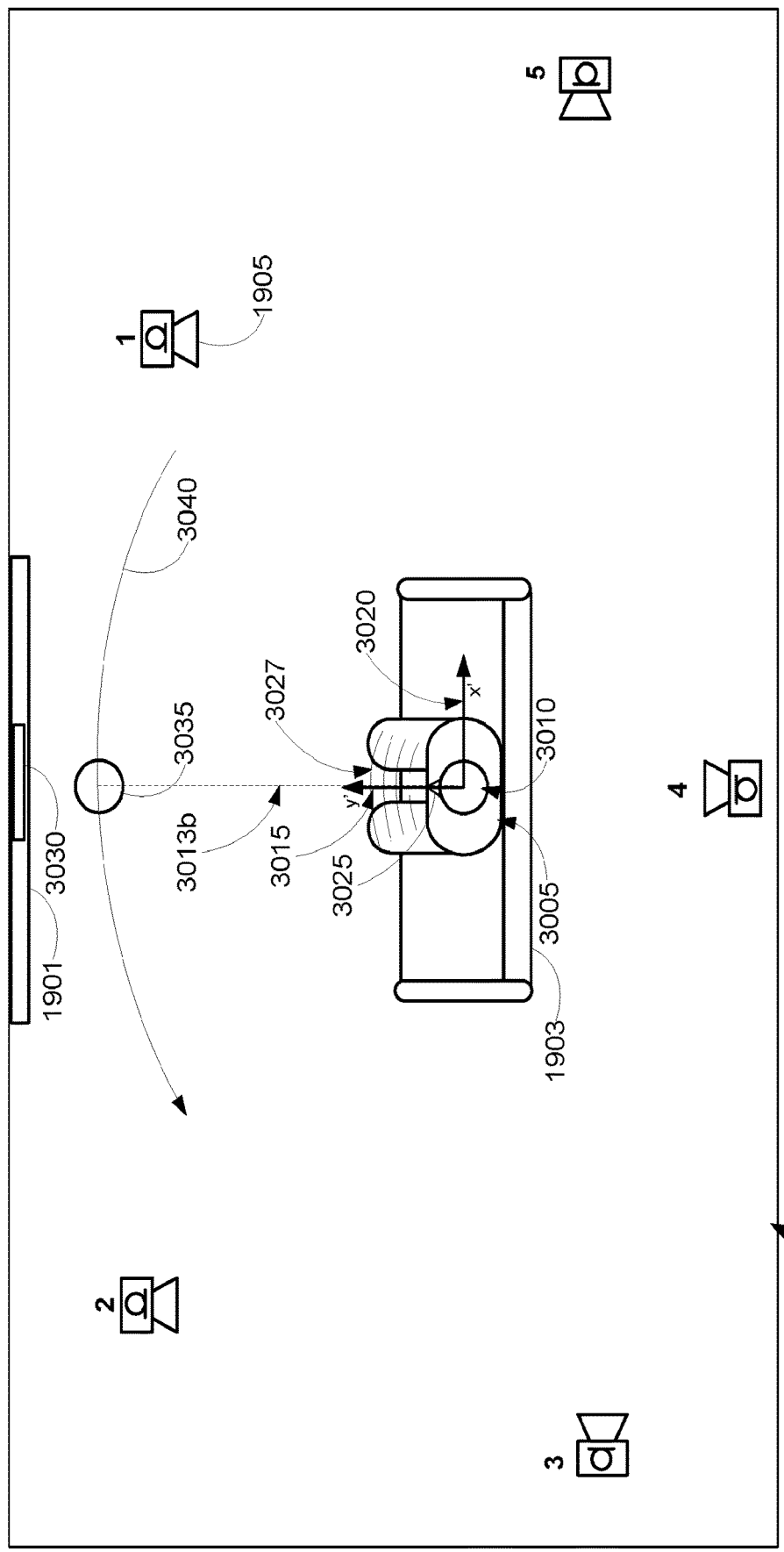
FIG. 30B shows an additional example of determining listener angular orientation data.

FIG. 30B shows an additional example of determining listener angular orientation data. According to this example, the listener location has already been determined in block 2915 of FIG. 29. Here, a control system is controlling loudspeakers of the environment 3000b to render the audio object 3035 to a variety of locations within the environment 3000b. In some such examples, the control system may cause the loudspeakers to render the audio object 3035 such that the audio object 3035 seems to rotate around the listener 3005, e.g., by rendering the audio object 3035 such that the audio object 3035 seems to rotate around the origin of the listener coordinate system 3020. In this example, the curved arrow 3040 shows a portion of the trajectory of the audio object 3035 as it rotates around the listener 3005.

According to some such examples, the listener 3005 may provide user input (e.g., saying "Stop") indicating when the audio object 3035 is in the direction that the listener 3005 is facing. In some such examples, the control system may be configured to determine a line 3013b between the listener location and the location of the audio object 3035. In this example, the line 3013b corresponds with the y' axis of the listener coordinate system, which indicates the direction that the listener 3005 is facing. In alternative implementations, the listener 3005 may provide user input indicating when the audio object 3035 is in the front of the environment, at a TV location of the environment, at an audio device location, etc.

Figure 30C:
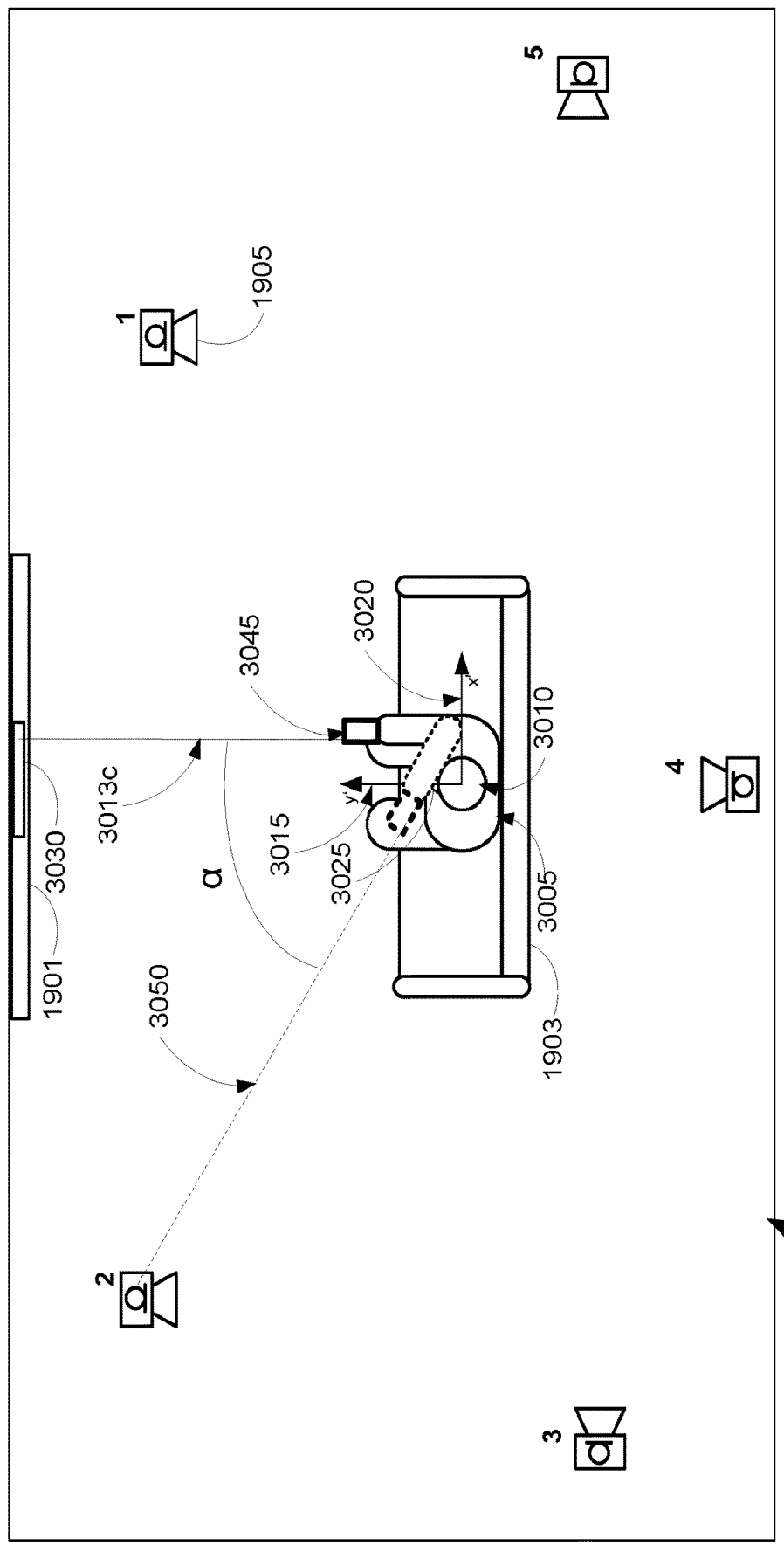
FIG. 30C shows an additional example of determining listener angular orientation data.

FIG. 30C shows an additional example of determining listener angular orientation data. According to this example, the listener location has already been determined in block 2915 of FIG. 29. Here, the listener 3005 is using a handheld device 3045 to provide input regarding a viewing direction of the listener 3005, by pointing the handheld device 3045 towards the television 1901 or the soundbar 3030. The dashed outline of the handheld device 3045 and the listener's arm indicate that at a time prior to the time at which the listener 3005 was pointing the handheld device 3045 towards the television 1901 or the soundbar 3030, the listener 3005 was pointing the handheld device 3045 towards audio device 2 in this example. In other examples, the listener 3005 may have pointed the handheld device 3045 towards another audio device, such as audio device 1. According to this example, the handheld device 3045 is configured to determine an angle α between audio device 2 and the television 1901 or the soundbar 3030, which approximates the angle between audio device 2 and the viewing direction of the listener 3005.

The handheld device 3045 may, in some examples, be a cellular telephone that includes an inertial sensor system and a wireless interface configured for communicating with a control system that is controlling the audio devices of the environment 3000c. In some examples, the handheld device 3045 may be running an application or "app" that is configured to control the handheld device 3045 to perform the necessary functionality, e.g., by providing user prompts (e.g., via a graphical user interface), by receiving input indicating that the handheld device 3045 is pointing in a desired direction, by saving the corresponding inertial sensor data and/or transmitting the corresponding inertial sensor data to the control system that is controlling the audio devices of the environment 3000c, etc.

According to this example, a control system (which may be a control system of the handheld device 3045 or a control system that is controlling the audio devices of the environment 3000c) is configured to determine the orientation of lines 3013c and 3050 according to the inertial sensor data, e.g., according to gyroscope data. In this example, the line 3013c is parallel to the axis y' and may be used to determine the listener angular orientation. According to some examples, a control system may determine an appropriate rotation for the audio device coordinates around the origin of the listener coordinate system 3020 according to the angle α between audio device 2 and the viewing direction of the listener 3005.

Figure 30D:
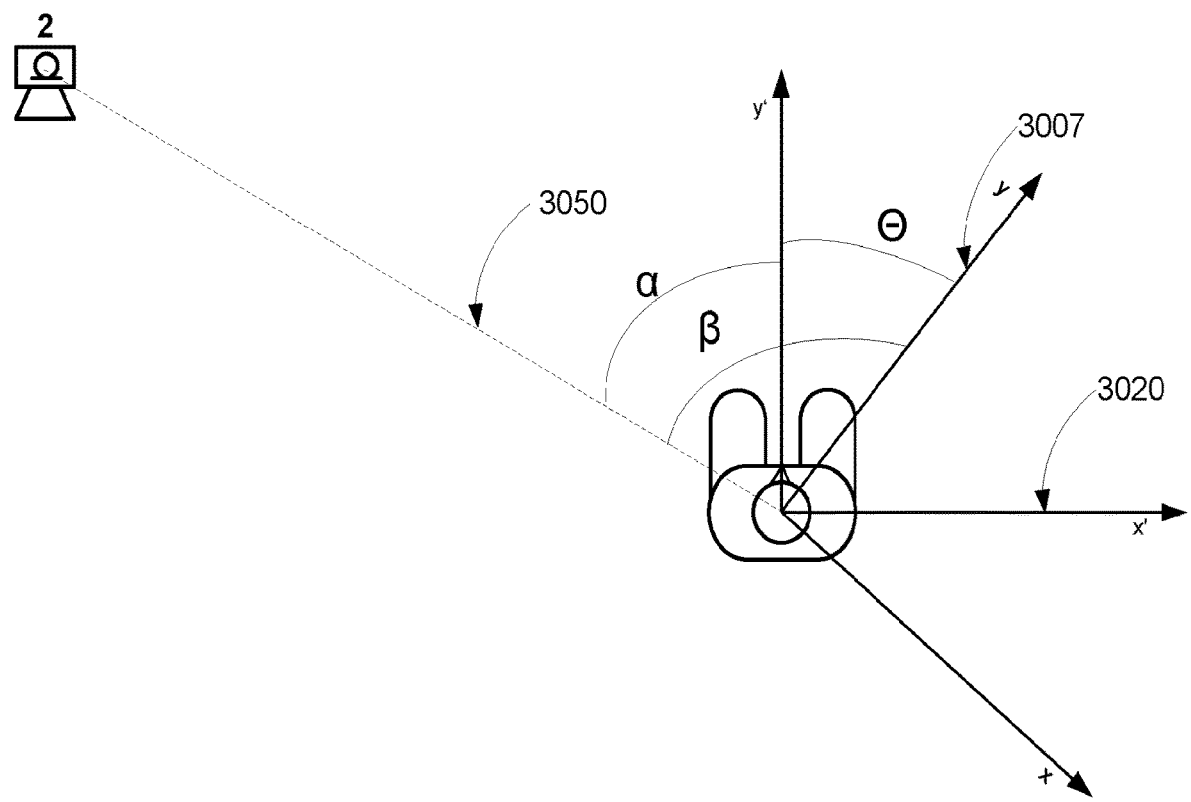
FIG. 30D shows an example of determining an appropriate rotation for the audio device coordinates in accordance with the method described with reference to FIG. 30C.

FIG. 30D shows an example of determining an appropriate rotation for the audio device coordinates in accordance with the method described with reference to FIG. 30C. In this example, the origin of the audio device coordinate system 3007 is co-located with the origin of the listener coordinate system 3020. Co-locating the origins of the audio device coordinate system 3007 and the listener coordinate system 3020 is made possible after the process of 2915, wherein the listener location is determined. Co-locating the origins of the audio device coordinate system 3007 and the listener coordinate system 3020 may involve transforming the audio device locations from the audio device coordinate system 3007 to the listener coordinate system 3020. The angle α has been determined as described above with reference to FIG. 30C. Accordingly, the angle α corresponds with the desired orientation of the audio device 2 in the listener coordinate system 3020. In this example, the angle β corresponds with the orientation of the audio device 2 in the audio device coordinate system 3007. The angle Θ, which is β−α in this example, indicates the necessary rotation to align the y axis of the of the audio device coordinate system 3007 with the y' axis of the listener coordinate system 3020.

In some implementations, the method of FIG. 29 may involve controlling at least one of the audio devices in the environment based at least in part on a corresponding audio device location, a corresponding audio device angular orientation, the listener location data and the listener angular orientation data.

For example, some implementations may involve providing the audio device location data, the audio device angular orientation data, the listener location data and the listener angular orientation data to an audio rendering system. In some examples, the audio rendering system may be implemented by a control system, such as the control system 110 of FIG. 1A. Some implementations may involve controlling an audio data rendering process based, at least in part, on the audio device location data, the audio device angular orientation data, the listener location data and the listener angular orientation data. Some such implementations may involve providing loudspeaker acoustic capability data to the rendering system. The loudspeaker acoustic capability data may correspond to one or more loudspeakers of the environment. The loudspeaker acoustic capability data may indicate an orientation of one or more drivers, a number of drivers or a driver frequency response of one or more drivers. In some examples, the loudspeaker acoustic capability data may be retrieved from a memory and then provided to the rendering system.

A class of embodiments involve methods for rendering audio for playback, and/or playback of the audio, by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices. Many interactions with the system are contemplated which require dynamic modifications to the rendering and/or playback. Such modifications may be, but are not necessarily, focused on spatial fidelity.

In the context of performing rendering (or rendering and playback) of a spatial audio mix (e.g., rendering of a stream of audio or multiple streams of audio) for playback by the smart audio devices of a set of smart audio devices (or by another set of speakers), the types of speakers (e.g., in, or coupled to, smart audio devices) might be varied, and the corresponding acoustics capabilities of the speakers might therefore vary quite significantly. In one example of the audio environment that is shown in FIG. 3A, the loudspeakers 305d, 305f and 305h may be smart speakers with a single 0.6-inch speaker. In this example, loudspeakers 305b, 305c, 305e and 305f may be smart speakers having a 2.5-inch woofer and a 0.8-inch tweeter. According to this example, the loudspeaker 305g may be a smart speaker with a 5.25-inch woofer, three 2-inch midrange speakers and a 1.0-inch tweeter. Here, the loudspeaker 305a may be a sound bar having sixteen 1.1-inch beam drivers and two 4-inch woofers. Accordingly, the low-frequency capability of smart speakers 305d and 305f would be significantly less than that of the other loudspeakers in the environment 200, particular those having 4-inch or 5.25-inch woofers.

Figure 31:
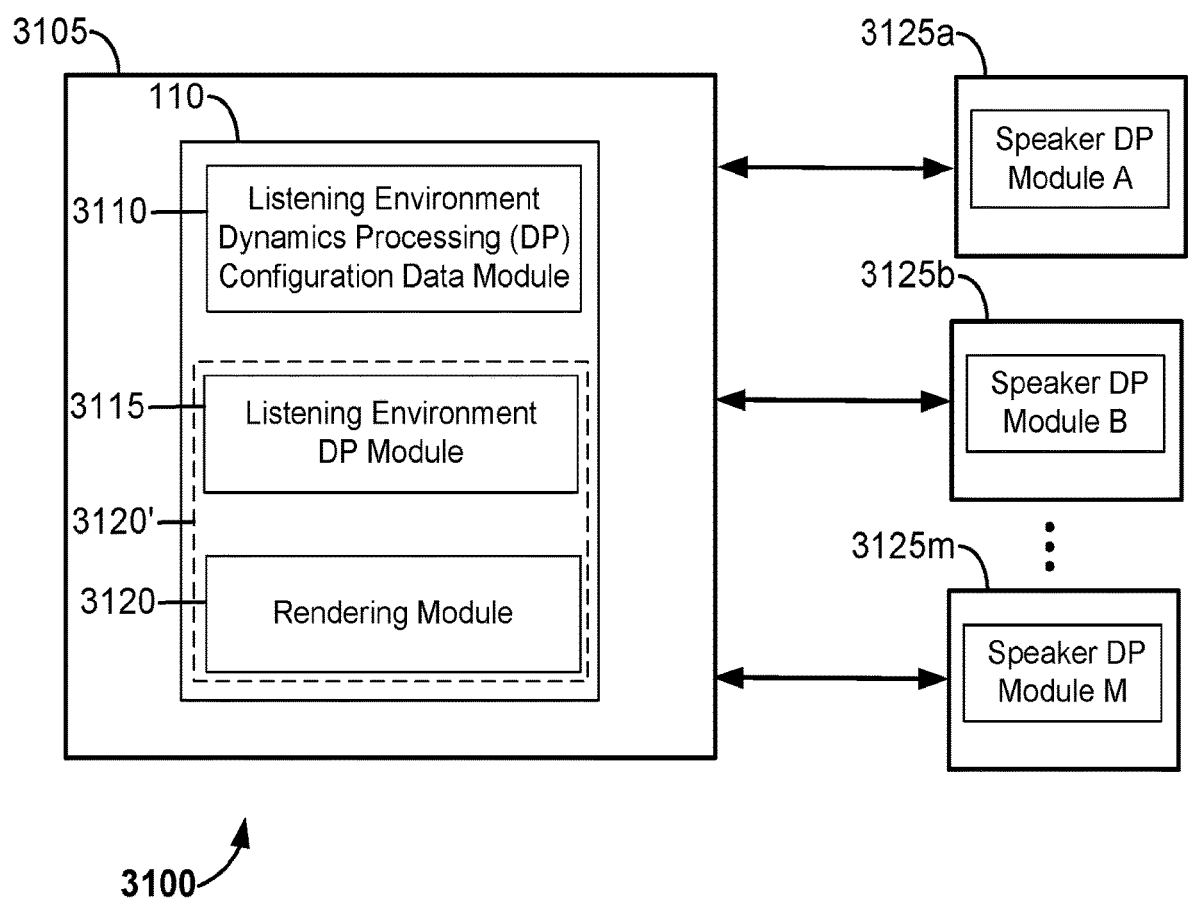
FIG. 31 is a block diagram that shows examples of components of a system capable of implementing various aspects of this disclosure.

FIG. 31 is a block diagram that shows examples of components of a system capable of implementing various aspects of this disclosure. As with other figures provided herein, the types and numbers of elements shown in FIG. 31 are merely provided by way of example. Other implementations may include more, fewer and/or different types and numbers of elements.

According to this example, the system 3100 includes a smart home hub 3105 and loudspeakers 3125a through 3125m. In this example, the smart home hub 3105 includes an instance of the control system 110 that is shown in FIG. 1A and described above. According to this implementation, the control system 110 includes a listening environment dynamics processing configuration data module 3110, a listening environment dynamics processing module 3115 and a rendering module 3120. Some examples of the listening environment dynamics processing configuration data module 3110, the listening environment dynamics processing module 3115 and the rendering module 3120 are described below. In some examples, a rendering module 3120' may be configured for both rendering and listening environment dynamics processing.

As suggested by the arrows between the smart home hub 3105 and the loudspeakers 3125a through 3125m, the smart home hub 3105 also includes an instance of the interface system 105 that is shown in FIG. 1A and described above. According to some examples, the smart home hub 3105 may be part of the environment 300 shown in FIG. 3A. In some instances, the smart home hub 3105 may be implemented by a smart speaker, a smart television, a cellular telephone, a laptop, etc. In some implementations, the smart home hub 3105 may be implemented by software, e.g., via software of a downloadable software application or "app." In some instances, the smart home hub 3105 may be implemented in each of the loudspeakers 3125a-m, all operating in parallel to generate the same processed audio signals from module 3120. According to some such examples, in each of the loudspeakers the rendering module 3120 may then generate one or more speaker feeds relevant to each loudspeaker, or group of loudspeakers, and may provide these speaker feeds to each speaker dynamics processing module.

In some instances, the loudspeakers 3125a through 3125m may include the loudspeakers 305a through 305h of FIG. 3A, whereas in other examples the loudspeakers 3125a through 3125m may be, or may include other loudspeakers. Accordingly, in this example the system 3100 includes M loudspeakers, where M is an integer greater than 2.

Smart speakers, as well as many other powered speakers, typically employ some type of internal dynamics processing to prevent the speakers from distorting. Often associated with such dynamics processing are signal limit thresholds (e.g., limit thresholds, which are variable across frequency), below which the signal level is dynamically held. For example, Dolby's Audio Regulator, one of several algorithms in the Dolby Audio Processing (DAP) audio post-processing suite, provides such processing. In some instances, but not typically via a smart speaker's dynamics processing module, dynamics processing also may involve applying one or more compressors, gates, expanders, duckers, etc.

Accordingly, in this example each of the loudspeakers 3125a through 3125m includes a corresponding speaker dynamics processing (DP) module A through M. The speaker dynamics processing modules are configured to apply individual loudspeaker dynamics processing configuration data for each individual loudspeaker of a listening environment. The speaker DP module A, for example, is configured to apply individual loudspeaker dynamics processing configuration data that is appropriate for the loudspeaker 3125a. In some examples, the individual loudspeaker dynamics processing configuration data may correspond with one or more capabilities of the individual loudspeaker, such as the loudspeaker's ability to reproduce audio data within a particular frequency range and at a particular level without appreciable distortion.

When spatial audio is rendered across a set of heterogeneous speakers (e.g., speakers of, or coupled to, smart audio devices), each with potentially different playback limits, care must be taken in performing dynamics processing on the overall mix. A simple solution is to render the spatial mix to speaker feeds for each of the participating speakers and then allow the dynamics processing module associated with each speaker to operate independently on its corresponding speaker feed, according to the limits of that speaker.

While this approach will keep each speaker from distorting, it may dynamically shift the spatial balance of the mix in a perceptually distracting manner. For example, referring to FIG. 3A, suppose that a television program is being shown on the television 330 and that corresponding audio is being reproduced by the loudspeakers of the environment 300. Suppose that during the television program, audio associated with a stationary object (such as a unit of heavy machinery in a factory) is intended to be rendered to particular position in the environment 300. Suppose further that a dynamics processing module associated with the loudspeaker 305d reduces the level for audio in the bass range substantially more than a dynamics processing module associated with the loudspeaker 305b does, because of the substantially greater capability of the loudspeaker 305b to reproduce sounds in the bass range. If the volume of a signal associated with the stationary object fluctuates, when the volume is higher the dynamics processing module associated with the loudspeaker 305d will cause the level for audio in the bass range to be reduced substantially more than the level for the same audio will be reduced by the dynamics processing module associated with the loudspeaker 305b. This difference in level will cause the apparent location of the stationary object to change. An improved solution is therefore needed.

Some embodiments of the present disclosure are systems and methods for rendering (or rendering and playback) of a spatial audio mix (e.g., rendering of a stream of audio or multiple streams of audio) for playback by at least one (e.g., all or some) of the smart audio devices of a set of smart audio devices (e.g., a set of coordinated smart audio devices), and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds). Examples of such embodiments include the following:

Systems and methods for audio processing may include rendering audio (e.g., rendering a spatial audio mix, for example by rendering a stream of audio or multiple streams of audio) for playback by at least two speakers (e.g., all or some of the speakers of a set of speakers), including by:

(a) combining individual loudspeaker dynamics processing configuration data (such as limit thresholds (playback limit thresholds) of the individual loudspeakers, thereby determining listening environment dynamics processing configuration data for the plurality of loudspeakers (such as combined thresholds);

(b) performing dynamics processing on the audio (e.g., the stream(s) of audio indicative of a spatial audio mix) using the listening environment dynamics processing configuration data for the plurality of loudspeakers (e.g., the combined thresholds) to generate processed audio; and (c) rendering the processed audio to speaker feeds.

According to some implementations, process (a) may be performed by a module such as the listening environment dynamics processing configuration data module 3110 shown in FIG. 31. The smart home hub 3105 may be configured for obtaining, via an interface system, individual loudspeaker dynamics processing configuration data for each of the M loudspeakers. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data. In some examples, the smart home hub 3105 may be configured for obtaining the individual loudspeaker dynamics processing configuration data sets by querying each of the loudspeakers 3125a-3125m. In other implementations, the smart home hub 3105 may be configured for obtaining the individual loudspeaker dynamics processing configuration data sets by querying a data structure of previously-obtained individual loudspeaker dynamics processing configuration data sets that are stored in a memory.

In some examples, process (b) may be performed by a module such as the listening environment dynamics processing module 3115 of FIG. 31. Some detailed examples of processes (a) and (b) are described below.

In some examples, the rendering of process (c) may be performed by a module such as the rendering module 3120 or the rendering module 3120' of FIG. 31. In some embodiments, the audio processing may involve:

(d) performing dynamics processing on the rendered audio signals according to the individual loudspeaker dynamics processing configuration data for each loudspeaker (e.g., limiting the speaker feeds according to the playback limit thresholds associated with the corresponding speakers, thereby generating limited speaker feeds). Process (d) may, for example, be performed by the dynamics processing modules A through M shown in FIG. 31.

The speakers may include speakers of (or coupled to) at least one (e.g., all or some) of the smart audio devices of a set of smart audio devices. In some implementations, to generate the limited speaker feeds in step (d), the speaker feeds generated in step (c) may be processed by a second stage of dynamics processing (e.g., by each speaker's associated dynamics processing system), e.g., to generate the speaker feeds prior to their final playback over the speakers. For example, the speaker feeds (or a subset or portion thereof) may be provided to a dynamics processing system of each different one of the speakers (e.g., a dynamics processing subsystem of a smart audio device, where the smart audio device includes or is coupled to the relevant one of the speakers), and the processed audio output from each said dynamics processing system may be used to generate a speaker feed for the relevant one of the speakers. Following the speaker-specific dynamics processing (in other words, the independently performed dynamics processing for each of the speakers), the processed (e.g., dynamically limited) speaker feeds may be used to drive the speakers to cause playback of sound.

The first stage of dynamics processing (in step (b)) may be designed to reduce a perceptually distracting shift in spatial balance which would otherwise result if steps (a) and (b) were omitted, and the dynamics processed (e.g., limited) speaker feeds resulting from step (d) were generated in response to the original audio (rather than in response to the processed audio generated in step (b)). This may prevent an undesirable shift in the spatial balance of a mix. The second stage of dynamics processing operating on rendered speaker feeds from step (c) may be designed to ensure that no speaker distorts, because the dynamics processing of step (b) may not necessarily guarantee that signal levels have been reduced below the thresholds of all speakers. The combining of individual loudspeaker dynamics processing configuration data (e.g., the combination of thresholds in the first stage (step (a)) may, in some examples, involve (e.g., include) a step of averaging the individual loudspeaker dynamics processing configuration data (e.g., the limit thresholds) across the speakers (e.g., across smart audio devices), or taking the minimum of the individual loudspeaker dynamics processing configuration data (e.g., the limit thresholds) across the speakers (e.g., across smart audio devices).

In some implementations, when the first stage of dynamics processing (in step (b)) operates on audio indicative of a spatial mix (e.g., audio of an object-based audio program, including at least one object channel and optionally also at least one speaker channel), this first stage may be implemented according to a technique for audio object processing through use of spatial zones. In such a case, the combined individual loudspeaker dynamics processing configuration data (e.g., combined limit thresholds) associated with each of the zones may be derived by (or as) a weighted average of individual loudspeaker dynamics processing configuration data (e.g., individual speaker limit thresholds), and this weighting may be given or determined, at least in part, by each speaker's spatial proximity to and/or position within, the zone.

In an example embodiment we assume a plurality of M speakers (M≥2), where each speaker is indexed by the variable i. Associated with each speaker i is a set of frequency varying playback limit thresholds $T_i[f]$, where the variable f represents an index into a finite set of frequencies at which the thresholds are specified. (Note that if the size of the set of frequencies is one then the corresponding single threshold may be considered broadband, applied across the entire frequency range). These thresholds are utilized by each speaker in its own independent dynamics processing function to limit the audio signal below the thresholds $T_i[f]$ for a particular purpose such as preventing the speaker from distorting or preventing the speaker from playing beyond some level deemed objectionable in its vicinity.

Figure 32A:
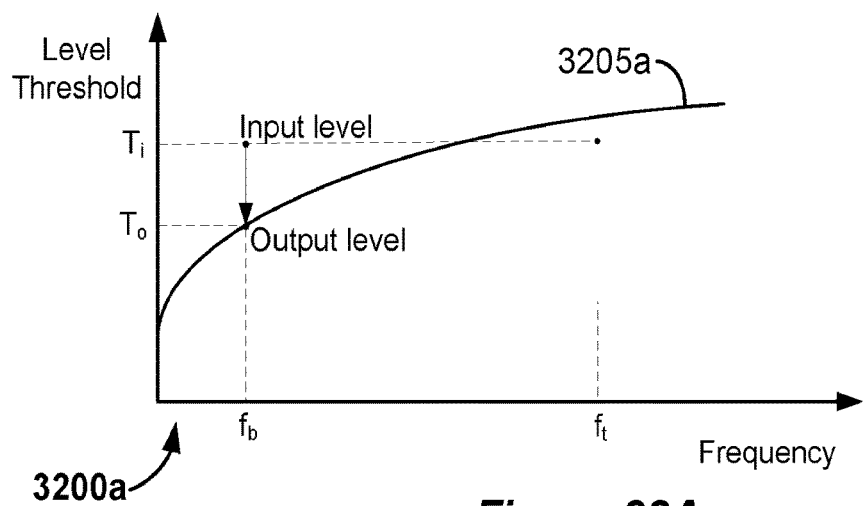
FIGS. 32A, 32B and 32C show examples of playback limit thresholds and corresponding frequencies.
Figure 32B:
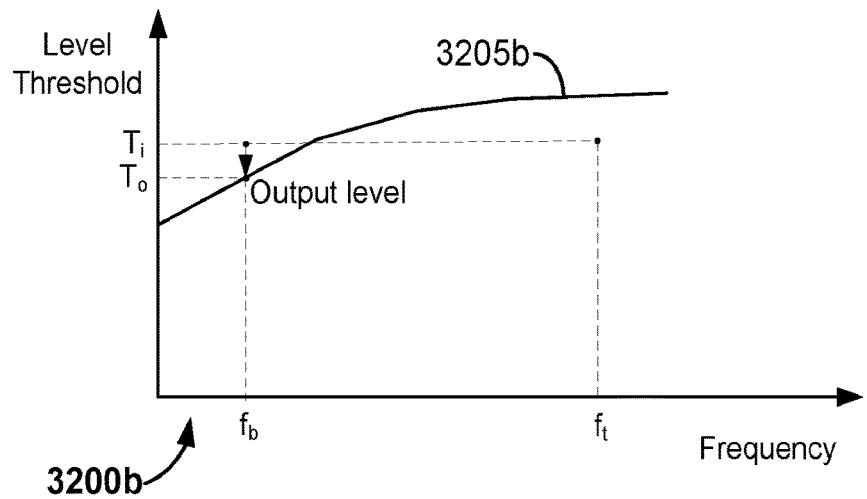
Figure 32C:
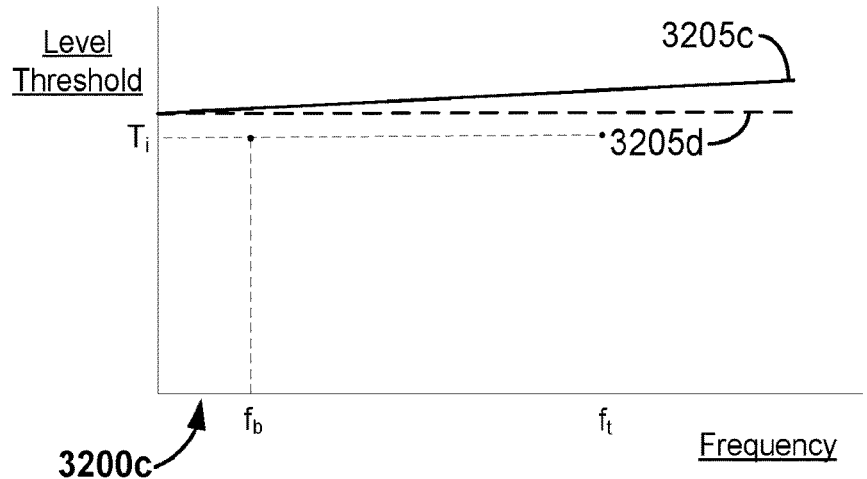

FIGS. 32A, 32B and 32C show examples of playback limit thresholds and corresponding frequencies. The range of frequencies shown may, for example, span the range of frequencies that are audible to the average human being (e.g., 20 Hz to 20 kHz). In these examples, the playback limit thresholds are indicated by the vertical axes of the graphs 3200a, 3200b and 3200c, which are labeled "Level Threshold" in these examples. The playback limit/level thresholds increase in the direction of the arrows on the vertical axes. The playback limit/level thresholds may, for example, be expressed in decibels. In these examples, the horizontal axes of the graphs 3200a, 3200b and 3200c indicate frequencies, which increase in the direction of the arrows on the horizontal axes. The playback limit thresholds indicated by the curves 3200a, 3200b and 3200c may, for example, be implemented by dynamics processing modules of individual loudspeakers.

The graph 3200a of FIG. 32A shows a first example of playback limit threshold as a function of frequency. The curve 3205a indicates the playback limit threshold for each corresponding frequency value. In this example, at a bass frequency $f_b$, input audio that is received at an input level $T_i$ will be output by a dynamics processing module at an output level $T_o$. The bass frequency $f_b$ may, for example, be in the range of 60 to 250 Hz. However, in this example, at a treble frequency $f_t$, input audio that is received at an input level $T_i$ will be output by a dynamics processing module at the same level, input level $T_i$. The treble frequency $f_t$ may, for example, be in the range above 1280 Hz. Accordingly, in this example the curve 3205a corresponds to a dynamics processing module that applies a significantly lower threshold for bass frequencies than for treble frequencies. Such a dynamics processing module may be appropriate for a loudspeaker that has no woofer (e.g., the loudspeaker 305d of FIG. 3A).

The graph 3200b of FIG. 32B shows a second example of playback limit threshold as a function of frequency. The curve 3205b indicates that at the same bass frequency $f_b$ shown in FIG. 32A, input audio that is received at an input level $T_i$ will be output by a dynamics processing module at a higher output level $T_o$. Accordingly, in this example the curve 3205b corresponds to a dynamics processing module that does not apply as low a threshold for bass frequencies than the curve 3205a. Such a dynamics processing module may be appropriate for a loudspeaker that has at least a small woofer (e.g., the loudspeaker 305b of FIG. 3A).

The graph 3200c of FIG. 32C shows a second example of playback limit threshold as a function of frequency. The curve 3205c (which is a straight line in this example) indicates that at the same bass frequency $f_b$ shown in FIG. 32A, input audio that is received at an input level $T_i$ will be output by a dynamics processing module at the same level. Accordingly, in this example the curve 3205c corresponds to a dynamics processing module that may be appropriate for a loudspeaker that is capable of reproducing a wide range of frequencies, including bass frequencies. One will observe that, for the sake of simplicity, a dynamics processing module could approximate the curve 3205c by implementing the curve 3205d, which applies the same threshold for all frequencies indicated.

A spatial audio mix may be rendered for the plurality of speakers using a known rendering system such as Center of Mass Amplitude Panning (CMAP) or Flexible Virtualization (FV). From the constituent components of a spatial audio mix, the rendering system generates speaker feeds, one for each of the plurality of speakers. In some previous examples, the speaker feeds were then processed independently by each speaker's associated dynamics processing function with thresholds $T_i[f]$. Without the benefits of the present disclosure, this described rendering scenario may result in distracting shifts in the perceived spatial balance of the rendered spatial audio mix. For example, one of the M speakers, say on the right-hand side of the listening area, may be much less capable than the others (e.g., of rendering audio in the bass range) and therefore the thresholds $T_i[f]$ for that speaker may be significantly lower than those of the other speakers, at least in a particular frequency range. During playback, this speaker's dynamics processing module will be lowering the level of components of the spatial mix on the right-hand side significantly more than components on the left-hand side. Listeners are extremely sensitive to such dynamic shifts between the left/right balance of a spatial mix and may find the results very distracting.

To deal with this issue, in some examples the individual loudspeaker dynamics processing configuration data (e.g., the playback limit thresholds) of the individual speakers of a listening environment are combined to create listening environment dynamics processing configuration data for all loudspeakers of the listening environment. The listening environment dynamics processing configuration data may then be utilized to first perform dynamics processing in the context of the entire spatial audio mix prior to its rendering to speaker feeds. Because this first stage of dynamics processing has access to the entire spatial mix, as opposed to just one independent speaker feed, the processing may be performed in ways that do not impart distracting shifts to the perceived spatial balance of the mix. The individual loudspeaker dynamics processing configuration data (e.g., the playback limit thresholds) may be combined in a manner that eliminates or reduces the amount of dynamics processing that is performed by any of the individual speaker's independent dynamics processing functions.

In one example of determining the listening environment dynamics processing configuration data, the individual loudspeaker dynamics processing configuration data (e.g., the playback limit thresholds) for the individual speakers may be combined into a single set of listening environment dynamics processing configuration data (e.g., frequency-varying playback limit thresholds $T[f]$) that are applied to all components of the spatial mix in the first stage of dynamics processing. According to some such examples, because the limiting is the same on all components, the spatial balance of the mix may be maintained. One way to combine the individual loudspeaker dynamics processing configuration data (e.g., the playback limit thresholds) is to take minimum across all speakers i:

$$T[f] = \min_i(T_i[f]) \quad \text{Equation (30)}$$

Such a combination essentially eliminates the operation of each speaker's individual dynamics processing because the spatial mix is first limited below the threshold of the least capable speaker at every frequency. However, such a strategy may be overly aggressive. Many speakers may be playing back at a level lower than they are capable, and the combined playback level of all the speakers may be objectionably low. For example, if the thresholds in the bass range shown in FIG. 32A were applied to the loudspeaker corresponding to the thresholds for FIG. 32C, the playback level of the latter speaker would be unnecessarily low in the bass range. An alternative combination of determining the listening environment dynamics processing configuration data is to take the mean (average) of individual loudspeaker dynamics processing configuration data across all speakers of the listening environment. For example, in the context of playback limit thresholds, the mean may be determined as follows:

$$T[f] = \text{mean}_i(T_i[f]) \quad \text{Equation (31)}$$

For this combination, overall playback level may increase in comparison to taking the minimum because the first stage of dynamics processing limits to a higher level, thereby allowing the more capable speakers to play back more loudly. For speakers whose individual limit thresholds fall below the mean, their independent dynamics processing functions may still limit their associated speaker feed if necessary. However, the first stage of dynamics processing will likely have reduced the requirements of this limiting since some initial limiting has been performed on the spatial mix.

According to some examples of determining the listening environment dynamics processing configuration data, one may create a tunable combination that interpolates between the minimum and the mean of the individual loudspeaker dynamics processing configuration data through a tuning parameter a. For example, in the context of playback limit thresholds, the interpolation may be determined as follows:

$$T[f] = \alpha \, \text{mean}_i(T_i[f]) + (1-\alpha)\min_i(T_i[f]) \quad \text{Equation (32)}$$

Other combinations of individual loudspeaker dynamics processing configuration data are possible, and the present disclosure is meant to cover all such combinations.

Figure 33A:
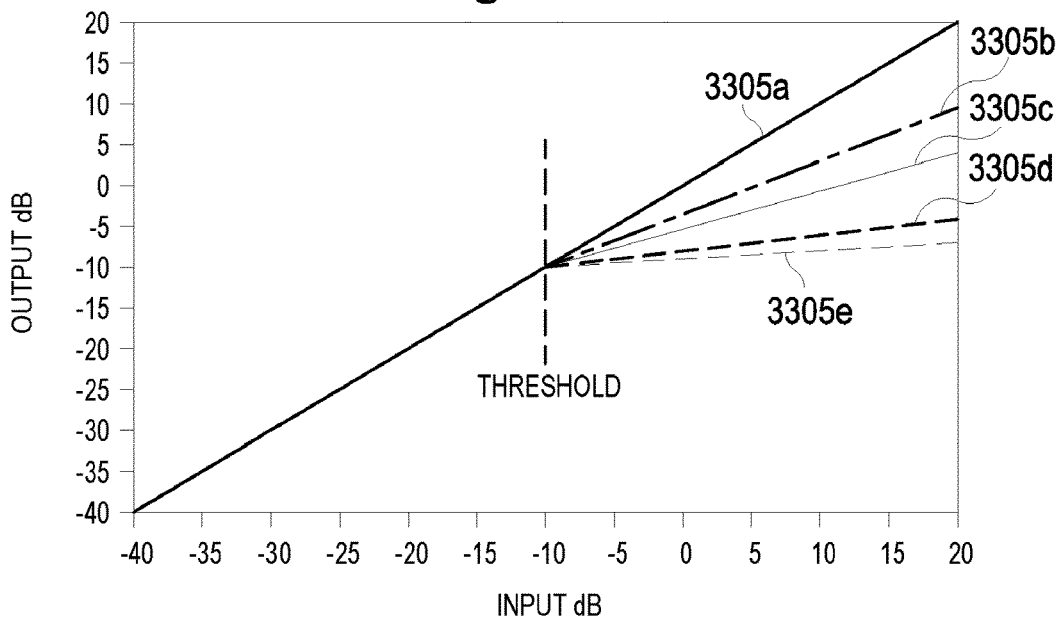
FIGS. 33A and 33B are graphs that show examples of dynamic range compression data.
Figure 33B:
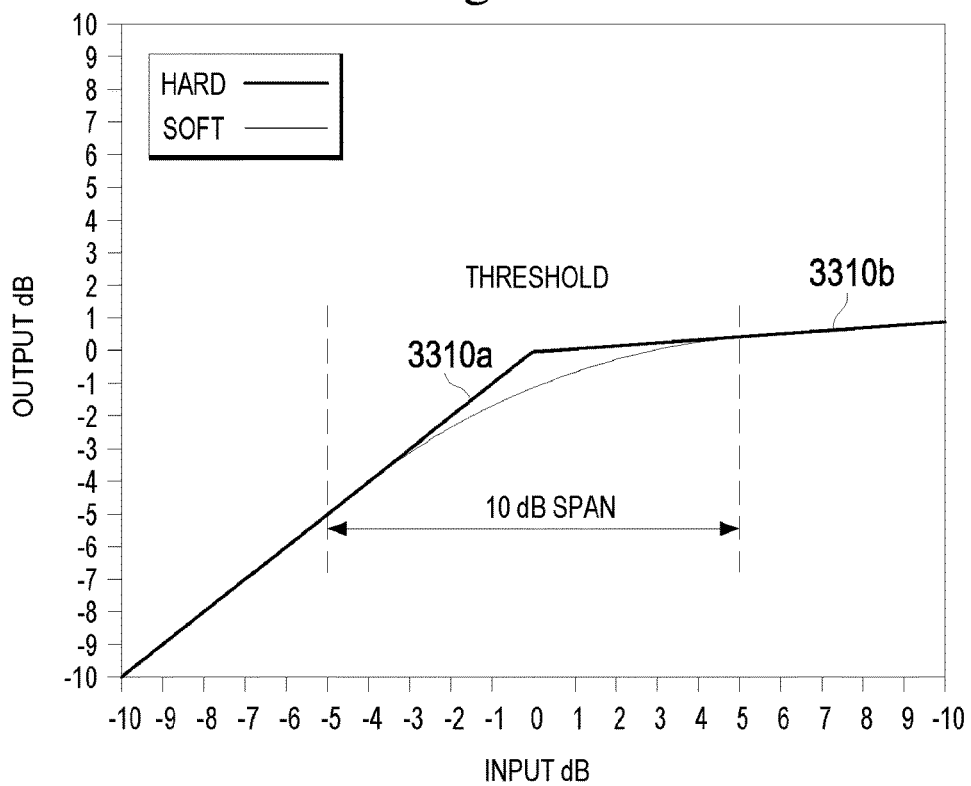

FIGS. 33A and 33B are graphs that show examples of dynamic range compression data. In graphs 3300a and 3300b, the input signal levels, in decibels, are shown on the horizontal axes and the output signal levels, in decibels, are shown on the vertical axes. As with other disclosed examples, the particular thresholds, ratios and other values are merely shown by way of example and are not limiting.

In the example shown in FIG. 33A, the output signal level is equal to the input signal level below the threshold, which is −10 dB in this example. Other examples may involve different thresholds, e.g., −20 dB, −18 dB, −16 dB, −14 dB, −12 dB, −8 dB, −6 dB, −4 dB, −2 dB, 0 dB, 2 dB, 4 dB, 6 dB, etc. Above the threshold, various examples of compression ratios are shown. An N:1 ratio means that above the threshold, the output signal level will increase by 1 dB for every N dB increase in the input signal. For example, a 10:1 compression ratio (line 3305e) means that above the threshold, the output signal level will increase by only 1 dB for every 10 dB increase in the input signal. A 1:1 compression ratio (line 3305a) means that the output signal level is still equal to the input signal level, even above the threshold. Lines 3305b, 3305c, and 3305d correspond to 3:2, 2:1 and 5:1 compression ratios. Other implementations may provide different compression ratios, such as 2.5:1, 3:1, 3.5:1, 4:3, 4:1, etc.

FIG. 33B shows examples of "knees," which control how the compression ratio changes at or near the threshold, which is 0 dB in this example. According to this example, the compression curve having a "hard" knee is composed of two straight line segments, line segment 3310a up to the threshold and line segment 3310b above the threshold. A hard knee can be simpler to implement, but may cause artifacts.

In FIG. 33B, one example of a "soft" knee is also shown. In this example, the soft knee spans 10 dB. According to this implementation, above and below the 10 dB span, the compression ratios of the compression curve having the soft knee are the same as those of the compression curve having the hard knee. Other implementations may provide various other shapes of "soft" knees, which may span more or fewer decibels, may indicate a different compression ratio above the span, etc.

Other types of dynamic range compression data may include "attack" data and "release" data. The attack is a period during which the compressor is decreasing gain, e.g., in response to increased level at the input, to reach the gain determined by the compression ratio. Attack times for compressors generally range between 25 milliseconds and 500 milliseconds, though other attack times are feasible. The release is a period during which the compressor is increasing gain, e.g., in response to reduced level at the input, to reach the output gain determined by the compression ratio (or to the input level if the input level has fallen below the threshold). A release time may, for example, be in the range of 25 milliseconds to 2 seconds.

Accordingly, in some examples the individual loudspeaker dynamics processing configuration data may include, for each loudspeaker of the plurality of loudspeakers, a dynamic range compression data set. The dynamic range compression data set may include threshold data, input/output ratio data, attack data, release data and/or knee data. One or more of these types of individual loudspeaker dynamics processing configuration data may be combined to determine the listening environment dynamics processing configuration data. As noted above with reference to combining playback limit thresholds, the dynamic range compression data may be averaged to determine the listening environment dynamics processing configuration data in some examples. In some instances, a minimum or maximum value of the dynamic range compression data may be used to determine the listening environment dynamics processing configuration data (e.g., the maximum compression ratio). In other implementations, one may create a tunable combination that interpolates between the minimum and the mean of the dynamic range compression data for individual loudspeaker dynamics processing, e.g., via a tuning parameter such as described above with reference to Equation (32).

In some examples described above, a single set of listening environment dynamics processing configuration data (e.g., a single set of combined thresholds $\overline{T}[f]$) is applied to all components of the spatial mix in the first stage of dynamics processing. Such implementations can maintain the spatial balance of the mix, but may impart other unwanted artifacts. For example, "spatial ducking" may occur when a very loud part of the spatial mix in an isolated spatial region causes the entire mix to be turned down. Other softer components of the mix spatially distant form this loud component may be perceived to become unnaturally soft. For example, soft background music may be playing in the surround field of the spatial mix at a level lower than the combined thresholds $\overline{T}[f]$, and therefore no limiting of the spatial mix is performed by the first stage of dynamics processing. A loud gunshot might then be momentarily introduced at the front of the spatial mix (e.g. on screen for a movie sound track), and the overall level of the mix increases above the combined thresholds. At this moment, the first stage of dynamics processing lowers the level of the entire mix below the thresholds $\overline{T}[f]$. Because the music is spatially separate from the gunshot, this may be perceived as an unnatural ducking in the continuous stream of music.

To deal with such issues, some implementations allow independent or partially independent dynamics processing on different "spatial zones" of the spatial mix. A spatial zone may be considered a subset of the spatial region over which the entire spatial mix is rendered. Although much of the following discussion provides examples of dynamics processing based on playback limit thresholds, the concepts apply equally to other types of individual loudspeaker dynamics processing configuration data and listening environment dynamics processing configuration data.

Figure 34:
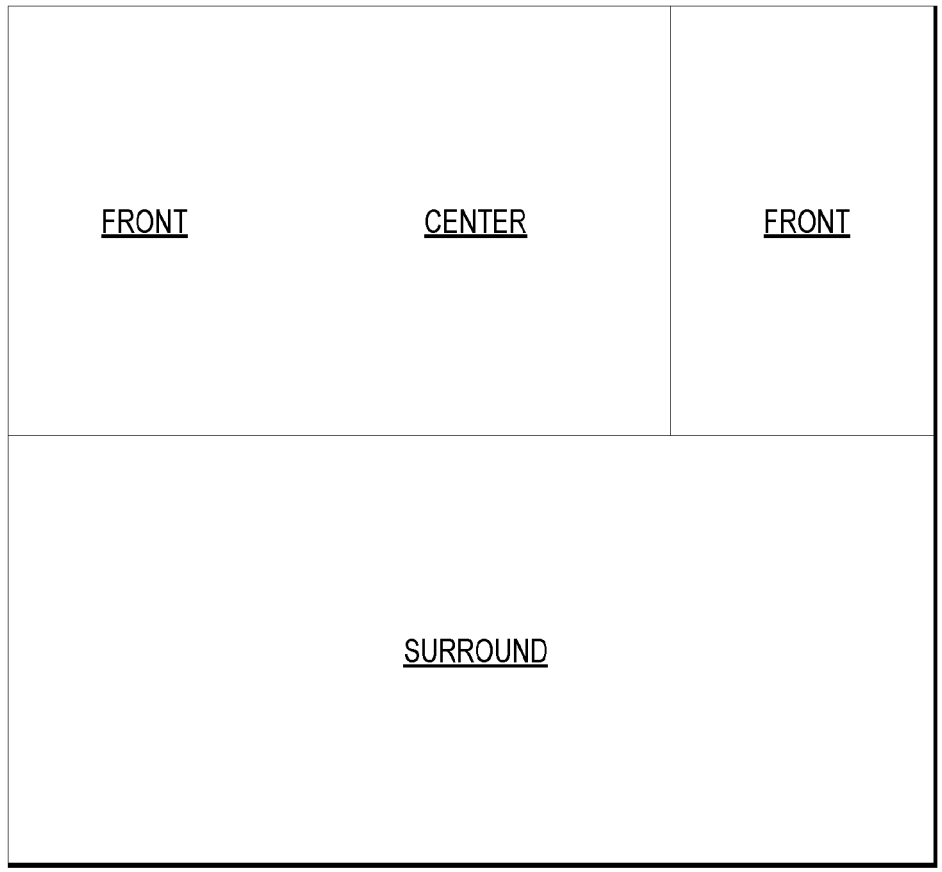
FIG. 34 shows an example of spatial zones of a listening environment.

FIG. 34 shows an example of spatial zones of a listening environment. FIG. 34 depicts an example of the region of the spatial mix (represented by the entire square), subdivided into three spatial zones: Front, Center, and Surround.

While the spatial zones in FIG. 34 are depicted with hard boundaries, in practice it is beneficial to treat the transition from one spatial zone to another as continuous. For example, a component of a spatial mix located at the middle of the left edge of the square may have half of its level assigned to the front zone and half to the surround zone. Signal level from each component of the spatial mix may be assigned and accumulated into each of the spatial zones in this continuous manner A dynamics processing function may then operate independently for each spatial zone on the overall signal level assigned to it from the mix. For each component of the spatial mix, the results of the dynamics processing from each spatial zone (e.g. time-varying gains per frequency) may then be combined and applied to the component. In some examples, this combination of spatial zone results is different for each component and is a function of that particular component's assignment to each zone. The end result is that components of the spatial mix with similar spatial zone assignments receive similar dynamics processing, but independence between spatial zones is allowed. The spatial zones may advantageously be chosen to prevent objectionable spatial shifts, such as left/right imbalance, while still allowing some spatially independent processing (e.g., to reduce other artifacts such as the described spatial ducking).

Techniques for processing a spatial mix by spatial zones may be advantageously employed in the first stage of dynamics processing of the present disclosure. For example, a different combination of individual loudspeaker dynamics processing configuration data (e.g., playback limit thresholds) across the speakers i may be computed for each spatial zone. The set of combined zone thresholds may be represented by $\overline{T}_j[f]$, where the index j refers to one of a plurality of spatial zones. A dynamics processing module may operate independently on each spatial zone with its associated thresholds $\overline{T}_j[f]$ and the results may be applied back onto the constituent components of the spatial mix according to the technique described above.

Consider the spatial signal being rendered as composed of a total of K individual constituent signals $x_k[t]$, each with an associated desired spatial position (possibly time-varying). One particular method for implementing the zone processing involves computing time-varying panning gains $\alpha_{kj}[t]$ describing how much each audio signal $x_k[t]$ contributes to zone j as a function the audio signal's desired spatial position in relation to the position of the zone. These panning gains may advantageously be designed to follow a power preserving panning law requiring that the sum of the squares of the gains equal unity. From these panning gains, zone signals $s_j[t]$ may be computed as the sum of the constituent signals weighted by their panning gain for that zone:

$$s_j[t]=\sum_{k=1}^{K}\alpha_{kj}[t]x_k[t] \quad \text{Equation (33)}$$

Each zone signal $s_j[t]$ may then be processed independently by a dynamics processing function DP parametrized by the zone thresholds $\overline{T}_j[f]$ to produce frequency and time varying zone modification gains $G_j$:

$$G_j[f,t]=DP\{s_j[t],\overline{T}_j[f]\} \quad \text{Equation (34)}$$

Frequency and time varying modification gains may then be computed for each individual constituent signal $x_k[t]$ by combining the zone modification gains in proportion to that signal's panning gains for the zones:

$$G_k[f,t]=\sqrt{\sum_{j=1}^{J}(\alpha_{kj}G_j[f,t])^2} \quad \text{Equation (35)}$$

These signal modification gains $G_k$ may then be applied to each constituent signal, by use of a filterbank for example, to produce dynamics processed constituent signals $\hat{x}_k[t]$ which may then be subsequently rendered to speaker signals.

The combination of individual loudspeaker dynamics processing configuration data (such as speaker playback limit thresholds) for each spatial zone may be performed in a variety of manners. As one example, the spatial zone playback limit thresholds $\overline{T}_j[f]$ may be computed as a weighted sum of the speaker playback limit thresholds $T_i[f]$ using a spatial zone and speaker dependent weighting $w_{ij}[f]$:

$$\overline{T}_j[f] = \Sigma_i w_{ij}[f] T_i[f] \qquad \text{Equation (36)}$$

Similar weighting functions may apply to other types of individual loudspeaker dynamics processing configuration data. Advantageously, the combined individual loudspeaker dynamics processing configuration data (e.g., playback limit thresholds) of a spatial zone may be biased towards the individual loudspeaker dynamics processing configuration data (e.g., the playback limit thresholds) of the speakers most responsible for playing back components of the spatial mix associated with that spatial zone. This may be achieved by setting the weights $w_{ij}[f]$ as a function of each speaker's responsibility for rendering components of the spatial mix associated with that zone for the frequency $f$.

Figure 35:
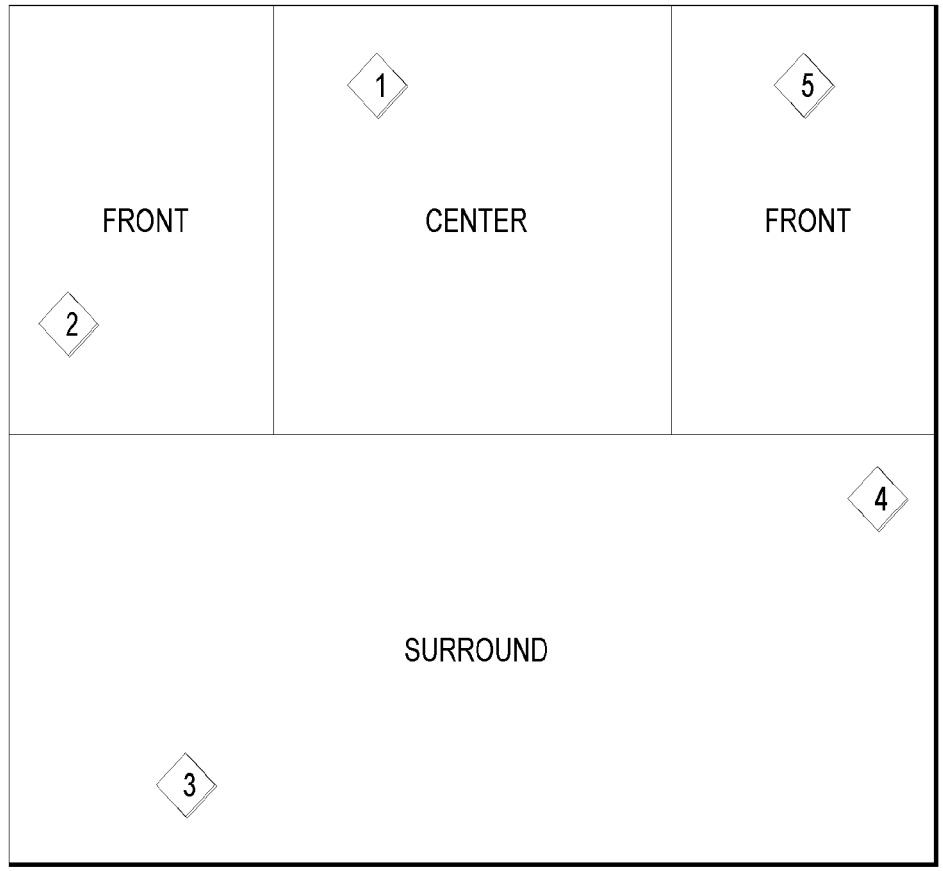
FIG. 35 shows examples of loudspeakers within the spatial zones of FIG. 34.

FIG. 35 shows examples of loudspeakers within the spatial zones of FIG. 34. FIG. 35 depicts the same zones from FIG. 34, but with the locations of five example loudspeakers (speakers 1, 2, 3, 4, and 5) responsible for rendering the spatial mix overlaid. In this example, the loudspeakers 1, 2, 3, 4, and 5 are represented by diamonds. In this particular example, speaker 1 is largely responsible for rendering the center zone, speakers 2 and 5 for the front zone, and speakers 3 and 4 for the surround zone. One could create weights $w_{ij}[f]$ based on this notional one-to-one mapping of speakers to spatial zones, but as with the spatial zone based processing of the spatial mix, a more continuous mapping may be preferred. For example, speaker 4 is quite close to the front zone, and a component of the audio mix located between speakers 4 and 5 (though in the notional front zone) will likely be played back largely by a combination of speakers 4 and 5. As such, it makes sense for the individual loudspeaker dynamics processing configuration data (e.g., playback limit thresholds) of speaker 4 to contribute to the combined individual loudspeaker dynamics processing configuration data (e.g., playback limit thresholds) of the front zone as well as the surround zone.

One way to achieve this continuous mapping is to set the weights $w_{ij}[f]$ equal to a speaker participation value describing the relative contribution of each speaker i in rendering components associated with spatial zone j. Such values may be derived directly from the rendering system responsible for rendering to the speakers (e.g., from step (c) described above) and a set of one or more nominal spatial positions associated with each spatial zone. This set of nominal spatial positions may include a set of positions within each spatial zone.

Figure 36:
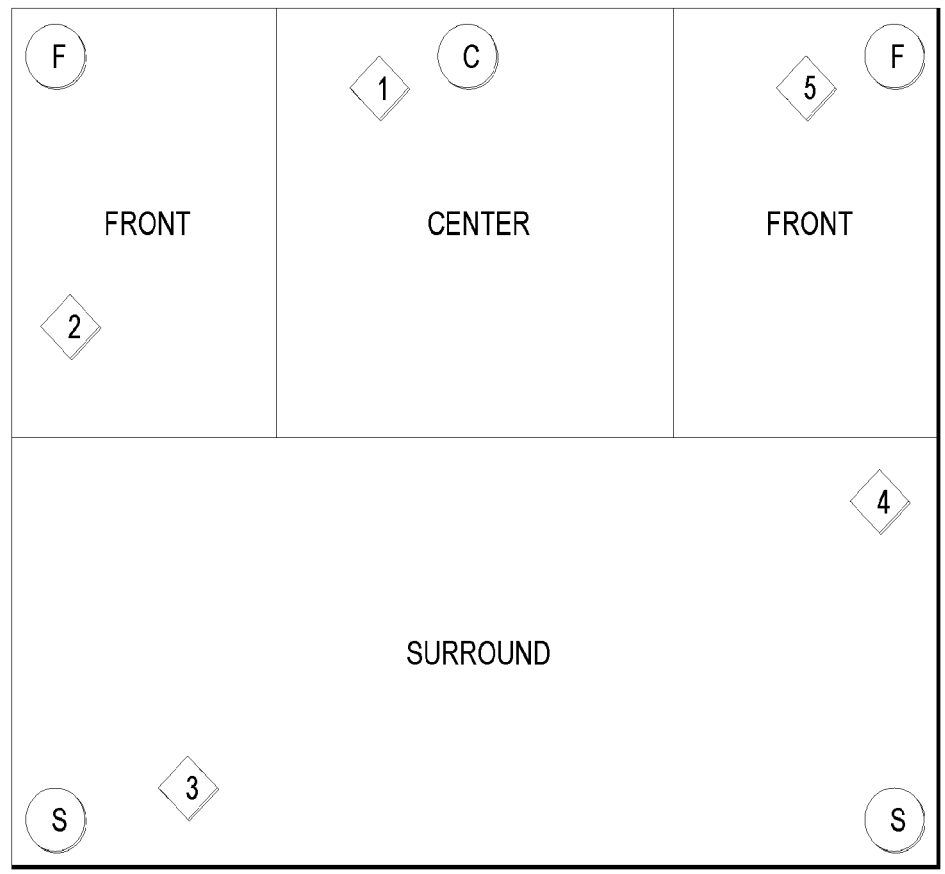
FIG. 36 shows an example of nominal spatial positions overlaid on the spatial zones and speakers of FIG. 35.

FIG. 36 shows an example of nominal spatial positions overlaid on the spatial zones and speakers of FIG. 35. The nominal positions are indicated by the numbered circles: associated with the front zone are two positions located at the top corners of the square, associated with the center zone is a single position at the top middle of the square, and associated with the surround zone are two positions at the bottom corners of the square.

To compute a speaker participation value for a spatial zone, each of the nominal positions associated with the zone may be rendered through the renderer to generate speaker activations associated with that position. These activations may, for example, be a gain for each speaker in the case of CMAP or a complex value at a given frequency for each speaker in the case of FV. Next, for each speaker and zone, these activations may be accumulated across each of the nominal positions associated with the spatial zone to produce a value $g_{ij}[f]$. This value represents the total activation of speaker i for rendering the entire set of nominal positions associated with spatial zone j. Finally, the speaker participation value in a spatial zone may be computed as the accumulated activation $g_{ij}[f]$ normalized by the sum of all these accumulated activations across speakers. The weights may then be set to this speaker participation value:

$$w_{ij}[f] = \frac{g_{ij}[f]}{\sum_k g_{ij}[f]} \qquad \text{Equation (37)}$$

The described normalization ensures that the sum of $w_{ij}[f]$ across all speakers i is equal to one, which is a desirable property for the weights in Equation 36.

According to some implementations, the process described above for computing speaker participation values and combining thresholds as a function of these values may be performed as a static process where the resulting combined thresholds are computed once during a setup procedure that determines the layout and capabilities of the speakers in the environment. In such a system it may be assumed that once set up, both the dynamics processing configuration data of the individual loudspeakers and the manner in which the rendering algorithm activates loudspeakers as a function of desired audio signal location remains static. In certain systems, however, both these aspects may vary over time, in response to changing conditions in the playback environment for example, and as such it may be desirable to update the combined thresholds according to the process described above in either a continuous or event-triggered fashion to take into account such variations.

Both the CMAP and FV rendering algorithms may be augmented to adapt to one or more dynamically configurable functions responsive to changes in the listening environment. For example, with respect to FIG. 35, a person located near speaker 3 may utter the wakeword of a smart assistant associated with the speakers, thereby placing the system in a state where it is ready to listen to a subsequent command from the person. While the wakeword is uttered the system may determine the location of the person using the microphones associated with the loudspeakers. With this information, the system may then choose to divert energy of the audio being played back from speaker 3 into other speakers so that the microphones on speaker 3 may better hear the person. In such a scenario, speaker 2 in FIG. 35 may for a period of time essentially "take over" the responsibilities of speaker 3, and as a result the speaker participation values for the surround zone change significantly; the participation value of speaker 3 decreases and that of speaker 2 increases. The zone thresholds may then be recomputed since they depend on the speaker participation values which have changed. Alternatively, or in addition to these changes to the rendering algorithm, the limit thresholds of speaker 3 may be lowered below their nominal values set to prevent the speaker from distorting. This may ensure that any remaining audio playing from speaker 3 does not increase beyond some threshold determined to cause interference with the microphones listening to the person. Since the zone thresholds are also a function of the individual speaker thresholds, they may be updated in this case as well.

Figure 37:
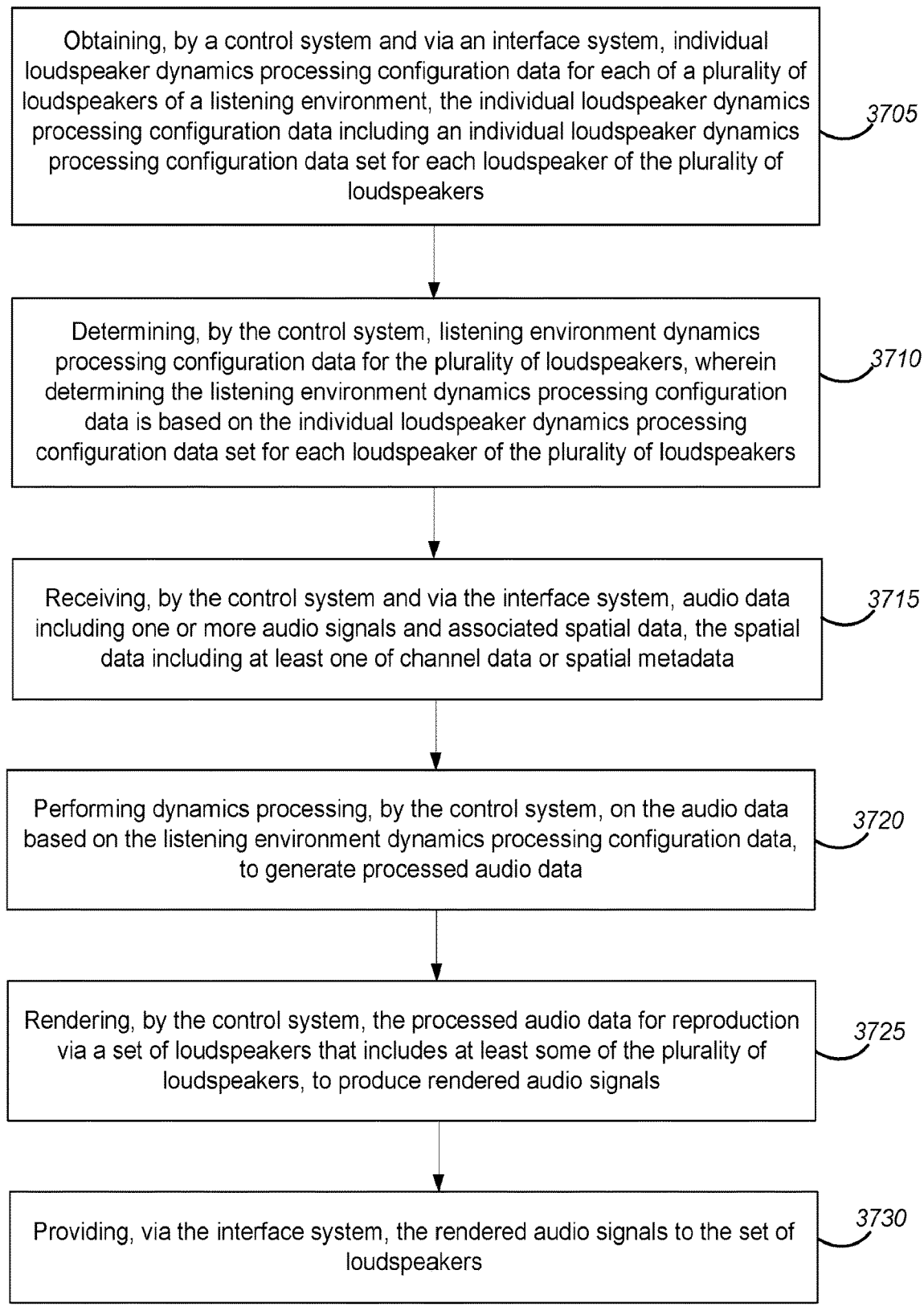
FIG. 37 is a flow diagram that outlines one example of a method that may be performed by an apparatus or system such as those disclosed herein.

FIG. 37 is a flow diagram that outlines one example of a method that may be performed by an apparatus or system such as those disclosed herein. The blocks of method 3700, like other methods described herein, are not necessarily performed in the order indicated. In some implementation, one or more of the blocks of method 3700 may be performed concurrently. Moreover, some implementations of method 3700 may include more or fewer blocks than shown and/or described. The blocks of method 3700 may be performed by one or more devices, which may be (or may include) a control system such as the control system 110 that is shown in FIG. 1A and described above, or one of the other disclosed control system examples.

According to this example, block 3705 involves obtaining, by a control system and via an interface system, individual loudspeaker dynamics processing configuration data for each of a plurality of loudspeakers of a listening environment. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data.

In some instances, block 3705 may involve obtaining the individual loudspeaker dynamics processing configuration data sets from each of the plurality of loudspeakers of a listening environment. In other examples, block 3705 may involve obtaining the individual loudspeaker dynamics processing configuration data sets from a data structure stored in a memory. For example, the individual loudspeaker dynamics processing configuration data sets may have previously been obtained, e.g., as part of a set-up procedure for each of the loudspeakers, and stored in the data structure.

According to some examples, the individual loudspeaker dynamics processing configuration data sets may be proprietary. In some such examples, the individual loudspeaker dynamics processing configuration data may sets have previously been estimated, based on the individual loudspeaker dynamics processing configuration data for speakers having similar characteristics. For example, block 3705 may involve a speaker matching process of determining the most similar speaker from a data structure indicating a plurality of speakers and a corresponding individual loudspeaker dynamics processing configuration data set for each of the plurality of speakers. The speaker matching process may be based, e.g., on a comparison of the size of one or more woofers, tweeters and/or midrange speakers.

In this example, block 3710 involves determining, by the control system, listening environment dynamics processing configuration data for the plurality of loudspeakers. According to this implementation, determining the listening environment dynamics processing configuration data is based on the individual loudspeaker dynamics processing configuration data set for each loudspeaker of the plurality of loudspeakers. Determining the listening environment dynamics processing configuration data may involve combining the individual loudspeaker dynamics processing configuration data of the dynamics processing configuration data set, e.g., by taking the average of one or more types of individual loudspeaker dynamics processing configuration data. In some instances, determining the listening environment dynamics processing configuration data may involve determining a minimum or a maximum value of one or more types of individual loudspeaker dynamics processing configuration data. According to some such implementations, determining the listening environment dynamics processing configuration data may involve interpolating between a minimum or a maximum value and a mean value of one or more types of individual loudspeaker dynamics processing configuration data.

In this implementation, block 3715 involves receiving, by a control system and via an interface system, audio data including one or more audio signals and associated spatial data. For example, the spatial data may indicate an intended perceived spatial position corresponding to an audio signal. In this example, the spatial data includes channel data and/or spatial metadata.

In this example, block 3720 involves performing dynamics processing, by the control system, on the audio data based on the listening environment dynamics processing configuration data, to generate processed audio data. The dynamics processing of block 3720 may involve any of the disclosed dynamics processing methods disclosed herein, including but not limited to applying one or more playback limit thresholds, compression data, etc.

Here, block 3725 involves rendering, by the control system, the processed audio data for reproduction via a set of loudspeakers that includes at least some of the plurality of loudspeakers, to produce rendered audio signals. In some examples, block 3725 may involve applying a CMAP rendering process, an FV rendering process, or a combination of the two. In this example, block 3720 is performed prior to block 3725. However, as noted above, block 3720 and/or block 3710 may be based, at least in part, on the rendering process of block 3725. Blocks 3720 and 3725 may involve performing processes such as those described above with reference to the listening environment dynamics processing module and the rendering module 3120 of FIG. 31.

According to this example, block 3730 involves providing, via the interface system, the rendered audio signals to the set of loudspeakers. In one example, block 3730 may involve providing, by the smart home hub 3105 and via its interface system, the rendered audio signals to the loudspeakers 3125a through 3125m.

In some examples, the method 3700 may involve performing dynamics processing on the rendered audio signals according to the individual loudspeaker dynamics processing configuration data for each loudspeaker of the set of loudspeakers to which the rendered audio signals are provided. For example, referring again to FIG. 31, the dynamics processing modules A through M may perform dynamics processing on the rendered audio signals according to the individual loudspeaker dynamics processing configuration data for the loudspeakers 3125a through 3125m.

In some implementations, the individual loudspeaker dynamics processing configuration data may include a playback limit threshold data set for each loudspeaker of the plurality of loudspeakers. In some such examples, the playback limit threshold data set may include playback limit thresholds for each of a plurality of frequencies.

Determining the listening environment dynamics processing configuration data may, in some instances, involve determining minimum playback limit thresholds across the plurality of loudspeakers. In some examples, determining the listening environment dynamics processing configuration data may involve averaging the playback limit thresholds to obtain averaged playback limit thresholds across the plurality of loudspeakers. In some such examples, determining the listening environment dynamics processing configuration data may involve determining minimum playback limit thresholds across the plurality of loudspeakers and interpolating between the minimum playback limit thresholds and the averaged playback limit thresholds.

According to some implementations, averaging the playback limit thresholds may involve determining a weighted average of the playback limit thresholds. In some such examples, the weighted average may be based, at least in part, on characteristics of a rendering process implemented by the control system, e.g., characteristics of the rendering process of block 3725.

In some implementations, performing dynamics processing on the audio data may be based on spatial zones. Each of the spatial zones may correspond to a subset of the listening environment.

According to some such implementations, the dynamics processing may be performed separately for each of the spatial zones. For example, determining the listening environment dynamics processing configuration data may be performed separately for each of the spatial zones. For example, combining the dynamics processing configuration data sets across the plurality of loudspeakers may be performed separately for each of the one or more spatial zones. In some examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

In some examples, combining the dynamics processing configuration data sets across the plurality of loudspeakers separately for each of the one or more spatial zones may be based, at least in part, on a loudspeaker participation value for each loudspeaker in each of the one or more spatial zones. Each loudspeaker participation value may be based, at least in part, on one or more nominal spatial positions within each of the one or more spatial zones. The nominal spatial positions may, in some examples, correspond to canonical locations of channels in a Dolby 5.1, Dolby 5.1.2, Dolby 7.1, Dolby 7.1.4 or Dolby 9.1 surround sound mix. In some such implementations, each loudspeaker participation value is based, at least in part, on an activation of each loudspeaker corresponding to rendering of audio data at each of the one or more nominal spatial positions within each of the one or more spatial zones.

According to some such examples, the weighted average of the playback limit thresholds may be based, at least in part, on activation of loudspeakers by the rendering process as a function of audio signal proximity to the spatial zones. In some instances, the weighted average may be based, at least in part, on a loudspeaker participation value for each loudspeaker in each of the spatial zones. In some such examples, each loudspeaker participation value may be based, at least in part, on one or more nominal spatial positions within each of the spatial zones. For example, the nominal spatial positions may correspond to canonical locations of channels in a Dolby 5.1, Dolby 5.1.2, Dolby 7.1, Dolby 7.1.4 or Dolby 9.1 surround sound mix. In some implementations, each loudspeaker participation value may be based, at least in part, on an activation of each loudspeaker corresponding to rendering of audio data at each of the one or more nominal spatial positions within each of the spatial zones.

According to some implementations, rendering the processed audio data may involve determining relative activation of the set of loudspeakers according to one or more dynamically configurable functions. Some examples are described below with reference to FIG. 10 et seq. The one or more dynamically configurable functions may be based on one or more properties of the audio signals, one or more properties of the set of loudspeakers, or one or more external inputs. For example, the one or more dynamically configurable functions may be based on proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance Relative activation of the speakers may, in some examples, be based on a cost function of a model of perceived spatial position of the audio signals when played back over the speakers, a measure of proximity of the intended perceived spatial position of the audio signals to positions of the speakers, and one or more of the dynamically configurable functions.

In some examples, minimization of the cost function (including at least one dynamic speaker activation term) may result in deactivation of at least one of the speakers (in the sense that each such speaker does not play the relevant audio content) and activation of at least one of the speakers (in the sense that each such speaker plays at least some of the rendered audio content). The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

According to some implementations, the individual loudspeaker dynamics processing configuration data may include, for each loudspeaker of the plurality of loudspeakers, a dynamic range compression data set. In some instances, the dynamic range compression data set may include one or more of threshold data, input/output ratio data, attack data, release data or knee data.

As noted above, in some implementations at least some blocks of method 3700 that are shown in FIG. 37 may be omitted. For example, in some implementations blocks 3705 and 3710 are performed during a set-up process. After the listening environment dynamics processing configuration data are determined, in some implementations steps 3705 and 3710 are not performed again during "run time" operation unless the type and/or arrangement of speakers of the listening environment changes. For example, in some implementations there may be an initial check to determine whether any loudspeakers have been added or disconnected, whether any loudspeakers positions have changed, etc. If so, steps 3705 and 3710 may be implemented. If not, steps 3705 and 3710 may not be performed again prior to "runtime" operations, which may involve blocks 3715-3730.

Figure 38C:
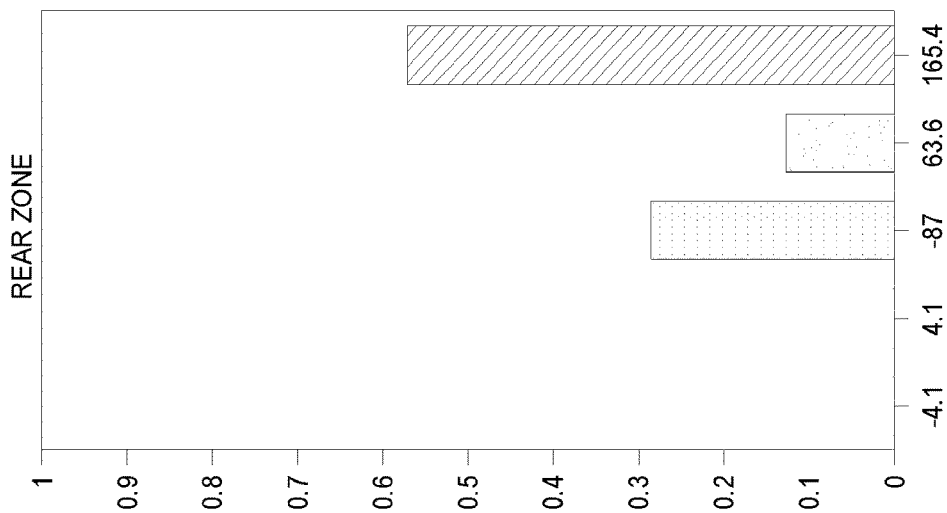
FIGS. 38A, 38B and 38C show examples of loudspeaker participation values corresponding to the examples of FIGS. 2C and 2D.
Figure 38B:
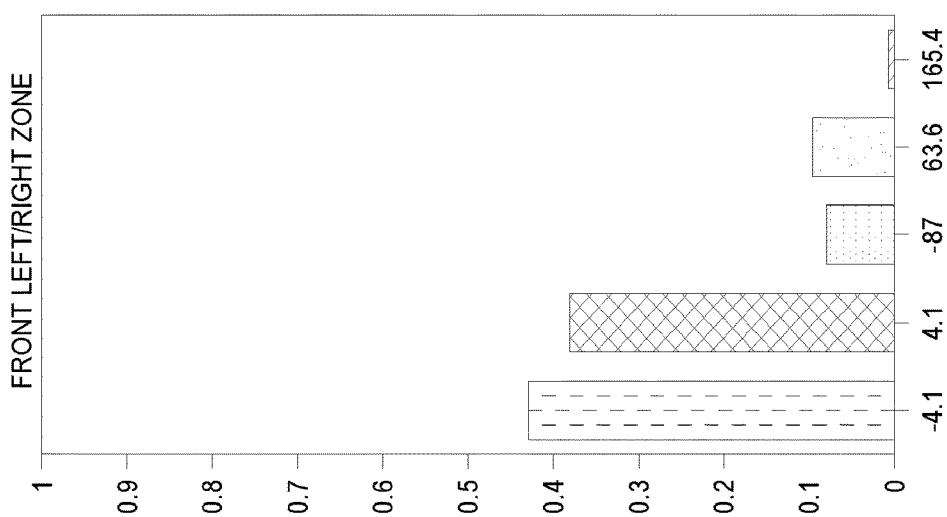
Figure 38A:
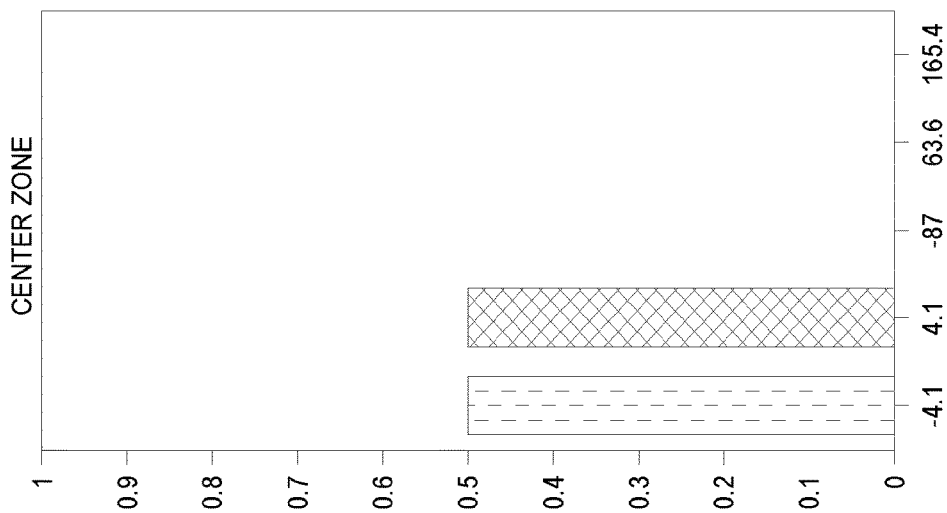

FIGS. 38A, 38B and 38C show examples of loudspeaker participation values corresponding to the examples of FIGS. 2C and 2D. In FIGS. 38A, 38B and 38C, angle −4.1 corresponds to speaker position 272 of FIG. 2D, angle 4.1 corresponds to speaker position 274 of FIG. 2D, angle −87 corresponds to speaker position 267 of FIG. 2D, angle 63.6 corresponds to speaker position 275 of FIG. 2D and angle 165.4 corresponds to speaker position 270 of FIG. 2D. These loudspeaker participation values are examples of weightings relating to the spatial zones that are described with reference to FIGS. 34-37. According to these examples, the loudspeaker participation values shown in FIGS. 38A, 38B and 38C correspond to each loudspeaker's participation in each of the spatial zones shown in FIG. 34: the loudspeaker participation values shown in FIG. 38A correspond to each loudspeaker's participation in the center zone, the loudspeaker participation values shown in FIG. 38B correspond to each loudspeaker's participation in the front left and right zones, and the loudspeaker participation values shown in FIG. 38C correspond to each loudspeaker's participation in the rear zone.

FIGS. 39A, 39B and 39C show examples of loudspeaker participation values corresponding to the examples of FIGS. 2F and 2G. In FIGS. 39A, 39B and 39C, angle −4.1 corresponds to speaker position 272 of FIG. 2D, angle 4.1 corresponds to speaker position 274 of FIG. 2D, angle −87 corresponds to speaker position 267 of FIG. 2D, angle 63.6 corresponds to speaker position 275 of FIG. 2D and angle 165.4 corresponds to speaker position 270 of FIG. 2D. According to these examples, the loudspeaker participation values shown in FIGS. 39A, 39B and 39C correspond to each loudspeaker's participation in each of the spatial zones shown in FIG. 34: the loudspeaker participation values shown in FIG. 39A correspond to each loudspeaker's participation in the center zone, the loudspeaker participation values shown in FIG. 39B correspond to each loudspeaker's participation in the front left and right zones, and the loudspeaker participation values shown in FIG. 39C correspond to each loudspeaker's participation in the rear zone.

Figure 40C:
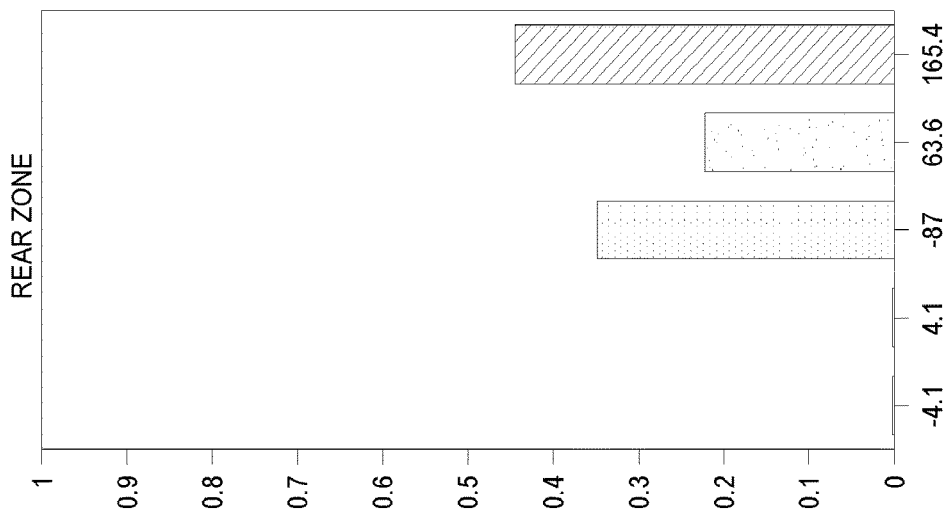
FIGS. 40A, 40B and 40C show examples of loudspeaker participation values corresponding to the examples of FIGS. 2H and 2I.
Figure 40B:
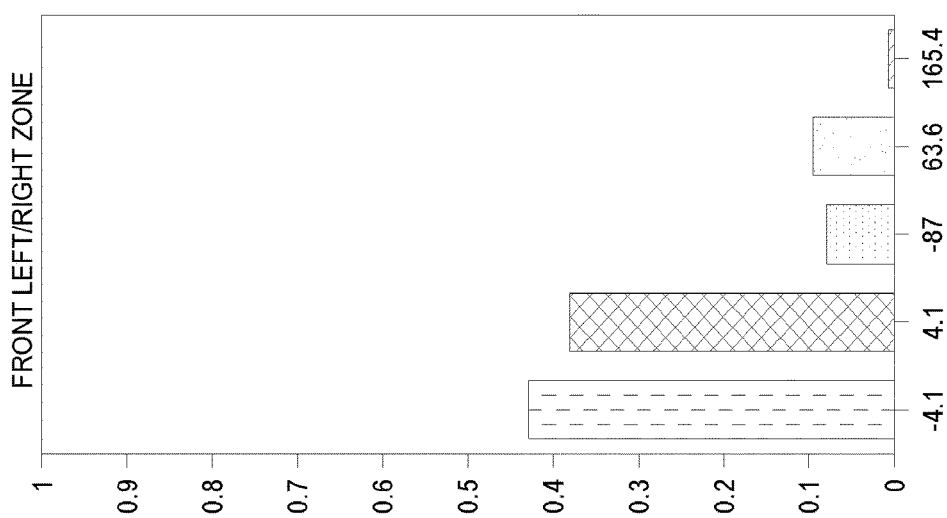
Figure 40A:
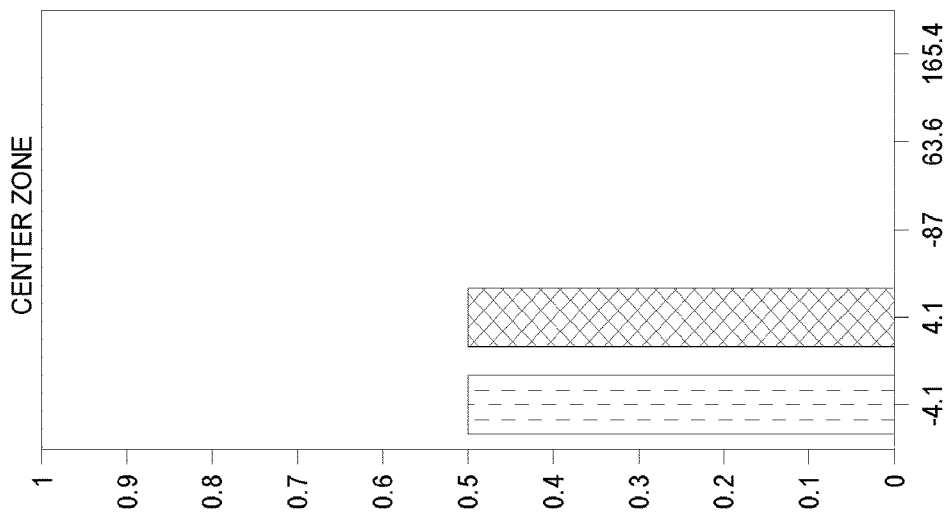

FIGS. 40A, 40B and 40C show examples of loudspeaker participation values corresponding to the examples of FIGS. 2H and 2I. According to these examples, the loudspeaker participation values shown in FIGS. 40A, 40B and 40C correspond to each loudspeaker's participation in each of the spatial zones shown in FIG. 34: the loudspeaker participation values shown in FIG. 40A correspond to each loudspeaker's participation in the center zone, the loudspeaker participation values shown in FIG. 40B correspond to each loudspeaker's participation in the front left and right zones, and the loudspeaker participation values shown in FIG. 40C correspond to each loudspeaker's participation in the rear zone.

FIGS. 41A, 41B and 41C show examples of loudspeaker participation values corresponding to the examples of FIGS. 2J and 2K. According to these examples, the loudspeaker participation values shown in FIGS. 41A, 41B and 41C correspond to each loudspeaker's participation in each of the spatial zones shown in FIG. 34: the loudspeaker participation values shown in FIG. 41A correspond to each loudspeaker's participation in the center zone, the loudspeaker participation values shown in FIG. 41B correspond to each loudspeaker's participation in the front left and right zones, and the loudspeaker participation values shown in FIG. 41C correspond to each loudspeaker's participation in the rear zone.

Figure 42:
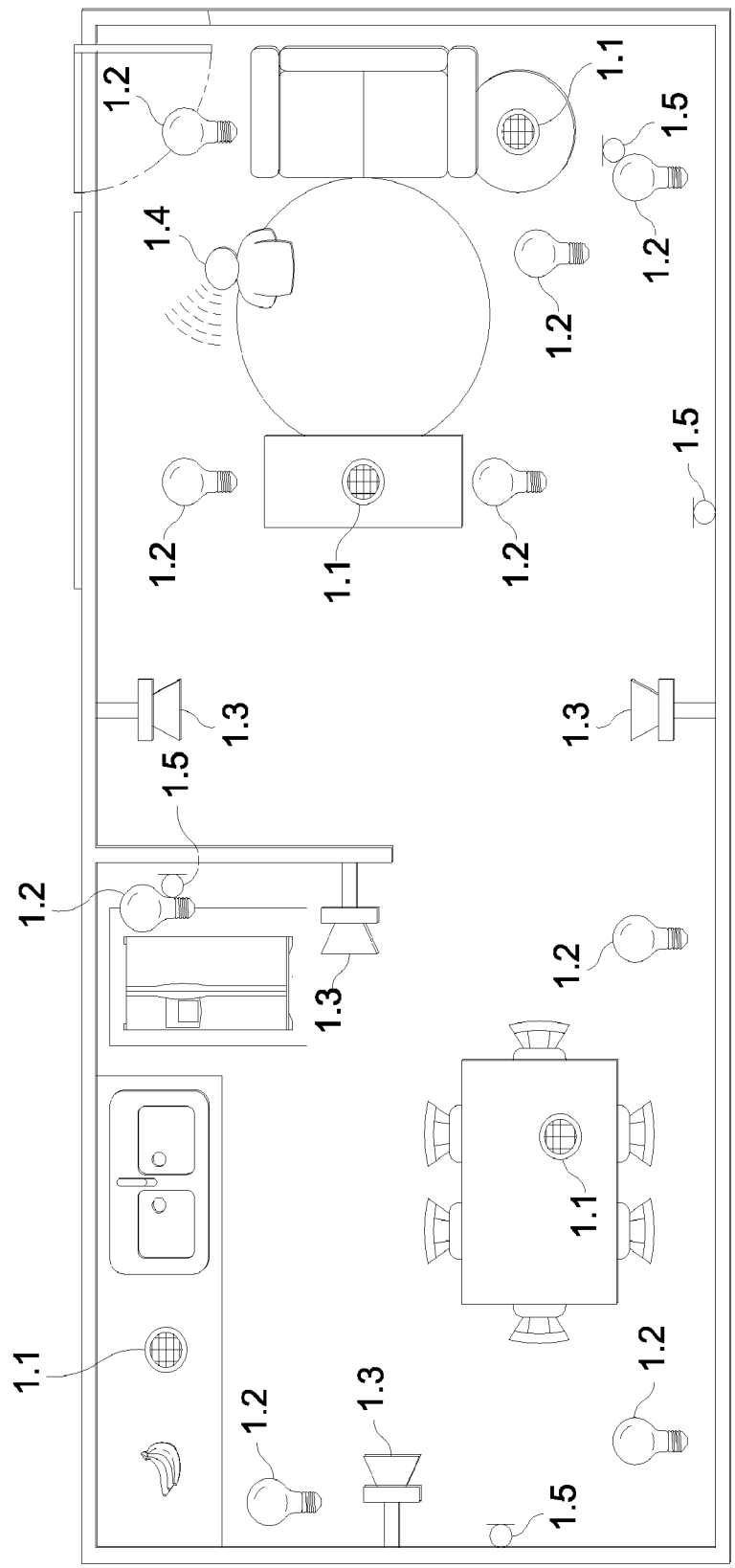
FIG. 42 is a diagram of an environment, which is a living space in this example.

FIG. 42 is a diagram of an environment, which is a living space in this example. According to this example, the living space includes a set of smart audio devices (devices 1.1) for audio interaction, speakers (1.3) for audio output, and controllable lights (1.2). In an example, only the devices 1.1 contain microphones and therefore have a sense of where is a user (1.4) who issues a wakeword command Using various methods, information may be obtained collectively from these devices to provide a positional estimate (e.g., a fine grained positional estimation) of the user who issues (e.g., speaks) the wakeword.

In such a living space there are a set of natural activity zones where a person would be performing a task or activity, or crossing a threshold. These action areas (zones) are where there may be an effort to estimate the location (e.g., to determine an uncertain location) or context of the user to assist with other aspects of the interface. In the FIG. 1 example, the key action areas are 1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

It is apparent that there are often a similar number of lights with similar positioning to suit action areas. Some or all of the lights may be individually controllable networked agents.

In accordance with some embodiments, audio is rendered (e.g., by one of devices 1.1, or another device of the FIG. 42 system) for playback (in accordance with any embodiment of the inventive method) by one or more of the speakers 1.3 (and/or speaker(s) of one or more of devices 1.1).

A class of embodiments are methods for rendering audio for playback, and/or playback of the audio, by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices. Many interactions with the system are contemplated which require dynamic modifications to the rendering and/or playback. Such modifications may be, but are not necessarily, focused on spatial fidelity.

Some embodiments implement rendering for playback, and/or playback, by speaker(s) of a plurality of smart audio devices that are coordinated (orchestrated). Other embodiments implement rendering for playback, and/or playback, by speaker(s) of another set of speakers.

Some embodiments (e.g., a rendering system or renderer, or a rendering method, or a playback system or method) pertain to systems and methods for rendering audio for playback, and/or playback, by some or all speakers (i.e., each activated speaker) of a set of speakers. In some embodiments, the speakers are speakers of a coordinated (orchestrated) set of smart audio devices.

Many embodiments are technologically possible. It will be apparent to those of ordinary skill in the art from the present disclosure how to implement them. Some embodiments are described herein.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

Various features and aspects will be appreciated from the following enumerated example embodiments ("EEEs"):

EEE1. A method for rendering of audio for playback by at least two speakers of at least one of the smart audio devices of a set of smart audio devices, wherein the audio is one or more audio signals, each with an associated desired perceived spatial position, where relative activation of speakers of the set of speakers is a function of a model of perceived spatial position of said audio signals played back over the speakers, proximity of the desired perceived spatial position of the audio signals to positions of the speakers, and one or more additional dynamically configurable functions dependent on at least one or more properties of the audio signals, one or more properties of the set of speakers, or one or more external inputs.

EEE 2. The method of claim EEE1, wherein the additional dynamically configurable functions include at least one of: proximity of speakers to one or more listeners; proximity of speakers to an attracting or repelling force; audibility of the speakers with respect to some location; capability of the speakers; synchronization of the speakers with respect to other speakers; wakeword performance; or echo canceller performance.

EEE 3. The method of claim EEE1 or EEE2, wherein the rendering includes minimization of a cost function, where the cost function includes at least one dynamic speaker activation term.

EEE 4. A method for rendering of audio for playback by at least two speakers of a set of speakers, wherein the audio is one or more audio signals, each with an associated desired perceived spatial position, where relative activation of speakers of the set of speakers is a function of a model of perceived spatial position of said audio signals played back over the speakers, proximity of the desired perceived spatial position of the audio signals to positions of the speakers, and one or more additional dynamically configurable functions dependent on at least one or more properties of the audio signals, one or more properties of the set of speakers, or one or more external inputs.

EEE 5. The method of claim EEE4, wherein the additional dynamically configurable functions include at least one of: proximity of speakers to one or more listeners; proximity of speakers to an attracting or repelling force; audibility of the speakers with respect to some location; capability of the speakers; synchronization of the speakers with respect to other speakers; wakeword performance; or echo canceller performance.

EEE6. The method of claim EEE4 or EEE5, wherein the rendering includes minimization of a cost function, where the cost function includes at least one dynamic speaker activation term.

EEE7. An audio rendering method, comprising:
rendering a set of one or more audio signals, each with an associated desired perceived spatial position, over a set of two or more loudspeakers, where relative activation of the set of loudspeakers is a function of a model of perceived spatial position of said audio signals played back over the loudspeakers, proximity of the desired perceived spatial position of the audio objects to the positions of the loudspeakers, and one or more additional dynamically configurable functions dependent on at least one or more properties of the set of audio signals, one or more properties of the set of loudspeakers, or one or more external inputs.

EEE1A. An audio processing method, comprising:
receiving a first audio program stream, the first audio program stream including first audio signals that are scheduled to be reproduced by at least some speakers of an environment, the first audio program stream comprising first spatial data, the first spatial data including at least one of channel data or spatial metadata;
rendering the first audio signals for reproduction via the speakers of the environment, to produce first rendered audio signals;
receiving a second audio program stream, the second audio program stream including second audio signals that are scheduled to be reproduced by at least one speaker of the environment;
rendering the second audio signals for reproduction via at least one speaker of the environment, to produce second rendered audio signals;
modifying a rendering process for the first audio signals based at least in part on at least one of the second audio signals, the second rendered audio signals or characteristics thereof, to produce modified first rendered audio signals;
modifying a rendering process for the second audio signals based at least in part on at least one of the first audio signals, the first rendered audio signals or characteristics thereof, to produce modified second rendered audio signals;
mixing the modified first rendered audio signals and the modified second rendered audio signals to produce mixed audio signals; and
providing the mixed audio signals to at least some speakers of the environment.

EEE2A. The method of claim EEE1A, wherein modifying the rendering process for the first audio signals involves performing one or more of:

warping the rendering of first audio signals away from a rendering location of the second rendered audio signals, or modifying the loudness of one or more of the first rendered audio signals in response to a loudness of one or more of the second audio signals or the second rendered audio signals.

EEE3A. The method of claim EEE1A or claim EEE2A, further comprising:
receiving first microphone signals from a first microphone; and
modifying the rendering process for at least one of the first audio signals or the second audio signals based at least in part on the first microphone signals.

EEE4A. The method of claim EEE3A, further comprising:
estimating a first sound source position based on the first microphone signals; and
modifying the rendering process for at least one of the first audio signals or the second audio signals based at least in part on the first sound source position.

EEE5A. The method of claim EEE3A or claim EEE4A, further comprising:
determining whether the first microphone signals correspond to a human voice; and
modifying the rendering process for at least one of the first audio signals or the second audio signals based at least in part on whether the first microphone signals correspond to a human voice.

EEE6A. The method of any one of claims EEE3A-EEE5A, further comprising:
determining whether the first microphone signals correspond to environmental noise; and
modifying the rendering process for at least one of the first audio signals or the second audio signals based at least in part on whether the first microphone signals correspond to environmental noise.

EEE7A. The method of any one of claims EEE3A-6A, further comprising deriving a loudness estimate for the reproduced first audio program stream or the reproduced second audio program stream based at least in part on the first microphone signals.

EEE8A. The method of claim EEE7A, further comprising modifying the rendering process for at least one of the first audio signals or the second audio signals based at least in part on the loudness estimate.

EEE9A. The method of claim EEE8A, wherein the loudness estimate is a perceived loudness estimate and wherein modifying the rendering process involves altering at least one of the first audio signals or the second audio signals in order to preserve its perceived loudness in the presence of an interfering signal.

EEE10A. The method of claim EEE4A, further comprising:
determining that the first microphone signals correspond to a human voice; and
reproducing the first microphone signals in one or more speakers near a location of the environment that is different from the first sound source position.

EEE11A. The method of claim EEE10A, further comprising determining that the first microphone signals correspond to a child's cry, wherein the location of the environment corresponds to an estimated location of a caretaker.

EEE12A. The method of claim EEE10A, wherein modifying the rendering process for the first audio signals involves reducing the loudness of the modified first rendered audio signals in one or more speakers near the location of the environment.

EEE13A. The method of any one of claims EEE1A-10A, wherein at least one of rendering the first audio signals or rendering the second audio signals involves flexible rendering to arbitrarily located speakers.

EEE14A. The method of claim EEE13A, wherein the flexible rendering involves Center of Mass Amplitude Panning or Flexible Virtualization.

EEE1B. A method of controlling speakers of an environment, the method comprising:
receiving a first audio program stream, the first audio program stream including first audio signals that are scheduled to be reproduced by at least some speakers of the environment, the first audio program stream comprising first spatial data, the first spatial data including at least one of channel data or spatial metadata;
rendering the first audio signals for simultaneous reproduction via the speakers of the environment, to produce first rendered audio signals;
receiving first microphone signals from a first microphone;
estimating a first sound source position based on the first microphone signals;
modifying a rendering process for the first audio signals based at least in part on the first microphone signals, to produce modified first rendered audio signals, wherein modifying the rendering process for the first audio signals involves performing one or more of:
warping the rendering of first audio signals away from the first sound source position based on the first microphone signals, or
modifying loudness of the first rendered audio signals based at least in part on the first sound source position; and
providing the modified first rendered audio signals to at least some of the speakers of the environment.

EEE2B. The method of claim EEE1B, further comprising determining that the first microphone signals correspond to environmental noise, wherein modifying the rendering process for the first audio signals involves increasing the loudness of the first rendered audio signals reproduced by speakers near the first sound source position, as compared to the loudness of the first rendered audio signals reproduced by speakers farther from the first sound source position.

EEE3B. The method of claim EEE1B, further comprising determining that the first microphone signals correspond to a human voice, wherein modifying the rendering process for the first audio signals involves reducing the loudness of the first rendered audio signals reproduced by speakers near the first sound source position, as compared to the loudness of the first rendered audio signals reproduced by speakers farther from the first sound source position.

EEE4B. The method of claim EEE3B, further comprising:
determining that the first microphone signals correspond to a wakeword;
determining a reply to the wakeword; and
controlling at least one speaker near the first sound source location to reproduce the reply.

EEE5B. The method of claim EEE3B, further comprising:
determining that the first microphone signals correspond to a command;
determining a reply to the command;
controlling at least one speaker near the first sound source location to reproduce the reply; and
executing the command.

EEE6B. The method of claim EEE5B, further comprising reverting to an unmodified rendering process for the first audio signals after controlling at least one speaker near the first sound source location to reproduce the reply.

EEE7B. The method of claim EEE1B, further comprising:
determining that the first microphone signals correspond to a human voice; and
reproducing the first microphone signals in one or more speakers near a location of the environment.

EEE8B. The method of claim EEE7B, further comprising determining that the first microphone signals correspond to a child's cry, wherein the location of the environment corresponds to an estimated location of a caretaker.

EEE9B. The method of claim EEE7B, wherein modifying the rendering process for the first audio signals involves reducing the loudness of the modified first rendered audio signals in one or more speakers near the second location.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. An audio processing system, comprising:
an interface system;
a microphone system including one or more microphones;
a control system comprising:
a first rendering module configured for:
receiving, via the interface system, a first audio program stream, the first audio program stream including first audio signals that are scheduled to be reproduced by at least some speakers of an environment, the first audio program stream comprising first spatial data, the first spatial data including at least one of channel data or spatial metadata; and
rendering the first audio signals for reproduction via the speakers of the environment, to produce first rendered audio signals;
a second rendering module configured for:
receiving, via the interface system, a second audio program stream, the second audio program stream including second audio signals that are scheduled to be reproduced by at least one speaker of the environment; and
rendering the second audio signals for reproduction via at least one speaker of the environment, to produce second rendered audio signals;
wherein the first rendering module is further configured for receiving first microphone signals from the microphone system and for modifying a rendering process for the first audio signals based at least in part on the first microphone signals and at least one of the second audio signals, the second rendered audio signals or characteristics thereof, to produce modified first rendered audio signals; and
wherein the second rendering module is further configured for receiving the first microphone signals and for modifying a rendering process for the second audio signals based at least in part the first microphone signals and on at least one of the first audio signals, the first rendered audio signals or characteristics thereof, to produce modified second rendered audio signals; and
a mixing module configured for mixing the modified first rendered audio signals and the modified second rendered audio signals to produce mixed audio signals,
wherein the control system is further configured for:
determining whether the first microphone signals correspond to a human voice;
modifying the rendering process for at least one of the first audio signals or the second audio signals based at least in part on whether the first microphone signals correspond to the human voice, wherein modifying the rendering process for the first audio signals involves reducing the loudness of the first rendered audio signals reproduced by speakers near the first sound source position, as compared to the loudness of the first rendered audio signals reproduced by speakers farther from the first sound source position; and
providing the mixed audio signals to at least some speakers of the environment.

2. The audio processing system of claim 1, further comprising:
one or more additional rendering modules, each of the one or more additional rendering modules being configured for:
receiving, via the interface system, an additional audio program stream, the additional audio program stream including additional audio signals that are scheduled to be reproduced by at least one speaker of the environment;
rendering the additional audio signals for reproduction via at least one speaker of the environment, to produce additional rendered audio signals; and
modifying a rendering process for the additional audio signals based at least in part on at least one of the first audio signals, the first rendered audio signals, the second audio signals, the second rendered audio signals or characteristics thereof, to produce modified additional rendered audio signals;
wherein the mixing module is further configured for mixing the modified additional rendered audio signals with at least the modified first rendered audio signals and the modified second rendered audio signals, to produce the mixed audio signals.

3. The audio processing system of claim 1, wherein modifying the rendering process for the first audio signals involves performing one or more of:
warping the rendering of first audio signals away from a rendering location of the second rendered audio signals, or
modifying the loudness of one or more of the first rendered audio signals in response to a loudness of one or more of the second audio signals or the second rendered audio signals.

4. The audio processing system of claim 1, wherein modifying the rendering process for the second audio signals involves performing one or more of:
warping the rendering of second audio signals away from a rendering location of the first rendered audio signals, or
modifying the loudness of one or more of the second rendered audio signals in response to a loudness of one or more of the first audio signals or the first rendered audio signals.

5. The audio processing system of claim 1, wherein modifying the rendering process for the first audio signals involves performing one or more modifications from a list of modifications consisting of spectral modification, audibility-based modification or dynamic range modification.

6. The audio processing system of claim 1, wherein the control system is further configured for:
estimating a first sound source position based on the first microphone signals; and
modifying the rendering process for at least one of the first audio signals or the second audio signals based at least in part on the first sound source position.

7. The audio processing system of claim 1, wherein the control system is further configured for:
determining whether the first microphone signals correspond to environmental noise; and modifying the rendering process for at least one of the first audio signals or the second audio signals based at least in part on whether the first microphone signals correspond to environmental noise.

8. The audio processing system of claim 1, wherein the control system is further configured for:
determining that the first microphone signals correspond to a wakeword;
determining a reply to the wakeword; and
controlling at least one speaker near the first sound source location to reproduce the reply.

9. The audio processing system of claim 1, wherein the control system is further configured for:
determining that the first microphone signals correspond to a command;
determining a reply to the command;
controlling at least one speaker near the first sound source location to reproduce the reply; and
executing the command.

10. The audio processing system of claim 9, wherein the control system is further configured for reverting to an unmodified rendering process for the first audio signals after controlling at least one speaker near the first sound source location to reproduce the reply.

11. The audio processing system of claim 1, wherein the control system is further configured for deriving a loudness estimate for the reproduced first audio program stream or the reproduced second audio program stream based at least in part on the first microphone signals.

12. The audio processing system of claim 11, wherein the control system is further configured for modifying the rendering process for at least one of the first audio signals or the second audio signals based at least in part on the loudness estimate.

13. The audio processing system of claim 12, wherein the loudness estimate is a perceived loudness estimate and wherein modifying the rendering process involves altering at least one of the first audio signals or the second audio signals in order to preserve its perceived loudness in the presence of an interfering signal.

14. The audio processing system of claim 1, wherein the control system is further configured for:
determining that the first microphone signals correspond to a human voice; and
reproducing the first microphone signals in one or more speakers near a location of the environment that is different from the first sound source position.

15. The audio processing system of claim 14, wherein the control system is further configured for determining whether the first microphone signals correspond to a child's cry, wherein the location of the environment corresponds to an estimated location of a caregiver.

16. The audio processing system of claim 1, wherein the control system is further configured for deriving a loudness estimate for the reproduced first audio program stream or the reproduced second audio program stream and wherein the control system is further configured for modifying the rendering process for at least one of the first audio signals or the second audio signals based at least in part on the loudness estimate.

17. The audio processing system of claim 16, wherein the loudness estimate is a perceived loudness estimate and wherein modifying the rendering process involves altering at least one of the first audio signals or the second audio signals in order to preserve its perceived loudness in the presence of an interfering signal.

18. The audio processing system of claim 1, wherein at least one of rendering the first audio signals or rendering the second audio signals involves flexible rendering to arbitrarily located speakers.

19. The audio processing system of claim 18, wherein the flexible rendering involves Center of Mass Amplitude Panning or Flexible Virtualization.

20. An audio processing method, comprising:
receiving, by a first rendering module, first microphone signals from the microphone system and a first audio program stream, the first audio program stream including first audio signals that are scheduled to be reproduced by at least some speakers of an environment, the first audio program stream comprising first spatial data, the first spatial data including at least one of channel data or spatial metadata; and
rendering, by the first rendering module, the first audio signals for reproduction via the speakers of the environment, to produce first rendered audio signals;
receiving, by a second rendering module, the first microphone signals from the microphone system and a second audio program stream, the second audio program stream including second audio signals that are scheduled to be reproduced by at least one speaker of the environment; and
rendering, by the second rendering module, the second audio signals for reproduction via at least one speaker of the environment, to produce second rendered audio signals;
modifying, by the first rendering module, a rendering process for the first audio signals based at least in part on the first microphone signals and at least one of the second audio signals, the second rendered audio signals or characteristics thereof, to produce modified first rendered audio signals; and
modifying, by the second rendering module, a rendering process for the second audio signals based at least in part on the first microphone signals and at least one of the first audio signals, the first rendered audio signals or characteristics thereof, to produce modified second rendered audio signals;
determining whether the first microphone signals correspond to a human voice;
modifying the rendering process for at least one of the first audio signals or the second audio signals based at least in part on whether the first microphone signals correspond to the human voice;
mixing the modified first rendered audio signals and the modified second rendered audio signals to produce mixed audio signals;
providing the mixed audio signals to at least some speakers of the environment;

determining that the first microphone signals correspond to a wakeword or a command;

determining a reply to the wakeword or the command; and controlling at least one speaker near the first sound source location to reproduce the reply.

21. The audio processing method of claim 20, wherein modifying the rendering process for the first audio signals involves performing one or more of:

warping the rendering of first audio signals away from a rendering location of the second rendered audio signals, or modifying the loudness of one or more of the first rendered audio signals in response to a loudness of one or more of the second audio signals or the second rendered audio signals.

22. The audio processing method of claim 20, wherein modifying the rendering process for the second audio signals involves performing one or more of:

warping the rendering of second audio signals away from a rendering location of the first rendered audio signals, or modifying the loudness of one or more of the second rendered audio signals in response to a loudness of one or more of the first audio signals or the first rendered audio signals.

23. The audio processing method of claim 20, wherein modifying the rendering process for the first audio signals involves performing one or more modifications from a list of modifications consisting of spectral modification, audibility-based modification or dynamic range modification.

24. The audio processing method of claim 20, further comprising:

estimating a first sound source position based on the first microphone signals; and modifying the rendering process for at least one of the first audio signals or the second audio signals based at least in part on the first sound source position.

25. One or more non-transitory media having software stored thereon, the software including instructions for controlling one or more device to perform an audio processing method, the audio processing method comprising:

receiving, by a first rendering module, first microphone signals from the microphone system and a first audio program stream, the first audio program stream including first audio signals that are scheduled to be reproduced by at least some speakers of an environment, the first audio program stream comprising first spatial data, the first spatial data including at least one of channel data or spatial metadata; and rendering, by the first rendering module, the first audio signals for reproduction via the speakers of the environment, to produce first rendered audio signals;

receiving, by a second rendering module, the first microphone signals from the microphone system and a second audio program stream, the second audio program stream including second audio signals that are scheduled to be reproduced by at least one speaker of the environment; and rendering, by the second rendering module, the second audio signals for reproduction via at least one speaker of the environment, to produce second rendered audio signals;

modifying, by the first rendering module, a rendering process for the first audio signals based at least in part on the first microphone signals and at least one of the second audio signals, the second rendered audio signals or characteristics thereof, to produce modified first rendered audio signals; and modifying, by the second rendering module, a rendering process for the second audio signals based at least in part on the first microphone signals and at least one of the first audio signals, the first rendered audio signals or characteristics thereof, to produce modified second rendered audio signals;

deriving a perceived loudness estimate for the reproduced first audio program stream or the reproduced second audio program stream based at least in part on the first microphone signals;

modifying the rendering process for at least one of the first audio signals or the second audio signals based at least in part on the loudness estimate, wherein modifying the rendering process involves altering at least one of the first audio signals or the second audio signals in order to preserve its perceived loudness in the presence of an interfering signal;

mixing the modified first rendered audio signals and the modified second rendered audio signals to produce mixed audio signals; and providing the mixed audio signals to at least some speakers of the environment.

26. The one or more non-transitory media of claim 25, wherein modifying the rendering process for the first audio signals involves performing one or more of:

warping the rendering of first audio signals away from a rendering location of the second rendered audio signals, or modifying the loudness of one or more of the first rendered audio signals in response to a loudness of one or more of the second audio signals or the second rendered audio signals.

27. The one or more non-transitory media of claim 25, wherein modifying the rendering process for the second audio signals involves performing one or more of:

warping the rendering of second audio signals away from a rendering location of the first rendered audio signals, or modifying the loudness of one or more of the second rendered audio signals in response to a loudness of one or more of the first audio signals or the first rendered audio signals.

28. The one or more non-transitory media of claim 25, wherein modifying the rendering process for the first audio signals involves performing one or more modifications from a list of modifications consisting of spectral modification, audibility-based modification or dynamic range modification.

29. The one or more non-transitory media of claim 25, wherein the audio processing method further comprises:

estimating a first sound source position based on the first microphone signals; and modifying the rendering process for at least one of the first audio signals or the second audio signals based at least in part on the first sound source position.

* * * * *